United States Patent
Kondiles et al.

(10) Patent No.: US 11,366,813 B2
(45) Date of Patent: Jun. 21, 2022

(54) MAXIMIZING IO THROUGHPUT VIA A SEGMENT SCHEDULER OF A DATABASE SYSTEM AND METHODS FOR USE THEREWITH

(71) Applicant: Ocient Holdings LLC, Chicago, IL (US)

(72) Inventors: George Kondiles, Chicago, IL (US); Daniel Coombs, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 17/155,439

(22) Filed: Jan. 22, 2021

(65) Prior Publication Data

US 2021/0240716 A1  Aug. 5, 2021

Related U.S. Application Data

(63) Continuation of application No. 16/778,194, filed on Jan. 31, 2020, now Pat. No. 11,061,910.

(51) Int. Cl.
*G06F 16/2455* (2019.01)
*G06Q 50/04* (2012.01)

(52) U.S. Cl.
CPC .... *G06F 16/24568* (2019.01); *G06F 16/2456* (2019.01); *G06Q 50/04* (2013.01)

(58) Field of Classification Search
CPC .......... G06F 16/24568; G06F 16/2456; G06F 16/24532; G06Q 50/04; Y02P 90/30
See application file for complete search history.

(56) References Cited

U.S. PATENT DOCUMENTS

| | | |
|---|---|---|
| 5,548,770 A | 8/1996 | Bridges |
| 5,926,807 A | 7/1999 | Peltonen et al. |
| 6,230,200 B1 | 5/2001 | Forecast |
| 6,633,772 B2 | 10/2003 | Ford |

(Continued)

FOREIGN PATENT DOCUMENTS

WO  2018187229 A1  10/2018

OTHER PUBLICATIONS

International Searching Authority; International Search Report; International Application No. PCT/US2021/014872; dated Jun. 2, 2021; 11 pgs.

(Continued)

*Primary Examiner* — Cam Y T Truong
(74) *Attorney, Agent, or Firm* — Garlick & Markison; Katherine C. Stuckman; Bruce E. Stuckman

(57) ABSTRACT

A method for execution by a node of a computing device includes determining a plurality of queries for concurrent execution. A plurality of sets of segments required to execute the plurality of queries is determined, and a set of virtual segments in the plurality of sets of segments is determined. A subset of the set of virtual segments is be determined by identifying ones of the set of virtual segments that are required to execute multiple ones of plurality of queries. A locally rebuilt set of rows for each of the set of virtual segments is generated by utilizing a recovery scheme. For each one of the set of virtual segments included in the subset, in response to generating the locally rebuilt set of rows, concurrent partial execution of corresponding multiple ones of the plurality of queries is facilitated.

16 Claims, 65 Drawing Sheets

(56) References Cited

U.S. PATENT DOCUMENTS

| | | | |
|---|---|---|---|
| 6,983,322 | B1 | 1/2006 | Tripp et al. |
| 7,499,907 | B2 | 3/2009 | Brown |
| 7,769,744 | B2 | 8/2010 | Waas et al. |
| 7,908,242 | B1 | 3/2011 | Achanta |
| 2001/0051949 | A1 | 12/2001 | Carey |
| 2002/0032676 | A1 | 3/2002 | Reiner |
| 2004/0162853 | A1 | 8/2004 | Brodersen |
| 2008/0133456 | A1 | 6/2008 | Richards |
| 2009/0063893 | A1 | 3/2009 | Bagepalli |
| 2009/0183167 | A1 | 7/2009 | Kupferschmidt |
| 2010/0082577 | A1 | 4/2010 | Mirchandani |
| 2010/0241646 | A1 | 9/2010 | Friedman |
| 2010/0274983 | A1 | 10/2010 | Murphy |
| 2010/0312756 | A1 | 12/2010 | Zhang |
| 2011/0219169 | A1 | 9/2011 | Zhang |
| 2012/0109888 | A1 | 5/2012 | Zhang |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | Mcwilliams |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0188841 | A1 | 7/2014 | Sun |
| 2014/0207760 | A1 | 7/2014 | Barron et al. |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |
| 2017/0134289 | A1* | 5/2017 | Xiao ..................... H04L 47/215 |
| 2020/0042428 | A1* | 2/2020 | Ophir ................. G06F 11/3692 |

OTHER PUBLICATIONS

A new high performance fabric for HPC, Michael Feldman, May 2016, Intersect360 Research.

Alechina, N (2006-2007) B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. . .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentibigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; dated Feb. 13, 2018; 17 pgs.

International Searching Authority; International Search Report and Written Opinion; International Application No. PCT/US2017/054784; dated Dec. 28, 2017; 10 pgs.

International Searching Authority; International Search Report and Written Opinion; International Application No. PCT/US2017/066145; dated Mar. 5, 2018; 13 pgs.

International Searching Authority; International Search Report and Written Opinion; International Application No. PCT/US2017/066169; dated Mar. 6, 2018; 15 pgs.

International Searching Authority; International Search Report and Written Opinion; International Application No. PCT/US2018/025729; dated Jun. 27, 2018; 9 pgs.

International Searching Authority; International Search Report and Written Opinion; International Application No. PCT/US2018/034859; dated Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon com/amazondynamodb/latestldeveloperguide!Ti. . . .

* cited by examiner database system 10 computing device 18 computing device 18 computing device 18 node 37 node 37 node 37

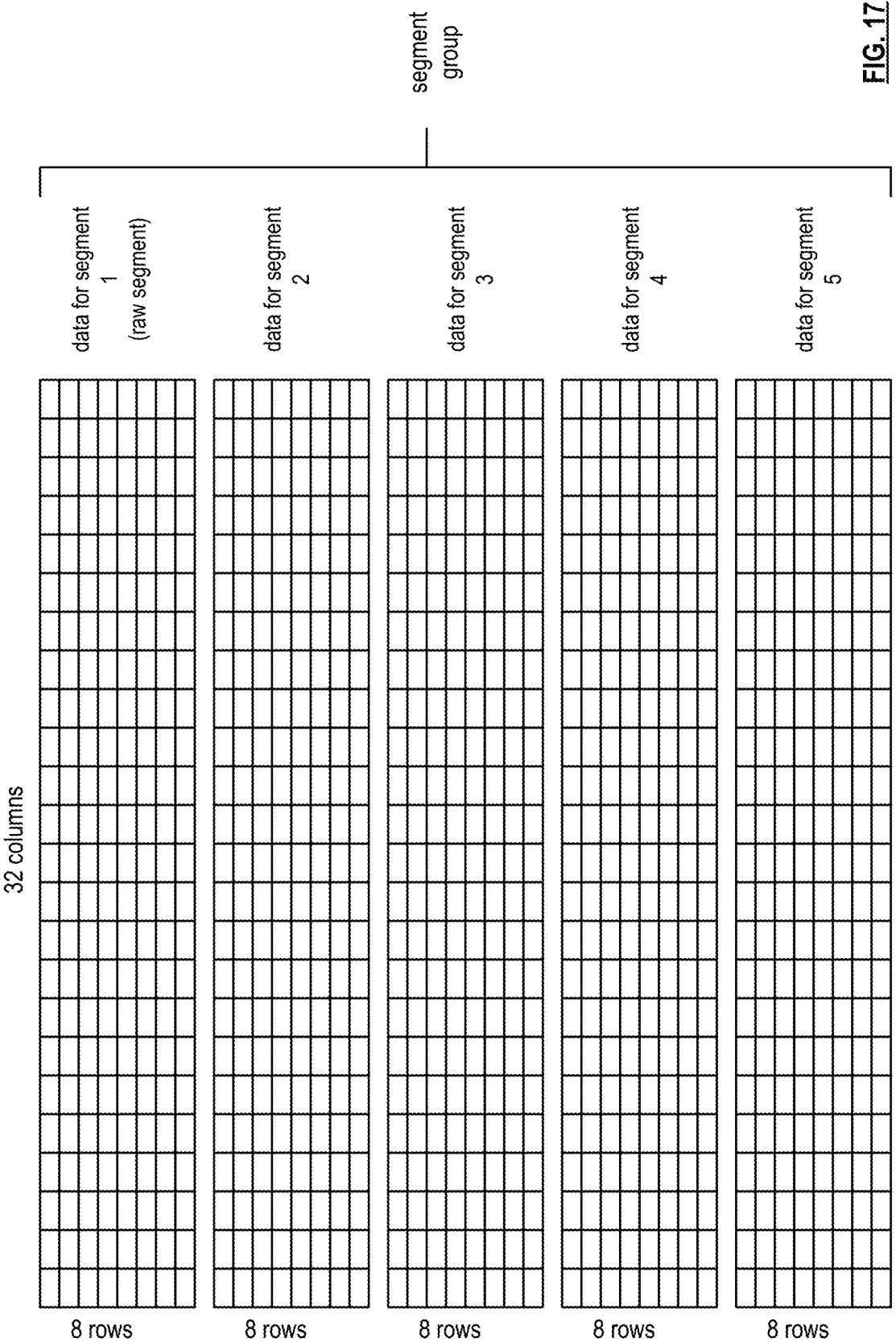

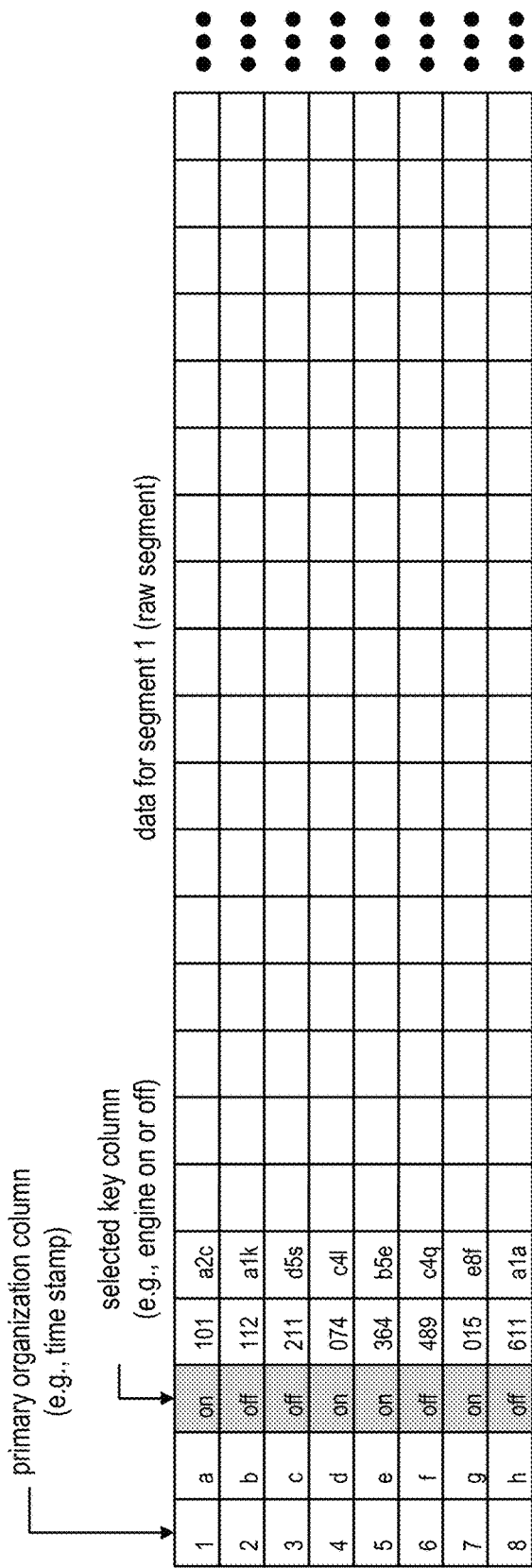

FIG. 21 node 37 node 37 node 37 node 37 node 37 node 37 node 37

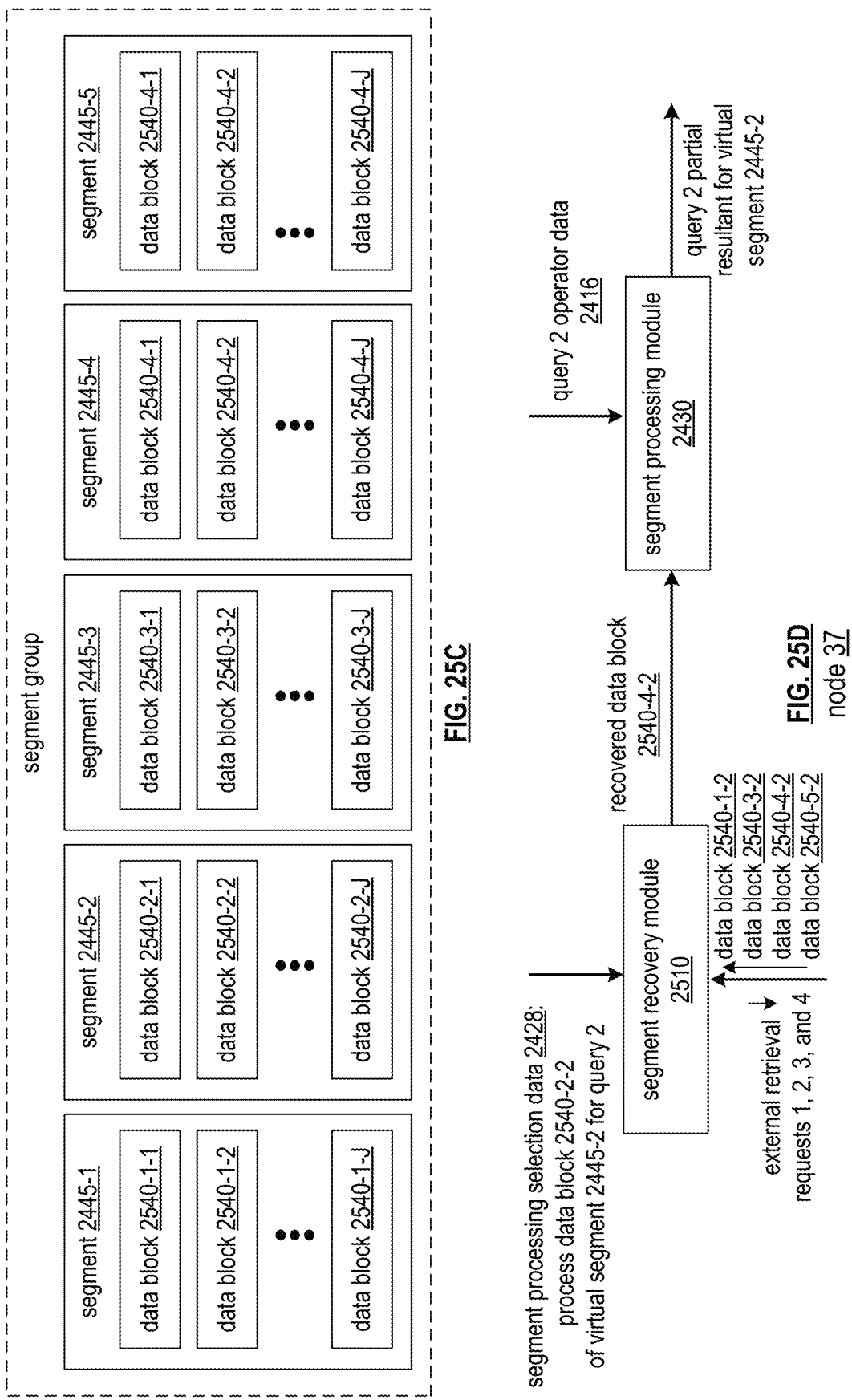

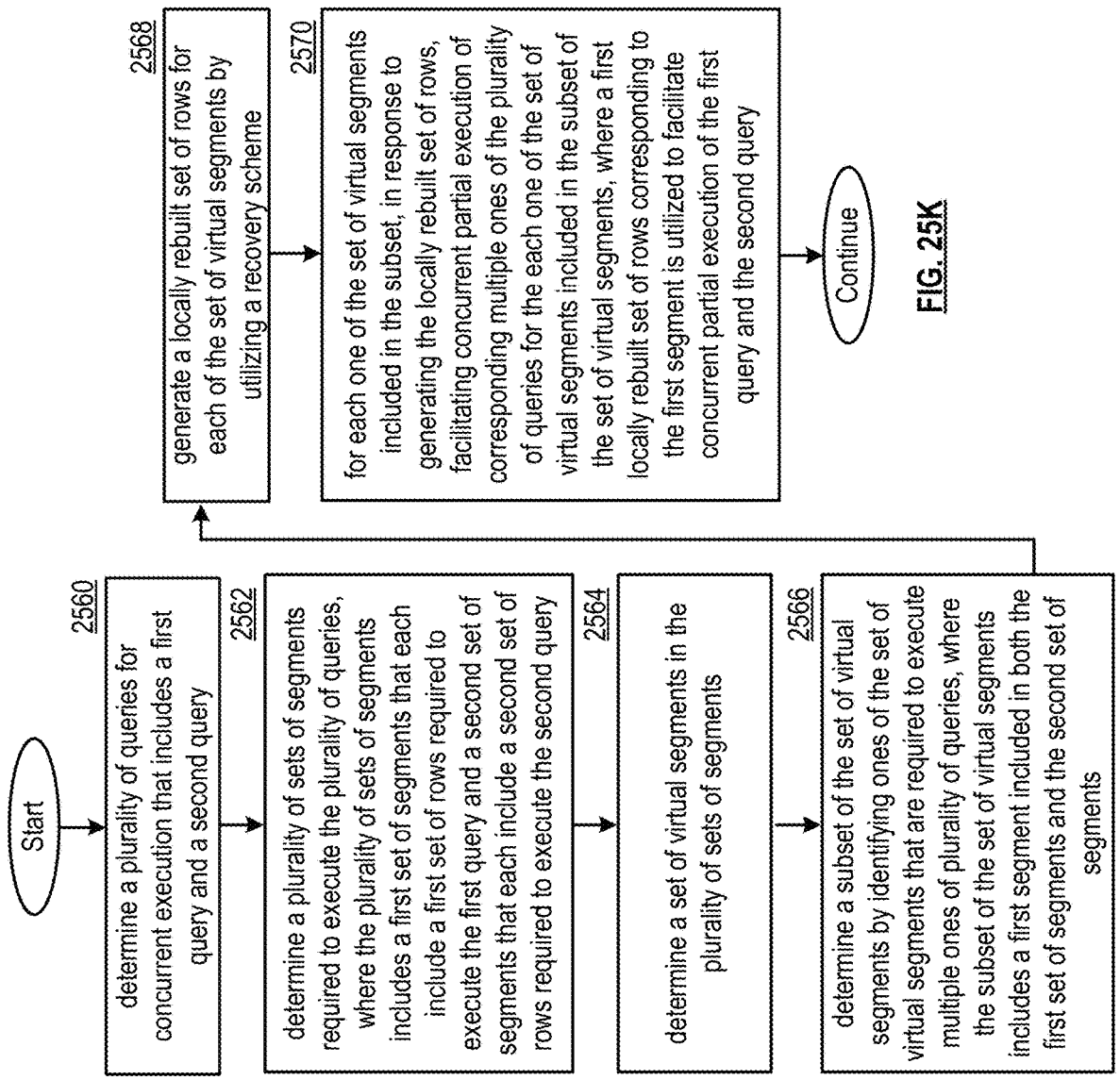

node 37

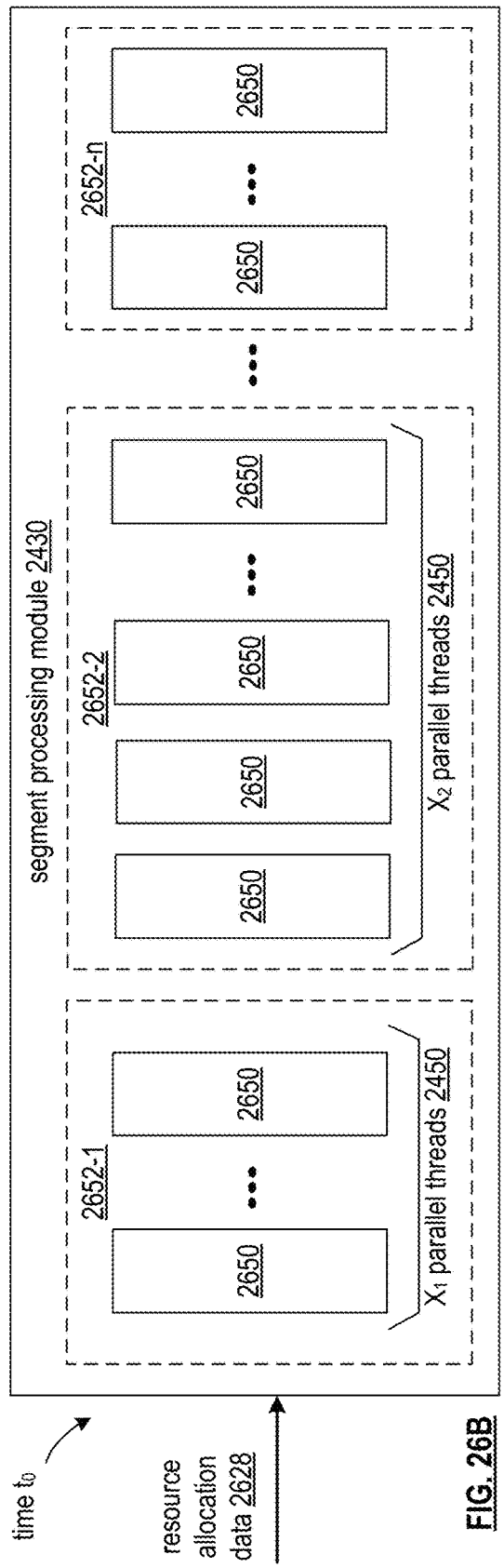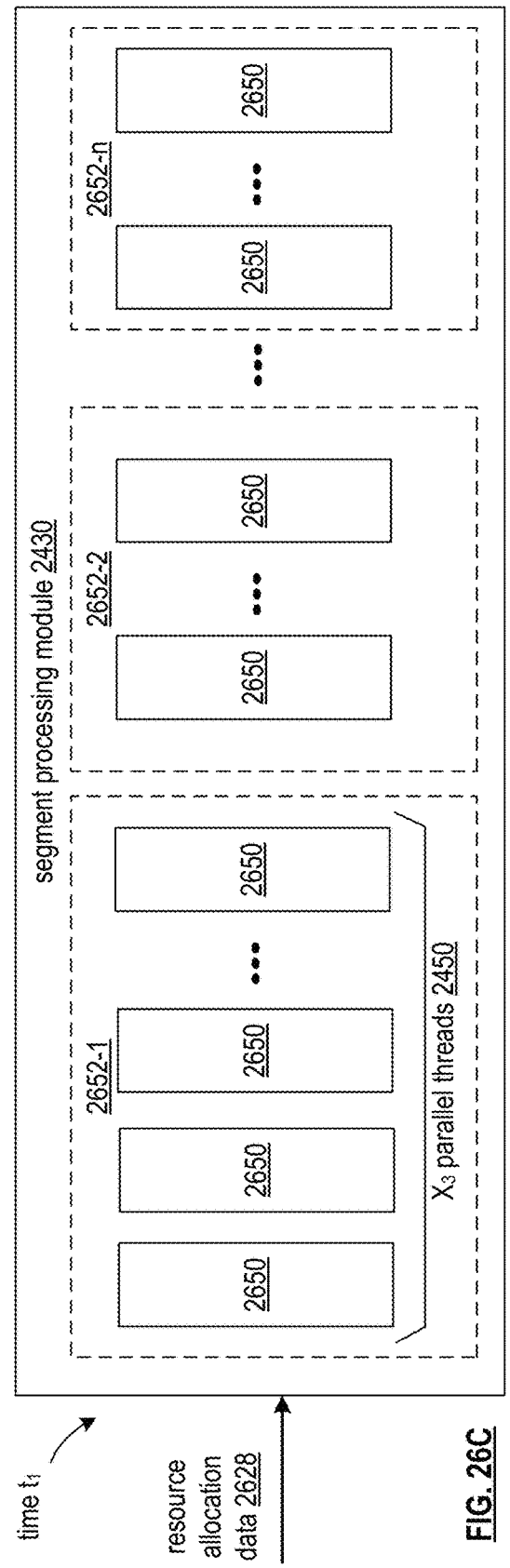

node 37-1 node 37-2 node 37-1 node 37-1

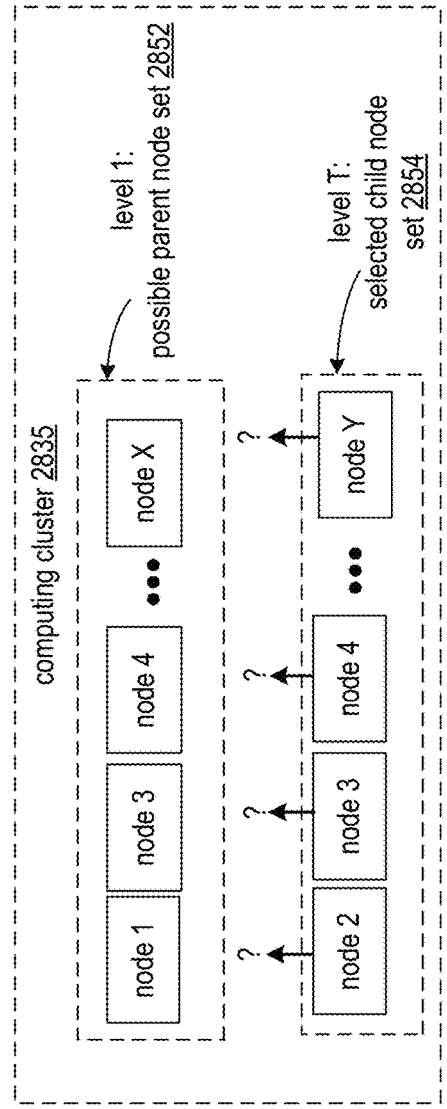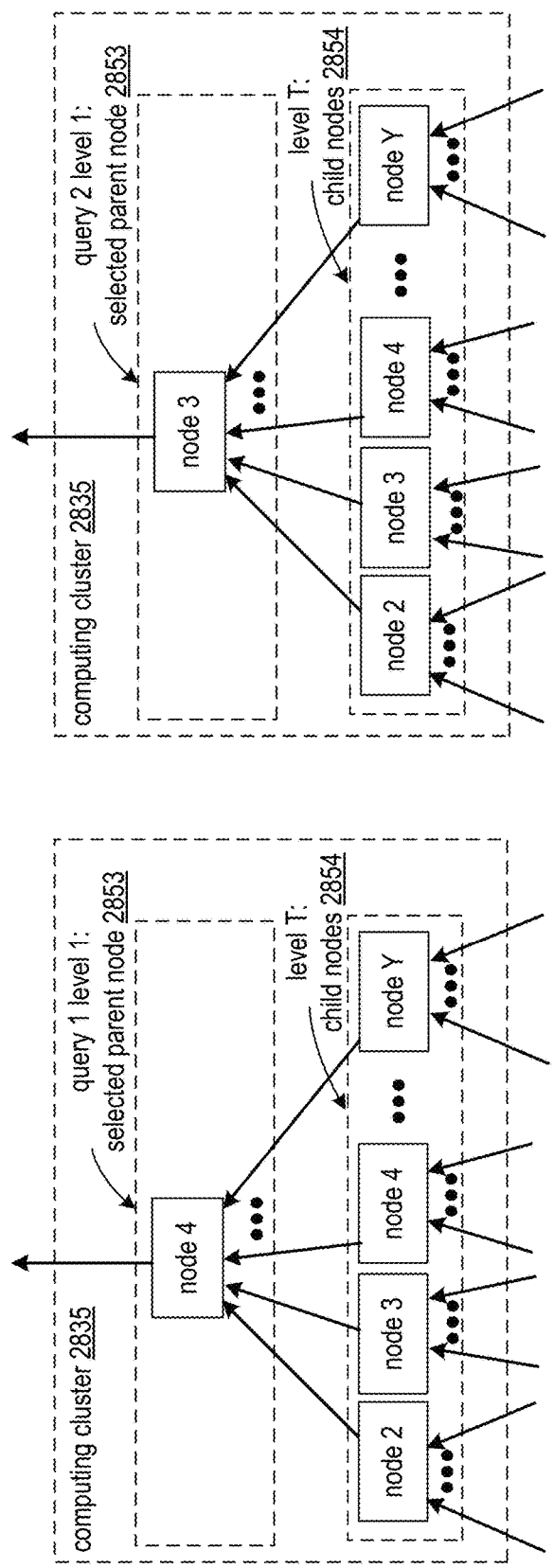

node 37 node 37

MAXIMIZING IO THROUGHPUT VIA A SEGMENT SCHEDULER OF A DATABASE SYSTEM AND METHODS FOR USE THEREWITH

CROSS-REFERENCE TO RELATED APPLICATIONS

The present U.S. Utility Patent Application claims priority pursuant to 35 U.S.C. § 120 as a continuation of U.S. Utility application Ser. No. 16/778,194, entitled "SERVICING CONCURRENT QUERIES VIA VIRTUAL SEGMENT RECOVERY", filed Jan. 31, 2020, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with the present invention;

FIG. 25C illustrates an embodiment of a segment group in accordance with the present invention;

FIGS. 25D-25F are schematic block diagrams of embodiments of a node that implements a segment recovery module to process virtual segments in accordance with the present invention;

FIG. 25K is a logic diagram illustrating a method of utilizing a locally rebuilt segment to service multiple concurrently executing queries in accordance with the present invention;

FIG. 26B-26C illustrate embodiment of a segment processing module that utilizes a plurality of sets of parallel threads to concurrently process a plurality of segments in accordance with the present invention;

FIGS. 28E-28G are schematic block diagram of an example embodiment of a computing cluster utilized to execute multiple queries in accordance with the present invention;

DETAILED DESCRIPTION OF THE INVENTION

Figure 1:
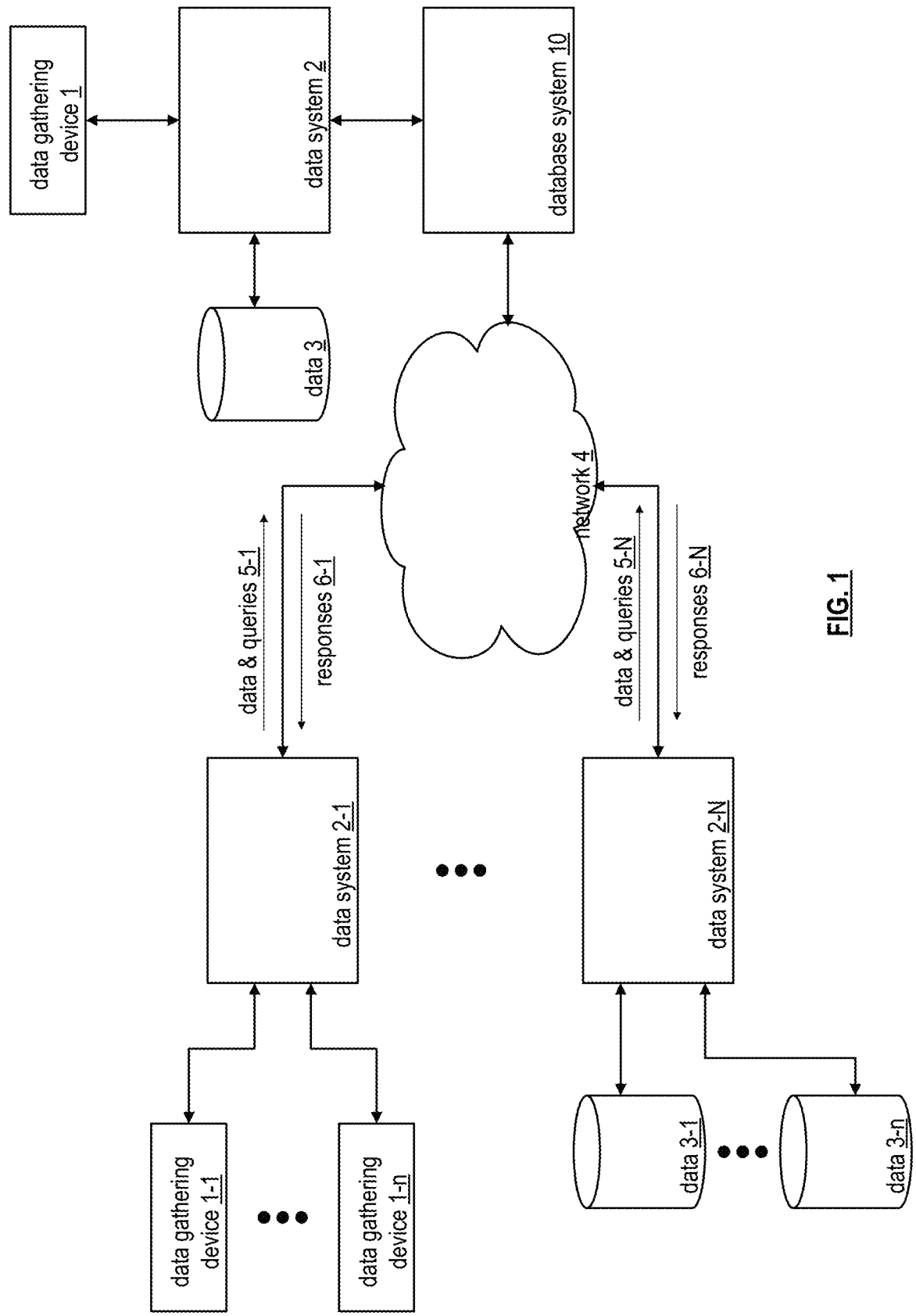
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-$n$), data systems (2, 2-1 through 2-N), data storage systems (3, 3-1 through 3-$n$), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
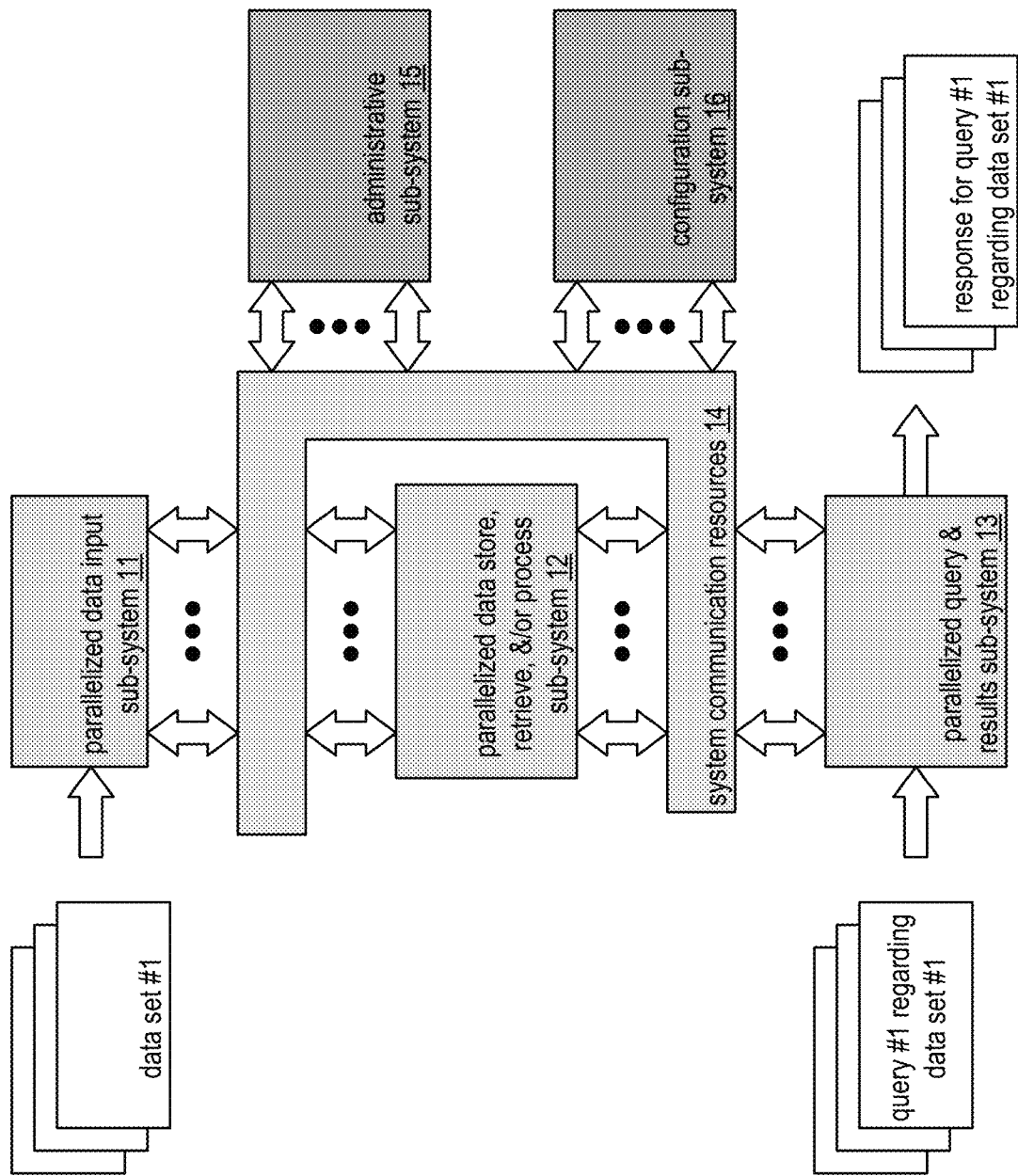
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
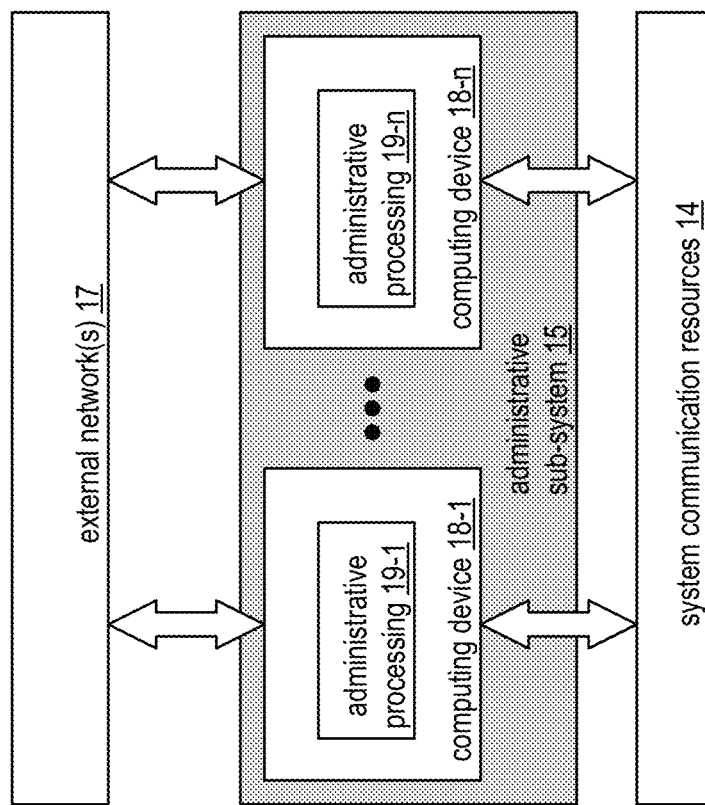
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
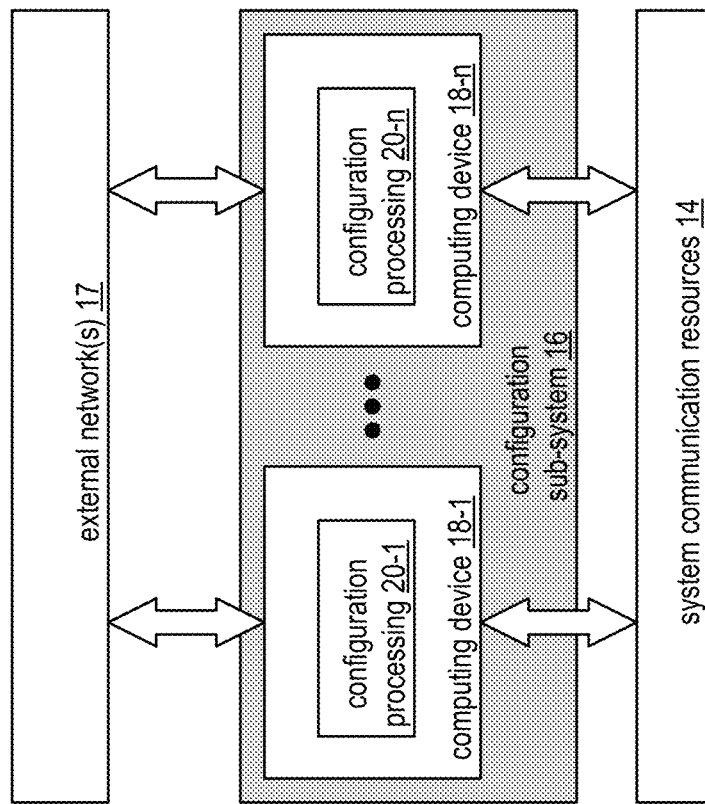
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
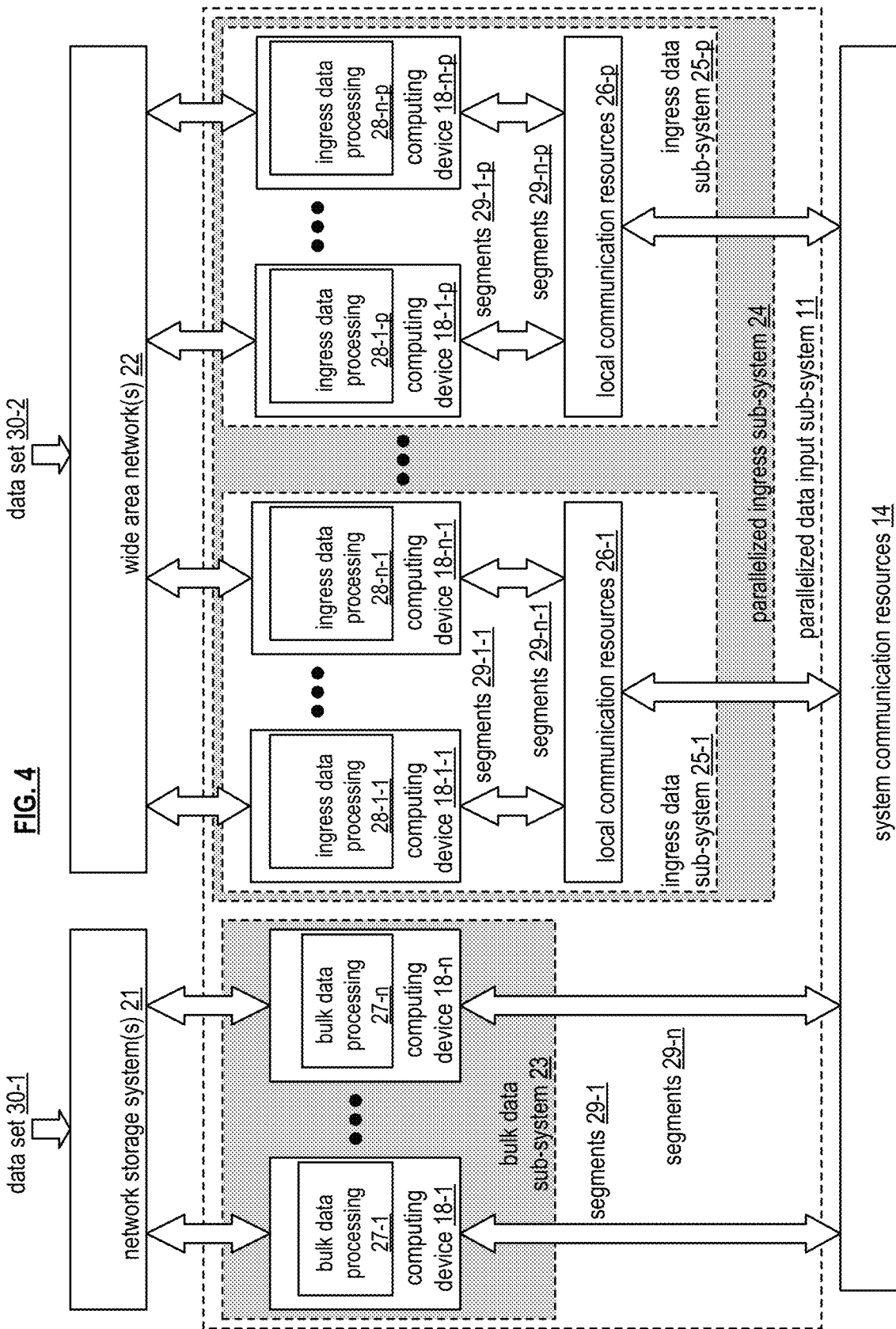
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
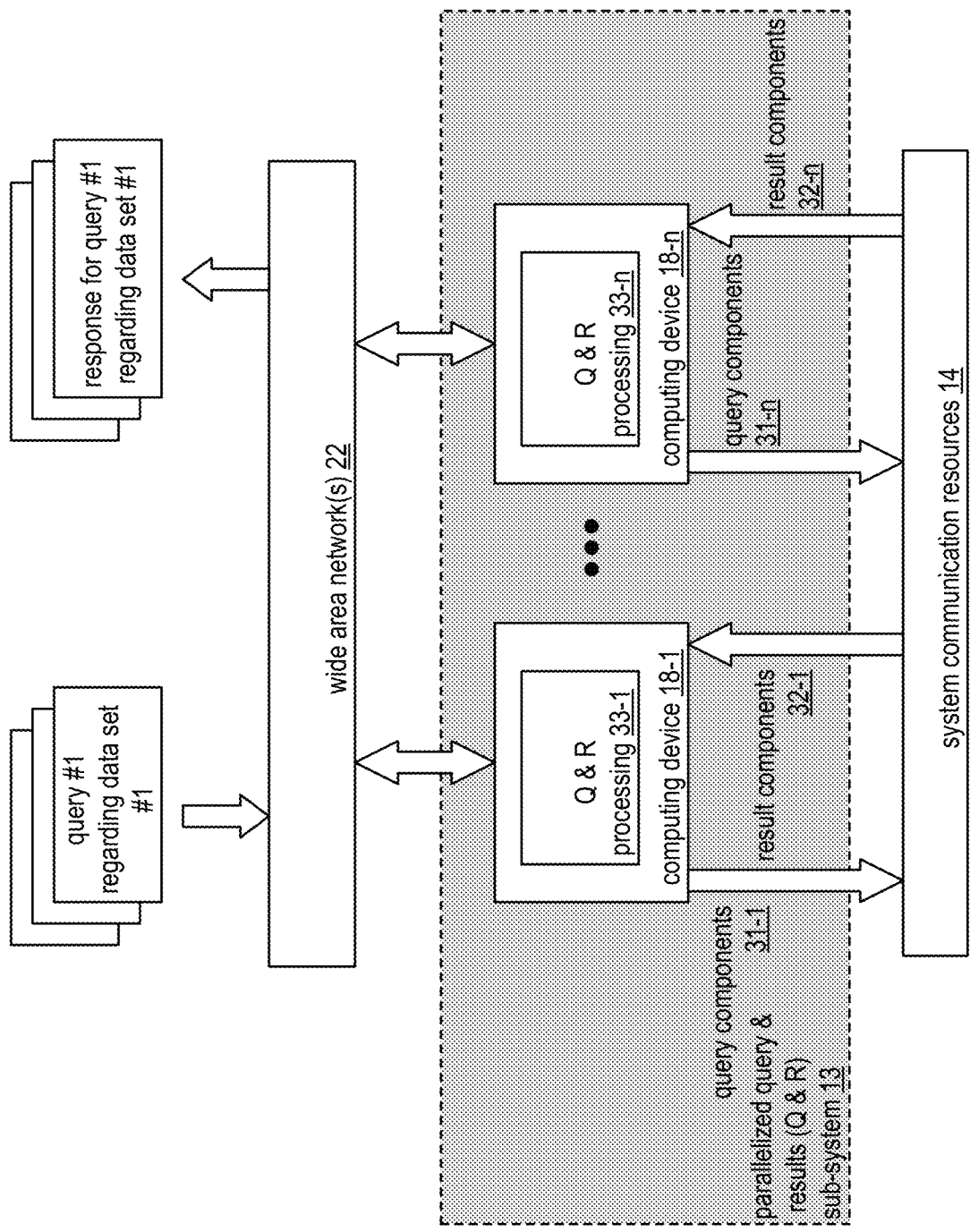
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-*n*. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
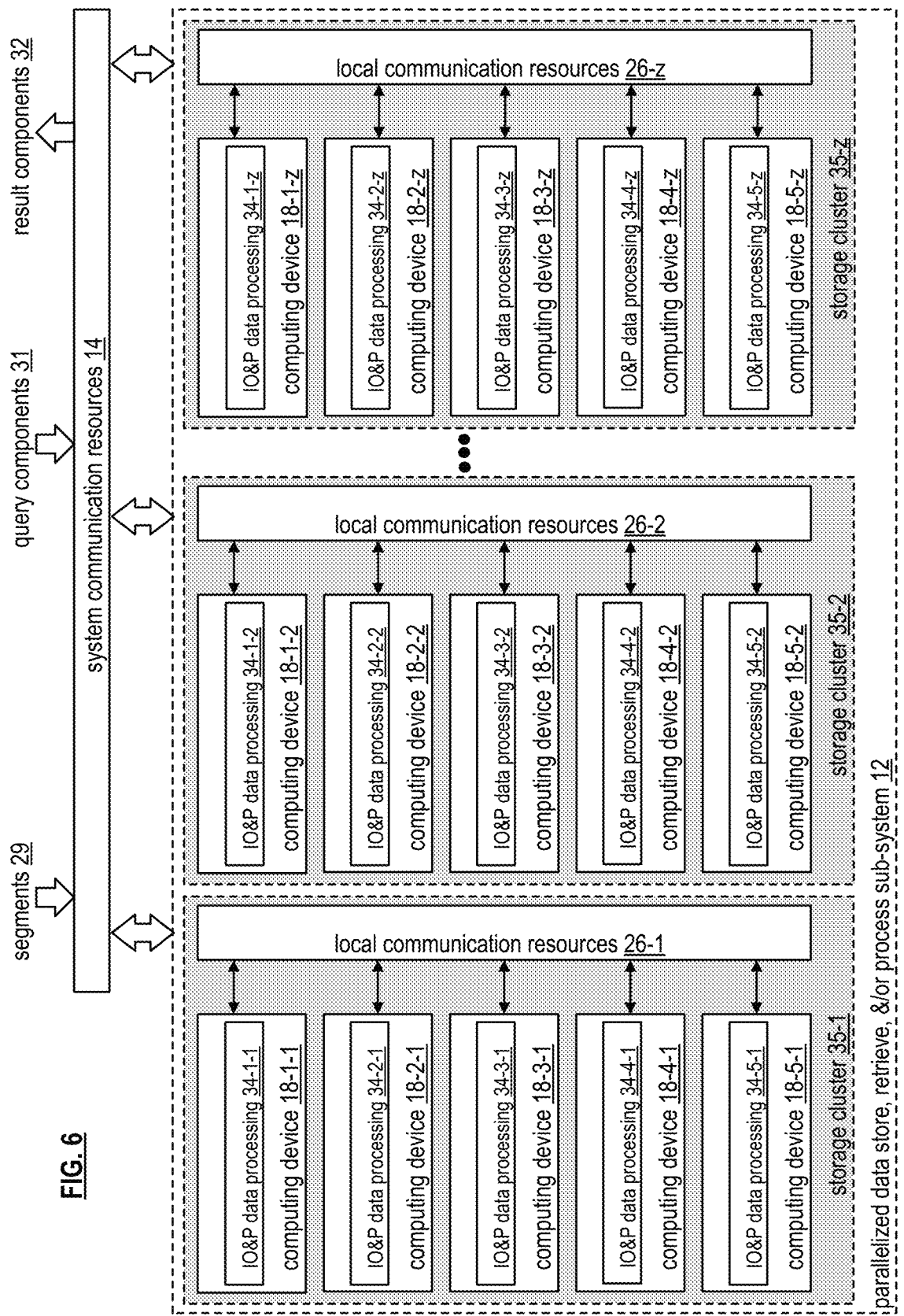
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-*z*. Each storage cluster includes a corresponding local communication resource 26-1 through 26-*z* and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-*n* are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
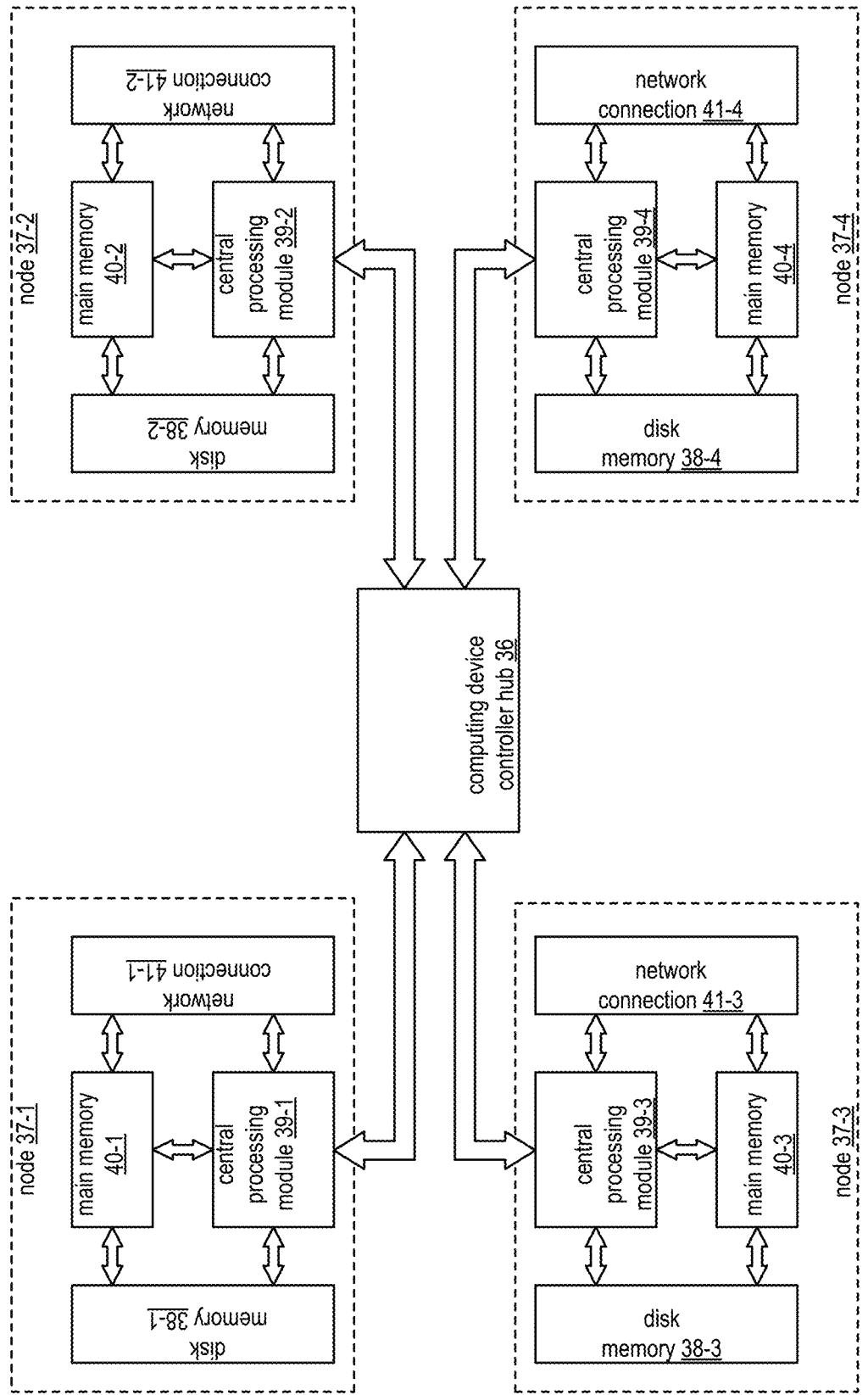
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
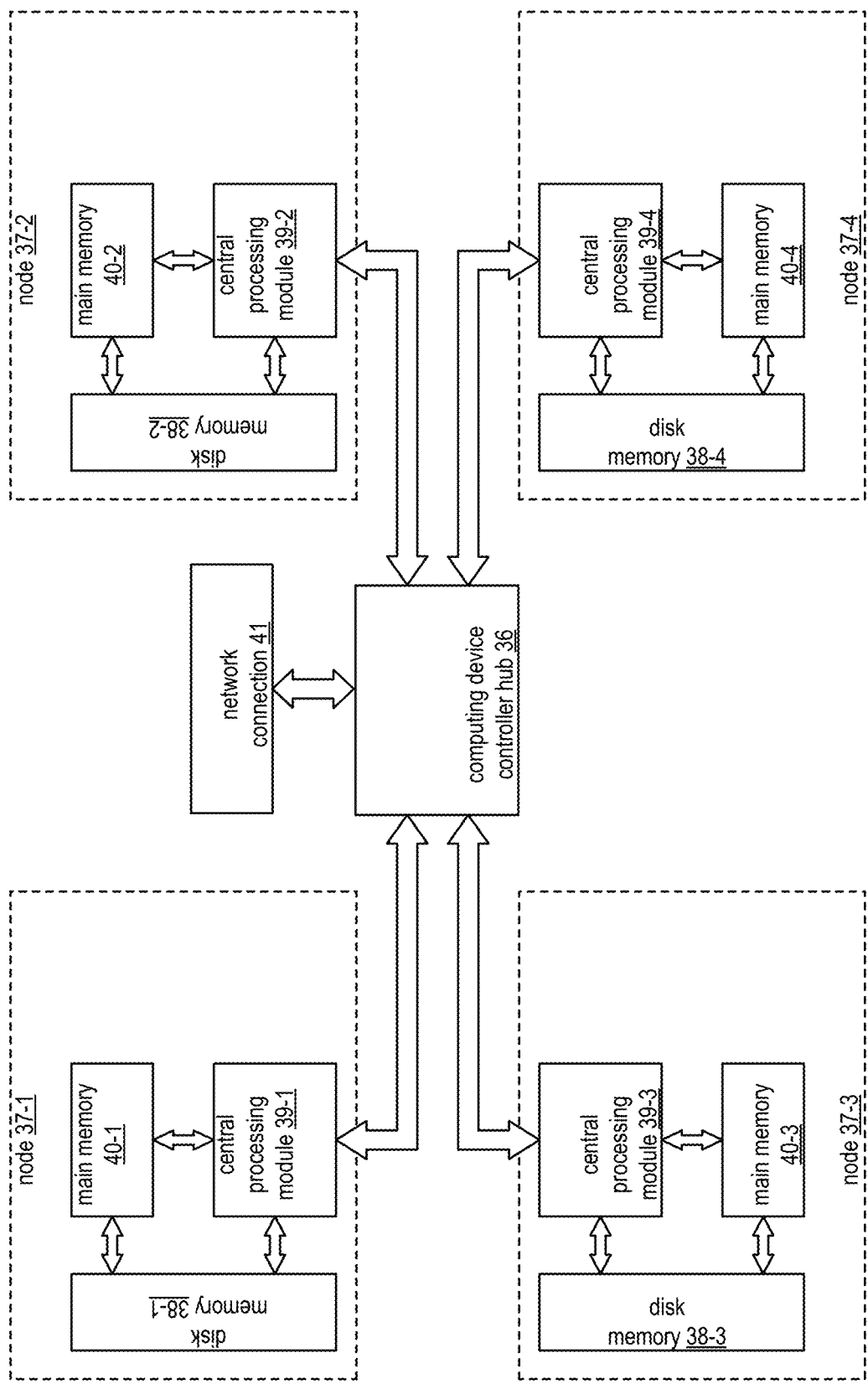
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
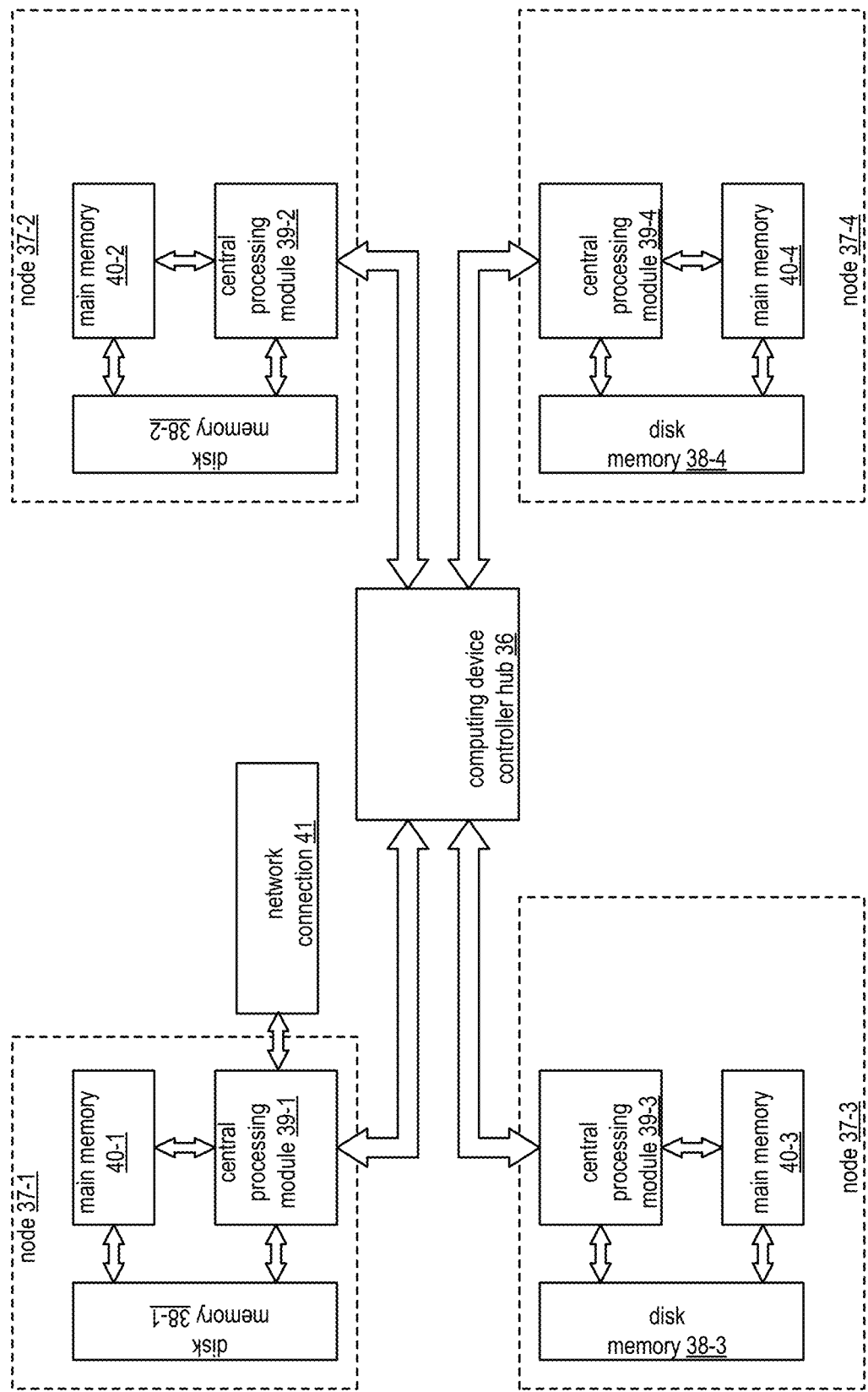
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
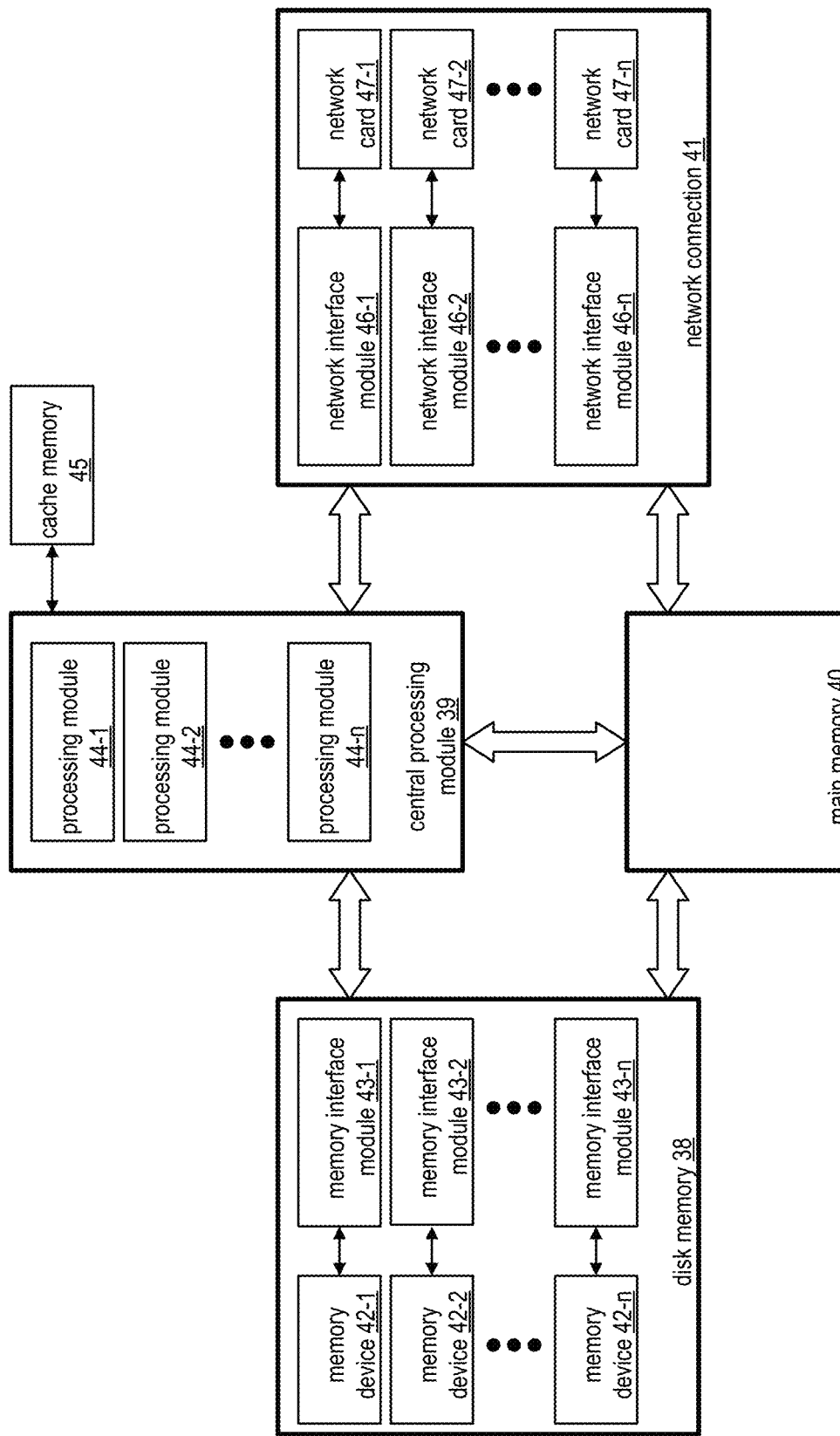
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-*n* and an associated one or more cache memory 45. A processing module is as defined at the end of the detailed description.

The disk memory 38 includes a plurality of memory interface modules 43-1 through 43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
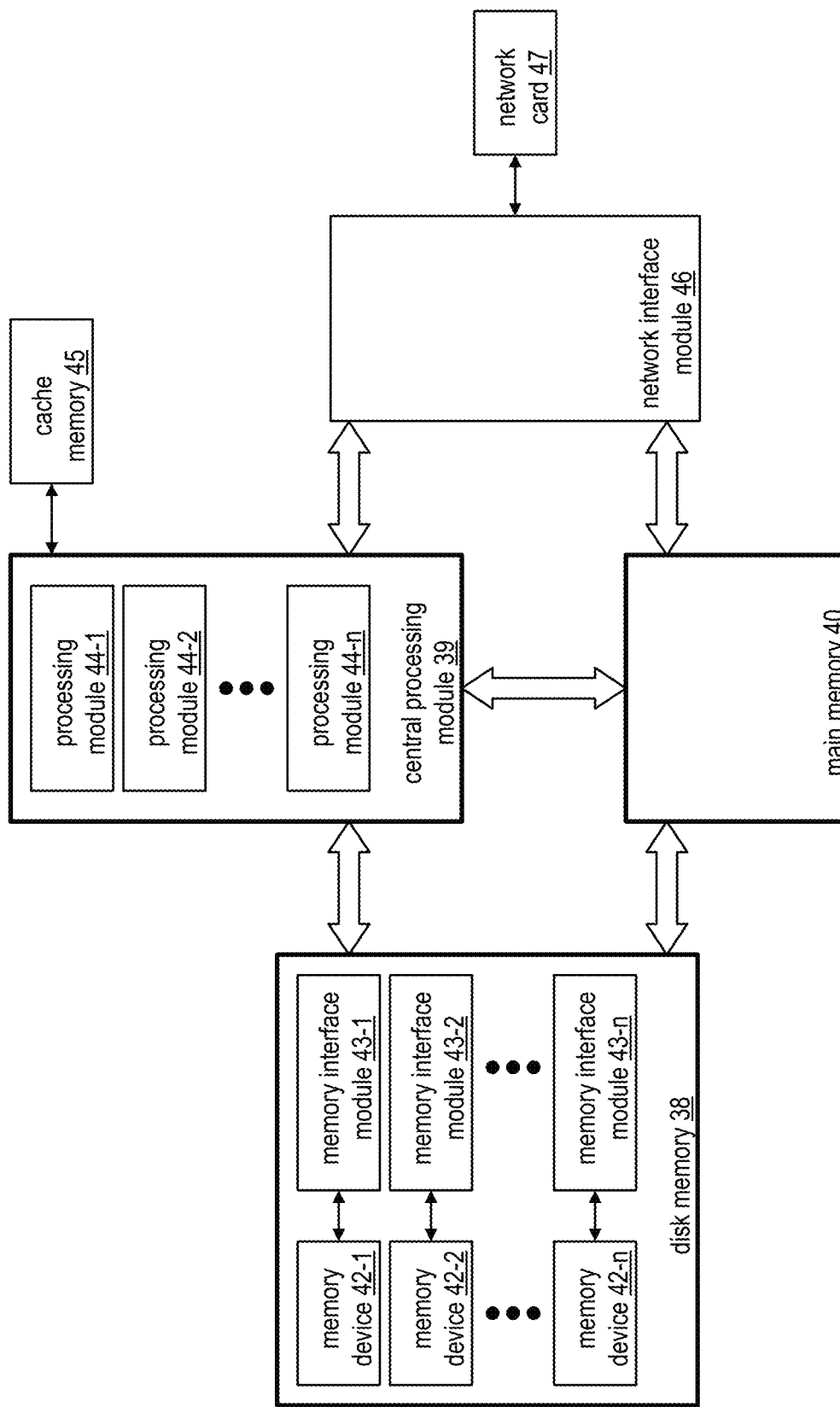
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
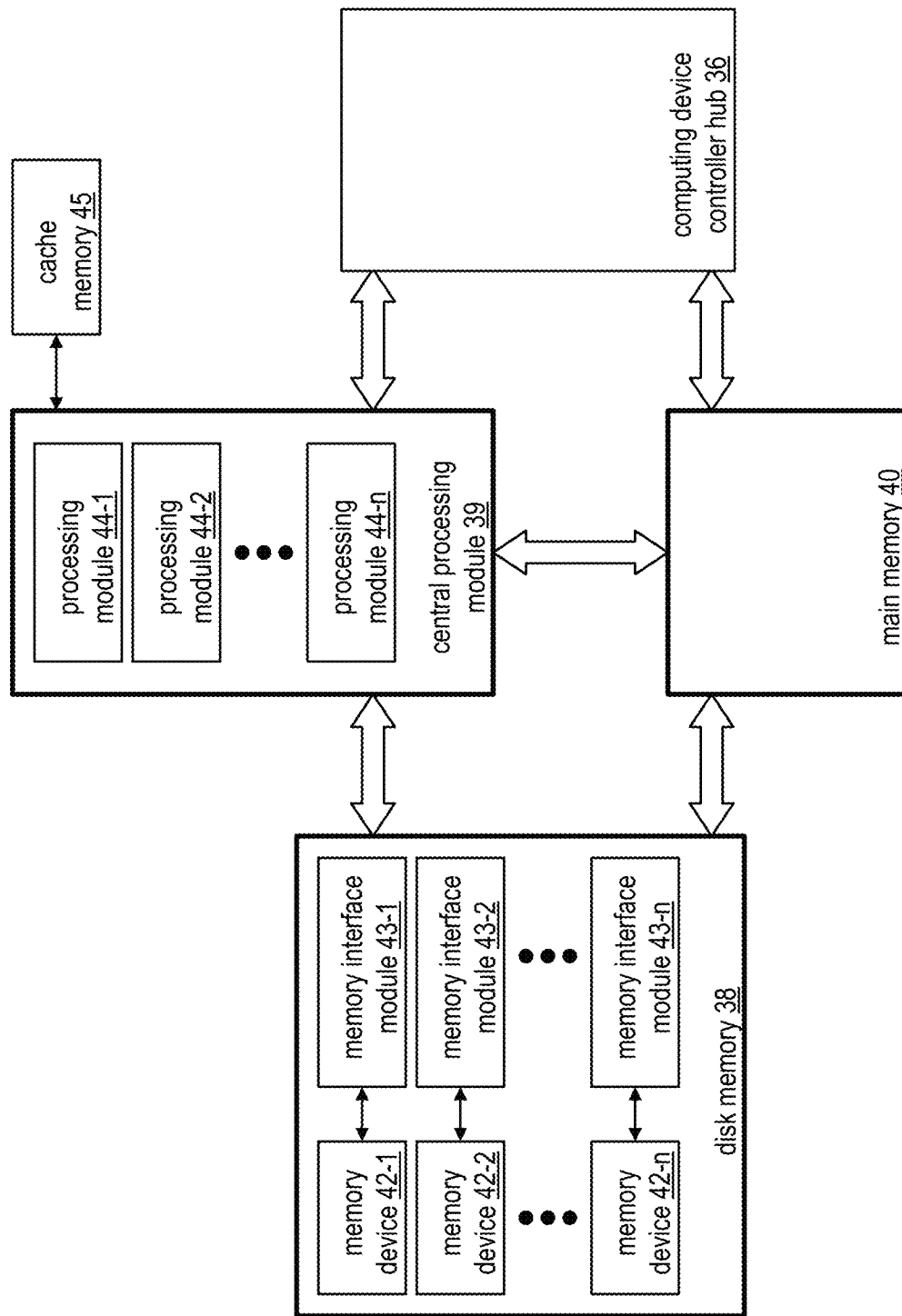
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
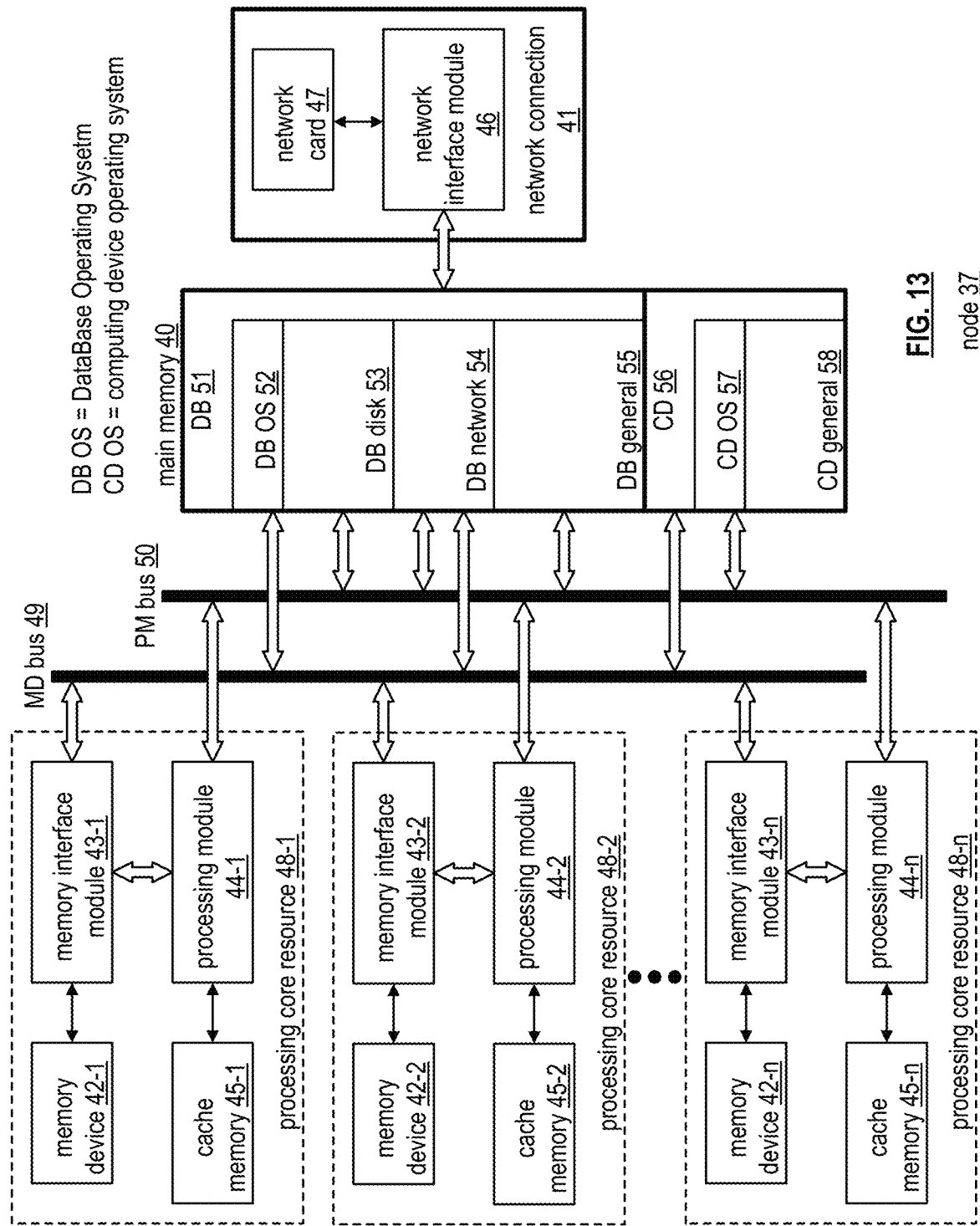
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-n, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-n, a corresponding memory interface module 43-1 through 43-n, a corresponding memory device 42-1 through 42-n, and a corresponding cache memory 45-1 through 45-n. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
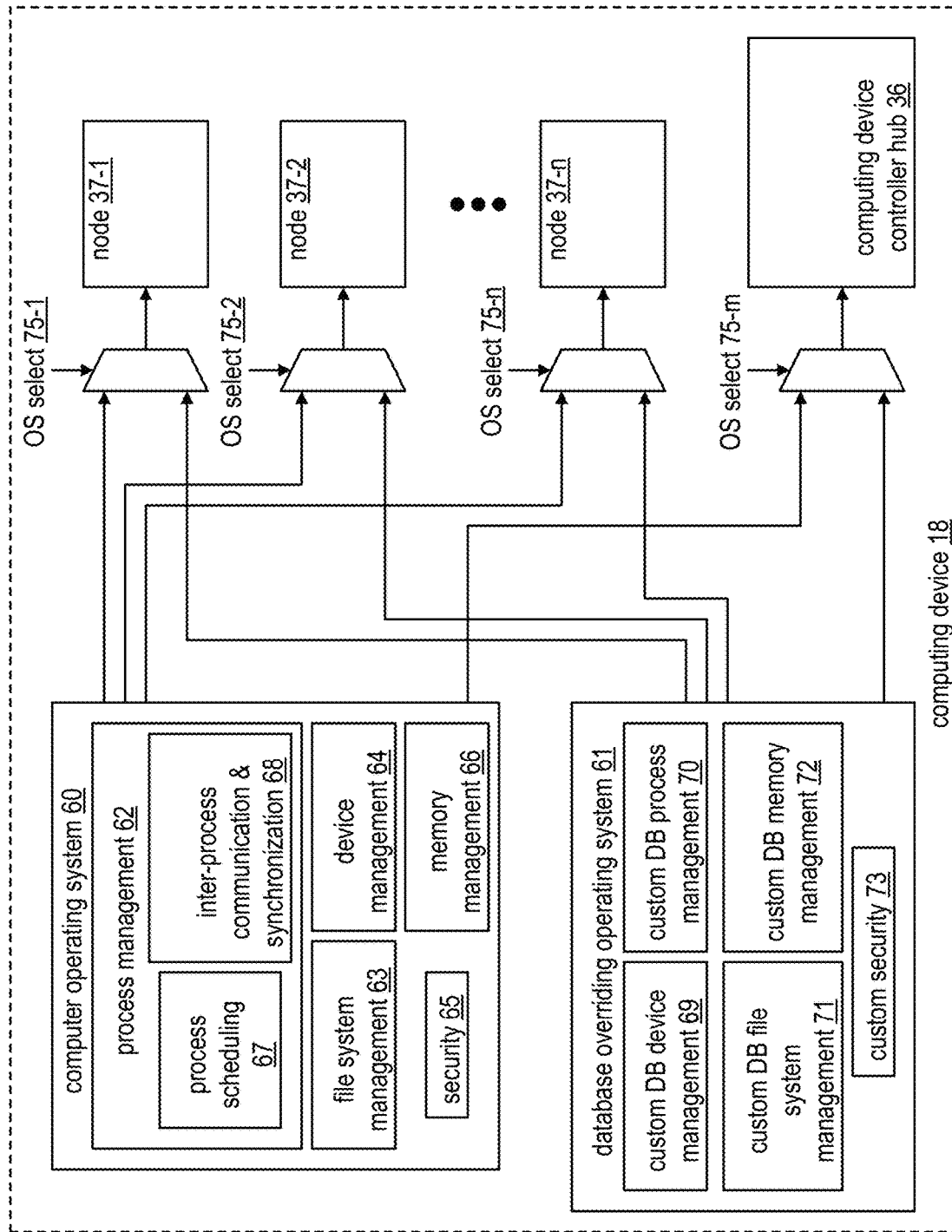
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-n and via OS select 75-m when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

Figure 15:
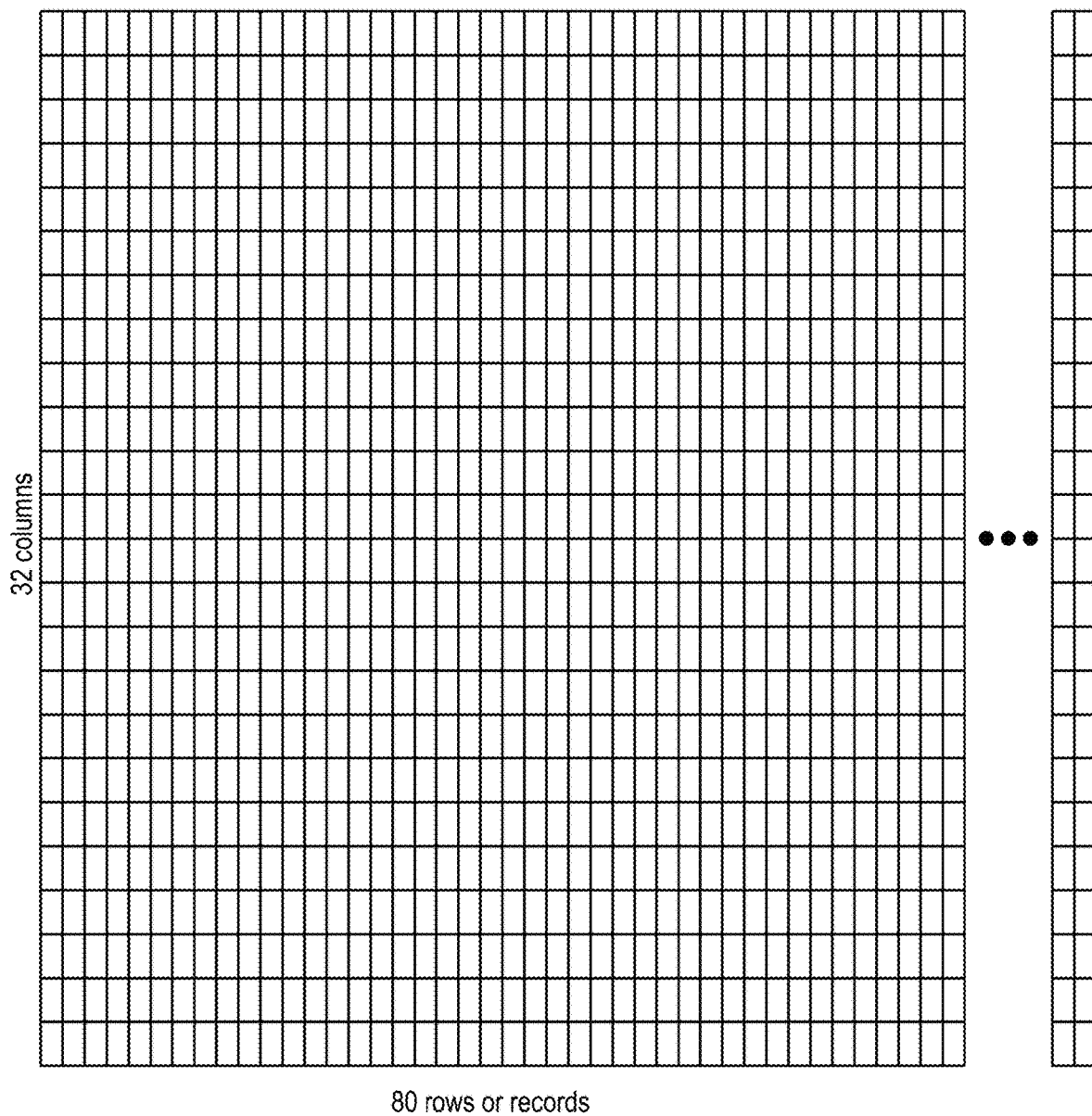

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
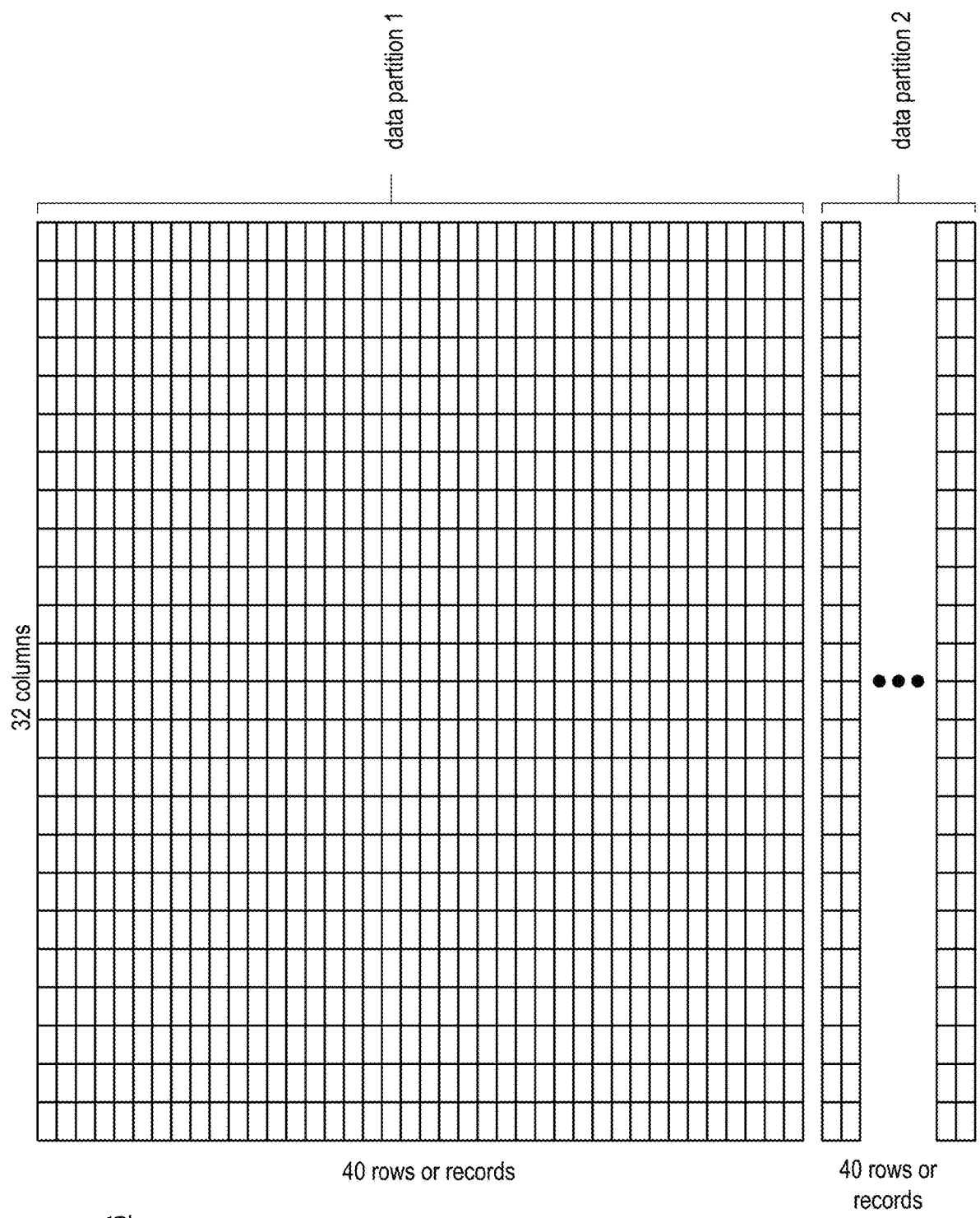

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
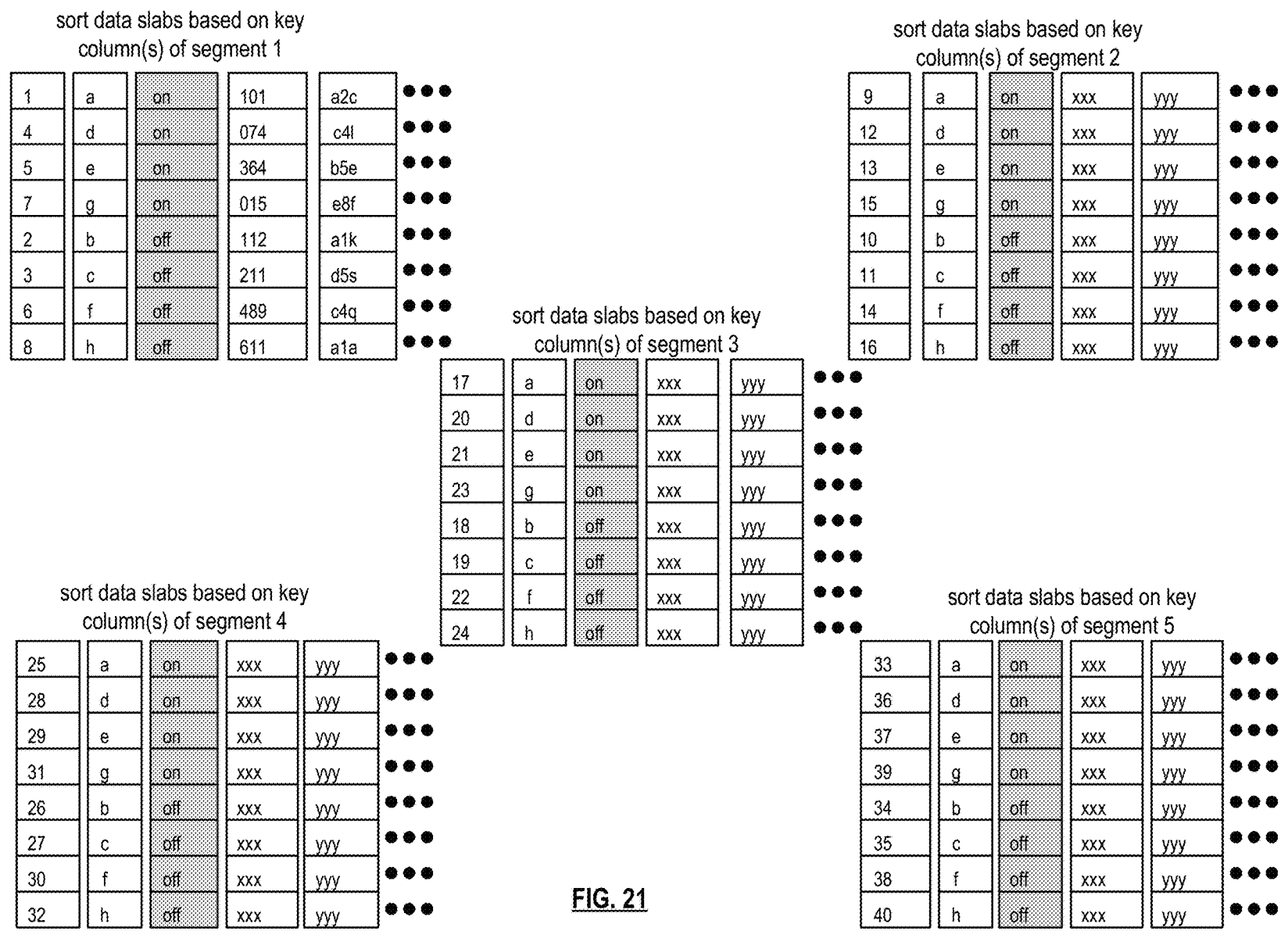

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
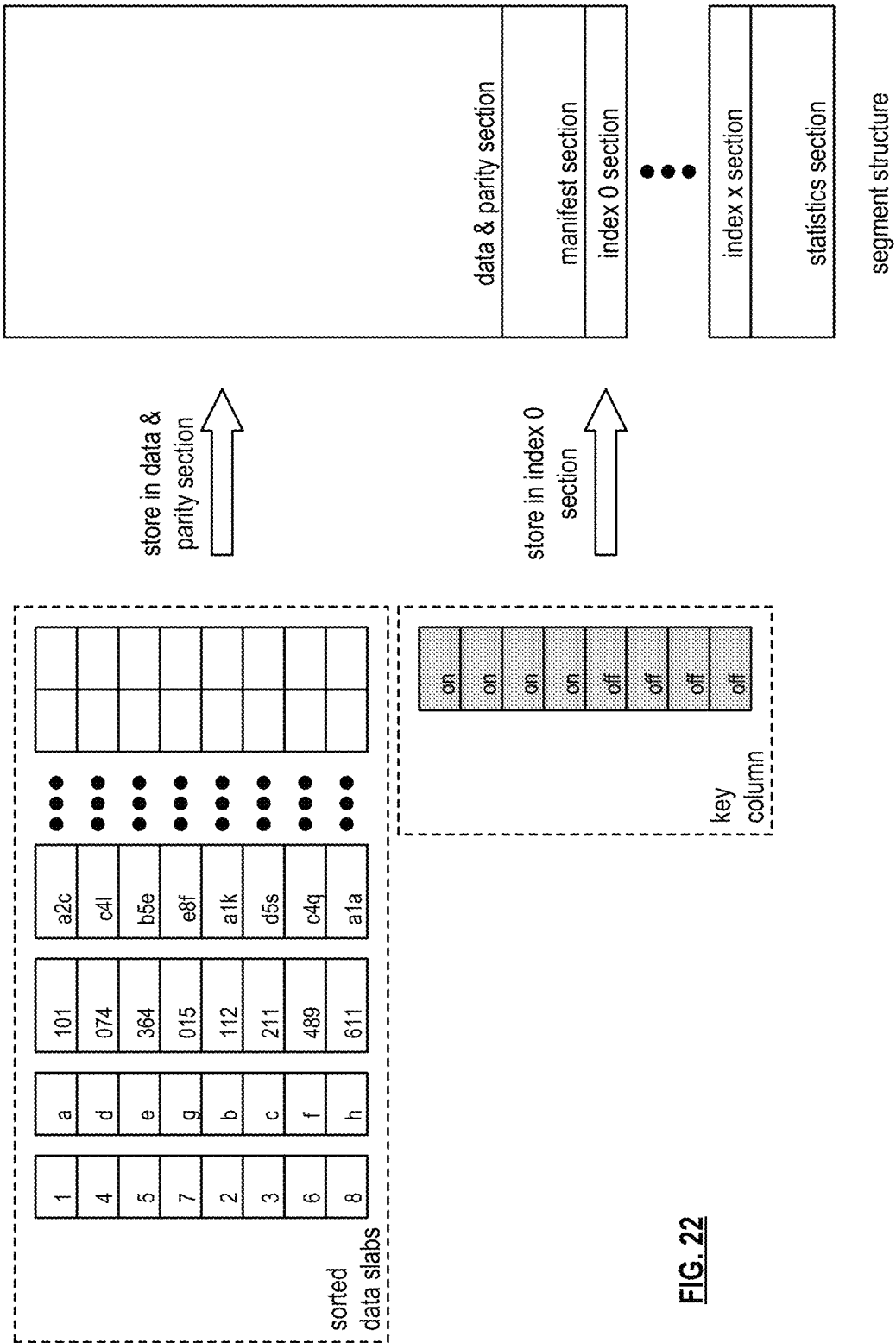

FIG. 22 illustrates an example of a segment structure for a segment of the segment group. The segment structure for a segment includes the data & parity section, a manifest section, one or more index sections, and a statistics section.

The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within in coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
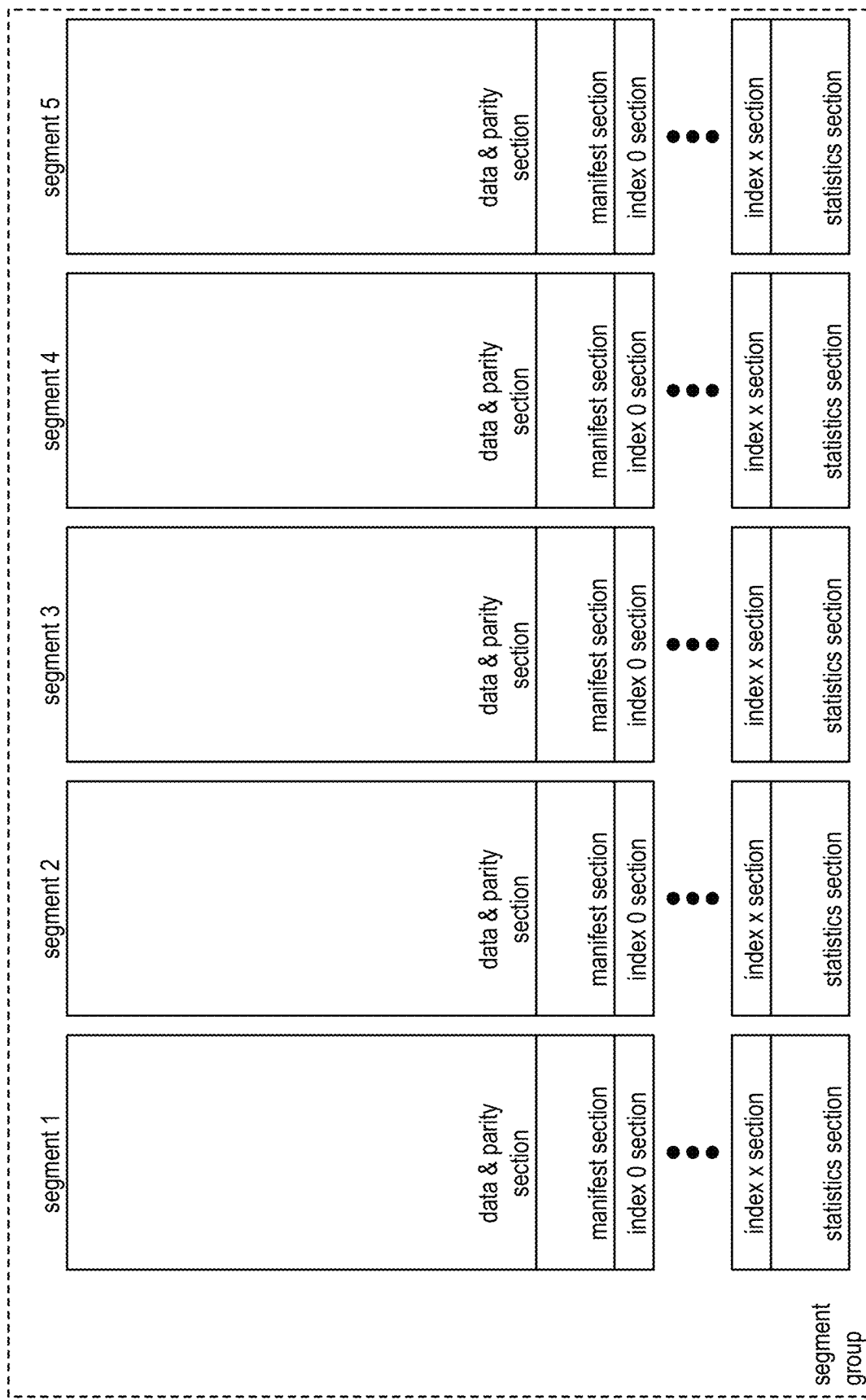

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

FIGS. 24A-24K illustrate various embodiments of a node 37 of a computing device 18 that is operable to implement a segment scheduler module 2410. The embodiments illustrated in 24A-24K can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13. The embodiments of node 37 discussed in conjunction with FIGS. 24A-24K can be utilized to implement any other nodes 37 of database system 10 discussed herein. The embodiments of node 37 illustrated in FIGS. 24A-24K are operable to schedule retrieval and/or processing of a plurality of segments required for execution of one or more queries over a plurality of sequential time slices. In particular, the retrieval and/or processing of segments can be scheduled based on maximizing and/or otherwise optimizing drive utilization of a plurality of drives storing the plurality of segments.

Figure 24A:
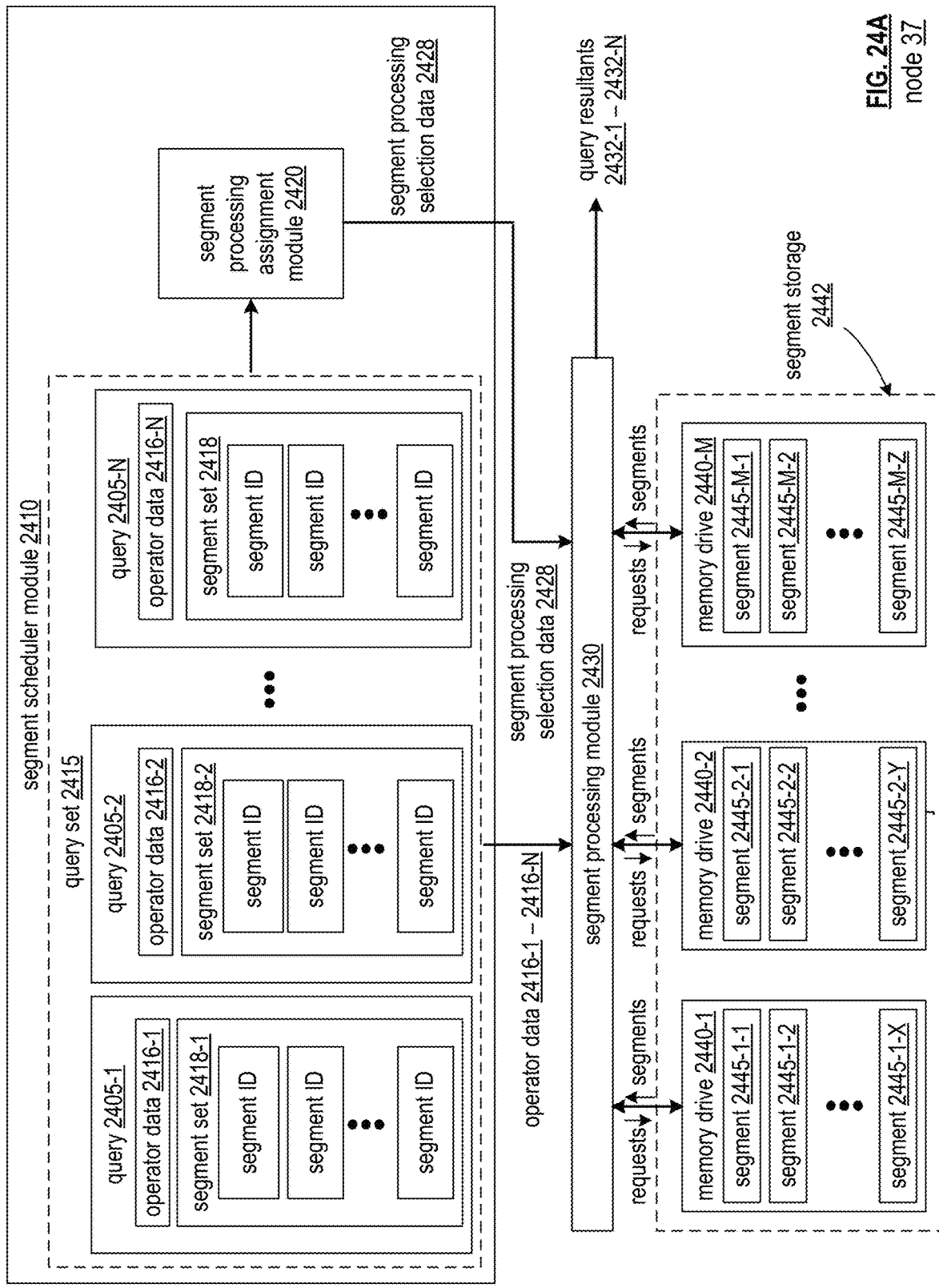
FIGS. 24A-24F are schematic block diagrams of various embodiments of a node of a computing device that implements a segment scheduler module in accordance with the present invention.

As illustrated in FIG. 24A, a node 37 can include segment storage 2442 that includes plurality of M memory drives 2440-1-2440-M. Different nodes 37 can include the same or different number of memory drives. Some or all memory of each memory drive 2440 can be designated for storage of a plurality of segments 2445. Different memory drives 2440-1-2440-M can store the same or different number of segments. For example, as illustrated in FIG. 24A, memory drive 2440-1 can store X segments that include segment 2445-1-1-2445-1-X; memory drive 2440-2 can store Y segments that include segment 2445-2-1-2445-2-Y; and memory drive M can store Z segments that include segment 2445-M-1-2445-M-Z. While the segments are labeled with sequential numbers in FIG. 24A in each memory drive, the set of segments stored by each memory drive 2440 can correspond to sequential or non-sequential partitions of data from the same or different tables and/or same or different datasets of the database system 10.

The segments stored by a memory drive 2440 can correspond to the segments discussed in conjunction with FIGS. 15-23, for example, where the segments are generated and stored in conjunction with a redundancy storage encoding scheme as discussed in conjunction with FIGS. 15-23. Alternatively, the segments stored by memory devices 2440 as discussed herein can correspond to other data that are not generated in conjunction with the redundancy storage encoding scheme discussed in in conjunction with FIGS. 15-23. For example, some or all segments can include and/or be processed to recover a subset of rows of one or more tables; a subset of columns of one or more tables; a set of data slabs of one or more tables and/or one or more other data sets; a set of data partitions of one or more tables and/or one or more other data sets; and/or other portions of data stored by the database system 10 as discussed herein. As discussed herein, each data segment can indicate a particular subset of rows of a particular table, where a subset of fields and/or columns or an entirety of fields and/or columns of each row in the particular subset of rows is included in the segment. In some embodiments, each segment of the node 37 is stored in exactly one memory drive 2440-1-2440-M. In some embodiments, each segment of the database system 10 is further stored in exactly one memory drive 2440 of exactly one node 37.

Each memory drive 2440 can be implemented by one or more memory devices such as one or more solid state memory devices and/or disk memories. Different memory drives 2440-1-2440-M can be implemented by the same or different one of more memory devices, and/or can be implemented by the same or different types of one or more distinct memory devices.

In some embodiments, some or all memory drives 2440 of a node 37 are implemented by utilizing disk memory 38 of the node 37 and/or main memory 40 of the node 37. For example, some or all memory drives 2440-1-2440-M of a node 37 can each be implemented by a designated portion of a memory device 42 of the node 37, where a single memory device 42 includes multiple memory drives 2440. As another example, some or all memory drives 2440 of a node 37 is implemented by its own memory device 42 of the node 37, where some or all memory devices 42-1-42-*n* each implement one memory device 2440. As another example, some or all memory drive 2440 of a node 37 can be implemented by utilizing multiple memory devices 42 of the node. Alternatively, some or all memory drives 2440 of a node 37 can be implemented utilizing other memory resources and/or additional memory devices of the node 37.

In some embodiments, all of the memory drives 2440-1-2440-M of a particular node 37 are integrated within and/or accessible via storage resources of the particular node 37, such as disk memory 38 and/or main memory 40 of the node 37. In such cases, each of the plurality of nodes 37 of one or more computing devices 18 can include and/or access segments stored by their own designated set of memory drives 2440, for example, where each memory device is owned by and/or accessible by exactly one corresponding node 37. In other embodiments, some memory drives 2440 are accessible by multiple nodes 37. In such cases, one or more memory drives 2440 of implemented by a particular node 37 can be accessed by other nodes 37, for example, where some or all nodes 37 in a computing device 18 can access one or more memory drives 2440 of some or all other nodes 37 in the same computing device. In some cases, other nodes only access segments from one or more memory drives of a particular node's memory resources to facilitate recovery of virtual segments being processed by the other nodes, as discussed in further detail in conjunction with FIGS. 25A-25L. In some embodiments, one or more memory drives 2440 can be implemented utilizing shared resources of multiple nodes of the same computing device 18. In some embodiments, one or more memory drives 2440 can be accessible by multiple nodes 37 of multiple different computing devices 18.

In such embodiments where memory drives 2440 are accessible by multiple nodes, the set of memory drives 2440-1-2440-M of a particular node 37 can include all memory drives that the particular node 37 has access to and/or all memory drives that the particular node 37 utilizes to retrieve segments from storage in processing physical segments it owns, as discussed in conjunction with FIGS. 25A-25L and FIGS. 27A-27K. This can include: at least one memory drive 2440 implemented utilizing the node's own storage resources; at least one memory drive 2440 implemented utilizing at least one different node's own storage resources, where each different node is implemented by the same or different computing device 18; and/or at least one memory drive implemented utilizing additional storage resources accessible by only the particular node 37 or accessible by multiple nodes 37 including the particular node 37.

The node 37 can be operable to execute queries against the database system by processing corresponding segments required for execution of the query. For example, as discussed previously, the node 37 can be implemented within the parallelized query and response sub-system 13 for processing a portion of a particular query or the entirety of a particular query. This can include identifying a segment set 2418 of a particular query 2405, which indicates a proper subset of segments stored in the memory drives 2440-1-2440-M required to execute the query. As illustrated in FIG. 24A, a segment set 2418 can indicate a plurality of segment identifiers or other information identifying the corresponding segments, for example, enabling the node 37 to identify the location of the corresponding node 37 in segment storage 2442 for retrieval.

The segment set 2418 of a particular query 2405 can include a set of segments that includes all fields of all rows required to execute the entirety of the query 2405. Alternatively, the segment set 2418 of a particular query can include a proper subset of all segments that include all fields of all rows required to execute the particular query, where the proper subset of segments includes all required fields of a proper subset of rows and/or a proper subset of all required fields of some or all rows. In such cases, the parallelized query and response sub-system 13 can utilize a set of multiple nodes 37 of one or more computing devices 18 to execute a same query in accordance with a query execution plan as discussed previously, where each node 37 in the set of multiple nodes identifies its own segment set 2418 of segments required by the query that are accessible by the node. The union of segment sets 2418 across the set of multiple nodes 37 executing the same query can includes all segments required to execute the same query. Furthermore, the plurality of segment sets 2418 of the set of multiple nodes 37 can be mutually exclusive to ensure that no same segments are processed by multiple nodes in their parallelized execution of the query. This assignment of particular segments to particular nodes to facilitate execution of a query in parallel is discussed in further detail in conjunction with 27A-27K. In some cases, the segment set 2418 for a particular query can be received and/or indicated in a request to execute the query, can determined based on the domain of the query and/or based on tables indicated in the query. The segment set 2418 can determined independently by a node 37, in isolation without global coordination, based on the information indicated by the corresponding query, as discussed in conjunction with 27A-27K. The retrieval of segments to across multiple nodes to execute a query can correspond to nodes implemented in conjunction with an IO level of a query execution plan utilized to execute the entirety of the query, as discussed in conjunction with FIGS. 28A-28O.

As used herein, execution of a query by a particular node 37 can correspond to the execution of the portion of the query 2405 assigned to the particular node, for example, by utilizing the particular node's determined segment set 2418 of the query. The portion of the query 2405 assigned to the node for execution and/or otherwise determined by the node for execution can be indicated and/or determined as operator data 2416 of the query 2405, which can indicate one or more operators of the query to be performed by the node 37 utilizing the corresponding segment set 2418. The portion of the query assigned to the node can include all operators of the query, where the entire query is performed by the node on a subset of required rows. For example, a resultant generated by a particular node's full execution of a query via retrieval and/or processing of the node's entire segment set 2418 may correspond to only a portion of the entire query result, such as a subset of rows in a final result set, where other nodes generate their own resultants via their own segment set 2418 to generate other portions of the full resultant of the query. In such embodiments, a plurality of nodes can fully execute queries on portions of the data independently parallel, where resultants generate by each of the plurality of nodes can be gathered into a final result of the query.

The portion of the query assigned to the node can include alternatively include only a proper subset of operators of the query, where the entire query is performed by the node on a subset of required rows. For example, the resultant generated by a particular node's full execution of a query via retrieval and processing of the node's entire segment set 2418 may correspond to a plurality of rows that need to be further filtered, aggregated, and/or processed via one or more other node's execution of the query. Thus execution of the query by the node, as used herein, can correspond to processing all segments of the segment set of the query in accordance with a subset of operators required to execute the query, where different nodes are assigned for processing of different operators of the query to facilitate full execution of the query via a query execution plan of multiple levels, as discussed in further detail in conjunction with FIGS. 28A-28O.

For example, the resultant generated by the particular node's full execution of the query is sent to and/or accessible by another node in the set of multiple nodes executing the query in their own execution of the query. As a particular example, one nodes' execution of a particular query can include retrieving all segments in the segment set and sending the required fields of the raw rows included in the segments of the segment set, or other raw data included in the segments of the segment set to another node responsible for performing query operators such as filtering and/or aggregation of the set of rows. For example, the node may only be responsible for performing reads of the data required to execute the query, where operators are to be performed on this data by one or more other nodes to ultimately fully execute the query. In such embodiments, this other node may not have and/or may not utilize their own set of memory drives 2440-1-2440-M, where these other nodes utilize resultants outputted by the particular node and/or at least one other node rather than utilizing raw rows of segments retrieved from memory drives 2440-1-2440-M. For example, this other node can correspond to a node implementing an inner level or root level of a query execution plan of FIG. 28A. In such embodiments, a plurality of nodes can execute assigned subsets of query operators in series, where a resultant generated by one node and/or resultants generated by multiple nodes performing the same operators on different distinct rows and/or different distinct subsets of previous resultants in parallel are sent to another node, where the another node utilizes the resultants generated by this one of more nodes as input to generate its own resultant based on its assigned subset of query operators of the query.

As used herein, partial execution of a query by a particular node 37 can correspond to retrieval and/or processing of a subset of the node's determined segment set 2418 of the query, and/or processing of a proper subset of the node's assigned operators of the query on some or all segments of the determined segment set 2418. Thus, a node's full execution of a particular query is facilitated via a plurality of partial executions of the query, where each partial execution includes partially and/or fully processing one or more segments in accordance with the portion of the query assigned to the node. The node's full execution of the query can include generating a plurality of partial resultants that render a resultant of the node's execution of its portion of the query. As used herein, a query resultant generated by a particular node 37 is not necessarily a final resultant of the query. A node's resultant can be utilized as input by other nodes to further process the query via other operators of the query.

If the node is instead receiving resultants from other nodes, for example, by receiving the full set of partial resultants from each other node at once or receiving each of the set of partial resultants one at a time as they are generated by each of a set of other nodes, the node's partial execution of the query can correspond to performing its assigned subset of query operations upon a corresponding one or more received partial resultants. A node's full execution of the query can correspond to generating its own plurality partial resultants by utilizing the plurality of full or partial resultants received from all of a set of other nodes that forwarded their own resultants to the node.

The node 37 discussed in conjunction with FIGS. 24A-24K performs partial executions upon segments to execute queries, and for example, does not receive resultants from other nodes that are utilized as input in processing queries. The node 37 discussed in conjunction with FIGS. 24A-24K can be operable to forward or send its partial and/or full resultants generated via the plurality of partial executions to one or more other nodes for processing via other operators of the query.

As illustrated in FIG. 24A, a node's performance of the plurality of partial executions of a query to ultimately generate its resultant for the query can be achieved by utilizing a segment processing module 2430 of the node 37. The segment processing module 2430 can be implemented by utilizing one or more of the processing core resources 48-1-48-n of the node 37, as further discussed in conjunction with FIGS. 24B and 24C. Alternatively, any other one or more processing modules included in the node 37 and/or available to the node 37 can be utilized by the node 37 to facilitate the performance of the plurality of partial executions.

A plurality of partial resultants can each be generated based on processing, via the segment processing module 2430, one or more particular segments. The query's resultant, corresponding to output of the node's execution of the query, is generated by the segment processing module 2430 based on: performing a union upon the plurality of partial resultants; gathering the plurality of partial resultants; combining the plurality of partial resultants; aggregating the plurality of partial resultants; and/or processing the plurality of partial resultants via one or more additional operators of the query. Some or all of the plurality of partial executions of the query required to fulfill the node's execution of the query can be performed in sequence, for example, where the node 37 processes each of the plurality of segments of the query one at a time in accordance with the operator data 2416 to generate a corresponding plurality of partial resultants. Some or all of the plurality of partial executions of a query required to fulfill the node's execution of the query can be facilitated by the node concurrently, for example, where different parallel processing threads of the same or different processing core resource 48 of the node process different segments in accordance with the assigned operators of the query.

In particular, as illustrated in FIG. 24A, the processing of a segment as one or more corresponding partial executions of a given query can include retrieving the segment from segment storage 2442. The partial execution of the query for the given segment can include only the retrieval of the segment from segment storage, where the query resultant generated by the node includes the raw segments in the segment set and/or raw rows extracted from the retrieved segments in the segment set. For example, the node's operator data indicates only row read operations of the query. Alternatively, the same or different partial execution of the query for the given segment can include additional processing of the segment and/or the raw rows of the segment, once retrieved from segment storage 2442, in accordance with the operator data 2416.

Execution of a particular query 2405 by segment processing module 2430 can be performed over a span of time. As used herein, a time slice can correspond to a temporal period of time. A set of sequential time slices can include multiple, consecutive time slices of the same or different temporal length. In a given time slice, at least one partial execution of at least one query can be initiated by the node 37 and/or can be facilitated in its entirety by the node 37. Thus, a query's execution by the node 37 can be performed across a corresponding set of sequential time slices, where some or all of the plurality of sequential time slices can include initiation of at least one least one partial execution of the query. The set of sequential time slices for a given query can begin with a first time slice corresponding to initiation of a first partial execution, such as the first time a segment in the segment set is retrieved. The set of sequential time slices for a given query can end with a last time slice, corresponding to the time slice where a final one of the plurality of partial executions is initiated and/or completed, and/or corresponding to the time slice where the resultant of the query is generated by the node from the plurality of partial resultants.

A partial execution can be completed in the same time slice in which it was initiated, or can be performed across a sequential subset of the set of sequential time slices. In some cases, at least one of a query's set of sequential time slices does not include any initiation or any portion of facilitation of execution of any partial execution of the query, where some time slices are "skipped" in initiating or facilitating a query's execution. In some cases, at least one of the set of sequential time slices includes initiation of and/or facilitation of at least a portion of multiple partial executions of the same query, where different parallel threads are utilized to concurrently perform these multiple partial executions of the same query in parallel within one or more same time slices.

As illustrated in FIG. 24A, a node 37 can be assigned and/or can otherwise determine a query set 2415 for execution, which can include a set of queries 2405-1-2405-N for ordered and/or unordered execution by the node 37, in series or concurrently. Each query can include its own corresponding segment set of the same or different number of segments. Some or all segment sets of different queries in the query set 2415 can have non-null intersections in response to their corresponding queries requiring access to the same tables and/or sets of rows. Some segment sets of different queries in the query set 2415 can be identical. Some segment sets of different queries in the query set 2415 can have null intersections.

Figure 26A:
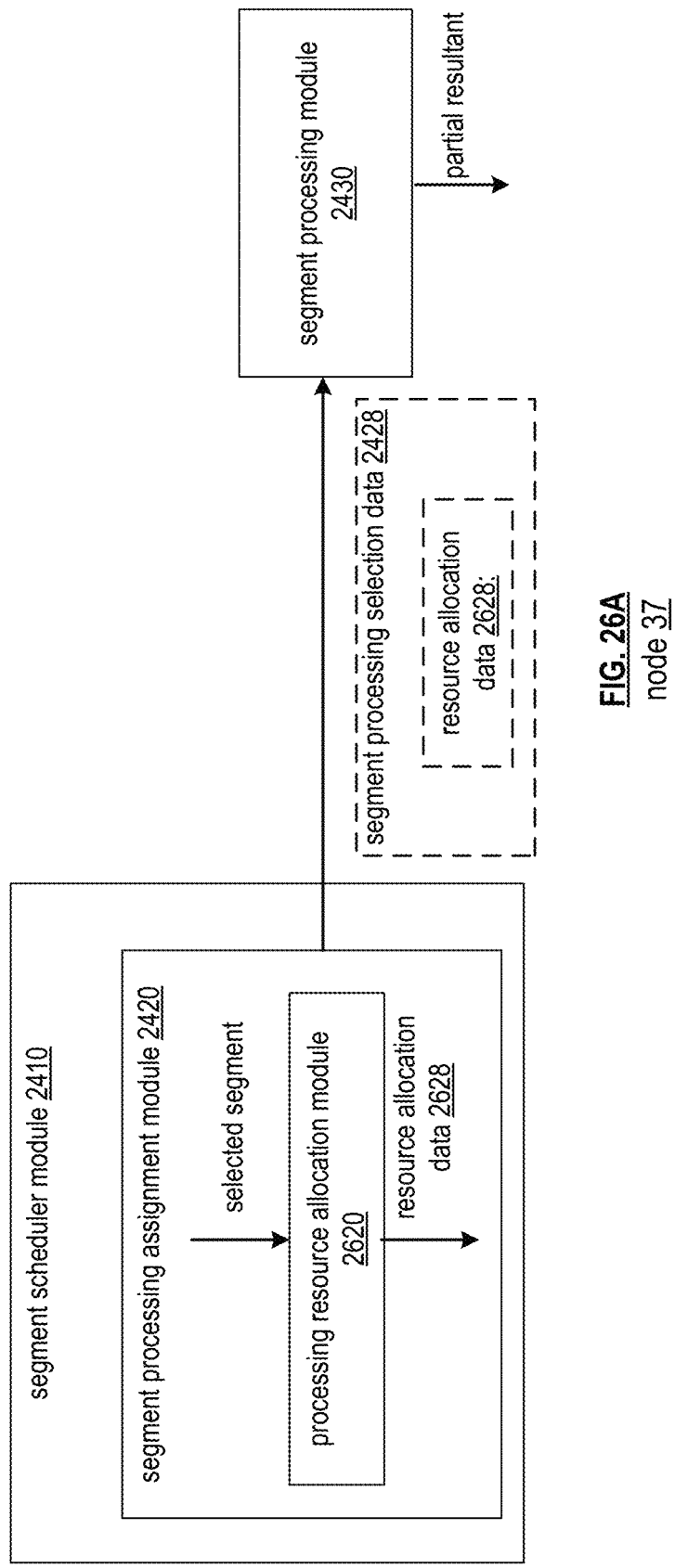
FIG. 26A is a schematic block diagrams of an embodiment of a node that implements a processing resource allocation module to allocate processing resources utilized to process segments in accordance with the present invention.

The concurrent execution of the multiple queries can be achieved via the segment processing module 2430, where different parallel processing threads of the segment processing module 2430 can perform partial executions of different queries concurrently, for example, as discussed in conjunction with FIGS. 26A-26C. Each query in the query set can be executed in its own set of sequential time slices, where different queries in the query set can have overlapping or non-overlapping sets of sequential time slices. Within a plurality of sequential time slices, execution of some or all of the set of queries 2405-1-2405-N can be facilitated by the segment processing module 2430 to ultimately generate a corresponding plurality of query resultants 2432-1-2432-N, where each one of the plurality of query resultants 2432 is based on a set of partial results generated for the corresponding one of the plurality of queries by processing the corresponding set of segments in the query's segment set 2418. Thus, the plurality of sequential time slices can include the plurality of sets of sequential time slices corresponding to the plurality of queries in the query set 2415, where some or all of the plurality of sets of sequential times slices include overlapping time slices or otherwise include overlapping temporal periods.

For example, consider two different queries 2405 in the query set 2415 that includes a first query and a second query. The first query can be initiated in a first time slice, and the second query can be initiated in a second time slice, where the second time slice is after the first time slice. Execution of the first query can be completed in a third time slice and execution of the second query can be completed in a fourth time slice, where the third time slice is before, after, or the same as the fourth time slice. The first query thus executes over a first set of sequential time slices beginning with the first time slice and ending with the third time slice. The second query executes over a second set of sequential time slices beginning with the second time slice and ending with the fourth time slice. Partial execution of the first query can be initiated and/or facilitated within every one of the first set of sequential time slices. Alternatively, at least one time slice in the first set of time slices does not include initiation or any portion of a partial execution of the first query, but does include initiation or at least one portion of at least one partial execution of the second query. Similarly, at least one time slice in the second set of time slices can include no initiation or no portion of a partial execution of the second query, but can include initiation or at least one portion of at least one partial execution of the first query. At least one time slice in the first set of sequential time slices and second set of sequential time slices can include initiation of and/or at least one portion of a partial execution for the first query, and can further include initiation of and/or at least one portion of a partial execution for the second query, for example, where these partial executions are facilitated in the same time slice via different parallel threads of the segment processing module 2430.

New queries can be assigned, received, and/or determined for execution by the node 37, and can thus be added to the node's query set 2415 overtime to generate updated query sets that include the new queries. For example, while at least one query in a prior query set 2415 is in the process of being executed, a new query can be added to generate an updated query set 2415, where the segment processing module 2430 can being executing the new query in the updated query set before or after execution of some or all queries in the prior query set have completed.

As illustrated in FIG. 24A, node 37 can further include a segment scheduler module 2410. A node's segment scheduler module 2410 can be implemented utilizing at least one processor and memory of the node 37. For example, the segment scheduler module can be implemented by utilizing one or more processing modules 44-1-44-n of central processing module 39 of the node 37; main memory 40 of the node 37, for example allocated for the computing device OS 57; and/or cache memory 45 of the node 37. As a particular example, the process scheduling 67 of the computing device 18 that implements the node 37, implemented via computing device OS 57 of the node 37, can be utilized to implement the segment scheduler module 2410. Alternatively, any other additional processing and/or memory resources of the node and/or accessible to the node can be utilized to implement the segment scheduler module 2410.

The segment scheduler module 2410 of a node 37 can locally store, access, or otherwise determine the query set 2415 of the node at any given time slice or otherwise at given points in time. The segment scheduler module 2410 can facilitate scheduling of the plurality of partial executions of each of the plurality of queries in the query set 2415 over the plurality of time slices by selecting which segments of which queries will be processed in a given time slice. This can be accomplished by utilizing a segment processing assignment module 2420 of the segment scheduler module 2410 and/or by otherwise utilizing at least one processor and memory of the segment scheduler module 2410. The segment processing assignment module 2420 can select, for a given current and/or upcoming time slice, at least one segment of at least one segment set in the query set 2415 for retrieval from its corresponding memory drive 2440, and/or for other processing in accordance with operator data 2416. This can be indicated in segment processing selection data 2428 that is generated by the segment processing assignment module 2420, and the segment processing selection data 2428 can be sent to and/or can otherwise be accessed by the segment processing module 2430.

Thus, a plurality of segment processing selection data 2428 can be generated by the segment processing assignment module 2420 for each of a plurality of sequential time slices, and/or can otherwise be sequentially generated over time. The segment processing module 2430 can receive this plurality of segment processing selection data 2428 in sequence as it is generated over time, and can perform partial executions by performing the retrieval or other processing of the corresponding segments indicated in the segment processing selection data 2428 in a corresponding plurality of sequential time slices.

As partial executions of queries are initiated and/or completed, the corresponding segments in the query set can be flagged and/or otherwise indicated as having their corresponding processing initiated and/or completed. When all segments of a given query have been fully processed in accordance with the operator data 2416 of the given query and/or when the resultant for the query is generated and/or sent to another node for processing, the query can be deemed as having been executed, and can be removed from the query set and/or can otherwise be indicated in the query set as having been completed. Alternatively, as each partial resultant is generated, it can be sent to another node for processing, for example, where the other node begins processing partial resultants as they are received even if the entirety of partial resultants have not yet been generated by the node.

Time slices for which segment processing selection data indicates segments for retrieval are not necessarily equal in length, where the segment scheduler module does not necessarily request that new segments be processed in regular fixed intervals. In some embodiments, the segment processing selection data is generated in response to determining that a currently executing query has completed a partial execution and/or has otherwise completed retrieval and/or processing of a segment previously indicated in previous segment processing selection data 2428. For example, a particular processing core resource 48, processing thread, and/or other processing resource allocated for execution of a particular one of the set of queries in the query set can indicate that it has completed processing of at least one previously selected segment, and is thus ready to process a new segment, for example, via a notification to the segment scheduler, via an update to query set 2415 indicating completion of processing of the previous segment, and/or via an indication that no segments of the query are currently being processed. A new segment of the query's segment set can be selected by the segment processing assignment module 2420 in response to determining that the previously selected segments of the query have completed processing. This mechanism of assigning segments for particular queries in the query set as their corresponding processing resources are completed processing prior segments in their segment set can dictate the plurality of sequential time slices as discussed herein, where a new time slice is initiated in response to determining to assign a new segment for processing of a query in response to one or more previously assigned segments have completed processing as completed partial executions of the query. Note that, if multiple queries are ready for a new segment, their requests for new segments may need to be queued and/or otherwise divided across multiple sequential time slices for retrieval, as dictated by the segment scheduler module 2410.

Figures 24B, 24C:
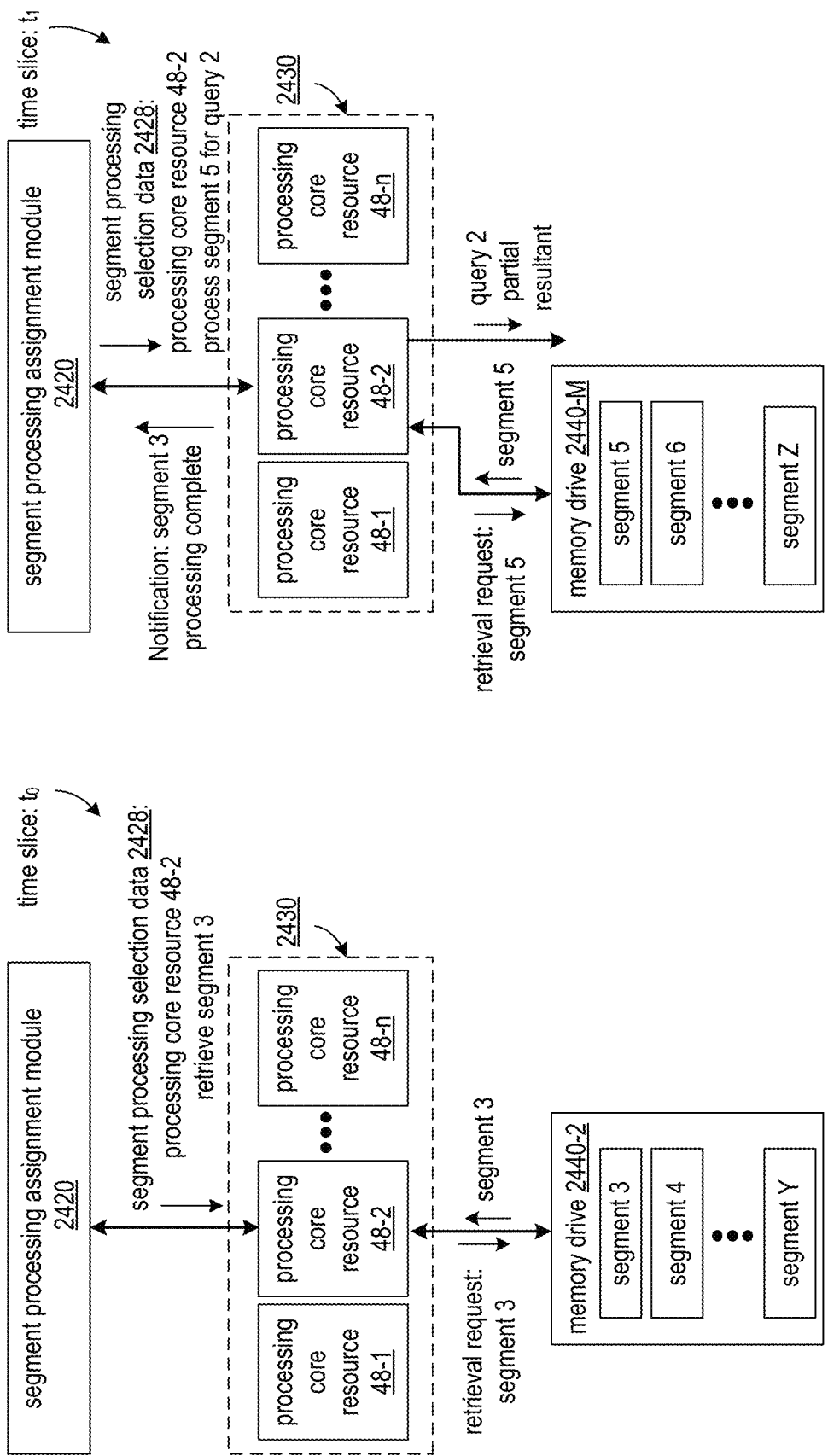

In some embodiments, the segment processing selection data 2428 can further allocate processing resources of the segment processing module 2430 for retrieval and/or processing of each particular segment and/or indicate which processing resources of the segment processing module 2430 are utilized to retrieve and/or process each particular segment. Such embodiments are illustrated in FIGS. 24B and 24C. In particular, the segment processing module 2430 can be implemented by utilizing some or all of the processing core resources 48, where each partial execution is assigned to a processing core resource. Each processing core resource 48 can initiate and/or perform one or more partial executions of one or more corresponding segments of one or more corresponding queries in a single time slice. For example, a single processing core resource 48 can facilitate concurrent partial executions of the same or different query in a single time slice by utilizing multiple parallel threads of the processing core resource 48. Alternatively, a single processing core resource can be responsible for one or more partial executions of exactly one query in a given time slice, and/or can be responsible for partial execution of exactly one segment in a given time slice. The segment processing selection data 2428 for a given time slice can indicate a set of partial executions assigned to a set of different processing core resources 48, where some or all processing core resources 48 initiate or perform at least one of its own partial executions within a given time slice.

In the example illustrated in FIG. 24B, the segment processing selection data 2428 of a given time slice indicates that segment 3 be retrieved by processing core resource 48-2, for example, via its processing module 44-2 and/or memory interface module 43-2. This can be based on the segment processing assignment module 2420 selecting segment 3 and further selecting processing core resource 48-2. In some cases, as illustrated in FIG. 24B, the segment processing selection data 2428 indicating selection of segment 3 for retrieval is sent directly to processing core resource 48-2, and not the other processing core resources, in response to the segment processing assignment module 2420 selecting processing core resource 48-2 for retrieval of segment 3. In other embodiments, the segment processing module 2430 and/or a different processing module of the node 37 can be responsible for allocation of resources of the segment processing module for processing of segments indicated by incoming segment processing selection data 2428, where the segment processing assignment module 2420 does not select which processing core resource will be utilized for processing of selected segments.

In response to receiving the instruction to retrieve segment 3 as indicated by the segment processing selection data 2428, the processing core resource 48-2 can determine segment 3 is stored in memory drive 2440-2. For example, the segment processing selection data 2428 can indicate the location of segment 3 and/or can indicate segment 3 as an address or other location data in memory drive 2, for example, based on the segment scheduling module 2410 utilizing location data indicated by the segment identifier in the segment set 2418 and/or utilizing a lookup table, metadata, or other information accessible locally by the node or otherwise accessible via the database system 10 that indicates storage locations of particular rows of a query or otherwise indicates storage locations of particular segments. Alternatively, the processing core resource 48-2 itself can determine that segment 3 is stored in memory device 2 based on utilizing the segment identifier of segment 3 indicated in the segment processing selection data 2428 and/or based on accessing a storage location lookup table and/or segment storage mapping information.

In some embodiments, processing core resources are mapped to one or more particular memory drives 2440, and a processing core resource 48 is automatically selected for retrieval and/or processing of a particular segments based on the segment being stored in the one or more particular memory drives 2440 mapped to the particular processing core resource. For example, each memory drive 2440 can be implemented utilizing some or all of a particular one of the set of memory device 42-1-42-n, where each of the set of memory devices 42-1-42-n is included in, assigned to, or utilized by a corresponding one of the set of processing core resources 48-1-48-n as illustrated in FIG. 13. In such cases, in response to selecting segment 3 for retrieval in the segment processing selection data 2428, processing core resource 48-2 can automatically be selected for retrieval of segment 3 in response to determining that segment 3 is stored in memory drive 2440-2 and further in response to determining memory drive 2440-2 is implemented by and/or included in memory device 42-2 that is mapped to processing core resource 48-2.

Once memory drive 2440-2 is identified, processing core resource 48-2 can retrieve segment 3 from memory drive 2440-2. For example, processing core resource 48-2 can send a retrieval request indicating segment 3 and can retrieve segment 3 from the memory drive in response. In other embodiments, the segment scheduling module 2410 itself can send requests to memory drives indicating instructions to send the selected segments to segment processing module 2430 and/or to a selected processing core resource 48 of segments processing module 2430 for processing. In response to receiving a request for a segment from the processing core resource and/or from the segment scheduler, the memory drive can send the requested segment to the requesting and/or indicated processing core resource in response.

In some embodiments, the retrieval of the segment constitutes the entirety of partial execution of the segment, and/or other execution of the segment can be facilitated via a different processing core resource 48 and/or a different node 37. However, the assigned core processing resource can facilitate the node's full processing of the segment in accordance with the operator data 2416 of the corresponding query.

Such an embodiment is illustrated in FIG. 24C, where the processing core resource generates a partial resultant for query 2 by processing segment 5 in accordance with operator data 2416 of query 2. In such embodiments, the segment processing selection data 2428 or can indicate instructions to process segment 5 in accordance with query 2, where the operator data for query 2 is also sent to the processing core resource 48-2. For example, the operator data for query 2 can be sent to processing core resource 48-2 only once, and the processing core resource 48-2 can utilize this operator data of query 2 in executing a plurality of partial executions for some or all of the segments in the segment set for query 2. Alternatively, if the node serves to only retrieve segments in query segment sets and extract their raw data for processing by other nodes in accordance with the query, each processing core resource can process retrieved segments for any query in the same fashion by extracting the necessary rows or other raw data and/or routing this extracted raw data to another node for further processing.

Furthermore, consider an example where the segment processing selection data 2428 of FIG. 24B occurs at one of the plurality of sequential time slices to, and that the segment processing selection data 2428 of FIG. 24C occurs at a later one of the plurality of sequential time slices $t_1$. Also assume that segment 3 was similarly processed to produce a partial resultant for query 2 in a similar fashion as segment 5 of FIG. 3, and that processing core resource 48-2 is assigned to facilitate some or all of the node 37's execution of query 2. As illustrated in FIG. 24C, the processing core resource 48-2 can send a notification to the segment scheduler indicating that it has completed processing of segment 3 for query 2, for example, in response to generating a partial resultant by processing segment 3. The segment scheduler, in response to determining that processing core resource 48-2 is ready to process a new segment for query 2, can send the segment processing selection data 2428 at $t_1$ indicating that the next segment selected to be processed for query 2 is segment 5.

Note that $t_1$ could be the time slice immediately following $t_0$ in the plurality of sequential time slices, where no other segment processing selection data 2428 is generated by the segment processing assignment module 2420 between the segment processing selection data 2428 at $t_0$ and the segment processing selection data 2428 at $t_1$. However, there may have been multiple other segment processing selection data 2428 that was generated between $t_0$ and $t_1$ for other queries being executed by the same or different processing core resources 48, for example, based on other partial resultants having been generated within this time frame for other queries of the query set, and new segments being assigned for processing these other queries by the segment processing assignment module 2420 in response.

FIGS. 24D-24K illustrate embodiments where the segment scheduling module 2410 implements the segment processing assignment module 2420 to select segments at particular time slices based on utilization data of the plurality of drives 1-M. A given query will addresses or otherwise requires some subset of the segments stored in one or more memory drives 2440 of segment storage 2442, but it can be unpredictable as to which segments will be required at any given point in time. Different queries of the query set 2415 running on different, possibly overlapping, segments can create unpredictable read patterns.

Because the processing of a segment set to facilitate execution of a corresponding query can be performed in any order to achieve the same resultant, and because the processing of a plurality of segment sets facilitate concurrent execution of a corresponding set of queries can also be performed in any order to achieve the same set of corresponding resultants, the ordering of segments for processing over time can be intelligently selected via the segment processing assignment module 2420 to improve efficiency of retrieval of segments from segment storage 2442. The segment scheduler can be operable to schedule segments with the aim to fully utilize each memory drive at any given point of time, up to its maximum amount of throughput. In particular, to improve and/or optimize retrieval efficiency of the segments in segment sets 2418 of one or more queries in a query set 2415, the segment processing assignment module 2420 can select segments for processing based on selecting corresponding memory drives for retrieval that are currently under-utilized. The selection of segments over time can be based on maximizing the utilization of each of the set of memory drives 2440-1-2440-M at any particular point in time, up to a maximum utilization threshold of each of the set of memory drives. This mechanism of intelligently selecting segments based on maximizing drive utilization across a set of drives improves a node's efficiency in concurrently executing queries. Furthermore, this mechanism can be applied across some or all of a plurality of nodes 37 in a database system 10 via implementation of segment processing assignment module 2420 by some or all of the plurality of nodes can improve efficiency of query execution by the database system 10 as a whole.

Figure 24D:
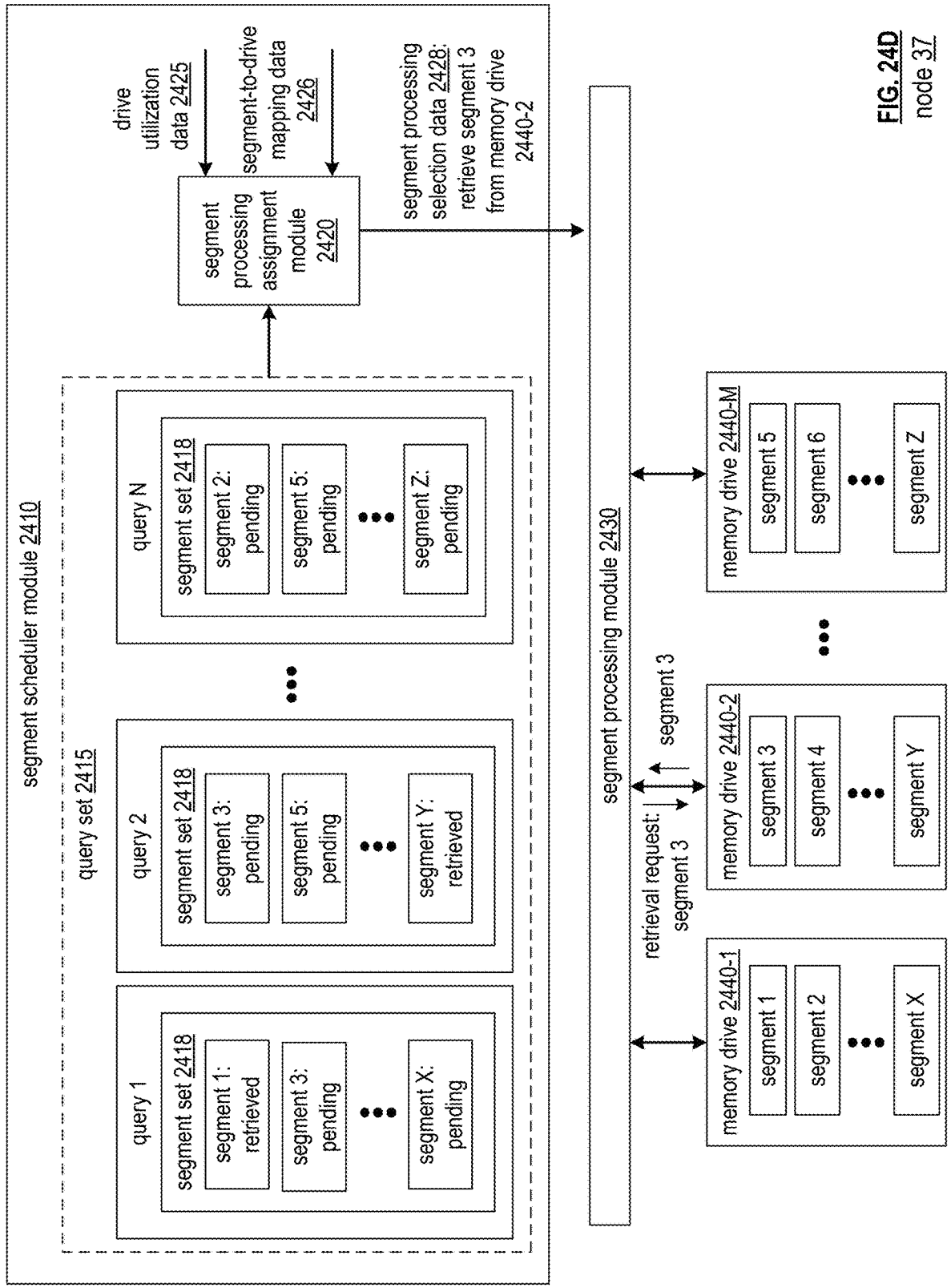

In the examples discussed in conjunction with FIGS. 24D-24J, consider the example query set 2415 illustrated in FIG. 24D. The query set includes N queries that include queries 1, 2, and N. Query 1 has a segment set identifying a set of segments that includes segments 1, 2, and X. Query 2 has a segment set identifying a set of segments that includes segments 3, 5, and Y. Query N has a segment set identifying a set of segments that includes segments 2, 5, and Z. In this example, memory drive 2440-1 stores a set of segments that includes segments 1, 2, and X; memory drive 2440-2 stores a set of segments that includes segments 3, 4, and Y; and memory drive M stores a set of segments that includes segments 5, 6, and Z. Segments 1 and Y have been retrieved or initiated for retrieval for processing of queries 1 and 2, respectively, via previously being selected in segment processing selection data 2428 generated previously for one or more prior time slices. This configuration of segments in the query set and stored in segment storage can also extend to the examples illustrated in FIGS. 24B and 24C.

In the current time slice, the segment processing selection data 2428 indicates selection of segment 3 for retrieval from memory drive 2440-2, for example, to facilitate corresponding partial execution of query 1 or query 2. In some cases, retrieval of segment 3 can be utilized to facilitate partial execution of both query 1 or query 2, where segment 3 is retrieved from memory only once to satisfy partial execution of both queries and to generate the same or different partial resultant for each query, where the resultant is the same or different based on whether the respective queries have the same or different operator data 2416. For example, a selected one of the plurality of processing core resources 48-1-48-n can be assigned to retrieve segment 3 and can further be assigned facilitate concurrent partial execution of both query 1 and query 2 utilizing the single retrieval of segment 3 to generate the corresponding partial resultants for query 1 and query 2.

Each memory drive 2440 can have a known and/or determined maximum utilization threshold indicating a maximum possible amount of utilization of the drive and/or a desired level of utilization the drive should be achieving at any given time in an optimal scenario. For example, the maximum utilization threshold can be based on a maximum possible throughput of the memory drive for transmission of retrieved segments, based on processing resources or maximum processing capabilities of the drive, based on the type of memory device utilized to implement the memory drive, based on average or maximum seek time to locate segments within the drive, and/or based on other time and/or processing constraints to access and/or transmit requested segments. Different ones of the set of memory drives 2440-1-2440-M of a particular node 37 can have the same or different corresponding maximum utilization thresholds. In some cases, the maximum utilization threshold is measured and/or estimated by the segment scheduler or other processing module of the node based on averaging and/or analyzing processing times and/or resource consumption utilized by the memory drives in historical retrieval of prior segments over time.

At a given time, drive utilization data 2425 can be received and/or generated by the segment scheduling module 2410. The drive utilization data 2425 can include actual and/or estimated utilization levels of some or all of the plurality of memory drives for a current, recent, and/or upcoming one or more time slices. A memory drive's utilization levels can correspond to or be based on a raw measurement or estimate of throughput of the memory drive, a raw measurement or estimate of resource utilization of the memory drive, and/or a raw measurement or estimate of another metric indicating a level of utilization of the memory drive. A memory drive's utilization level can correspond to or be based on an actual or estimated percentage or proportion of the drive's maximum utilization threshold utilized currently, utilized recently, and/or expected to be utilized in one or more upcoming time slices.

The set of maximum utilization thresholds and the drive utilization data can be utilized to determine an actual or estimated available utilization level for some or all of the set of memory drives 2440, for example, calculated based on a difference between the raw measurement or estimate for utilization of the drive and the maximum utilization threshold of the drive. This available utilization level can similarly correspond to an estimated amount of availability or actual amount of availability for one or more current, recent and/or upcoming time slices. In some cases, the drive utilization data indicates this set of calculated available utilization levels.

The segment processing assignment module can select one or more memory drives to be accessed in the current or next upcoming time slice, as dictated in the segment retrieval selection data. The one or more memory drives can be selected based on the available utilization levels of the set of memory drives and/or can otherwise be selected based on the drive utilization data 2425. For example, one or more memory drives with highest levels of available utilization at a given period of time can be identified, where this one or more memory drives with highest levels of available utilization are selected for access in generating the segment retrieval selection data at the given period of time. As another example, one or more memory drives with lowest raw utilization metrics or estimates can be selected. As another example, one or more memory drives with lowest percentages of utilization can be selected. By continually selecting the least-utilized drive and/or the drive with the greatest amount of under-utilization relative to its maximum utilization threshold over time, IO parallelism can be maximized because one drive isn't overscheduled above its maximum throughout threshold before scheduling other, under-utilized drives first.

Once these one or more memory drives are selected, one or more particular segments can be selected for retrieval from the one or more selected memory drives. As illustrated in FIG. 24D, the segment processing assignment module can receive, access, and/or determine segment-to-drive mapping data 2426 indicating where segments in the segment set are stored and/or indicated a listing or lookup table of all segments stored in each memory drive 2440-1-2440-M. This segment-to-drive mapping data 2426 can be utilized to determine a set of possible segments for selection, where the set of possible segments correspond to only segments in the segment sets of the query set that are stored in the one or more selected memory drives, and that are pending or otherwise have not yet been processed. As indicated in FIG. 24D, segment set can indicate which ones of the set of segments have already been retrieved, and which ones of the set of segments are pending or otherwise have yet to be requested for retrieval. The segment set can further indicate which ones of the set of segments are currently being retrieved, where retrieval of the segment has been initiated based on being previously indicated in segment processing selection data 2428 of a prior time slice, but where retrieval of the segment has not been completed by the segment processing module 2430. Alternatively, this information indicating retrieval status of segments in the segment sets can be stored elsewhere and/or can be determined separately from accessing the query set 2415.

The final set of segments to be identified for retrieval in the given time slice can be selected from the possible set of segments based on a random or pseudo-random selection, based on an ordering of the segments indicated in the segment set, and/or based on a deterministic selection. Determining the final set of segments can include selecting a number of segments to be selected. For example, larger numbers of segments can be selected for retrieval from one or more drives based on the level of under-utilization of each of the one or more drives, where greater numbers of segments are selected for retrieval for a time slice from a memory drive that is greatly under-utilized, and smaller numbers of are selected for retrieval for a same or different time slice from a memory drive that is only slightly underutilized. In other cases, the same number of segments, such as exactly one segment, is always selected.

In some cases, other factors are utilized to select the final set of segments from the possible set of segments. This can include selecting one or more of a subset of the set of queries with segments in the possible set of segments, where the segments are deterministically, randomly, or pseudo-randomly selected from the possible set of segments that are included in segment sets of the selected one or more queries. For example, a query that has the fewest remaining segments for processing across queries in the subset can be selected; a query in the subset that is being processed by a particular processing core resources 48 that is determined to be most under-utilized and/or that is under-utilized with respect to a processing core resources utilization threshold can be selected; a query in the subset whose execution has been initiated via prior retrieval of at least one different segment of the query's segment set can be selected over another query in the subset whose execution has not yet been initiated; a query in the subset with a highest assigned priority can be selected over a query in the subset with a lower assigned priority; and/or other information regarding the queries in the subset can be utilized to select one or more particular queries from the subset of queries to have segments retrieved in the given time slice.

Another selection factor can include determining if the set of possible segments include any sets of segments that are stored sequentially in a memory drive that can be retrieved via a single request for the range of memory that includes the set of sequentially stored segments. In some cases, sequentially stored segments can be included in the segment set of the same query and/or of different queries in the query set. In such cases, some or all of the identified sequentially stored segments can be selected for retrieval in a batched request to the memory drive, for example, for retrieval and processing via the same one of the set of processing core resources 48. Selecting ones of the identified sequentially stored segments can further include selecting the determined number of segments from the set of sequentially stored segments.

Rather than automatically selecting the most under-utilized memory drives for segment retrieval, segments from other drives determined to be under-utilized can be selected for retrieval. In such embodiments, the available utilization levels can be compared to a predetermined maximum utilization availability threshold, where a proper subset of memory drives with available utilization levels are greater than the maximum utilization availability threshold or that otherwise compare unfavorably to the maximum utilization availability threshold is identified. The maximum utilization availability threshold can be the same across all memory drives regardless of whether they have the same or different maximum utilization thresholds.

Alternatively, a set of threshold utilization levels can be determined for each of the set of memory drives, where each of the set of threshold utilization levels are the same or different based on having same or different corresponding maximum utilization thresholds, and/or where each of the set of threshold utilization levels are determined based on a predetermined difference from and/or predetermined proportion of the corresponding set of maximum utilization thresholds. Some or all threshold utilization levels can be strictly less than the corresponding maximum utilization level, or can be equal to the maximum utilization level. The raw and/or estimated level of utilization indicated in the drive utilization data for each of the set of memory drives can be compared to their respective threshold utilization levels, where the proper subset of memory drives is alternatively determined by identifying ones of the set of memory drives with utilization levels that are less than their respective threshold utilization level or that otherwise compare unfavorably to the utilization availability threshold.

Once the proper subset of memory drives is identified via either mechanism described above or by a different determination, the one or more memory drives can be selected from this proper subset of memory drives. For example, all of the proper subset of memory drives can be selected where at least one segment is identified for retrieval from each of the proper subset of memory drives. Alternatively, at least one of the proper subset of memory drives is not selected, for example, based on determining to select a predetermined number of memory drives that is less than the predetermined number of memory drives and/or a predetermined number of segments that is less than the size of the proper subset of memory drives. For example, the one or more memory drives can be selected from the proper subset of memory drives randomly or pseudo-randomly, can be selected from the proper subset of memory drives in accordance with a round robin scheme over time, and/or can be selected based on another determination.

In some cases, the one or more memory drives are not selected from the proper subset of memory drives, and instead one or more segments are selected from a larger set of possible segments, where this larger set of possible segments correspond to all segments in any segment set of the query set that are stored in any of the determined proper subset of memory drives. For example, rather than selecting a segment for retrieval from the most under-utilized drive, a different segment is selected from another under-utilized drive that is not necessarily the most under-utilized, based on its utilization comparing unfavorably to its threshold utilization level or its utilization availability comparing unfavorably to the maximum utilization availability level. This can be ideal as other optimizations relating to the segments themselves can be utilized to intelligently select particular segments that are stored in any under-utilized drive for retrieval.

Figures 24E, 24F:
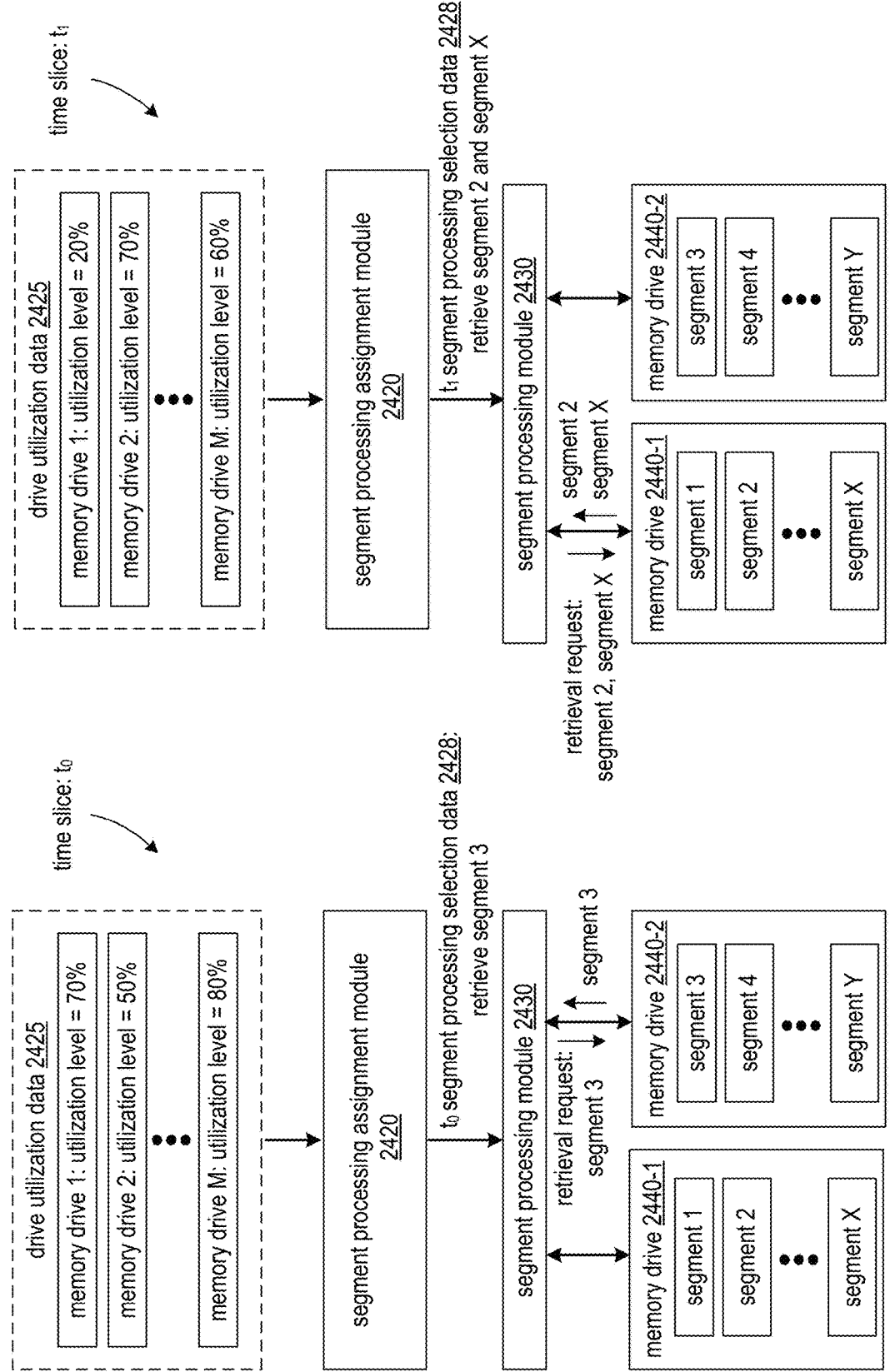

FIGS. 24E and 24F illustrate example embodiments of selecting different segments for retrieval in different time slices to and $t_1$ respectively, where time slice $t_0$ occurs immediately before time slice $t_1$ in the plurality of sequential time slices. As illustrated in FIG. 24E, drive utilization data 2425 determined for time slice $t_0$ indicates utilization levels of 70%, 50%, and 80% for memory drives 1, 2, and M, respectively. Assume for this example that 50% is lower than utilization level across additional memory drives 3-M-1. Thus, memory drive 2 is selected for segment retrieval for time slice $t_0$ by the segment processing assignment module 2420 because memory drive 2 has the lowest level of utilization and/or because it has a highest amount of available utilization. Segment 3 is then selected for retrieval by the segment processing assignment module 2420 because it is determined to be stored in memory drive 2, and because it has not yet been retrieved for processing of query 2. This selection of segment 3 for retrieval is indicated in the segment processing selection data generated for time slice $t_0$. Segment 3 is retrieved from memory drive 2 by segment processing module 2430 based on the segment processing selection data 2428 generated for time slice $t_0$ indicating selection of segment 3 for retrieval.

As illustrated in FIG. 24F, the drive utilization data 2425 determined for time slice $t_1$ has changed from the drive utilization data 2425 determined for time slice $t_0$ illustrated in FIG. 24E. Drive utilization data 2425 determined for time slice $t_1$ indicates utilization levels of 20%, 70%, and 60% for memory drives 1, 2, and M, respectively. The increase of utilization level for memory drive 2 can be due to retrieval of segment 3 initiated at time slice $t_0$ still being in progress at time slice $t_1$ and/or can be due to other memory drive utilization induced since determining drive utilization data for time slice $t_0$. The decrease of utilization for memory drive 1 can be due to a previously initiated retrieval of other segments from memory drive 1 that were in progress when drive utilization data for time slice $t_0$ completing prior to drive utilization data determined for time slice $t_1$ and/or can be based on other utilization of the memory drive in this time frame between time slice $t_0$ and time slice $t_1$. Assume for this example that 20% is lower than utilization level across additional memory drives 3-M-1. Thus, memory drive 1 is selected for segment retrieval for time slice $t_0$ by the segment processing assignment module 2420 because memory drive 2 has the lowest level of utilization and/or because it has a highest amount of available utilization. Segments 2 and X are then selected for retrieval by the segment processing assignment module 2420 because it they are determined to be stored in memory drive 2, and because they have not yet been retrieved for processing of queries N and 1, respectively. This selection of segment 3 for retrieval is indicated in the segment processing selection data generated for time slice $t_0$. Segment 2 and segment X are retrieved from memory drive 2440-1 by segment processing module 2430 based on the segment processing selection data 2428 generated for time slice $t_1$ indicating retrieval of segment 2 and segment X.

In this case, multiple segments may have been selected for retrieval from memory drive 2440-1 in time slice 1 based on the level of utilization of memory drive 2440-1 being particularly low, and/or based on the level of utilization of memory drive 2440-1 determined for time slice $t_1$ indicating higher utilization availability than the utilization availability determined for memory drive 2440-1 for time slice $t_0$ that yielded selection of only one segment for retrieval from memory drive 2440-2. For example, the number of segments selected for retrieval from a particular memory drive in a particular time slice can be an increasing function of the memory drive's utilization availability. In such cases, the multiple segments from the same memory drive can be selected by selecting ones of the possible set of segments that are included in different query's segment sets, for example, to distribute execution across different queries as evenly as possible. Alternatively or in addition, different processing core resources 48 can be selected for retrieval of the different segments from the same memory device for example, to ensure none of the processing core resources are overloaded with retrieval and processing of too many segments and/or to distribute retrieval and/or processing of queries across the processing core resources and/or parallel threads as evenly as possible. In some cases, the number of time slices retrieved in the given time slice is capped based on current utilization and/or resource availability of segment processing module 2430 and/or of individual processing core resources 48.

FIGS. 24G-24K illustrate examples of a segment scheduling module 2410 that implements a utilization data generating module 2450 to generate the drive utilization data 2425 for some or all time slices. Alternatively, the utilization data generating module 2450 can be implemented by different a processing module of the node 37 that communicates with the segment scheduling module 2410 to send the segment scheduling module the drive utilization data 2425.

Figure 24H:
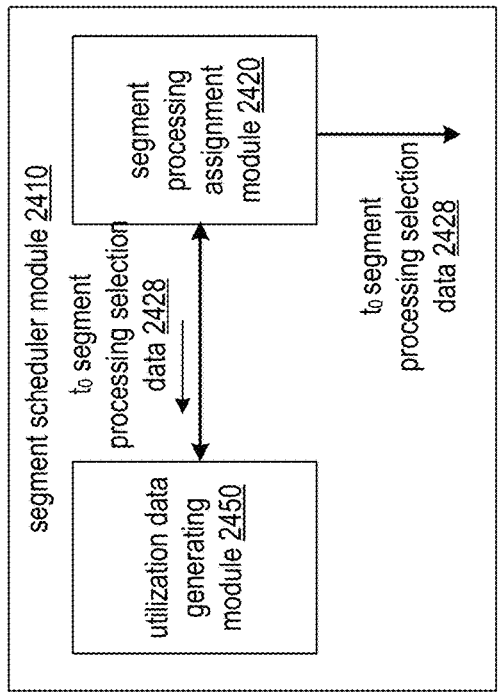
FIGS. 24G-24K are schematic block diagrams of an embodiment of a segment scheduler module in accordance with the present invention.
Figure 24J:
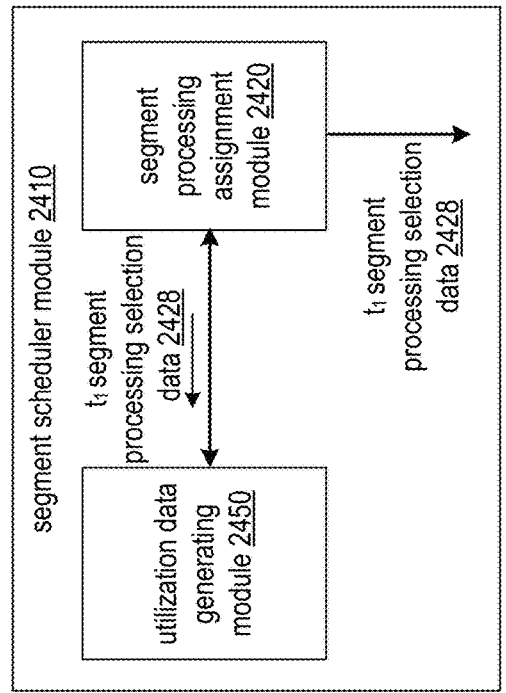
Figure 24G:
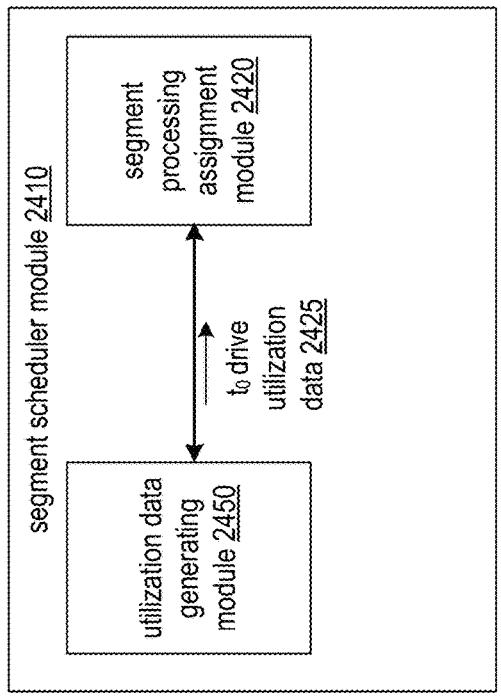

In the examples illustrated in FIGS. 24G-24K, the utilization data generating module 2450 generates the utilization data based on tracking the initiation and/or completion of segment retrieval over the plurality of time slices to determine how many segments are currently being retrieved by the node 37 from each memory drive at any given time slice. As illustrated in FIG. 24G, the utilization data generating module 2450 can generate drive utilization data 2425 for time slice $t_0$, and can send this information to the segment processing assignment module 2420. Upon receiving this drive utilization data 2425 determined for time slice $t_0$ is then utilized by the segment processing assignment module 2420 to generate the segment processing selection data 2428 for use by the segment processing module to initiate retrieval of these segments in time slice $t_0$ as discussed previously. Note that the utilization data generated for time slice $t_0$ as illustrated in FIG. 24G can correspond to expected utilization for the time slice $t_0$ corresponding to the span of time when the new segments indicated in segment processing selection data 2428 have their retrieval initiated, and/or corresponds to the most recent utilization data leading up to time slice $t_0$ when the new segments indicated in segment processing selection data 2428 have their retrieval initiated.

As illustrated in FIG. 24H, some or all of segment processing selection data 2428 for time slice $t_0$ can also be sent back to the utilization data generating module 2450. This allows the utilization data generating module to determine which segments are currently in the process of being retrieved and/or that will be in the process of being retrieved in the next time slice $t_1$ of the plurality of sequential time slices, and/or in multiple subsequent next time slices starting at $t_1$. Alternatively or in addition, the segment processing selection data 2428 is utilized to update the status of segments in query set 2415 to indicate that they have their retrieval initiated at time slice $t_1$ or to update another record accessible by the node 37 tracking which segments in the query set 2415 are currently in the process of being retrieved.

The utilization data generating module 2450 can determine whether retrieval of one or more other previously requested segments selected in segment processing selection data 2428 of one or more time slices prior to time slice $t_0$ have completed. This can include determining whether the status of the segment in the query set 2415 and/or other record indicates that their retrieval is complete. For example, the segment processing module 2430 can send notifications to the segment scheduling module 2410 indicating completion of retrieval of segments upon their completion, or the segment scheduling module 2410 can otherwise determine when the retrieval has completed.

Alternatively or in addition, the utilization data generating module 2450 can determined whether retrieval of one or more other previously requested segments selected in segment processing selection data 2428 of one or more time slices prior to time slice $t_0$ are expected to have completed, for example, if actual notifications indicating their completion are delayed with respect to the rate of the plurality time slices and/or if this information is not received. The time that retrieval of a given segment is expected to be completed can be based on an estimated retrieval time for the given segment and/or estimated number of time slices from the time the retrieval is initiated until retrieval of the given segment is complete. The estimated retrieval time or estimated number of time slices can be utilized in conjunction with the known time slice that retrieval was initiated in corresponding segment processing selection data 2428 to determine an expected time slice that the retrieval of the time slice will be completed, for example, by adding the estimated retrieval time or estimated number of time slices to the time retrieval was initiated.

This estimate can be determined in conjunction with other segments being concurrently retrieved, for example, by the same processing core resource 48. For example, the estimated amount of time to retrieve a slice can be an increasing function of the number of segments being retrieved from the same or different memory drive by the particular processing core resource 48 and/or by the segment processing module 2430 as a whole. This estimate can be determined in conjunction with other segments being retrieved, for example, from the same memory drive 2440. For example, the estimated amount of time to retrieve a slice can be an increasing function of the number of segments currently being retrieved from the same memory drive 2440 by the same or different processing core resource 48 and/or by the segment processing module 2430 as a whole.

The estimated retrieval time for the given segment can be the same or different for segments retrieved from different memory devices. For example, the estimated retrieval time can based on the memory drive, where different memory drives have different estimated retrieval times based on the type of memory device being utilized to implement the memory drive and/or based on historical time of retrieval of segments from different memory drives. The estimate retrieval time can be based on the segment being retrieved, such as the size of the segment, the location of the segment on the memory drive, and/or the type of encoding, encryption, compression, and/or other storage mechanism utilized to store the segment on the memory drive. Different segments of different sizes, in different locations on the same memory drive, and/or stored via different types of storage mechanisms can have different corresponding estimated retrieval times based on these differences and/or based on historical retrieval times of these different types of segments.

The utilization data generating module 2450 can determine whether or not each previously requested segment is known or expected to have its retrieval completed at the time the next drive utilization data for the next time slice is generated and/or whether or not each previously requested segment is known or expected to have its retrieval completed by the time slice for which the next drive utilization data is being generated. This can be utilized to determine a set of segments for each memory drive 2440 with retrieval in progress for the next time slice. The number of segments in each of these sets can be utilized to determine the utilization level of the corresponding memory drive 2440, where the utilization level is an increasing function of the number of segments currently being retrieved from the memory drive. Alternatively or in addition, change in the number of segments in the set from a previously determined set for previously generated utilization data for the memory drive can be utilized to in utilized to determine the change in utilization level from the previous utilization level, where the amount of change of utilization level is an increasing function of the amount of change in the number of segments.

Figure 24I:
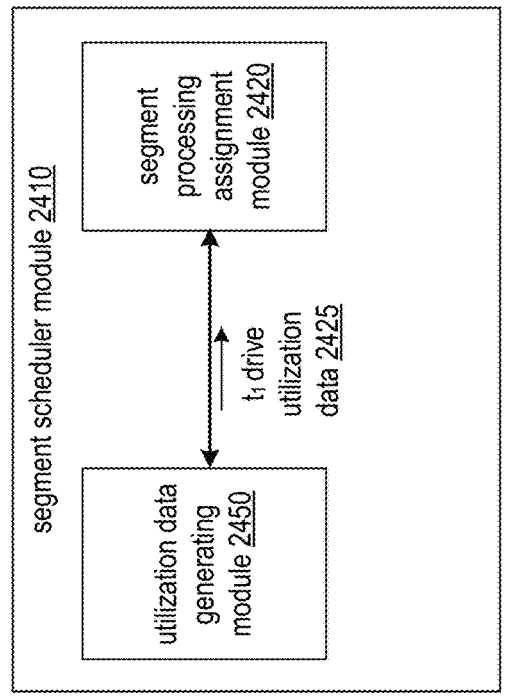

For example, as illustrated in FIG. 24I, updated drive utilization data 2425 is generated for time slice $t_1$ based on one or more previously generated segment processing selection data 2428 and/or based on the number of segments determined or expected to be undergoing retrieval from each of the memory drive during the time slice $t_1$. This updated drive utilization data similarly sent to the segment processing assignment module 2420. As illustrated in FIG. 24J, the segment processing assignment module 2420 utilizes this updated drive utilization data to generate the segment processing selection data 2428 for time slice $t_1$, which is sent to the segment processing module 2430 and is utilized by the utilization data generating module 2450 to generate the next updated drive utilization data. This process of updating the drive utilization data based on tracking which and/or how many segments are currently being retrieved from memory drives can continue over time for subsequent ones of the plurality of sequential time slices.

Figure 24K:
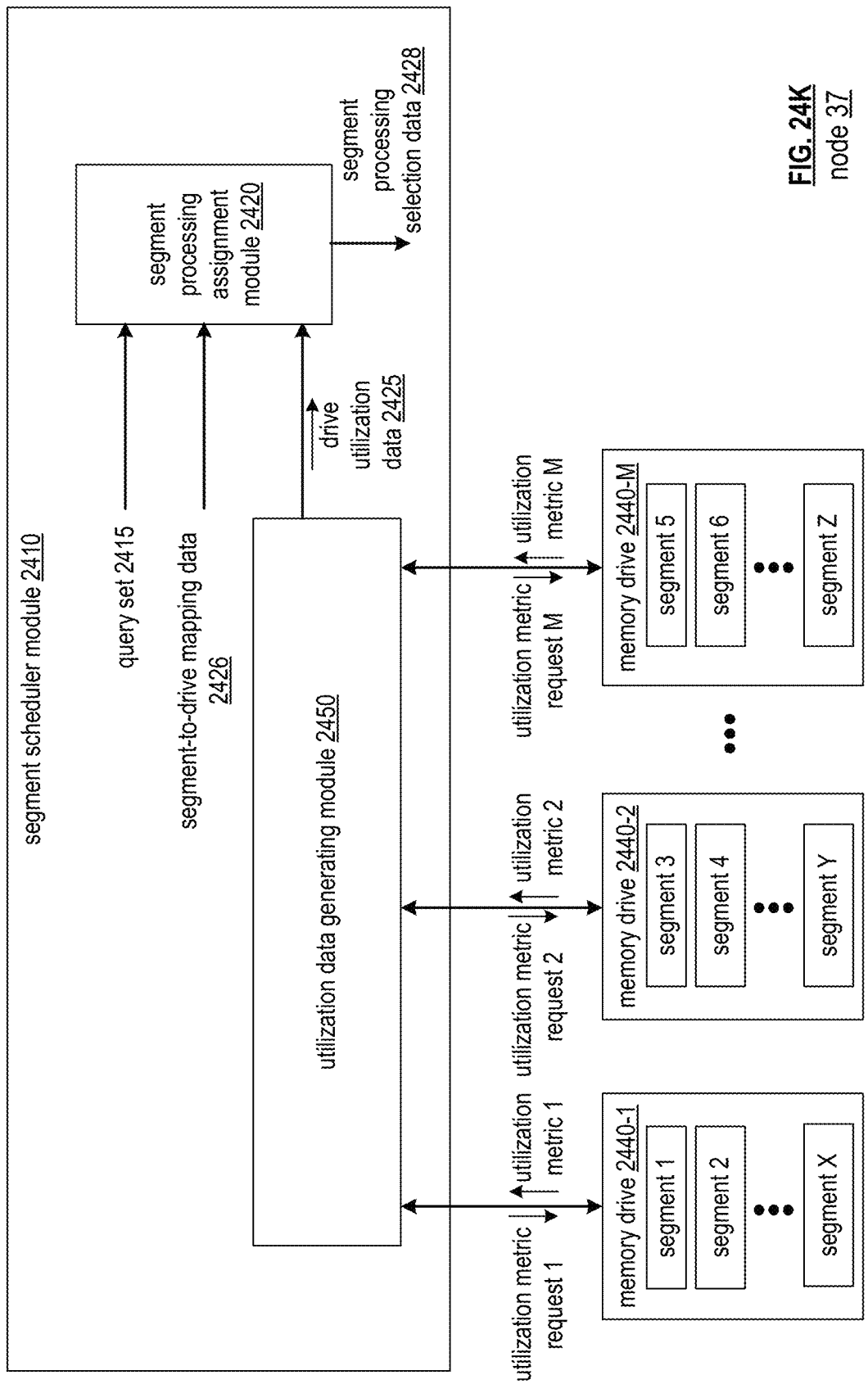

In the example illustrated in FIG. 24K, the utilization data generating module 2450 generates the drive utilization data based on sampling the memory drives' utilization levels in every time slice and/or in an evenly distributed proportion of time slices, where the memory drives' utilization levels are occasionally sampled in accordance with a predetermined sampling schedule and/or based on utilization metric requests sent to the memory drives. The memory drives can generate utilization metrics by measuring or otherwise determining their current utilization level and/or one or more recent utilization levels, such as measured throughput, measured processing resource utilization, and/or other information indicating a measured level of utilization of the memory drive. These one or more utilization metrics can be measured and set to the utilization data generating module 2450 in response to receiving the request and/or in accordance with the predetermined sampling schedule. The utilization data generating module can consolidate, analyze and/or process the utilization metrics to generate the drive utilization data 2425. Alternatively, another processing module of the node's computing device 18 can monitor and/or sample utilization of the node's memory drives 2440 and/or all memory drives 2440 of all of the plurality of nodes 37 implemented by the computing device 18 to generate utilization metrics for some or all of these memory drives 2440 of the computing device 18, where this processing module sends utilization metrics corresponding to the particular node's memory drives to the segment scheduler module 2410 in scheduled intervals and/or in response to requests, and/or where the segment scheduler module 2410 otherwise accesses the utilization metrics generated by the processing module of the computing device 18.

This sampling of the memory drives' utilization levels can be performed alternatively or additionally to the tracking of segment retrieval over time as illustrated in FIGS. 24G-24J to generate the utilization data, for example, where utilization data is generated based on both the retrieved metrics and the tracked segment retrieval. Alternatively, tracked segment retrieval can be utilized to estimate changes in utilization from a most recent time slice where actual utilization metrics were sampled, where these estimated changes are calculated based on segment retrieval alone for one or more time slices until a later time slice when updated utilization metrics are received from some or all memory drives, resetting the utilization data where estimated changes are calculated with respect to these more recently updated utilization metrics.

Utilizing the actual utilization metrics sampled from the memory drives to generate utilization data can be ideal as it may provide more accurate information, and can further account for additional accesses or utilization of these drives, for example, by other nodes in conjunction with recovering segments implemented as virtual segments as discussed in further detail herein. However, as it is inefficient and/or unideal to sample utilization very frequently, combining a less frequent sampling of actual metrics with estimated changes induced by tracked segment retrieval by the node can be ideal in maintaining occasional updates to determine actual drive utilization, while providing sufficient estimates of drive utilization for time slices where the drives are not sampled based on the tracked segment retrieval.

In various embodiments, a node of a computing device has at least one processor and memory that stores executable instructions that, when executed by the at least one processor, cause at least one processing module of the node to determine a query for execution, and to determine a set of segments required to execute the query, where the set of segments is stored in a set of memory drives. For each of a plurality of sequential time slices, the executable instructions, when executed by the at least one processor, further cause at least one processing module of the node to determine utilization data for the set of memory drives, to select at least one of the set of memory drives based on the utilization data, and to retrieve one or more of the set of segments stored in the at least one of the set of memory drives to facilitate one or more of a set of partial executions of the query utilizing the one or more of the set of segments. Each of a plurality of selected at least one of the set of segments are retrieved in a corresponding one of the plurality of sequential time slices, where each of the set of partial executions are facilitated utilizing a corresponding one of the plurality of selected at least one of the set of segments. Facilitation of the plurality of partial executions yields execution of the query.

Figure 24M:
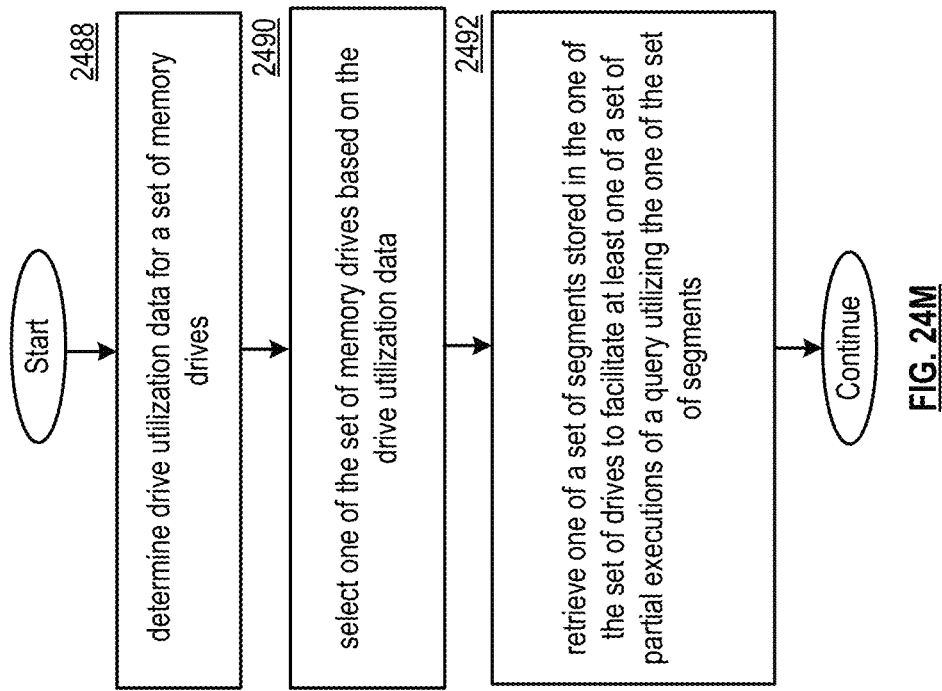
FIGS. 24L-24M are logic diagrams illustrating a method of retrieving segments for query execution based on drive utilization data in accordance with the present invention.
Figure 24L:
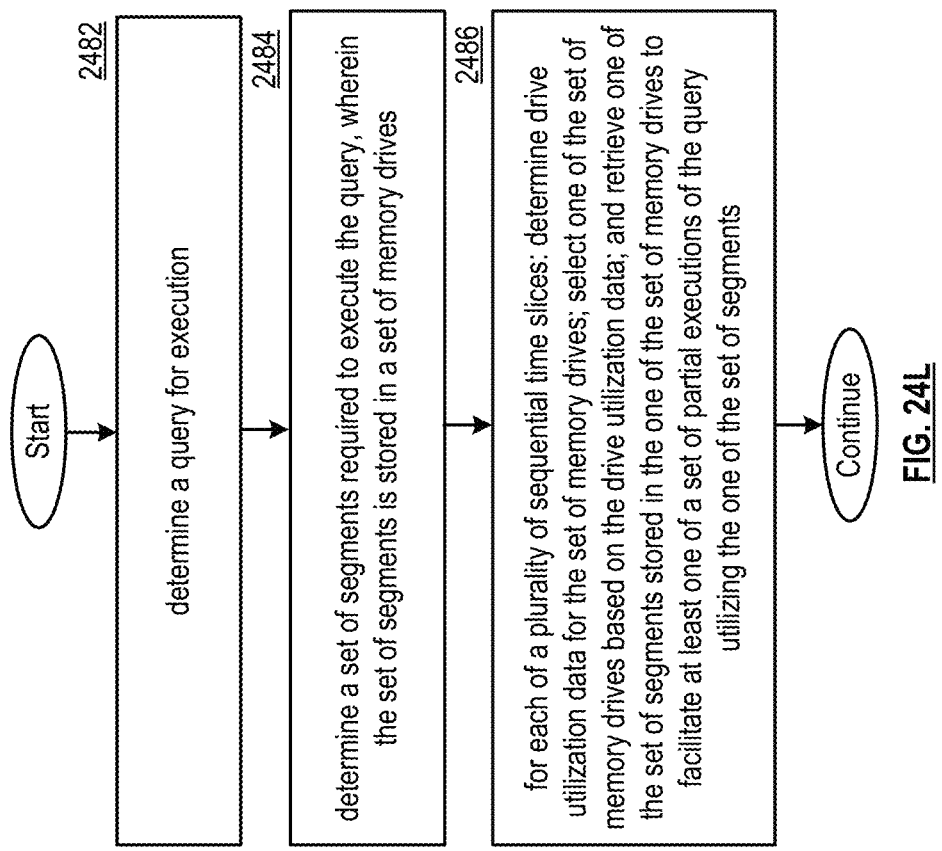

FIGS. 24L and 24M illustrate a method for execution by a node 37. For example, the node can utilize at least one processing module of the node 37 to execute operational instructions stored in memory accessible by the node, where the execution of the operational instructions causes the node 37 to execute the steps of FIG. 24L. The method of 24L can be performed by a node 37 in accordance with embodiments of node 37 discussed in conjunction with FIGS. 24A-24K, and/or in conjunction with other embodiments of node 37 discussed herein.

Step 2482 includes determining a query for execution. For example, the query can be received by the node for execution. Step 2484 includes determining a set of segments required to execute the query, where the set of segments is stored in a set of memory drives. Step 2486 includes, for each of a plurality of sequential time slices: determining utilization data for the set of memory drives; selecting one of the set of memory drives based on the utilization data; and/retrieving one of the set of segments stored in the one of the set of memory drives to facilitate at least one of a set of partial executions of the query utilizing the one of the set of segments. Each of the set of segments is retrieved in a corresponding one of the plurality of sequential time slices. Each of the set of partial executions are facilitated utilizing a corresponding one of the set of segments. Facilitation of the set of partial executions yields execution of the query.

The three steps of step 2486 that are be performed for each of the plurality of sequential time slices are illustrated as a method in FIG. 24M, where the method of FIG. 24M is repeated for each of the each of the plurality of sequential time slices to render execution of step 2486 of FIG. 24L. Step 2488 includes determining utilization data for a set of memory drives. Step 2490 includes selecting one of the set of memory drives based on the utilization data. Step 2492 includes retrieving one of a set of segments stored in the one of the set of memory drives to facilitate at least one of a set of partial executions of a query utilizing the one of the set of segments.

In various embodiments, determining the utilization data includes determining a plurality of utilization levels. Each of the plurality of utilization levels corresponds to one of the set of memory drives, and the one of the set of memory drives is selected based on the at one of the set of memory drives having a most unfavorable utilization level of the plurality of utilization levels. In various embodiments, each of the plurality of utilization levels are determined based on determining current resource utilization metrics for each of the set of memory drives by sampling each of the set of memory drives. In various embodiments, for one of the plurality of sequential time slices, a first utilization level of the plurality of utilization levels is determined for a first one of the set of memory drives, and a second utilization level of the plurality of utilization levels is determined for a second one of the set of memory drives. The first utilization level is more unfavorable than the second utilization level based on the first one of the set of memory drives having first current resource utilization metrics indicating lower resource utilization than second current resource utilization metrics of the second one of the set of memory drives. The first one of the set of memory drives can be selected for the one of the plurality of sequential time slices in response to having the most unfavorable utilization level of all of the utilization levels for the one of the plurality of sequential time slices.

In various embodiments, the plurality of utilization levels are determined based on determining at least one prior subset of the set of segments retrieved in at least one corresponding prior time slice of the plurality of sequential time slices. In various embodiments, for one of the plurality of sequential time slices, retrieval of a first prior subset of the set of segments from a first one of the set of memory drives was initiated within a subset of prior time slices of the plurality of sequential time slices, and retrieval of a second prior subset of the set of segments from a second one of the set of memory drives was initiated within the subset of prior time slices of the plurality of sequential time slices. A first utilization level of the plurality of utilization levels is determined for the first one of the set of memory drives for the of the plurality of sequential time slices based on a first number of segments in the first prior subset of the set of segments. A second utilization level of the plurality of utilization levels is determined for the second one of the set of memory drives for the of the plurality of sequential time slices based on a second number of segments in the second prior subset of the set of segments. The first utilization level is more unfavorable than the second utilization level based on the first number of segments in the first prior subset of the set of segments being lower than the second number of segments in the second prior subset of the set of segments. The first one of the set of memory drives can be selected for the one of the plurality of sequential time slices in response to having the most unfavorable utilization level of all of the utilization levels for the one of the plurality of sequential time slices. In various embodiments, the method further includes determining, for the one of the plurality of sequential time slices, the first prior subset of the set of segments and the second prior subset of the set of segments based on determining ones of the set of segments whose retrieval is currently in progress during the one of the plurality of sequential time slices.

In various embodiments, one of the set of memory drives is determined to have a most unfavorable utilization level of the plurality of utilization levels based on having a utilization level indicating a lowest level of current resource utilization of the plurality of utilization levels. In various embodiments, the method further includes determining a maximum throughput for each of the set of memory drives, and determining available utilization for each of the set of memory drives based on a difference between the maximum throughput of the each of the set of memory drives and the utilization level of the each of the set of memory drives. One of the set of memory drives is determined to have a most unfavorable utilization level of the plurality of utilization levels based on having a highest available utilization of the set of memory drives.

In various embodiments, the method includes determining a plurality of queries for execution that includes the query. The method further includes determining a plurality of sets of segments by determining, for each of the plurality of queries, a corresponding set of segments required to execute the query, where the plurality of sets of segments is stored in the set of memory drives. One of the plurality of sets of segments is retrieved for each of the plurality of sequential time slices based on the selection of the one of the set of memory drives based on the utilization data. Each partial execution of a plurality of sets of partial executions are facilitated utilizing a corresponding one of the plurality of sets of segments, and facilitation of each set of partial executions in the plurality of sets of partial executions yields execution of a corresponding one of the plurality of queries.

In various embodiments, a first time slice of the plurality of sequential time slices includes a retrieval of a first one of the plurality of sets of segments. A second time slice of the plurality of sequential time slices includes a retrieval of a second one of the plurality of sets of segments. A third time slice of the plurality of sequential time slices includes a retrieval of a third one of the plurality of sets of segments. The first time slice is before the second time slice in the plurality of sequential time slices, and the second time slice is before the third time slice in the plurality of sequential time slices. The first one of the plurality of sets of segments is utilized to facilitate a partial execution of a first one of the plurality of queries. The second one of the plurality of sets of segments is utilized to facilitate a partial execution of a second one of the plurality of queries. The third one of the plurality of sets of segments is also utilized to facilitate a partial execution of the first one of the plurality of queries.

In various embodiments, a non-transitory computer readable storage medium includes at least one memory section that stores operational instructions that, when executed by a processing module that includes a processor and a memory, cause the processing module to determine a query for execution, and to determine a set of segments required to execute the query, where the set of segments is stored in a set of memory drives. For each of a plurality of sequential time slices, the executable instructions, when executed by the at least one processor, further cause at least one processing module to determine utilization data for the set of memory drives, to select at least one of the set of memory drives based on the utilization data, and to retrieve one or more of the set of segments stored in the at least one of the set of memory drives to facilitate one or more of a set of partial executions of the query utilizing the one or more of the set of segments. Each of a plurality of selected at least one of the set of segments are retrieved in a corresponding one of the plurality of sequential time slices, where each of the set of partial executions are facilitated utilizing a corresponding one of the plurality of selected at least one of the set of segments. Facilitation of the plurality of partial executions yields execution of the query.

FIGS. 25A-25I present embodiments of a node 37 that facilitate execution of queries 2405 in the query set 2415, even when at least one segment 2445 indicated in the corresponding segment set 2418 is unavailable for access in segment storage 2442. The embodiments illustrated in 25A-25I can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The embodiments of node 37 discussed in conjunction with FIGS. 25A-25I can be utilized to implement any other nodes 37 of database system 10 discussed herein.

Segments on disk may become unavailable due to drive failures, such as a failure of one or more corresponding memory drives 2440 responsible storing these segments. Segment unavailability can also occur as a result of failure of a corresponding node 37 storing the segment; software issues such as software issues regarding the node 37 and/or memory drive 2440 storing the segment; connectivity problems such as connectivity problems that render retrieval of segments from their memory drive 2440 and/or node 37 unavailable; and/or other issues that result in unavailability of access to a segment via its memory drive 2440 at a given time.

In embodiments where segments are not replicated or otherwise do not have duplicate segments stored on other memory drives of the same or different node 37 and/or computing device 18, unavailability of a particular segment can render a corresponding query requiring the segment as impossible to execute properly, as the query resultant is not guaranteed to be correct if at least one segment in the query's segment set is not processed. However, in embodiments of database system 10 discussed herein, segments are stored in exactly one location and are "owned" by exactly one node.

As discussed previously in conjunction with FIGS. 15-23, segments can be generated in accordance with a redundancy storage encoding scheme. Thus, despite unavailability of access to a particular segment via its corresponding memory drive 2440, this segment can be reconstructed in accordance with the redundancy storage encoding scheme, so long as enough other segments in the same segment group as the segment, as dictated by the redundancy storage encoding scheme, are available for access on their respective memory drives and/or so long as segment losses do not otherwise exceed the failure threshold of the redundancy storage encoding scheme.

When a segment becomes unavailable, processing resources of database system 10 can fully rebuild these segments. As used herein, full rebuilding refers to the process of reconstructing at least one unavailable segment in accordance with the corresponding redundancy storage encoding scheme utilized to generate the segment, and further re-homing these reconstructed segments for storage in the same or different memory drive 2440 and/or for storage by segment storage 2442 of the same or different node 37 and/or the same or different computing device 18. In particular, if a particular memory drive 2440 fails, for example, due to failure of a particular memory device 42 that implements some or all of the memory drives 2440, the plurality of segments stored by this memory drive 2440 can be rebuild by the database system 10, for example, for storage on a new memory drive 2440. This can include assigning these rebuilt segments to a new node in response to rebuilding the segments on one or more memory drives 2440 of a new node 37, where rebuild segments of the memory drive 2440 can be assigned to storage via the same or different new node 37. Alternatively, a replacement memory drive 2440 or repaired original memory drive 2440 can be implemented on the original node, where the rebuilt segments are stored on the replacement or repaired memory drive and are assigned to storage via the same node 37.

However, this full rebuilding process can be lengthy, particularly if a large number of segments from a failed memory drive need to be reconstructed and then re-stored on disk in accordance with the full rebuilding process. Relying on completion of this full rebuilding process for access to unavailable segments to facilitate execution of ongoing queries can therefore be unideal, as these queries cannot be performed or completed during the entire, lengthy duration of this full rebuilding process.

Furthermore, as the rebuilding process of all segments of an unavailable memory drive and/or entire node is lengthy and computationally expensive, there are cases where the database system 10 may wish to forego the rebuilding process. In particular, if a memory drive or node outage is temporary, for example, due to scheduled and/or otherwise known maintenance and/or due to a scheduled migration of segments to a new memory drive of the same or different node on a same or different computing device 18, rebuilding of all segments of these temporarily unavailable memory drives or entire nodes is unideal, as access to the segments will again become available once the temporary outage has elapsed, and expensive rebuilding is not necessary. However, these cases of waived rebuilding also pose problems for timely query execution, as queries requiring nodes stored on memory drives or nodes undergoing the temporary outage cannot be performed or completed during this temporary outage.

The embodiments discussed in conjunction with FIGS. 25A-25L address these problems by enabling dynamic recovery of unavailable segments required for execution of ongoing queries without requiring these unavailable segments undergo the full rebuilding process of being fully rebuilt to disk. This can be ideal, as segments that are not required for query during a scheduled outage are not recovered, where only the proper subset of unavailable segments during the outage that are required for query execution during the outage are recovered. Furthermore, individual segments that may be undergoing a full rebuilding process to be rebuild to disk by the database system 10 as part of a large rebuilding operation to rebuild a large number of segments can also be dynamically recovered for execution of queries, separately from this rebuilding process and/or before this full rebuilding process is completed. This ability to dynamically recover unavailable segments as they are required for execution of ongoing queries improves database systems by enabling queries to be executed during outages and/or before unavailable segments are fully rebuilt to disk, ensuring that pending queries do not undergo long delays due to outages and/or lengthy rebuilding operations, while preserving resources to only recover the unavailable segments as they are necessary for query execution.

Figure 25A:
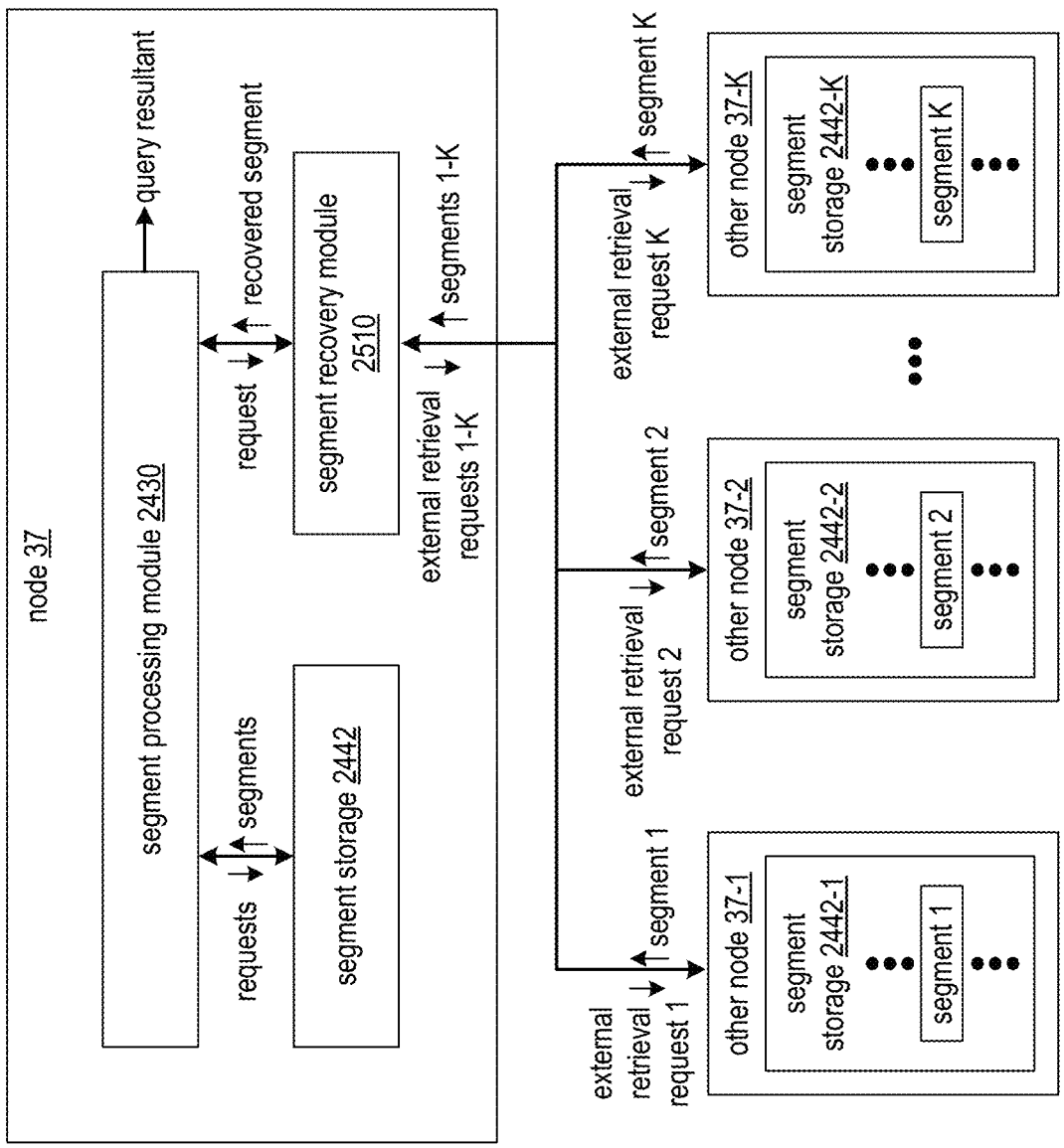
FIGS. 25A-25B are schematic block diagrams of embodiments of a node that implements a segment recovery module to process virtual segments in accordance with the present invention.

FIG. 25A illustrates an example of a node's execution of a query that requires retrieval and/or processing of at least one unavailable segment. As discussed thus far with regards to the embodiments of 24A-24L, a node retrieves segments 2445 from segment storage 2442 to service incoming or ongoing queries of query set 2415. These segments that are stored in segment storage 2442, are otherwise stored to disk, are currently available for retrieval from their storage without utilizing a recovery scheme, and/or that are designated for retrieval from their storage without utilizing a recovery scheme can correspond to "physical segments." When physical segments become unavailable, a node 37 can be implemented to perform dynamic recovery of the unavailable segments that are required for execution of a query in query set 2415 by implementing a segment recovery module 2510. The segment recovery module 2510 can be implemented utilizing at least one processing module of the node 37, such as at least one processing core resource 48. The unavailable segments that a node determined to recover to service its execution of at least one query can correspond to "virtual segments" that are reconstructed and/or otherwise recovered to service the query.

As used herein, a "virtual segment" refers to the abstraction and/or logical construct of a locally rebuilt segment that is not permanently re-homed and/or is not stored to disk. A segment being processed as a virtual segment can require generation of a "locally rebuilt segment" or "recovered segment" via one or more other segments that are physically stored elsewhere to service ongoing and/or incoming queries. Virtual segments can correspond to segments determined to be unavailable in their designated memory drive 2440 of segment storage 2442 of the same or different node, that therefore must be recovered if needed to service queries while unavailable physically. In some cases, such as the embodiments discussed in conjunction with FIGS. 27A-27K, a segment processed as a virtual segment may be currently available for access as a physical segment by the same or different node, but is determined to be processed as a virtual segment by generating a recovered segment anyways, for example, based on a node segment set of data ownership information indicating that the segment be processed by the node as a virtual segment.

While not depicted in FIG. 25A, the segment recovery module 2510 can be implemented utilizing the segment processing module 2430, can be implemented utilizing the same set of processing resources as the segment processing module 2430, can be implemented utilizing overlapping processing resources shared with the segment processing module 2430, and/or can be implemented utilizing a proper subset of the node's processing resources that are allocated to the segment recovery module 2510, where another, distinct proper subset of the node's processing resources are allocated to the segment processing module 2430. Embodiments enabling intelligent allocation of processing resources for utilization by the segment recovery module 2510 to recover and/or process unavailable segments and for utilization by the segment processing module for normal retrieval and/or processing of available segments is discussed in further detail in conjunction with FIGS. 26A-26C.

The segment recovery module 2510 can determine to recover an unavailable segment and/or a segment otherwise indicated as a virtual segment. For example, as illustrated in FIG. 25A, the segment recovery module can receive a request from the segment processing module 2430 indicating the segment to be recovered. Alternatively or in addition, this information can be received from the segment scheduling module 2410 and/or can be based on segment processing selection data 2428 that identifies that the unavailable segment be retrieved and/or processed in conjunction with a partial execution of a query in the query set 2415. Alternatively or in addition, the segment recovery module 2510 can otherwise determine the to recover the unavailable segment based on determining the unavailable segment is required for execution of an ongoing query and/or a new query in the query set 2415.

In response to determining to recover an unavailable segment and/or virtual segment, the segment recovery module 2510 can facilitate recovery of the segment to generate a locally rebuilt segment by implementing a recovery scheme. This can include determine a set of other segments 1-K that are stored on disk by other nodes, and that are required to recover the unavailable segment. This can include determining the other segments 1-K based on identifying the segment grouping to which the unavailable segment belongs and/or to otherwise determine the particular segments needed to recover the unavailable segment based on accessing metadata structures associated with the segment, a lookup table, accessing information storing indicating the segment groupings, or otherwise determining the segment grouping based on an identifier of the unavailable segment. This can also include selecting the other segments 1-K from a larger set of possible segments that will be recovered, where any K segments of the larger set of possible segments can be utilized to recover the unavailable segment. Alternatively, requests for all of the set of possible segments can be sent to a larger set of other nodes, where K segments, such as the first K received segments, are selected from a larger set of incoming possible segments for recovery of the unavailable segment.

Once the set of other segments 1-K are identified, the node can query other nodes 37, such as nodes on a set of other computing devices 18, for the segments 1-K. For example, as illustrated in FIG. 25A, the segment recovery module 2510 can generate a plurality of external retrieval requests 1-K that are sent by the node 37 to a set of other nodes 37-1-37-K of the database system 10. Each one of the set of other nodes 37-1-37-K can be stored on a distinct one of a set of corresponding computing devices 18-1-18K. Each external retrieval request 1-K can identify the corresponding segment in the set of segments 1-K to be retrieved from the corresponding other node. The node 37 can send the set of external retrieval requests 1-K to the set of other nodes 37-1-37-K by utilizing the network connection 41 of the node 37 and/or by utilizing system communication resources 14 of the database system 10. Each other node 37-1-37-K can receive the corresponding one of the set of external retrieval requests 1-K via their own network connection 41 and/or via another connection to system communication resources 14.

Note that, as illustrated in FIG. 25A and/or in further figures herein, nodes labeled 37-1, 37-2, . . . can correspond to different particular example nodes for each different example discussed, for example, where nodes are implemented by the same or different set of computing devices 18 in each example. In particular, in this example and in further examples herein, the example nodes 37-1, 37-2, 37-3, and 37-4 can be different from example nodes 37-1, 37-2, 37-3, and 37-4 of FIGS. 7 8, and/or 9. In particular, the set of nodes 37-1, 37-2, 37-3, and/or 37-4 discussed in conjunction with FIG. 25A and/or further figures herein can all be included on more than one computing device 18 and/or can each be implemented by a different computing device.

In response to receiving an external retrieval request indicating a particular segment for retrieval, each of the other nodes 37, and/or other processing resources of each computing device 18 that includes a corresponding one of the other nodes, can facilitate retrieval of the requested segment from their own segment storage 2442. This can include each of the other nodes identifying which of their set of memory drives 2440 of their corresponding segment storage 2442 stores the requested segment, retrieving the segment from the identified one of the set of memory drives 2440, and sending the segment back to the requesting node 37. Each other node 37 can send the corresponding segment retrieved from their segment storage 2442 to the requesting node 37 by again utilizing their network connection 41 and/or by utilizing system communication resources 14 of the database system 10, where the requesting node 37 receives the set of segments 1-K from the set of other nodes 1-K via its network connection 41 and/or via another connection to system communication resources 14. In some embodiments, a segment scheduling module 2410 of one of these nodes 1-K can facilitate partial execution of a query requiring the requested segment in response to retrieving the requested segment from its memory device 2440. For example, rather than facilitating two different retrievals of this segment for the recovery and for its own use, this particular node can perform a single retrieval of the segment to service both the request from the other node for the segment as part of a recovery of a virtual segment being performed by the other node, as well as this particular node's own usage of the segment as a physical segment to generate a partial resultant for a query 2405 with this segment in its segment set 2418.

In other embodiments, the requesting node 37 may not have knowledge of which particular nodes in the database system 10 store the necessary segments 1-K. In these cases, the node 37 can instead broadcast the external retrieval request to some or all nodes in the database system 10 via its network connection 41 and/or via another connection to system communication resources 14, where the external retrieval request indicates the set of segments 1-K. Each other node in the database system 10, upon receiving the broadcast, can determine whether they store any of the indicated segments 1-K, where many of the nodes will determine that they do not store any of these segments and will thus do nothing. Only the particular set of other nodes 37-1-37-K do each store one of the requested segments will retrieve the one requested segment from their segment storage 2442 accordingly for transmission back to the requesting node 37.

Once the set of segments 1-K are received by the requesting node 37, the segment recovery module 2510 can further implement the recovery scheme to facilitate recovery of the unavailable segment. This can include generating a recovered segment as a locally rebuilt segment by utilizing the set of segments 1-K. This can include utilizing the redundancy storage encoding scheme, such as an erasure scheme or other rebuilding scheme, to recover the segment. For example, a corresponding redundancy storage decoding function can be performed on the set of segments 1-K to generate the recovered segment in accordance with the particular redundancy storage encoding scheme utilized to generate the segment group that includes the unavailable segment and the set of segments 1-K.

The segment processing module 2430 can process the recovered segment generated by locally rebuilding segment recovery module 2510 as a virtual segment to service the given query, and can further process other physical segments to service the given query, for example, via requests to retrieve these physical segments from memory drives 2440 of segment storage 2442 as discussed previously. At least one partial resultant can be generated by utilizing the virtual segment recovered via segment recovery module 2510 and/or any other virtual segments recovered via segment recovery module 2510 for the query that are not illustrated. Other partial resultants can be generated utilizing the physical segments retrieved from memory. The partial resultants generated via processing all segments of the given query, whether physical or virtual, can be combined and/or processed to yield the final query resultant for the query.

As the recovered segment is generated for use in the corresponding query executed by the node 37, the recovered segment can persist only for the life of the query, where the recovered segment is not stored is not stored in segment storage 2442 or otherwise is not stored to disk. For example, the particular data of the recovered segment required to execute the query, such as some or all of the set of rows included as data of this segment, can be forwarded to the segment processing module 2430 for use in processing the query in accordance with the corresponding operator data 2416 of the query to generate a partial resultant of the query. The recovered segment can otherwise exist as a logical construct or abstraction rather than a physically stored segment on disk, for example, persisting only in cache memory such as cache memory 45 of one or more particular processing core resources that are utilized by the segment recovery module 2510 to reconstruct the segment and/or that are utilized by the segment scheduling module 2410 to process the recovered segment to generate the corresponding partial resultant for the query. Once the query is fully executed, the recovered segment can be deleted from cache memory, can be no longer available to the node 37, and/or can otherwise no longer persist. In some cases, once the particular partial resultant corresponding to the recovered segment is generated, the is recovered segment deleted from cache memory, can be no longer available to the node 37 for use in processing other queries requiring the virtual segment, and/or can otherwise no longer persist, even if the full query resultant has not yet been generated and/or if the query's execution by the node 37 is not yet complete.

Thus, because the recovered segment does not persist beyond the life of the query and/or beyond its use in generating the corresponding partial result, if the particular unavailable segment is later required by the node, for example, to service a different query, the segment recovery module 2510 will again re-perform the same recovery process by re-retrieving segments 1-K and re-generating the recovered segment for processing by the segment processing module 2430 to generate the corresponding partial resultant in accordance with the operator data of the different query. While the recovered segment is interchangeably referred to as a "locally rebuilt segment" herein, a locally rebuilt segment is similarly not fully rebuilt for storage on disk or in segment storage 2442, unlike fully rebuilt segments that are rebuilt via a different, full rebuilding process to fully reconstruct unavailable segments as physical segments that are stored to disk and/or segment storage 2442 for subsequent retrieval as physical segment.

Figure 25B:
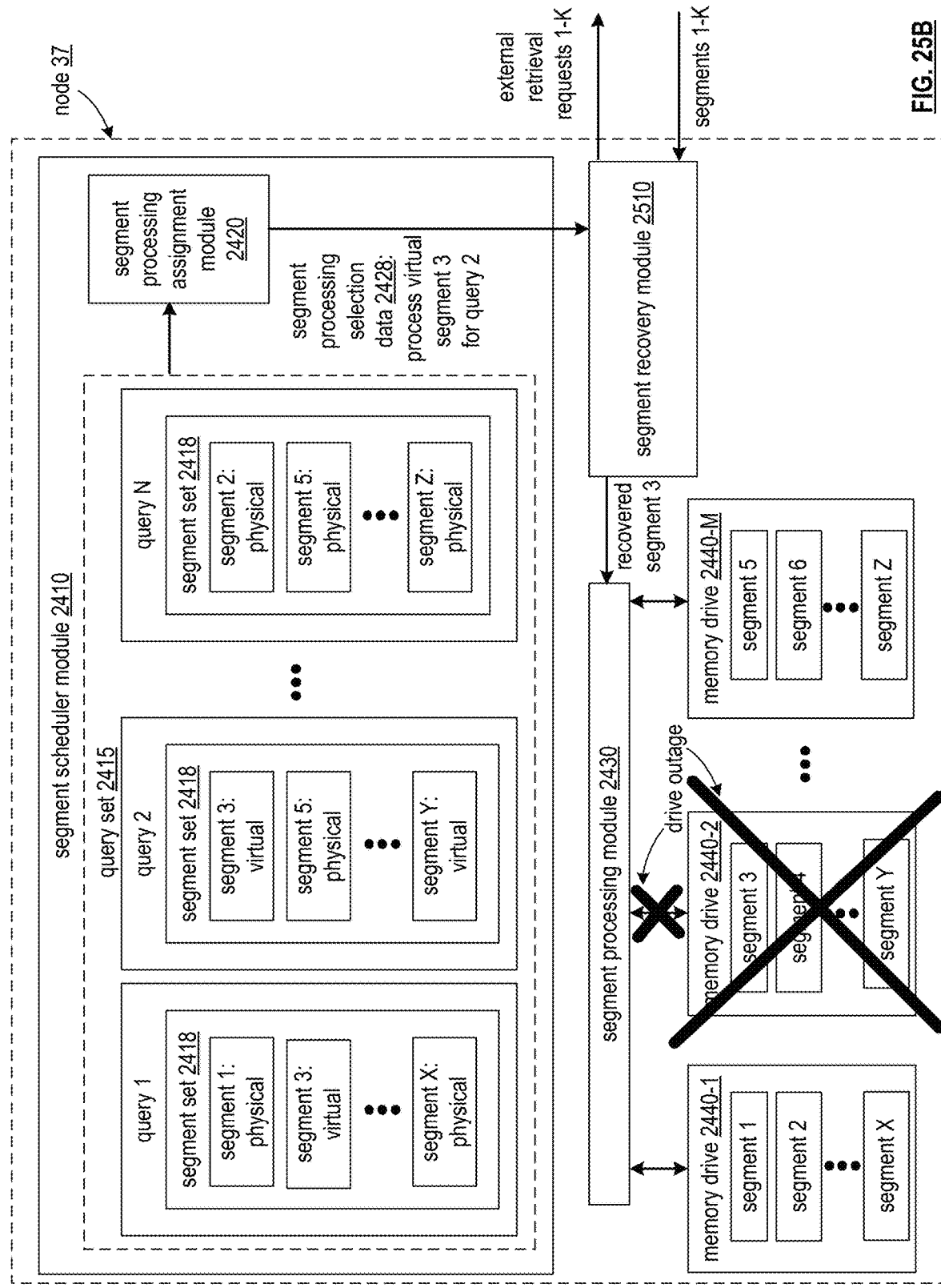

FIG. 25B illustrates a particular example of node 37 that processes a set of queries in query set 2415 that require use of unavailable segments via a segment scheduling module 2410 as described in conjunction with FIGS. 24A-24L. The example of FIG. 25B illustrates the same example storage configuration of segments in memory drives 2440-1-2440-M as illustrated in FIG. 24D, and further illustrates the same example segment sets for queries 1-N in query set 2415. However, as illustrated in FIG. 25B, the memory drive 2440-2 is experiencing a drive outage and/or its segments are otherwise unavailable for access as physical segments. This outage can correspond to a temporary outage and/or scheduled outage, where memory drive 2440-2 will be again available at a later time and where the segments of memory drive 2440-2 are not rebuilt for physical storage. Alternatively, this outage can correspond to a permanent outage and/or unexpected outage, where the segments of memory drive 2440-2 are rebuilt to physical storage. For example, within the temporal period depicted in FIG. 25B, the segments of memory drive 2440-2 can be currently undergoing a full rebuilding process for physical storage in another memory drive of the same or different node 37 via other processing resources of the database system 10. This current full rebuilding process can be separate from the node's recovery of virtual segments of memory drive 2440-2 as depicted and described herein, and/or this current full rebuilding process is otherwise not depicted and/or not relevant to the query execution of FIG. 25B as described herein.

The query set 2415 can further indicate whether segments in each segment set 2418 are to service the query as physical segments retrieved directly from segment storage 2442 or as virtual segment recovered via retrieval of a set of other segments as illustrated in FIG. 25A. Alternatively, the segment scheduling module 2410 can otherwise determine whether each segment in segment set 2418 be processed as a physical or virtual segment. In this example, based on the drive outage of memory drive 2440-2, the segment scheduling module 2410 can determine to process the segments stored by memory drive 2440-2 as virtual segments. In particular, segment 3 will be processed as a virtual segment to service queries 1 and 2, and segment Y will be processed as a virtual segment to service query 2. Some or all other segments stored by memory drive 2440-2, such as segment 4, may not be included in any of the segment sets of query set 2415 during the outage of memory drive 2440-2, and thus will not need to be recovered via segment recovery module 2510 because they are not necessary to service any queries during the outage.

At the time slice illustrated in FIG. 25B, the segment processing assignment module generates segment processing selection data 2428 indicating that segment 3 be processed as a virtual segment for query 2, based on determining that segment 3 is unavailable for access as a physical segment and/or based on determining that segment 3 is indicated to be processed as a virtual segment for query 2. Segment 3 can be recovered via the segment recovery module 2510 based on the segment processing selection data 2428 indicating processing of segment 3 as a virtual segment, where the recovered segment 3 generated by the segment recovery module 2510 is sent to and/or otherwise utilized by segment processing module 2430 to generate the corresponding partial resultant for query 2.

In this example, segment 3 will again be recovered in a later time slice by segment recovery module 2510 to service query 1 because segment 3 does not persist beyond the life of query 2 and/or beyond generating the corresponding partial resultant for query 2. In other cases as discussed in further detail herein, recovered segment 3 can be utilized for concurrent processing via segment processing module 2430 to generate corresponding partial resultants for both queries 1 and 2 and/or can be utilized to service both queries 1 and 2, where segment 3 does not need to be separately recovered two distinct times by segment recovery module 2510.

In the discussion of processing virtual segments described thus far, segments processed as virtual segments are recovered in their entirety. However, in other embodiments, a node 37 can further be operable to determine that only a portion of a particular segment processed as a virtual segment is required for execution of a particular query. For example, a particular segment can store data corresponding to a plurality of rows of one or more particular tables, but a particular query may only require accessing a small percentage of these rows. As another example, a particular segment can store a plurality of fields and/or columns for each of a set of rows in a particular table, but a particular query may only require accessing a small percentage of the fields for some or all of the set of rows of the table. In such cases, rather than facilitating recovery of the entirety of a segment processed as a virtual segment, a node can instead facilitate recovery of only a portion of the segment deemed necessary to execute the corresponding query.

For example, as illustrated in FIG. 25C, a segment 2445 can include a set of data blocks 2540 that each include a distinct set of raw rows and/or raw columns of a table and/or portion of a table stored by the data segment. The set of data blocks can be implemented via the coding blocks and/or data slabs discussed in conjunction with FIGS. 21 and 22. For example, one or more particular data slabs of a segment as discussed in conjunction with FIGS. 21 and 22 can be recovered rather than recovering the entire segment based on determining that only the columns included in the one or more particular data slabs are necessary for execution of the query. As a particular example, if each of a plurality of coding blocks of a segment store one or more corresponding data slabs of the segment, individual coding blocks can be recovered rather than recovering the entire segment. If these coding blocks are, for example, each 4 Kilo-Bytes in size as discussed in conjunction with FIG. 22, and if each segment is, for example, 32 Giga-Bytes in size as discussed in conjunction with FIG. 22, recovery and processing of a small number of coding blocks rather than an entire segment can further reduce computation time and processing resources to generate the same required partial resultant for the query. The data blocks of FIG. 25C can alternatively correspond to other distinct portions of raw data included in a segment.

Each data block 2540 can be independently recoverable, where a single data block 2540 can be recovered without requiring recovery of any other data blocks. An example of such an embodiment is illustrated in FIG. 25C. A segment group includes a number of segments 2445 such as five segments 2445-1-2445-5 generated via the redundancy storage encoding scheme, for example, as discussed in conjunction with FIG. 23. In this example, any four of the five segments can similarly be processed via a decoding scheme in accordance with the redundancy storage encoding scheme to recover the remaining one of the five segments, for example, by utilizing parity data stored in each segment generated in accordance with the redundancy storage encoding scheme. In some embodiments, the data blocks 2540 of each segment 2445 illustrated in FIG. 25C can be fully included in the data and parity section of the corresponding segment as illustrated in FIG. 23, where the segments 2445 of FIG. 25C additionally include the manifest section, index sections, and/or statistics section as illustrated in FIG. 23.

In some embodiments, an individual data block of one of the five segments can be independently recoverable without requiring recovery of the entire segment. In some cases, recovery of a particular data block of a particular segment can include retrieving a corresponding data block from each other segment in the segment group. For example, as illustrated in FIG. 25C, each segment can be generated to include a same number of data blocks, where a data block in one segment belongs to a data block grouping of five data blocks that includes one data block from each segment. For example, a first data block grouping can include data blocks 2540-1-1, 2540-2-1, 2540-3-1, 2540-4-1, and 2540-5-1; a second data block grouping can include data blocks 2540-1-2, 2540-2-2, 2540-3-2, 2540-4-2, and 2540-5-2; and so on, where a total of J data block groupings are included in the segment grouping. In particular, each particular data block can include and/or otherwise be associated with its own corresponding parity data that was generated in accordance with the redundancy storage encoding scheme, where the recovery of a particular data block of a particular segment can include utilizing the parity data specific to the corresponding block of each other segment in the same segment group.

As a particular example, the redundancy storage encoding scheme can be individually applied to the raw data, such as full or partial data slabs, to be included in each data block of a data block group to generate the data block group with its own corresponding parity data that enables the data blocks in the data block group to be independently recoverable. In this example, the redundancy storage encoding scheme can be applied separately on J sets of data slabs or other raw data to generate J data block groups of five data blocks each, where the data and parity section of each segment is generated from J data blocks of each one of the J data block groups, and associated parity data for each data block if not integrated in the data blocks themselves. Alternatively, the redundancy storage encoding scheme, when applied to all raw data of each data segment to generate the segments in the segment group as a whole, can inherently render individual portions of the data in each segment independently recoverable via corresponding individual portions of data in a set of other segments of the segment group and/or via the entirety of the other segments of the segment group.

FIG. 25D illustrates an example where a particular data block of a virtual segment is recovered by a node 37 to process the virtual segment to service the query. First, the segment scheduling module 2410 and/or other processing module of the node can identify that only the particular data block is required to service the corresponding query, for example, based on domain data of the query, particular columns accessed in the query, and/or particular rows accessed in the query. In this example, data block 2540-2-2 of virtual segment 2445-2 is determined to be required to process query 2. This can be indicated in segment processing selection data 2428 and/or can otherwise be determined by the segment recovery module 2510, where the segment recovery module 2510 retrieves the corresponding data blocks of the set of segments 1-K in the segment group via a set of requests 1-K indicating these corresponding data blocks. In this example, K is equal to four, and four external retrieval requests are sent to retrieve each of four data blocks in the data block group: data blocks 2540-1-2, 2540-3-2, 2540-4-2, and 2540-5-2. The retrieved data blocks are processed by the segment recovery module 2510 to recover the required data block of the virtual segment based on the redundancy storage encoding scheme utilized to encode the data blocks individually and/or utilized to encode the corresponding segments as a whole. In this example, the received four data blocks 2540-1-2, 2540-3-2, 2540-4-2, and 2540-5-2 are processed to generate recovered data block 2540-2-2. The recovered data block 2540-2-2 is then forwarded to segment processing module 2430, where the segment processing module generates the corresponding partial resultant for the corresponding virtual segment. For example, the operator data 2416 for the corresponding query can be received and/or determined by the segment processing module 2430 to generate the partial resultant. In some cases, the partial resultant is merely the raw data, such as raw rows and/or columns of the particular data block to be forwarded to a different node for further processing.

While not discussed in conjunction with FIGS. 24A-24L, the retrieval and/or processing of physical segments of a segment set 2418 of a query 2405 can similarly include determining one or more particular data blocks 2540, such as one or more particular data slabs and/or coding blocks of FIGS. 21 and 22, that are required to service the corresponding query, where only a subset of data blocks identified from the plurality if data blocks of the segment are retrieved from the memory drive storing the segment and/or where only where only the subset of data blocks identified from the plurality if data blocks of the segment are processed to generate the corresponding partial result. Identifying the location of the particular data blocks 2540 of a particular segment that will be retrieved from physical storage and/or processed can similarly include accessing metadata structures associated with the segment and/or a lookup table that indicates the location of the particular data blocks and/or indicates the rows and/or columns associated with the particular data blocks.

In some cases, the segment set 2418 includes and/or indicates identifiers of a set of particular data blocks 2540 of each segment 2445, whether indicated to be processed as a virtual or physical segment, that are necessary to service the query, where these particular data blocks, and perhaps only these particular data blocks, are retrieved from memory to service the query via a corresponding physical segment and/or are recovered via externally retrieved data blocks and/or externally retrieved entire segments.

In some cases, multiple consecutive or non-consecutive data blocks of the segment are determined to be required to service the query, and the multiple consecutive or non-consecutive data blocks of a virtual segment can be recovered by independently and/or jointly recovering the multiple consecutive or non-consecutive data blocks via corresponding multiple consecutive or non-consecutive data blocks of each other required segment in the set of segments 1-K. Identifying the multiple data blocks can include identifying a set with the minimum number of data blocks required to service the corresponding query, where any data blocks that do not include any data required to service the query are not identified. Alternatively, in some cases, a consecutive set of data blocks is identified to simplify the transaction as a single read, even if the consecutive set of data blocks includes one or more data blocks that are not required to service the query.

In some cases, particularly if the required data blocks are non-consecutive, separate data blocks of the same segment can be indicated for retrieval or recovery as separate transactions, for example, occurring in different slices and/or scheduled by the segment scheduling module 2410 to be performed at different times. Alternatively, multiple data blocks can be retrieved or recovered in a single, batched request, particularly if they are consecutively stored in physical memory and/or have corresponding data blocks in the same data block groups that are consecutively stored on other memory drives of other nodes. In particular, the segment scheduling module 2410 can exploit the fact that many reads of data blocks and/or entire segments are sequential in nature. When this occurs, these reads can be batched into a single request. The batched reads can correspond to retrieval of local sequential data, such as multiple data blocks or other sequential portions of data within the same segment and/or across multiple segments. The batched reads can also correspond to the other segments and/or individual data blocks on other nodes required to be retrieved to recover a segment processed as a virtual segment. In either case, the segment scheduling module can determine to batch required reads to retrieve multiple segments and/or multiple data blocks of the same segment in its own memory drive or memory drives of other nodes in recovery of a corresponding virtual segment, for example, when this required data is determined to be stored sequentially and/or non-sequentially in the same location. This can minimize the number of distinct requests to local memory and perhaps more importantly, can minimize the number of distinct requests sent over a network of the database system 10 via system communication resources 14.

The segment scheduling module 2410 can determine multiple data blocks of a same physical or virtual segment be retrieved and/or recovered in tandem as a batched request, for example, in same segment processing selection data generated for a particular time slice and/or indicating a same core processing resource to perform the corresponding retrieval and/or recovery of the multiple data blocks. This can still include retrieving and/or recovering only a proper subset of data blocks determined to be required for execution of the corresponding query. The segment scheduler can determine whether or not to batch requests to recover multiple data blocks of a virtual segment and/or can determine whether or not to batch requests to recover multiple data blocks of a virtual segment. Alternatively, the segment scheduler can always determine to batch requests to recover multiple data blocks of a same virtual segment of a same query and/or retrieve multiple data blocks of a same physical segment of a same query.

Similarly, batched requests to process multiple physical segments and/or multiple virtual segments of the same query can similarly be generated and/or determined by the segment scheduling module 2410. In particular, multiple physical segments of a segment stored in the same memory drive can be retrieved in a single request to service a query, where the multiple retrieved segments are retrieved and processed in tandem for the query, for example, by jointly processing the multiple retrieved segments in accordance with the operator data to generate a single partial result. As another example, multiple virtual segments of the same query can be retrieved in a batched requests, for example, if the multiple virtual segments recoverable via retrieval of segments stored on the same set of nodes 1-K, where the set of nodes 1-K are sent a batched request for retrieval of a set of multiple segments, where the set of multiple segments retrieved from each of the set of nodes constitute at least a minimum number of required segments for each of a corresponding set of segment groups that are utilized to are to generate a set of recovered segments. The multiple recovered segments can similarly be jointly in accordance with the operator data to generate a single partial result for the multiple virtual segments.

The segment scheduling module 2410 can thus similarly determine that multiple physical or virtual segments be retrieved and/or recovered in tandem as a batched request, for example, in same segment processing selection data generated for a particular time slice and/or indicating a same core processing resource to perform the corresponding retrieval and/or recovery of the multiple segments. This can include indicating that each entire segment in a set of multiple segments be jointly retrieved and/or recovered. Alternatively, distinct subsets of data blocks of some or all of the multiple segments can be selected, and the segment scheduling module 2410 can determine that only particular data blocks of some or all segments in a set of multiple segments be jointly retrieved and/or recovered.

In some cases, the segment scheduling module 2410 only batches a set of multiple physical segments in the same request for retrieval and/or processing, for example, by a same particular processing core resource 48, when stored in the same memory drive 2440 of segment storage 2442 and/or when the corresponding requested data blocks are stored sequentially on the same memory drive 2440. In some cases, the segment scheduling module 2410 only batches a set of multiple virtual segments in the same request for recovery and/or processing, for example, by a same particular processing core resource 48, when the corresponding segments for retrieval are stored on the same set of nodes 1-K; are stored on an overlapping set of nodes 1-K+r where r is positive and K is the number of other segments required to recover each segment and/or where r is less than or equal to a predefined threshold indicating the amount of overlap is sufficient to constitute batching recovery of the set of segments; and/or are stored on the same set of particular memory drives or a sufficiently overlapping set of memory drives of the same set of nodes and/or overlapping set of nodes to facilitate the other nodes own batched retrieval of some or all of the requested segments from their own segment storage 2442.

Figure 25E:
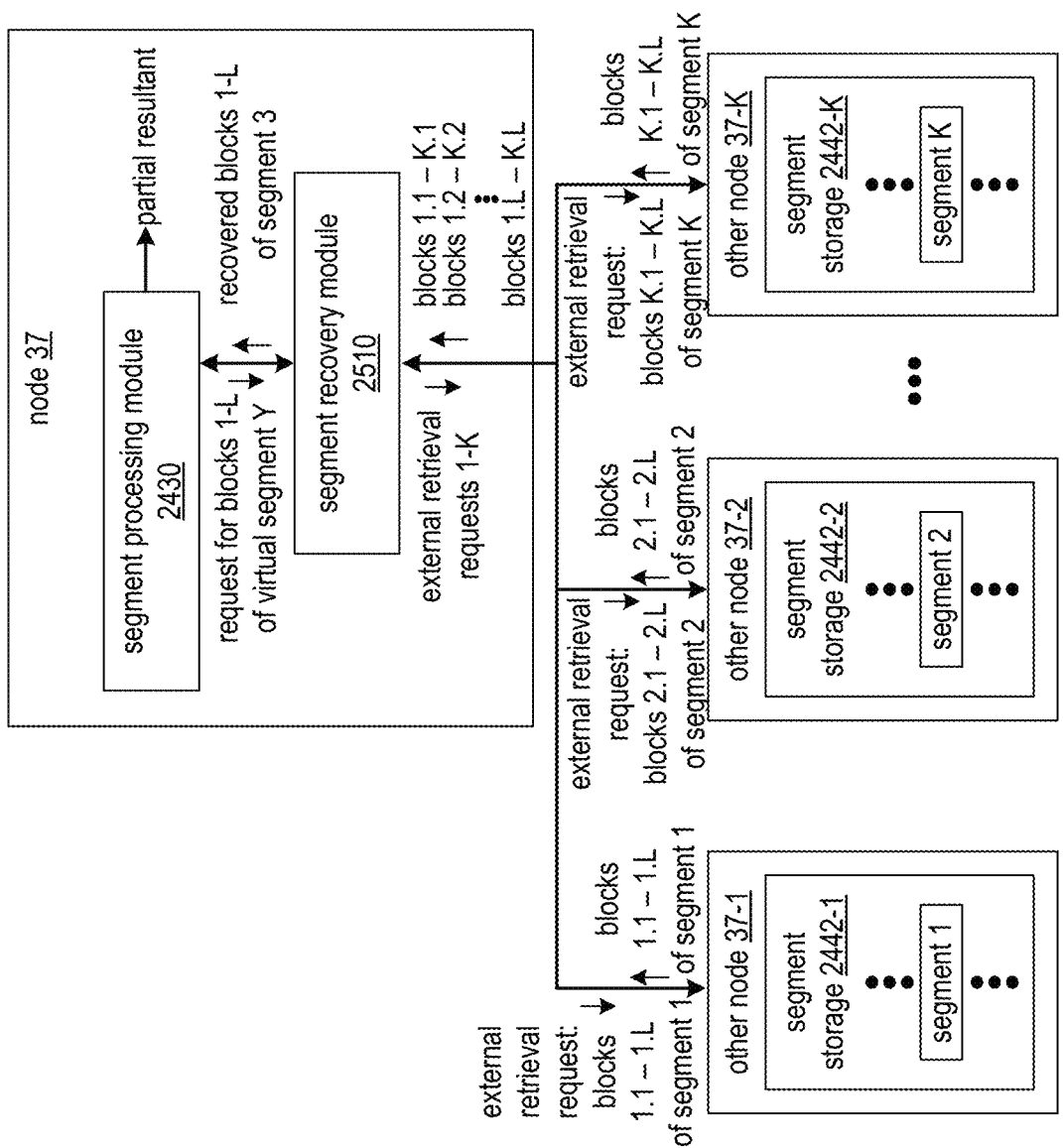

FIG. 25E presents a particular example of batching requests to recover multiple blocks. For a single query, or multiple queries as discussed in further detail in conjunction with FIGS. 25F-25I, a set of reads to sequential, unavailable data blocks, can be batched, where the sequential data can be recovered in one rebuild action as opposed to being rebuilt separately. This can include sequential sub-portions of a same data segment or can include multiple, consecutive data segments. This mechanism of batching can improve database system efficiency by minimizing or otherwise reducing requests sent via the network, and/or by minimizing and/or otherwise reducing processing time that would be required to recover each of the consecutive data blocks individually.

As illustrated in FIG. 25E, the segment recovery module 2510 can be instructed by the segment processing module 2430, and/or can be instructed directly by the segment scheduling module 2410, to recover a set of blocks 1-L of a same virtual segment 3. This can be based on the selection to process segment 3 to service query 2 as illustrated in FIG. 25B, in response to a further determination that only blocks 1-L of segment 3 are required to service query 2. The set of blocks 1-L can constitute, for example, a small number of sequential or non-consecutive blocks of the virtual segment 3. The segment recovery module can send a set of K retrieval requests to retrieve a set of segments 1-K from a set of other nodes 37-1-37-K as illustrated in FIG. 25A. However, in this example, only a portion of each segment that are required to, when processed in conjunction with the corresponding portions of all requested segments 1-K, recover only blocks 1-L of the segment 3 are indicated in the request. As illustrated, only L blocks 1.1-1.L are requested and retrieved for segment 1; only L blocks 2.1-2.L are requested and retrieved for segment 2; and only L blocks K.1-K.L are requested and retrieved for segment K. For example, as discussed in conjunction with FIGS. 25C and 25D, the set of K blocks 1.1-K.1 from the set of K different segments can be utilized to recover data block 1 of segment 3; the set of K blocks 1.2-K.2 from the set of K different segments can be utilized to recover data block 2 of segment 3; and so on where the set of K blocks 1.L-K.L from the set of K different segments can be utilized to recover data block L of segment 3.

The set of L blocks can be recovered via a set of L distinct recovery operations performed on each of these L block groupings in accordance with the redundancy storage encoding scheme. Alternatively, in particular if each set of L blocks are consecutive in each segment, it can be possible for some redundancy error coding schemes to recover the set of L blocks performed on jointly on the combined and/or concatenated set of blocks in each segment, where the set of K partial segments of multiple concatenated blocks (1.1-1.L)-(K.1-K.L) are processed as joint sub-portions of their respective segments 1.K in accordance with the redundancy error coding scheme to recover blocks 1.L of the segments. These recovered blocks 1.L can be jointly processed to yield one or more corresponding partial results.

In some cases, other blocks of segment 3 are required, but are recovered and/or processed separately, for example, because they are a different set of consecutive blocks that are not consecutive with blocks 1-L and/or because the entirety of required blocks of segment 3 require too many processing resources to retrieve the corresponding other segments and/or process the corresponding other segments jointly. While not depicted in FIG. 25E, a similar mechanism can similarly be utilized to recover multiple segments stored in the same set of other nodes 37-1-37-K.

Batched requests for multiple data blocks and/or multiple segments, whether physical or virtual, can also be intelligently determined by the segment scheduling module 2410 to service multiple ongoing queries. In particular, multiple queries can be serviced simultaneously via utilization of the same physical segment or same virtual segment determined to be required for the multiple queries. As the reconstruction of a virtual segment is a logical construct that is not stored physically on disk, and is only available for the life of the queries being serviced, the same reconstruction can only service multiple queries in this fashion if this reconstruction is forwarded and/or processed in accordance with the multiple queries simultaneously and/or within the time frame the recovered segment is available. This coalescing can further improve database system efficiency by minimizing or otherwise reducing recovery processing time that would be required to service each of these queries via the virtual segment individually, for example, by reducing and/or minimizing requests sent via the network, as other segments required to reconstruct a particular virtual segment to service multiple queries need only be retrieved one time for the multiple queries rather than multiple corresponding times; and/or by reducing the number of rebuilding actions, as the segment is only reconstructed one time for the multiple queries rather than multiple corresponding times.

Figure 25F:
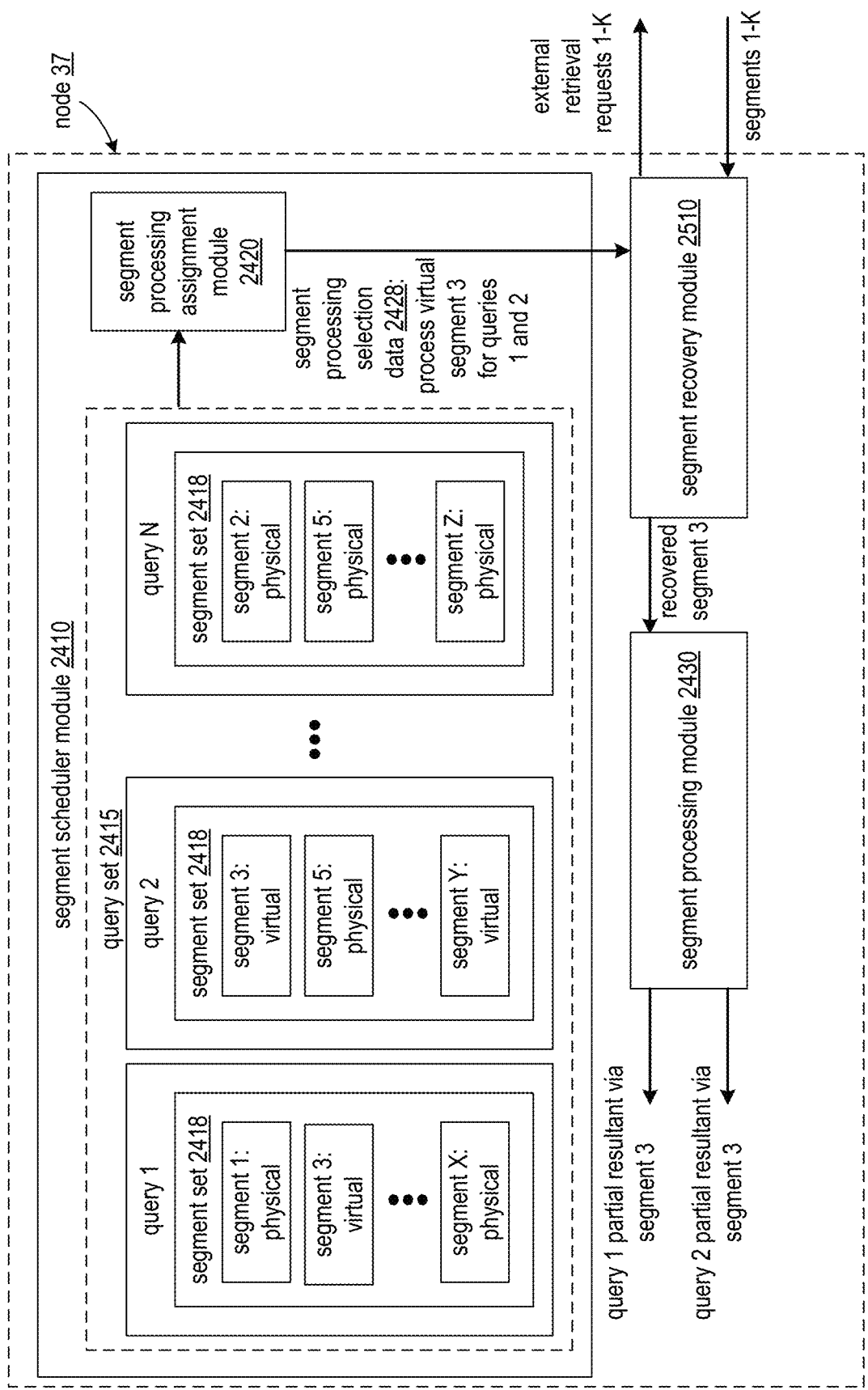

For example, again consider the example presented in FIG. 25B for processing of virtual segment 3. As illustrated in FIG. 25F, virtual segment 3 can be scheduled by the segment scheduler module 2410 to be recovered to process both queries 1 and 2, as both queries 1 and 2 require processing of segment 3. This can include assigning same processing resources, such as a same core processing resource 48 and/or a same set of parallel threads of the segment processing module 2430, to retrieve the segment and service both queries utilizing the same segment in accordance with the operator data 2416. If the node serves to read rows or other raw data of segments for further processing by other nodes, a same partial resultant, such as two identical partial resultants or a single partial resultant corresponding to this read can be generated by the segment processing module 2430 to be forwarded to the same node assigned to process these partial resultants as input in accordance with both queries 1 and 2 and/or to be forwarded to two different nodes, where one node is designated to process this partial resultant of query 1 in accordance with further processing of query 1, and where the other node is designated to process this partial resultant of query 2 in accordance with further processing of query 2.

In some cases, when a particular segment of a segment set of a query, whether virtual or physical, is selected by the segment processing assignment module 2420 for processing, the segment scheduling module 2410 determines whether this segment is identified in segment sets of one or more other queries in the query set. If the segment is also indicated in a set of one or more other queries, the segment processing assignment module 2420 can determine whether to coalesce the retrieval and/or processing of the segment for the given query with processing of this segment for all of these other queries that require the segment, or for a selected proper subset of other queries that require the segment. For example, the segment processing assignment module 2420 can determine not to coalesce retrieval and/or other processing of at least one other query that includes the segment based on determining a maximum number of queries that can be serviced via processing of the segment at the time slice based on the processing constraints of the segment processing module 2430. In such cases, the segment processing assignment module 2420 can select a proper subset of queries that include a same segment to be serviced via retrieval and/or processing of the segment, for example, in generating the query processing selection data for a given time slice, by selecting a predetermined maximum number of queries from this set of possible queries that include the same segment to be serviced; and/or by selecting a dynamically determined maximum number of queries from this set of possible queries to be serviced, where the dynamically determined maximum is determined based on current availability of processing resources and/or based on processing demands of the corresponding operator data for the set of queries. In some cases, the segment processing assignment module 2420 can determine to select all queries in the set of possible queries to be serviced in a single retrieval based on determining the set of possible queries includes less than or equal to the predetermined maximum number of queries or the dynamically determined maximum number of queries.

In some cases, only a same portion of the data segment and/or portion of the segment that includes required sub-portions required by each of the multiple queries is recovered, as discussed in conjunction with FIGS. 25C-25E. In such cases, the multiple queries can be identified to have retrieval and/or recovery of their corresponding segments coalesced when they request the exact same portions of the segment, such as a same subset of data blocks 1-L of the segment. In such cases, this identified portion of the segment is retrieved and/or recovered to service each of the multiple queries that requires this same portion.

In some cases, even if the portions of the segment required by two or more different queries differ, an overlapping portion across the two or more different segments can be utilized to service the two or more different segments as one retrieval and/or recovery. For example, reconsider the example presented in FIG. 25E, where data blocks 1-L of segment 3 are recovered to service query 2. In this example, if data blocks 1-L are also required for the use of segment 3 to service query 1, they will need to be separately recovered at a different time if processing of segment 3 for queries 1 and 2 was not coalesced into a single action.

Figure 25G:
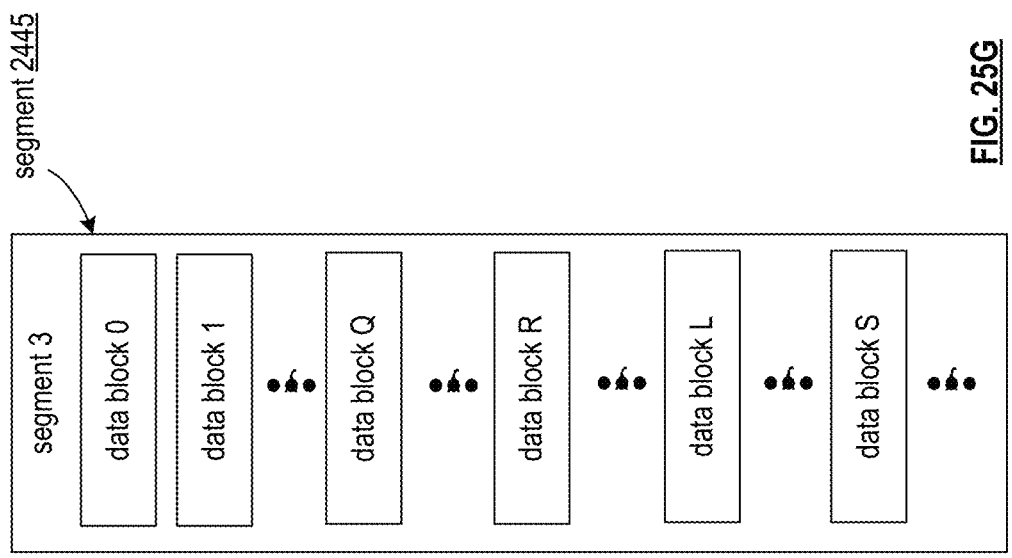
FIG. 25G illustrates an example embodiment of a segment that includes a plurality of data blocks.
Figure 25H:
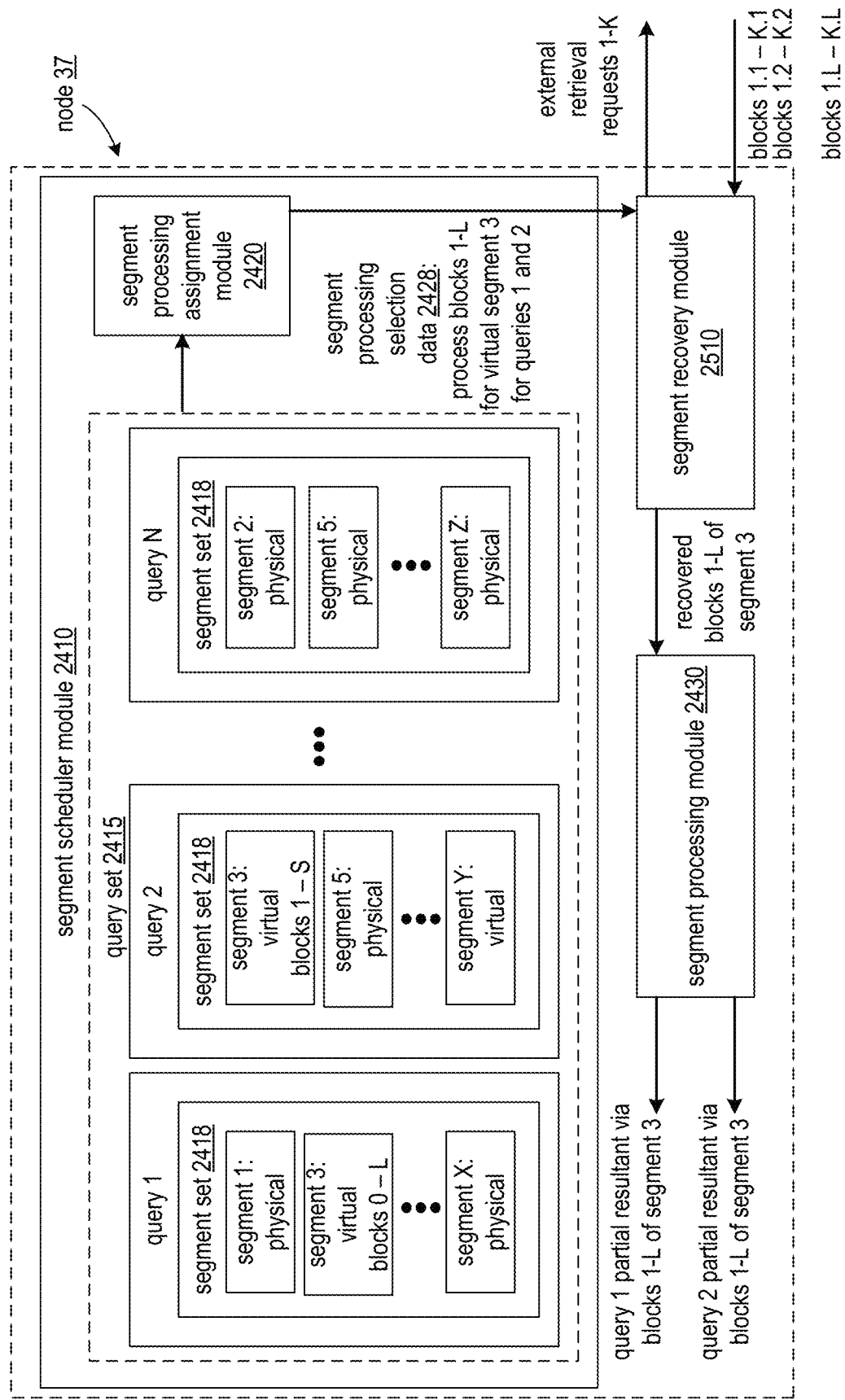
FIGS. 25H-25I are schematic block diagrams of embodiments of a node that implements a segment recovery module to process virtual segments in accordance with the present invention.
Figure 25I:
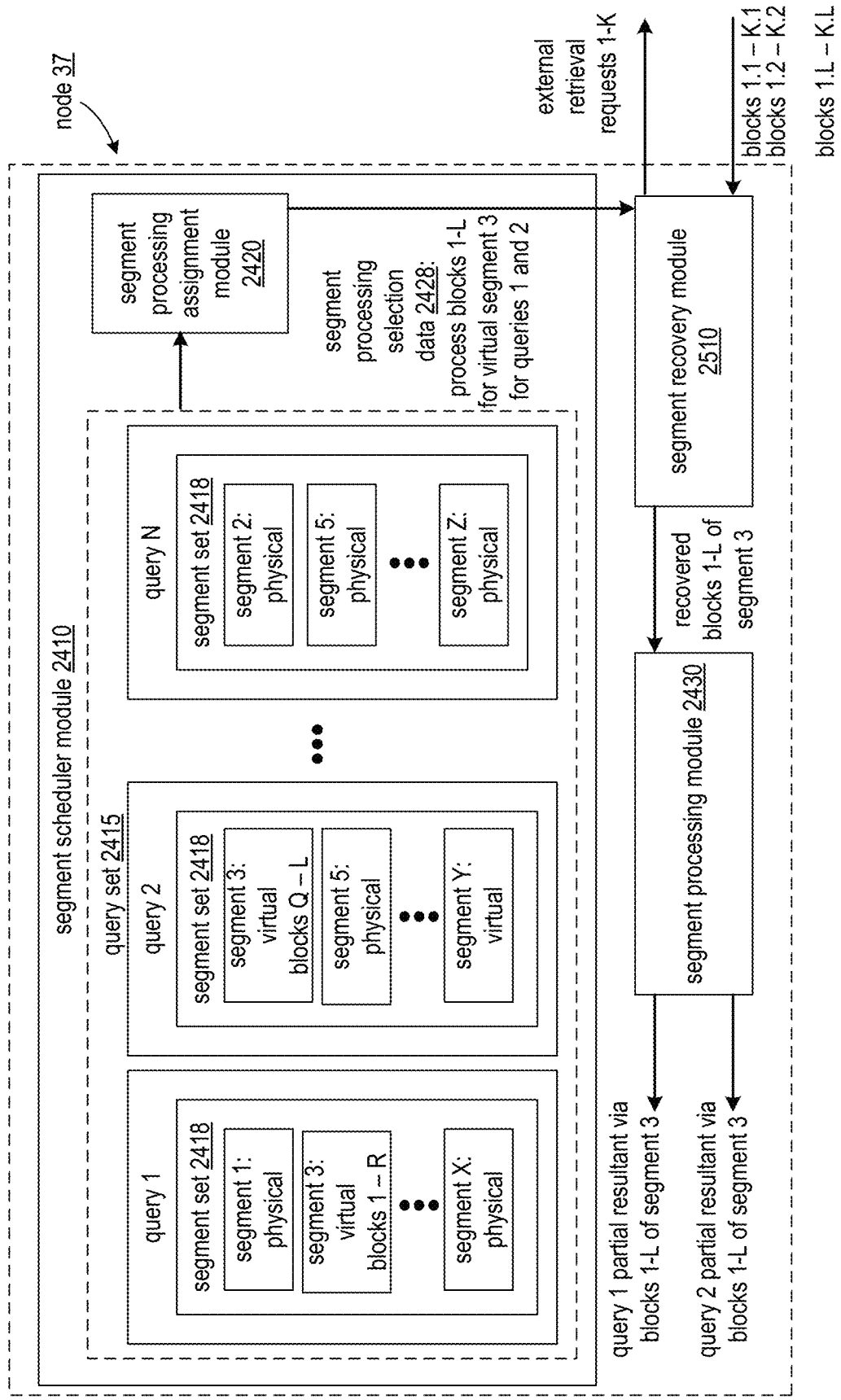

FIGS. 25G-25I illustrates two examples where data blocks 1-L of FIG. 25E are recovered in a single transaction to service both queries 1 and 2 where blocks (1.1-K.1)-(1.L-K.L) only need to be retrieved from other nodes 37-1-37-K one time to service both queries 1 and 2, and/or where blocks (1.1-K.1)-(1.L-K.L) only need to be processed one time to facilitate recovery of data blocks 1.L of segment 3. In particular, the segment scheduler module 2410 can combine the mechanism of batching sequential reads discussed in conjunction with FIG. 25E with the mechanism of coalescing usage of the same data for processing multiple queries that require usage of the same data.

FIG. 25G illustrates an example of a sequential ordering of data blocks of segment 3 that will be utilized in the example embodiments of FIGS. 25H and 25I. As illustrated in FIG. 25G, segment 3 can sequentially include a plurality of data blocks starting at data block 0, followed by data block 1. In sequence, data block Q can be included one or more data blocks after data block 1; data block R can be included one or more data blocks after data block Q; data block L can be included one or more data blocks after data block R; and data block S can be included one or more data blocks after data block R. As segment 3 is utilized as a virtual segment, the corresponding other segments 1-K in segment 3's segment group used to recover segment 3 can similarly have a same sequential configuration of these data blocks, where data block 1.0-K.0 can be utilized to recover data block 0 of segment 3, and so on, where data blocks 1.S-K.S can be utilized to recover data block S of segment 3. While this illustration indicates an ordering of these data blocks, these data blocks need not be ordered or consecutive with respect to segment 3 in some embodiments.

FIG. 25H illustrates an example a segment scheduler module 2410 that selects a set of data blocks, such as a set of sequential data blocks, to service multiple queries based on determining an intersection of data blocks required for multiple queries. In the example of FIG. 25H, query 1 requires usage of some or all of data blocks 0-L of segment 3, and query 2 requires usage of some or all of data blocks 1-S of segment 3. This can be indicated in query set 2415 as illustrated or can otherwise be determined by the segment scheduler module 2410. The segment scheduler module 2410 determines that both query 1 and 2 require processing of segment 3 as a virtual segment. As illustrated in FIG. 25G, the overlapping, sequential portion of segment 3 that both of these queries require includes the set of data blocks 1-L. Alternatively, the data blocks need not be consecutively stored and/or ordered with respect to the corresponding segment, and batching reads for overlapping portions of required data can still be ideal regardless of the ordering of data. Thus, the set of data blocks 1-L can be any consecutive or non-consecutive data blocks of segment 3 that are determined to include exactly the intersection of the first set of consecutive or non-consecutive data blocks 0-L required by query 1 and the second set of consecutive or non-consecutive data blocks 1-S required by query 2.

The segment scheduler module 2410 can determine the intersection of all required data blocks and/or the intersection of sequential required data blocks required to service both queries, and can thus determine that this intersection includes data blocks 1-L. In embodiments where only intersection portions of data are coalesced, the segment processing assignment module 2420 indicates that data blocks 1-L of segment 3 be recovered to service both queries 1 and 2. The recovery of data blocks 1-L can be accomplished as discussed in conjunction with FIG. 25E. This particular recovered portion of segment 3 can be utilized to service reads or other processing required in operator data of query 1 and query 2, respectively, as discussed in conjunction with FIG. 25F to generate the same or different partial resultant utilizing data blocks 1-L for queries 1 and 2, for example, via the same core processing resource 48. However, in this example, data block 0 of segment still needs to be recovered and processed to execute query 1, and data blocks (L+1)-S still need to be recovered and processed to execute query 2. The segment scheduler module 2410 can facilitate separate recovery and/or processing of these additional data blocks to service each query separately, for example, via selection in different time slices and/or via assignment to different processing core resources 48 or processing threads. This mechanism can similarly be applied to three or more queries that all require usage of an intersecting set of data, where the intersecting set of data is retrieved and/or recovered to service all of the three or more queries.

To further reduce the number of network requests and/or processing to recover portions of the segment, the segment scheduler can be operable to identify a union of portions of one or more segments that are required to service multiple queries. This can include identifying a union of all consecutive or non-consecutive portions of a particular segment that are required by different ongoing and/or pending queries in the query set 2415. This can further include identifying a union all of portions across multiple segments stored physically on a same memory drive that are required by different ongoing and/or pending queries as physical segments, where reads for some or all of these portions are batched into one or more batched reads that can service multiple queries. This can further include identifying a union of all portions across multiple segments recoverable via requests to the same set of other nodes that are required by different ongoing and/or pending queries, where external retrieval and/or recovery of some or all of these portions of one or more segments required by the same or different queries are batched in a single set of external retrieval requests to this set of nodes and/or where the resulting recovered one or more portions of one or more segments are utilized to service multiple queries.

FIG. 25I illustrates an example a segment scheduler module 2410 that selects a set of data blocks, such as a set of sequential data blocks, to service multiple queries based on determining a union of data blocks required for multiple queries. In the example of FIG. 25I, query 1 requires usage of some or all of data blocks 1-R of segment 3, and query 2 requires usage of some or all of sequential data blocks Q-L of segment 3. This can be indicated in query set 2415 as illustrated or can otherwise be determined by the segment scheduler module 2410. The segment scheduler module 2410 determines that both query 1 and 2 require processing of segment 3 as a virtual segment. As illustrated in FIG. 25G, the union of these distinct, sequential portion of segment 3 required to service all portions of segment 3 required for both of these queries includes the set of data blocks 1-L. Alternatively, the data blocks need not be consecutively stored and/or ordered with respect to the corresponding segment, and batching reads for the union of required portions of data can still be ideal regardless of the ordering of data. Thus, the set of data blocks 1-L can be again any consecutive or non-consecutive data blocks of segment 3 that are determined to include exactly the union of the first set of consecutive or non-consecutive data blocks 1-R required by query 1 and the second set of consecutive or non-consecutive data blocks Q-L required by query 2.

The segment scheduler module 2410 can determine the union of all required data blocks and/or the union of sequential required data blocks required to service both queries, and can thus determine that this intersection includes data blocks 1-L. In embodiments where the union of all required portions of data are coalesced, the segment processing assignment module 2420 indicates that data blocks 1-L of segment 3 be recovered to service both queries 1 and 2. The recovery of data blocks 1-L can be accomplished as discussed in conjunction with FIG. 25E. This particular recovered portion of segment 3 can be utilized to service reads or other processing required in operator data of query 1 and query 2, respectively, as discussed in conjunction with FIG. 25F to generate the same or different partial resultant utilizing data blocks 1-L for queries 1 and 2, for example, via the same core processing resource 48. In this example, processing of both queries may consider or utilize all of data blocks 1-L, even though data blocks R+1-L are not required for query 1 and even though data blocks 1-(Q minus 1) are not required for query 2. For example, if these data blocks will automatically be filtered, disregarded, and/or will otherwise not change the corresponding partial resultants when the operators of operator data 2416 are applied, all of the data blocks 1-L can be processed for both queries to generate their respective resultants. Alternatively, once recovered data blocks 1-L are generated, these recovered data blocks can be divided into data blocks 1-R and Q-L for processing to generate the partial resultants for query 1 and query 2, respectively. This mechanism can similarly be applied to three or more queries that all require usage of data within a determined union of their sets of data, where the union set of data is retrieved and/or recovered to service all of the three or more queries. While this example illustrates recovering portions of a single segment via the single set of external requests 1-K to retrieve the portions of each required segment 1-K, multiple segments included in a union of data required to service multiple queries can be determined, and multiple corresponding required segments for recovery can be similarly requested in single set of external requests 1-K to retrieve the some or all of each of a plurality of sets of required segments 1-K, where each set in the plurality of sets is utilized to recover one of a corresponding plurality of segments required to service the multiple queries.

Such embodiments a node 37 that utilizes virtual segments as discussed in conjunction with FIGS. 25A-25I can be implemented in conjunction with any other embodiments of node 37 discussed herein, such as the embodiments previously discussed with regards to FIGS. 24A-24L, for example, where the segment processing assignment module is operable to select segments of segment sets for execution, based on drive utilization data 2425, where some of the segments include virtual segments. In such cases, the drive utilization data 2425 can be utilized only determining to select a physical segment to determine which physical segment of a subset of segments corresponding to physical segments are selected. In other cases, the drive utilization data 2425 can be utilized to determine whether to select a physical segment or a virtual segment at a given point in time.

In various embodiments, a node of a computing device has at least one processor and memory that stores executable instructions that, when executed by the at least one processor, cause at least one processing module of the node to determine a query for execution and to determine a set of segments that each include a set of rows and/or other data required to execute the query. The set of executable instructions, when executed by the at least one processor, can further cause the processing module of the node to determine a first segment of the set of segments is unavailable and/or to determine the first segment of the set of segments be processed as a virtual segment. A locally rebuilt set of rows or other locally rebuilt data corresponding to the first segment can be generated, by the at least one processing module of the node, by utilizing a recovery scheme. For example, the locally rebuild set of rows can correspond to some or all of the rows included in and/or extracted from a recovered segment, where the recovered segment is generated by the at least one processing module of the node in accordance with a redundancy storage encoding scheme and/or is generated by utilizing a plurality of other segments retrieved externally from storage on a plurality of other nodes. Execution of the query can be facilitated by the at least one processing module of the node by utilizing this locally rebuilt set of rows.

In various embodiments, a node of a computing device has at least one processor and memory that stores executable instructions that, when executed by the at least one processor, cause at least one processing module of the node to determine at least one query for execution and to determine a set of segments that include a set of rows required to execute the at least one query. The set of executable instructions, when executed by the at least one processor, can further cause the processing module of the node to determine at least one virtual segment in the set of segments by identifying segments of the set of segments that are unavailable and/or that are determined to be processed as virtual segments. At least two consecutive or non-consecutive data portions in the at least one unavailable segment can be identified, for example, where the at least two data portions are required to execute the at least one query. A locally rebuilt set of rows or other locally rebuild data for the at least two consecutive data portions can be generated by utilizing a recovery scheme. For example, the locally rebuild set of rows can correspond to some or all of the rows included in and/or extracted from a recovered segment and/or recovered portion of a segment, where the recovered segment and/or recovered portion of the segment is generated by the at least one processing module of the node in accordance with a redundancy storage encoding scheme and/or is generated by processing portions of a plurality of other segments retrieved externally from storage on a plurality of other nodes. Execution of the query can be facilitated by the at least one processing module of the node by utilizing this locally rebuilt set of rows.

In various embodiments, a node of a computing device has at least one processor and memory that stores executable instructions that, when executed by the at least one processor, cause at least one processing module of the node to determine a plurality of queries for concurrent execution that includes a first query and a second query. A plurality of sets of segments required to execute the plurality of queries can further be determined by the at least one processing module of the node, where the plurality of sets of segments includes a first set of segments that each include a first set of rows required to execute the first query and a second set of segments that each include a second set of rows required to execute the second query. The first set of rows and second set of rows can have a null intersection, a non-null intersection, or can be the same set of rows. The at least one processing module of the node can determine a set of virtual segments in the plurality of sets of segments by identifying segments of the plurality of sets of segments that are unavailable and/or that are determined to be processed as virtual segments. A subset of the set of virtual segments can be determined by identifying ones of the set of virtual segments that are required to execute multiple ones of plurality of queries. The subset of the set of virtual segments can include a first segment included in both the first set of segments and the second set of segments.

A locally rebuilt set of rows for each of the set of virtual segments can be generated by utilizing a recovery scheme. For example, the locally rebuild set of rows can correspond to some or all of the rows included in and/or extracted from a recovered segment of the set of unavailable segments and/or recovered portion of a segment of the set of virtual segments, where the recovered segment and/or recovered portion of the segment is generated by the at least one processing module of the node in accordance with a redundancy storage encoding scheme and/or is generated by processing portions of a plurality of other segments retrieved externally from storage on a plurality of other nodes. For each one of the set of virtual segments included in the subset, in response to generating the locally rebuilt set of rows, the at least one processing module of the node can facilitate concurrent partial execution of corresponding multiple ones of the plurality of queries for the each one of the set of virtual segments included in the subset of the set of virtual segments, where a first locally rebuilt set of rows corresponding to the first segment is utilized to facilitate concurrent partial execution of the first query and the second query. In some cases, partial execution of the first query and second query can occur in different time slices, but can utilize the same, first locally rebuilt set of rows, where the first locally rebuilt set of rows is not generated for the first and second query via separate performances of the recovery scheme.

Figure 25J:
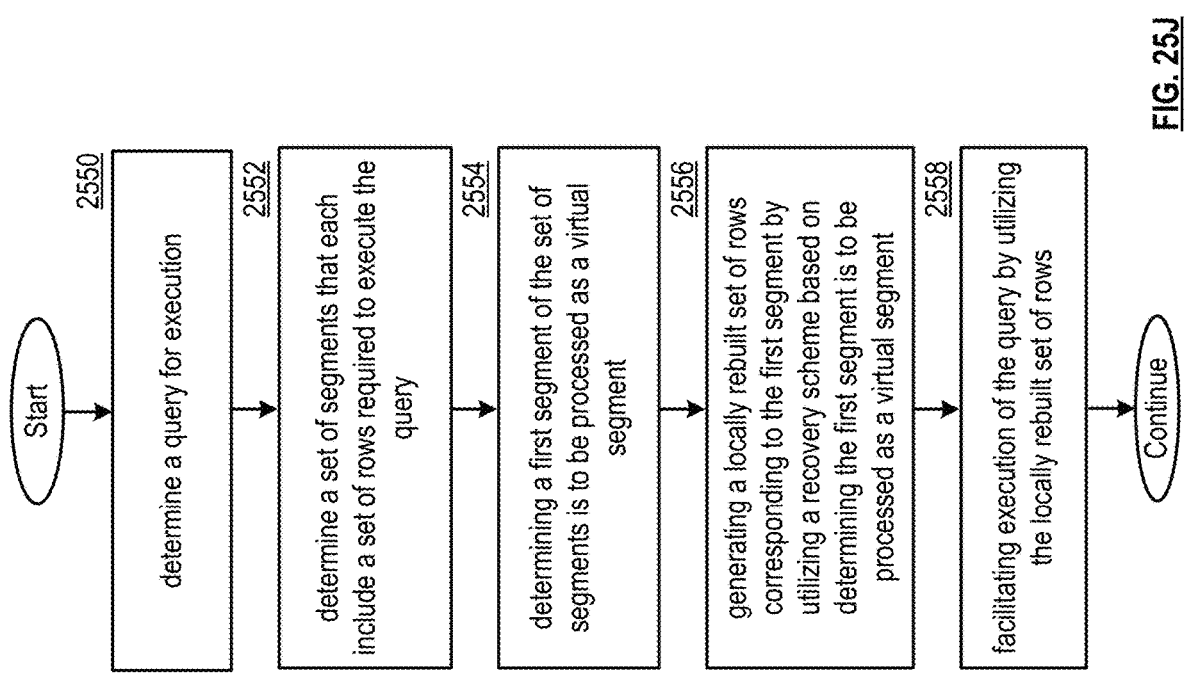
FIG. 25J is a logic diagram illustrating a method of utilizing a recovery scheme to process virtual segments in accordance with the present invention.
Figure 25L:
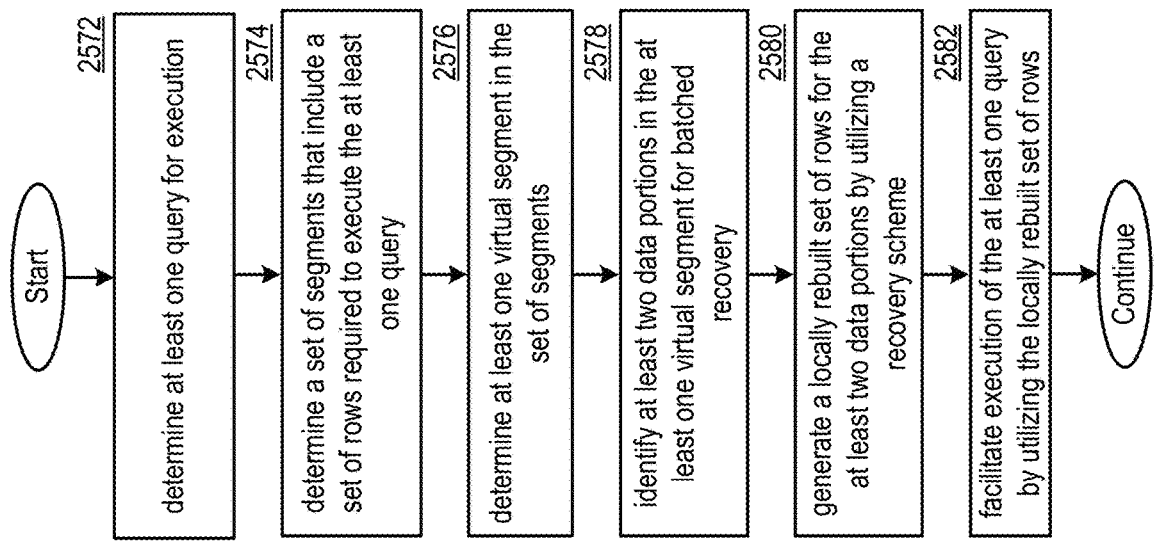
FIG. 25L is a logic diagram illustrating a method of batching recovery of multiple data portions in accordance with the present invention.

FIGS. 25J-25L illustrate methods for execution by a node 37. For example, the node can utilize at least one processing module of the node 37 to execute operational instructions stored in memory accessible by the node, where the execution of the operational instructions causes the node 37 to execute the steps of FIGS. 25J, 25K, and/or 25L. The methods of FIGS. 25J, 25K, and/or 25L can be performed by a node 37 in accordance with embodiments of node 37 discussed in conjunction with FIGS. 25A-25I, and/or in conjunction with other embodiments of node 37 discussed herein.

In the method illustrated in FIG. 25J, step 2550 includes determining a query for execution. Step 2552 includes determining a set of segments that each include a set of rows required to execute the query. Step 2554 includes determining a first segment of the set of segments is to be processed as a virtual segment. Step 2556 includes generating a locally rebuilt set of rows corresponding to the first segment by utilizing a recovery scheme based on determining the first segment is to be processed as a virtual segment. Step 2558 includes facilitating execution of the query by utilizing the locally rebuilt set of rows.

In various embodiments, determining the first segment is to be processed as virtual segment is based on determining unavailability of a memory drive that stores the first segment and/or determining a data migration of the first segment is in progress.

In various embodiments, the first segment is included in a segment group generated by utilizing a redundancy coding scheme. Generating the locally rebuilt set of rows includes determining a set of segments in the segment group required to rebuild the first segment, retrieving each of the set of segments in the segment group from a corresponding one of a set of memory drives, and utilizing the retrieved set of segments in the segment group to rebuild the one of the set of segments.

In various embodiments, the method includes foregoing storage of the locally rebuilt set of rows to disk of the node and/or to segment storage of the node, where the locally rebuilt set of rows is not locally stored once execution of the query is complete. In various embodiments, the method includes temporarily storing the locally rebuilt set of rows in local cache memory to service the query, and further includes facilitating deletion of the locally rebuilt set of rows from the local cache memory in response to completing execution of the query.

In various embodiments, the first segment undergoes a rebuilding process for a temporal period, where the rebuilding process includes reconstruction of the first segment for storage as a physical segment to a memory drive. The first segment is unavailable during an entirety of the temporal period, and the temporal elapses once the first segment is reconstructed in storage as the physical segment in the memory drive. This temporal period begins before the query is determined for execution, where the temporal period ends after the execution of the query is facilitated, and where determining the first segment is to be processed as a virtual segment is based on determining that reconstruction of the first segment is incomplete.

In various embodiments, the method includes determining a second query for execution after execution of the query is facilitated and during the temporal period. A second set of segments that each include a second set of rows required to execute the second query is determined, where the first segment is included in the second set of segments. The method includes determining the first segment is determined to be processed as a virtual segment for the second query, for example, based on determining that reconstruction of the one of the set of segments is incomplete. The method includes generating a second locally rebuilt set of rows corresponding to first segment by utilizing the recovery scheme and facilitating execution of the second query by utilizing the second locally rebuilt set of rows during the temporal period. In some cases, this second locally rebuilt set of rows is identical to the rebuilt set of rows generated to service the query, but is separately rebuilt because the set of rows for the query does not persist in cache memory and/or for access to service the second query because its utilization in facilitating execution of the query is complete. In other embodiments, the locally rebuilt set of rows is a first subset of a plurality of rows included in first segment, and the second locally rebuilt set of rows is a second subset of the plurality of rows included in first segment, and a set difference between the locally rebuilt set of rows and the second locally rebuilt set of rows is non-null.

In various embodiments, the first segment includes a plurality of portions, such as a plurality of data blocks, that each include a distinct subset of a plurality of rows corresponding included in the first segment. Each of the plurality of portions can be independently recoverable via the recovery scheme. The method can further include identifying a proper subset of the plurality of portions of the first segment that include the set of rows required to execute the query. Generating the locally rebuilt set of rows includes recovering only the proper subset of the plurality of portions of the first segment, where portions that do not include any rows required to execute the query are not recovered. In various embodiments, identifying the proper subset of the plurality of portions that include the set of rows includes accessing metadata for the first segment indicating a mapping of the plurality of rows to the plurality of portions.

In various embodiments, a non-transitory computer readable storage medium includes at least one memory section that stores operational instructions that, when executed by a processing module that includes a processor and a memory, cause the processing module to determine a query for execution and to determine a set of segments that each include a set of rows and/or other data required to execute the query. The set of operational instructions, when executed by the at least one processor, can further cause the processing module to determine a first segment of the set of segments is unavailable and/or to determine the first segment of the set of segments be processed as a virtual segment. A locally rebuilt set of rows or other locally rebuilt data corresponding to the first segment can be generated, via the processing module, by utilizing a recovery scheme. For example, the locally rebuild set of rows can correspond to some or all of the rows included in and/or extracted from a recovered segment, where the recovered segment is generated by the at least one processing module of the node in accordance with a redundancy storage encoding scheme and/or is generated by utilizing a plurality of other segments retrieved externally from storage on a plurality of other nodes. Execution of the query can be facilitated by the at least one processing module by utilizing this locally rebuilt set of rows.

In the method illustrated in FIG. 25K, step 2560 includes determining a plurality of queries for concurrent execution that includes a first query and a second query. Step 2562 includes determining a plurality of sets of segments required to execute the plurality of queries. The plurality of sets of segments includes a first set of segments that each include a first set of rows required to execute the first query and a second set of segments that each include a second set of rows required to execute the second query. Step 2564 includes determining a set of virtual segments in the plurality of sets of segments. Step 2566 includes determining a subset of the set of virtual segments by identifying ones of the set of virtual segments that are required to execute multiple ones of plurality of queries. The subset of the set of virtual segments includes a first segment included in both the first set of segments and the second set of segments. Step 2568 includes generating a locally rebuilt set of rows for each of the set of virtual segments by utilizing a recovery scheme. For each one of the set of virtual segments included in the subset, in response to generating the locally rebuilt set of rows, the method performs step 2570, which includes facilitating concurrent partial execution of corresponding multiple ones of the plurality of queries for the each one of the set of virtual segments included in the subset of the set of virtual segments, where a first locally rebuilt set of rows corresponding to the first segment is utilized to facilitate concurrent partial execution of the first query and the second query.

In various embodiments, the method includes determining a set of available segments in the plurality of segments by identifying segments of the plurality of sets of segments that are stored as physical segments on a corresponding one of a set of memory drives. The method further includes retrieving the set of available segments from the set of memory drives and facilitating execution of the plurality of queries by utilizing the retrieved set of available segments and by utilizing the plurality of locally rebuilt sets of rows. In various embodiments, the method further includes determining an ordering for retrieval of the segments in the plurality of sets of segments based on the subset of the set of virtual segments.

In various embodiments the first segment includes a plurality of portions that each include a distinct subset of a plurality of rows included in the first segment. Each of the plurality of portions is independently recoverable via a recovery scheme. The method can include identifying a first proper subset of the plurality of portions that include a subset of rows required to execute the first query, and can include identifying a second proper subset of the plurality of portions that include a subset of rows required to execute the second query. The method can further include determining a union of the first proper subset of the plurality of portions and the second proper subset of the plurality of portions, where the union is a third proper subset of the plurality of portions, and where generating the locally rebuilt set of rows for the first segment includes rebuilding only the union. Alternatively, the method can further include determining an intersection of the first proper subset of the plurality of portions and the second proper subset of the plurality of portions, where the intersection is a third proper subset of the plurality of portions, and where generating the locally rebuilt set of rows for the first segment includes rebuilding the intersection to facilitate concurrent execution of the first query and second query. The method can further include rebuilding, as separate rebuilding processes, for example in other time slices, the set difference between the first proper subset and the third proper subset to facilitate further execution of the first query, and the set difference between the second proper subset and the third proper subset to facilitate further execution of the second query.

In various embodiments, the method includes determining an intersection of the first proper subset of the plurality of portions and the second proper subset of the plurality of portions. The methods can further include identifying the first segment for inclusion in the subset based on determining the intersection is non-null, where the first subset includes only segments with non-null intersections of proper subsets of their plurality of portions required to execute the corresponding multiple ones of plurality of queries.

In various embodiments, the method includes identifying a second segment included in the first set of segments, the second set of segments, and the set of virtual segments. The second segment includes a second plurality of portions that each include a distinct subset of a second plurality of rows included in the second segment, and each of the second plurality of portions is independently recoverable via the recovery scheme. A third proper subset of the second plurality of portions that include a set of rows required to execute the first query is identified, and a fourth proper subset of the second plurality of portions that include a set of rows required to execute the second query is also identified. The method includes determining an intersection of the first proper subset of the plurality of portions and the second proper subset of the plurality of portions is null. The second segment is not included in the subset based on determining the intersection of the first proper subset of the plurality of portions and the second proper subset of the plurality of portions is null. The method further includes, in a first temporal period, rebuilding the third proper subset of the second plurality of portions, and facilitating partial execution of the first query based on the third proper subset. The method further includes, in a second temporal period that is distinct from the first temporal period, rebuilding the fourth proper subset of the of the second plurality of portions, and facilitating partial execution of the second query based on the fourth proper subset, where the second temporal period is distinct from the first temporal period based on determining the second segment is not included in the subset.

In various embodiments, the first segment is identified for inclusion in the subset further based on determining the size of the intersection compares favorably to a predetermined intersection size threshold. The first subset includes only segments with intersections of proper subsets of their plurality of portions required to execute the corresponding multiple ones of plurality of queries that compare favorably to the predetermined intersection size threshold. In various embodiments each of the plurality of segments has a fixed segment size, and the predetermined intersection size threshold indicates a required minimum proportion of the fixed segment size. In various embodiments, the predetermined intersection size threshold indicates a required minimum proportion of a union size, where the union size corresponds to a determined size of a union of the proper subsets of each segment's plurality of portions required to execute the corresponding multiple ones of plurality of queries.

In various embodiments, the plurality of queries for concurrent execution includes a first subset of queries whose execution has been initiated based on retrieving at least one segment for each of the first subset of queries, and further includes a second subset of queries whose execution has not yet been initiated. The first subset of queries and the second subset of queries are mutually exclusive and collectively exhaustive with respect to the plurality of queries for concurrent execution. The first query is included in the first subset of queries, and the second query is included in the second subset of queries at a time prior to locally rebuilding the first locally rebuilt set of rows corresponding to the first segment. The method can further include initiating execution of the second query in response to locally rebuilding the first locally rebuilt set of rows corresponding to the first segment. The concurrent partial execution of the first query and the second query utilizing the first locally rebuilt set of rows is a first one of a plurality of partial executions utilized to facilitate execution of the second query. The concurrent partial execution of the first query and the second query utilizing the first locally rebuilt set of rows occurs after at least one previous partial execution of a plurality of partial executions utilized to facilitate execution of the first query.

In various embodiments, the set of virtual segments correspond to a set of unavailable segments, and the set of virtual segments is determined by identifying ones of the plurality of sets of segments that are unavailable for access as physical segments. In various embodiments, the first segment is included in a segment group generated by utilizing a redundancy coding scheme, and generating the locally rebuilt set of rows includes determining a set of segments in the segment group required to rebuild the first segment, retrieving at least a portion of each of the set of segments in the segment group from a corresponding one of a set of memory drives, and utilizing the retrieved at least a portion of each of the set of segments in the segment group to rebuild at least a portion of the one of the set of segments.

In various embodiments, the method includes determining a third query for execution after the first locally rebuilt set of rows is utilized to facilitate the concurrent partial execution of the first query and the second query. The method includes determining the first segment is required to execute the third query, and generating a second locally rebuilt set of rows the first segment by utilizing a recovery scheme. The second locally rebuilt set of rows includes all of rows of the first locally rebuilt set of rows. Second locally rebuilt set of rows is generated after the first locally rebuilt set of rows, and is based on the first locally rebuilt set of rows being unavailable after utilization in facilitating the concurrent partial execution of the first query and the second query. The method includes facilitating execution of the third query utilizing the second locally rebuilt set of rows. In various embodiments, a first temporal period corresponds to the node's execution of the first query, a second temporal period corresponds to the node's execution of the third query, and an intersection between the first temporal period and the second temporal period is non-null. The intersection includes at least one partial execution of the first query by the node, and the intersection includes at least one partial execution of the third query by the node. For example, execution of first query by the node is not completed when initiation execution of the third query by the node occurs.

In various embodiments, a non-transitory computer readable storage medium includes at least one memory section that stores operational instructions that, when executed by a processing module that includes a processor and a memory, cause the processing module to determine a plurality of queries for concurrent execution that includes a first query and a second query. A plurality of sets of segments required to execute the plurality of queries can further be determined by the at least one processing module, where the plurality of sets of segments includes a first set of segments that each include a first set of rows required to execute the first query and a second set of segments that each include a second set of rows required to execute the second query. The first set of rows and second set of rows can have a null intersection, a non-null intersection, or can be the same set of rows. The at least one processing module can determine a set of virtual segments in the plurality of sets of segments by identifying segments of the plurality of sets of segments that are unavailable and/or that are determined to be processed as virtual segments. A subset of the set of virtual segments can be determined by identifying ones of the set of virtual segments that are required to execute multiple ones of plurality of queries. The subset of the set of virtual segments can include a first segment included in both the first set of segments and the second set of segments.

A locally rebuilt set of rows for each of the set of virtual segments can be generated by utilizing a recovery scheme. For each one of the set of virtual segments included in the subset, in response to generating the locally rebuilt set of rows, the at least one processing module can facilitate concurrent partial execution of corresponding multiple ones of the plurality of queries for the each one of the set of virtual segments included in the subset of the set of virtual segments, where a first locally rebuilt set of rows corresponding to the first segment is utilized to facilitate concurrent partial execution of the first query and the second query. In some cases, partial execution of the first query and second query can occur in different time slices, but can utilize the same, first locally rebuilt set of rows, where the first locally rebuilt set of rows is not generated for the first and second query via separate performances of the recovery scheme.

In the method illustrated in FIG. 25L, step 2572 includes determining at least one query for execution. Step 2574 includes determining a set of segments that include a set of rows required to execute the at least one query. Step 2576 includes determining at least one virtual segment in the set of segments. Step 2578 includes identifying at least two data portions in the at least one virtual segment. Step 2580 includes generating a locally rebuilt set of rows for the at least two data portions by utilizing a recovery scheme. Step 2582 includes facilitating execution of the at least one query by utilizing the locally rebuilt set of rows.

In various embodiments, the at least one virtual segment corresponds to at least one unavailable segment, where the at least one virtual segment is determined by identifying ones of the set of segments that are unavailable for access as physical segments. In various embodiments, the at least two portions are independently recoverable via the recovery scheme, and the method further includes determining to batch recovery of the at least two portions via a single performance of the recovery scheme, where the locally rebuilt set of rows for the at least two data portions by utilizing a recovery scheme are recovered via the single performance of the recovery scheme in response to determining to batch recovery of the at least two portions.

In various embodiments, the at least one segment is included in at least one segment group generated by utilizing a redundancy coding scheme. Generating the locally rebuilt set of rows can include determining a set of segments in the at least one segment group required to rebuild the at least two data portions, retrieving at least a portion of each of the set of segments in the at least one segment group from a corresponding one of a set of memory drives, and utilizing the retrieved at least a portion of the each of set of segments in the segment group to rebuild the at least two data portions based on the redundancy coding scheme. In various embodiments, the at least a portion of each of the set of segments includes multiple portions, retrieving the multiple portions of each of the set of segments includes, for each of the set of segments, sending only one request to retrieve the corresponding multiple portions.

In various embodiments, a first segment of the at least one virtual segment includes a plurality of sequential data portions. The at least two data portions is a proper subset of consecutive ones of the plurality of sequential data portions, and each of the plurality of sequential portions is independently recoverable via the recovery scheme. In various embodiments, the first segment includes at least one other data portion, where the at least one other data portion and the at least two data portions are non-consecutive in the plurality of sequential portions. The method can further include generating a second locally rebuilt set of rows for the at least one other data portion by utilizing the recovery scheme, where the locally rebuilt set of rows is generated separately from the second locally rebuilt set of rows in response to the at least one other data portion and the at least two data portions being non-consecutive in the plurality of sequential portions.

In various embodiments, the first segment is included in a segment group generated by utilizing a redundancy coding scheme. Generating the locally rebuilt set of rows can include determining a set of segments in the segment group required to rebuild the first segment, where each of the set of segments includes a plurality of corresponding data portions that can be consecutive or non-consecutive. Generating the locally rebuilt set of rows can include further include identifying, for each of the set of segments, at least two data portions of the corresponding data portions of the each of the set of segments required to rebuild the at least two data portions of the first segment. Generating the locally rebuilt set of rows can further include retrieving the subset of the corresponding data portions of the each of the set of segments from a corresponding one of a set of memory drives, for example, where the set of memory drives are associated with and/or integrated within a corresponding set of other nodes and/or other computing devices. Generating the locally rebuilt set of rows can further include utilizing the retrieved subset of the corresponding data portions of the each of the set of segments to rebuild the at least two data portions based on the redundancy coding scheme.

In various embodiments, the method includes retrieving the subset of the corresponding data portions of the each of the set of segments includes generating a single read request to each corresponding one of the set of memory drives, other nodes, and/or other computing devices. Generating each single read request can include by batching a plurality of read requests to the corresponding one of the set of memory drives, where each of the plurality of read requests corresponds to one of the at least two data portions of the corresponding each of the set of segments.

In various embodiments, the at least one segment is included in at least one segment group generated by utilizing a redundancy coding scheme, and generating the segment group includes generating a plurality of data portion groupings by utilizing the redundancy coding scheme, where each data portion grouping includes one data portion, such as a data blocks, from each of a plurality of segments in the segment group, where each data portion of a data portion grouping has a same placement in their corresponding plurality of data portions of their corresponding data segment, for example, where their corresponding plurality of data portions is sequential or otherwise has a determined ordering. Each data portion can be independently recoverable by utilizing the other data portions in the same data portion grouping via the recovery scheme.

In various embodiments, a first segment of the at least one segment includes a plurality of sequential or non-sequential data portions, where the at least two data portions is a proper subset of the plurality of data portions. The first segment is included in a segment group generated by utilizing a redundancy coding scheme. Generating the locally rebuilt set of rows includes determining a set of segments in the segment group required to rebuild the first data segment, where each of the set of segments includes a plurality of corresponding data portions. Generating the locally rebuilt set of rows includes identifying subsets of the corresponding data portions of the each of the set of segments required to rebuild the at least two data portions. Generating the locally rebuilt set of rows includes retrieving the subset of the corresponding data portions of the each of the set of segments from a corresponding one of a set of memory drives. Generating the locally rebuilt set of rows includes utilizing the retrieved subset of the corresponding data portions of the each of the set of segments to rebuild the at least two data portions based on the redundancy coding scheme.

In various embodiments, identifying the at least two data portions in the at least one virtual segment includes identifying all of the consecutive data portions sequential to the least two data portions that include ones of the set of rows required to execute the at least one query, where a first data portion is stored in sequence immediately prior to a first one of the least two data portions, where a second data portion is stored in sequence immediately after a last one of the least two data portions, and where the first data portion and the second data portion are not included in the at least two data portions based on determining the first data portion and the second data portion do not include ones of the set of rows required to execute the at least one query.

In various embodiments, the at least one query includes a first query and a second query. A first set of rows is required to execute the first query, and a second set of rows is required to execute the second query. The at least two data portions includes a first subset of the first set of rows, and the at least two data portions further includes a second subset of the second set of rows. The first subset can be a proper subset of the first set of rows or can include all of the first set of rows. The second subset can be a proper subset of the second set of rows or can include all of the first set of rows.

In various embodiments, the first subset of the first set of rows and the second subset of the second set of rows are mutually exclusive, where a first subset of the at least two data portions includes the first subset of the first set of rows, where a second subset of the at least two data portions includes the second subset of the second set of rows, and where the first subset of the at least two data portions and the second subset of the at least two data portions are mutually exclusive. In some cases, the first subset and second subset are also collectively exhaustive with respect to the at least two data portions. In various embodiments the first subset of the first set of rows and the second subset of the second set of rows have a non-zero intersection, and at least one data portion of the at least two data portions includes rows of the first set of rows and the second set of rows. The at least two data portions can include only rows in the non-zero intersection. The at least two data portions can include a union of the first set of rows and the second set of rows.

In various embodiments, a non-transitory computer readable storage medium includes at least one memory section that stores operational instructions that, when executed by a processing module that includes a processor and a memory, cause the processing module to determine at least one query for execution and to determine a set of segments that include a set of rows required to execute the at least one query. The set of executable instructions, when executed by the at least one processor, can further cause the processing module to determine at least one virtual segment in the set of segments by identifying segments of the set of segments that are unavailable and/or that are determined to be processed as virtual segments. At least two consecutive or non-consecutive data portions in the at least one unavailable segment can be identified, for example, where the at least two data portions are required to execute the at least one query. A locally rebuilt set of rows or other locally rebuilt data for the at least two consecutive data portions can be generated by utilizing a recovery scheme. Execution of the query can be facilitated by the at least one processing module by utilizing this locally rebuilt set of rows.

FIGS. 26A-26C illustrate embodiments of a node that utilize a processing resource allocation module 2620 to allocate processing resources that are utilized in processing of segments via the segment processing module 2430. The embodiments illustrated in 26A-26C can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The embodiments of node 37 discussed in conjunction with FIGS. 24A-24K can be utilized to implement any other nodes 37 of database system 10 discussed herein.

As discussed previously, a node can be implemented to read and/or otherwise process a combination of physical segments and virtual segments to service a query. The processing of virtual segments via the recovery scheme requires multiple external retrieval requests to retrieve a set of other segments from a set of other nodes, and further requires and additional processing to generate the locally rebuild segment by utilizing the set of other segments. Performing this set of network reads and subsequent recovery of a requested virtual segment requires greater processing resources than retrieving a physical segment from segment storage 2442, for example, via a conventional read operation. If virtual segments and physical segments are treated identically in allocation of processing resources, this higher read latency of virtual segments will be apparent and can disrupt the read throughput of a node's execution of a query when these virtual segments are being read. Thus, if the amount of processing resources, such as a number of parallel threads being utilized to service reads, is fixed regardless of whether or not virtual segments are being processed, a noticeable latency can be associated with recovery of a virtual segment in comparison to retrieval of a physical segment.

The processing resource allocation module 2620 of FIGS. 26A-26C presents an improvement to the processing of a combination of virtual and physical segments by masking this latency of virtual segments to achieve higher throughput. This can include generating resource allocation data 2628 that indicate processing resources to utilized by segment processing module 2430 to process segments selected in the corresponding segment processing selection data 2428 based on whether any of these segments are to be processed as a virtual segment or a physical segment, for example, as indicated in the query set 2415 and/or as otherwise determined by the segment scheduling module 2410. This mechanism can be implemented by a node's segment scheduling module 2410 to enable segment-type awareness, where physical segments and virtual segments are scheduled to be handled differently via allocation of different types of processing resources. In particular, the processing resource allocation module 2620 is utilized by the node 37 to keep more reads in flight when virtual segments are to be processed by increasing the number of segments that are being processed in parallel. This includes increasing the number of parallel threads that are being utilized in the processing of virtual segments. To increase the number of virtual segments being processed, the number of threads dedicated to virtual segments can be correspondingly increased.

The processing resource allocation module 2620 can be implemented in conjunction with the segment processing assignment module 2420, where the segment processing selection data 2428 indicates at least one portion of at least one segment selected for processing in conjunction with at least one corresponding query via the segment processing module 2430 for the corresponding time slice as discussed previously, and where the segment processing selection data 2428 further indicates resource allocation data 2628 indicating particular processing resources of the segment processing module 2430 and/or segment recovery module 2510 that are allocated for use in retrieval, recovery, and/or processing of the corresponding at least one portion of at least one segment selected for processing in conjunction with at least one corresponding query for the corresponding time slice. The processing resource allocation module can thus be integrated within the segment processing assignment module 2420 and/or can utilize at least one other processing module of the node 37.

The resource allocation data 2628 can indicate a particular processing core resource 48 or other particular processing module and/or processing resource of the node that is assigned to retrieve, recover, and/or process a segment selected in the segment processing selection data 2428 for processing a particular query and/or for coalesced processing of multiple queries that require the segment as discussed in conjunction with FIGS. 25F-25I. For example, the processing resource allocation module 2620 can be implemented in the example embodiment presented previously in conjunction with FIGS. 24B-24C, where processing core resource 48-2 is selected by the processing resource allocation module 2620 to retrieve segment 3 for execution of query 2 and/or where processing core resource 48-2 is selected by the processing resource allocation module 2620 to process segment 5 for query 2 once processing of segment 3 by processing core resource 48-2 is completed.

When a segment is selected for processing in the segment processing selection data 2428, the resource allocation data 2628 can be generated by the resource allocation module 2620 to indicate whether this segment is to be processed in parallel with at least one other segment. A selected set of segments of the segment processing selection data 2428 of a particular time slice can be read or otherwise processed by the segment processing module 2830 within the particular time slice in series, or in parallel by a corresponding set of parallel threads, based on a corresponding indication on the resource allocation data 2628. At any given time, any parallel thread allocated for segment processing can be utilized to read exactly one segment. Thus, the number of parallel threads that are allocated by the processing resource allocation module 2620 in resource allocation data 2628 for a particular time slice or other time frame can be equal to a number of selected segments to be processed in parallel in this time slice or other time frame. As illustrated in FIG. 26A, the segment processing selection data 2428 can indicate this resource allocation data 2628 indicating the selected number of parallel threads, and the segment processing module 2430 can process the segments indicated in the segment processing selection data 2428 in accordance with the selected number of parallel threads indicated in the corresponding resource allocation data 2628.

The number of segments to be processed in parallel, dictating the corresponding number of parallel threads that are allocated for processing of segments at a particular time, can be dynamically allocated over time as sets of segments are selected for processing by the segment scheduler module 2410. This dynamic allocation of parallel threads can be based on whether or not virtual segments are currently selected for processing and/or can be an increasing function of a number of virtual segments that are currently selected for processing. When at least one virtual segment is selected for processing, the number of segments being processed in parallel can be selected to be higher to mask the latency induced by reading of virtual segments.

In some cases, the segment scheduler module 2410 generates segment processing selection data 2428 that indicates a set of segments to be processed for a particular time slice that includes a single segment or multiple segments. A number of parallel threads implemented by segment processing module 2430 are then allocated to facilitate processing of the set of segments by the processing resource allocation module 2620. For example, multiple ones of the set of segments can be assigned to a same processing core resource 48 of the segment processing module 2430 for concurrent processing via a corresponding set of parallel threads of this processing core resource 48. At a given time, each processing core resource 48 of a node 37 can be processing one or more assigned segments via its own one or more corresponding parallel threads. This number of parallel threads that will be utilized by a given core processing resource 48 can be selected as a function of the number of virtual segments in the set of segments scheduled to be processed at this time. In some cases, each virtual segment in the set of segments is allocated for processing via its own parallel thread by a core processing resource. The number of parallel threads that are utilized by a single processing core resource 48 at a given time can be equal to and/or an increasing function of the number of virtual segments assigned to the corresponding processing core resource 48 at the given time. The number of parallel threads that are utilized across all processing core resources 48-1-48-$n$ of a node 37 at a given time can be equal to and/or an increasing function of the number of virtual segments assigned for processing across all processing core resources 48-1-48-$n$ at the given time. For example, at a first time when a first number of virtual segments are selected for processing, a first number of parallel threads are allocated for processing the first number of virtual segments. At a second time when a second number of virtual segments are selected for processing, a second number of parallel threads are allocated for processing the first number of virtual segments. The second number of parallel threads can be less than the first number of parallel threads based on the second number of virtual segments being less than the first number virtual segments.

In some cases, the processing resource allocation module 2620 can select and/or allocate a subset of a set of fixed parallel threads of a particular selected processing core resource and/or can otherwise select and/or allocate a subset of a set of fixed parallel threads of the segment processing module 2430 for processing of segments indicated in the segment processing selection data 2428 to generate the partial resultant of the corresponding query. For example, each processing core resource 48 and/or the segment processing module 2430 can have a fixed set of parallel threads that can be utilized at any given time for processing segments for queries, where a subset of these parallel threads are allocated for processing of segments for the one or more particular queries.

Alternatively, the processing resource allocation module 2620 can select and/or dynamically generating a set of parallel threads of a particular selected processing core resource 48 and/or otherwise selecting and/or can dynamically allocate a set of parallel threads of the segment processing module 2430 for processing of the segment to generate the partial resultant of the corresponding query. For example, the selected processing core resource 48 and/or the segment processing module 2430 can have different numbers of the same or different parallel threads being utilized at different time slices for processing segments. Processing core resources 48 and/or the segment processing module 2430 can otherwise have different sets of parallel threads being utilized at different time slices for processing segments for queries, where the parallel threads are dynamically allocated by the processing resource allocation module 2620 and/or where the type and/or amount of processing resources utilized to implement each parallel thread being implemented at a given point in time can be dynamically adjusted by the processing resource allocation module 2620 based on how many parallel threads are required at a given point in time and/or based on resource availability at a given point in time.

An example of allocating different numbers of parallel threads over time by one or more different processing core resources 48-1-48-$n$ is illustrated in FIGS. 26B-26C. In FIG. 26B, a plurality of sets of parallel threads 2652-1-2652-$n$ are implemented by segment processing module 2430 at a first time slice $t_0$ to process a set of segments. A single parallel thread is designated as parallel thread 2650, where each set of parallel threads includes one or more parallel threads 2650. Each set of parallel threads can be implemented, for example, by a corresponding one of a set of processing core resources 48-1-48-$n$ of the segment processing module 2430. In some cases, a single set of parallel threads 2652 is allocated for processing, for example, in cases where segment processing module 2430 is implemented via a single processing core resource 48.

Each set 2652 of the plurality of n sets of parallel threads can be processing a corresponding set of segments of one or more queries of the query set 2415, where the set of parallel threads was previously allocated for processing of this set of segments based on resource allocation data 2628 of segment processing selection data 2428 generated by the segment processing assignment module 2420 that implements the processing resource allocation module 2620 for the time slice or for a prior time slice.

Thus, the plurality of sets of parallel threads are implemented to concurrently process a corresponding plurality of segments. This plurality of segments can include segments from different ones of the set of queries in the query set 2415, where the plurality of segments constitutes a subset of the segments in the segment sets 2418 of the query set 2415 whose processing has been initiated by segment processing selection data 2428 generated by the segment scheduling module 2410.

In some cases, one or more sets of parallel threads 2652 includes exactly one thread at a particular time slice. For example, exactly one thread can be designated for segment processing by one or more processing core resources to process one or more physical segments in series, one at a time. In such cases, additional threads are only allocated in time slices where virtual segments are selected for processing.

In some cases, a set of parallel threads 2652 processes one or more a set of segments in accordance with multiple queries as described in conjunction with FIGS. 25F-25I. In some cases, a set of parallel threads processes multiple data blocks of different segments that were batched to be processed in tandem in accordance with a single corresponding query or multiple corresponding queries as discussed in conjunction with FIGS. 25E-25I.

As illustrated in FIG. 26B, a set 2652-1 of the plurality of sets of parallel threads can include a first number of different parallel threads, where the first number is equal to a first integer $X_1$ that is greater than or equal to one. Another set 2652-2 of the plurality of sets of parallel threads can include the second number of different parallel threads, where the second number is equal to a second integer $X_2$ that is strictly greater than one and is strictly greater than $X_1$. For example, the second integer $X_2$ is greater than the first integer to $X_1$ based on the second processing core resource 48-2 being assigned to process a greater number of virtual segments at time slice $t_0$ than the first processing core resource 48-1.

Alternatively or in addition to different processing core resources 48 being allocated different numbers of parallel threads for processing segments at a particular time, the number of parallel threads allocated to a single processing core resource can dynamically change over time based on changes in the number of virtual segments assigned for processing by the processing core resource at different times. This is illustrated in FIG. 26C. In particular, the set 2652-1 of the plurality of sets of parallel threads can include a new number of different parallel threads $X_3$ for time $t_1$. In particular, the corresponding processing core resource can implement a greater number of parallel threads for processing its assigned segments indicated in the new segment processing selection data 2428 for time $t_1$ based on updated resource allocation data 2628. This increase of parallel threads from $X_1$ to $X_3$ can similarly be based on the second processing core resource 48-1 being assigned to process a greater number of virtual segments at time slice $t_1$ than in time slice $t_0$. As the number of virtual segments decreases or otherwise changes over time, the number of virtual segment can similarly change over time as a function of the number of virtual segments.

At least one of the parallel threads 2650 of a set 2652 can be designated for processing of physical segments. In some cases, exactly one of the parallel threads 2650 of a set 2652 is designated for processing physical segments, for example, where multiple physical segments are processed in series by this designated parallel thread. In such cases, the number of parallel threads X of a set 2652 can be equal to the number of virtual segments assigned to the corresponding processing core resource plus one, where the additional parallel thread is allocated for processing of physical segments by the processing core resource. In other embodiments, the number of parallel threads 2650 allocated to physical segments is a function of the number of physical segments assigned for processing, where the number of parallel threads 2650 of a set 2652 designated for processing of physical segments can be greater than one. These multiple parallel threads designated for processing of physical segments can each process their own distinct sets of allocated physical segments in series. In such cases, total number of parallel threads 2650 in a set 2652 can be a function of both the physical segments and the number of virtual segments assigned to the processing core resource.

For example, the number of parallel threads 2650 allocated for processing physical segments can be determined based on multiplying the assigned number of physical segments by a first factor $p_1$, and the number of parallel threads 2650 allocated for processing virtual segments can be determined based on multiplying the assigned number of virtual segments by a second factor $p_2$. The factor $p_1$ can be strictly less than the second factor $p_2$, thus inducing higher degrees of parallelism when virtual segments are added. In some cases, the first factor $p_1$ can be strictly less than one, and the second factor $p_2$ can be less than or equal to one. In particular, the factor $p_2$ can be equal to one to dictate that an additional parallel threads is allocated for each corresponding virtual segment. In other cases, the factor $p_2$ can be less than one to dictate that one or more parallel threads allocated for virtual segments may be assigned to process one or more virtual segments in series.

The second factor $p_2$ can be greater than the first factor $p_1$ by a factor of N, where N is equal to or based on the calculated and/or measured latency of processing virtual segments relative to processing physical segments. For example, N can be equal to or selected based on an average virtual segment read latency divided by an average physical segment read latency to most effectively mask the latency induced by reads of virtual segments. The average virtual segment read latency and/or average physical segment read latency can be measured and/or calculated based on prior reads of physical and virtual segments, respectively, by segment processing module 2430 historically. In some cases, the factor N is different for different processing core resources based on different processing capabilities. In some cases, the factor N is adjusted over time based on detecting that the latency ratio between physical and virtual segments changes over time, for example, due to hardware and/or software updated. As a particular example, the factor N can be based on the number of external retrieval requests required to retrieve the required other segments in recovering virtual segments via the segment recovery module 2510. For example, the factor N can be equal to, can be greater than, can be a multiple of, and/or can be otherwise a deterministic function of the number K other segments that are retrieved from the K other nodes 37-1-37-K, as K distinct external retrieval requests are required to retrieve the K required segments.

In some cases, a processing core resource 48 is currently processing at least one segment via at least one corresponding parallel thread. Prior to finishing this processing, a new segment is assigned to be processed by the processing core resource 48 in segment processing selection data 2428. If the new segment is a physical segment, this segment can be queued for processing via an existing one of the parallel threads that is being utilized to process the at least one segment, for example, once a parallel thread completes its processing of an existing segment. In particular, the resource allocation data 2628 can indicate this segment be queued for processing in this fashion in response to this segment being indicated for processing as a physical segment in the query data 2415 and/or the segment processing assignment module can wait to assign physical segments for processing until an existing parallel thread becomes available to process a new segment by finishing processing of a previous segment. However, if this new segment is instead a virtual segment, rather than waiting for the existing parallel threads to complete their processing, a new parallel thread can automatically be allocated for processing this new segment via the processing core resource 48. In particular, the resource allocation data 2628 can indicate that a new parallel thread be added to the existing set of parallel threads for processing of the segment in response to this segment being indicated for processing as a virtual segment in the query data 2415.

In some cases, the segment processing assignment module 2420 can further determine processor utilization data for each processing core resource 48 and/or for the segment processing system 2430 as a whole. The processor utilization data can indicate actual or estimated metrics in one or more recent slices, a current time slice, and/or at least one upcoming time slice, for each processing core resource 48 and/or for the segment processing system 2430 as a whole: an amount of available processing resources; a number of current parallel threads being utilized to process segments; a number of segments currently being processed; a proportion of the current number of segments being processed that are virtual segments; measurements of processing latency and/or processing performance; estimated processing latency, performance, and/or availability based on previously allocated resource of previously generated resource allocation data 2628 in one or more previous time slices that is determined to and/or estimated to still be allocated due to processing of corresponding segments determined to be and/or expected to be still in progress; or other processing information. Some or all of these metrics can be determined for particular time slices based on sampling processing core resource 48 and/or the segment processing module 2430 for metrics of their processing performance and/or availability in some or all time slices. Some or all of these metrics can be determined for particular time slices based on virtual segments and/or physical segments currently being processed and/or a number of parallel threads currently allocated.

When a virtual segment is selected by the segment processing assignment module 2420 to be processed for a particular time slice, a processing core resource 48 of the set of processing core resources with a lowest level of processing amount of utilization and/or highest level of available utilization indicated by the processor utilization data for the time slice can be selected by the processing resource allocation module 2620 to process the selected virtual segment. A particular processing core resource 48 can be otherwise selected for a given time slice $t_0$ maximize and/or evenly distribute utilization across all processing core resources 48 in a similar fashion discussed with regards to maximizing and/or evenly distributing utilization across all memory drive 2440 discussed in conjunction with FIGS. 24D-24K. In some cases, the processing utilization data of a time slice is determined based on and/or is a function of the drive utilization data 2425 of the time slice and/or of one or more prior time slices.

A processing core resource determined to be processing a greater number of segments can be determined to have a higher level of processing utilization than a processing core resource determined to be processing a smaller number of segments. A processing core resource determined to be processing a greater number of virtual segments and/or higher proportion of virtual segments can be determined to have a higher level of processing utilization than a processing core resource determined to be processing a smaller number of number of virtual segments and/or smaller proportion of virtual segments. A processing core resource determined to be utilizing a greater number of parallel threads can be determined to have a higher level of processing utilization than a processing core resource determined to be processing a smaller number of parallel threads.

Alternatively in addition, the segment processing assignment module 2420 can select virtual segments for processing at particular time slices where the overall utilization of processing resources is lower, and can instead select physical segments for processing at particular time slices where the overall utilization of processing resources is higher. For example, virtual segments are only selected for processing in a time slice if the processor utilization data for the time slice indicates a processing utilization level of the segment processing system 2430 as a whole and/or if the processing utilization level of a particular processing core resource 48 is below a predetermined and/or dynamically determined processing utilization threshold. If the processing utilization level is not below the processing utilization threshold, no virtual segments are selected for processing during the time slice and a physical segment is instead selected.

In some cases, the processing utilization threshold is set to a lower and/or tighter processing utilization threshold when a lower number or proportion virtual segments are included in the query set 2415. This can be beneficial to only process this low number of virtual segments when processing resources are particularly under-utilized. However, in cases where many virtual segments need to be processed, the processing resource allocation module may not have the luxury of assigning virtual segments for processing in only such under-utilized conditions, as a queue of remaining virtual segments continually being passed over for selection of physical segments can cause tremendous build up where these remaining virtual segments would need to be processed all at once. Thus, the processing utilization threshold is set to a higher and/or looser processing utilization threshold when a higher number or proportion virtual segments are included in the query set 2415. This can be beneficial to ensure that more virtual segments are being processed over time to accommodate this higher number of virtual segments, even when processing resources are less under-utilized.

As another example, the segment processing assignment module 2420 can determine a proportion of segments in segments sets 2418 of the query set 2415 and can evenly distribute the processing of the virtual segments over the plurality of sequential time slices, for example based on selecting virtual segments for processing in a proportion of the plurality of sequential time slices that is equal to or substantially similar to the proportion of segments that are virtual segments. As a particular example, if 10% of the segments in the current query set are virtual segments, one virtual segment can be selected in every tenth time slice and/or can be selected for every ten selected segments over any number of time slices. As this proportion of virtual segments increases or decreases over time as new queries are added to the query set, the proportion of time slices utilized to process the virtual segments can increase accordingly, where the virtual segments are still selected to evenly distribute processing of virtual segments over time in accordance with the changing proportion. If the 10% of the segments in the current query set increases to 25%, one virtual segment can be selected in every fourth time slice and/or can be selected for every four selected segments over any number of time slices Alternatively or in addition, the assignment of virtual segments to core processing resources can similarly be uniformly distributed within a given time slice and/or over time, where core resources are each assigned processing of substantially the same proportion of virtual segments over the plurality of sequential time slices.

In various embodiments, a node of a computing device has at least one processor and memory that stores executable instructions that, when executed by the at least one processor, cause at least one processing module of the node to determine a query for execution and to determine a set of segments required to execute the query. A first proper subset of the set of segments is determined by the at least one processing module of the node by identifying ones of the set of segments that correspond to physical segments. A second proper subset of the set of segments is determined by the at least one processing module of the node by identifying ones of the set of segments that correspond to virtual segments. A third proper subset of the set of segments that includes at least one of the second proper subset of the set of segments are selected by the at least one processing module of the node for processing in parallel. The third proper subset of the set of segments are processed in parallel to facilitate partial execution of the query by utilizing a corresponding set of parallel threads of a segment processing module of the node. Each one of the third proper subset of the set of segments is processed by utilizing one of the corresponding set of parallel threads.

Figure 26D:
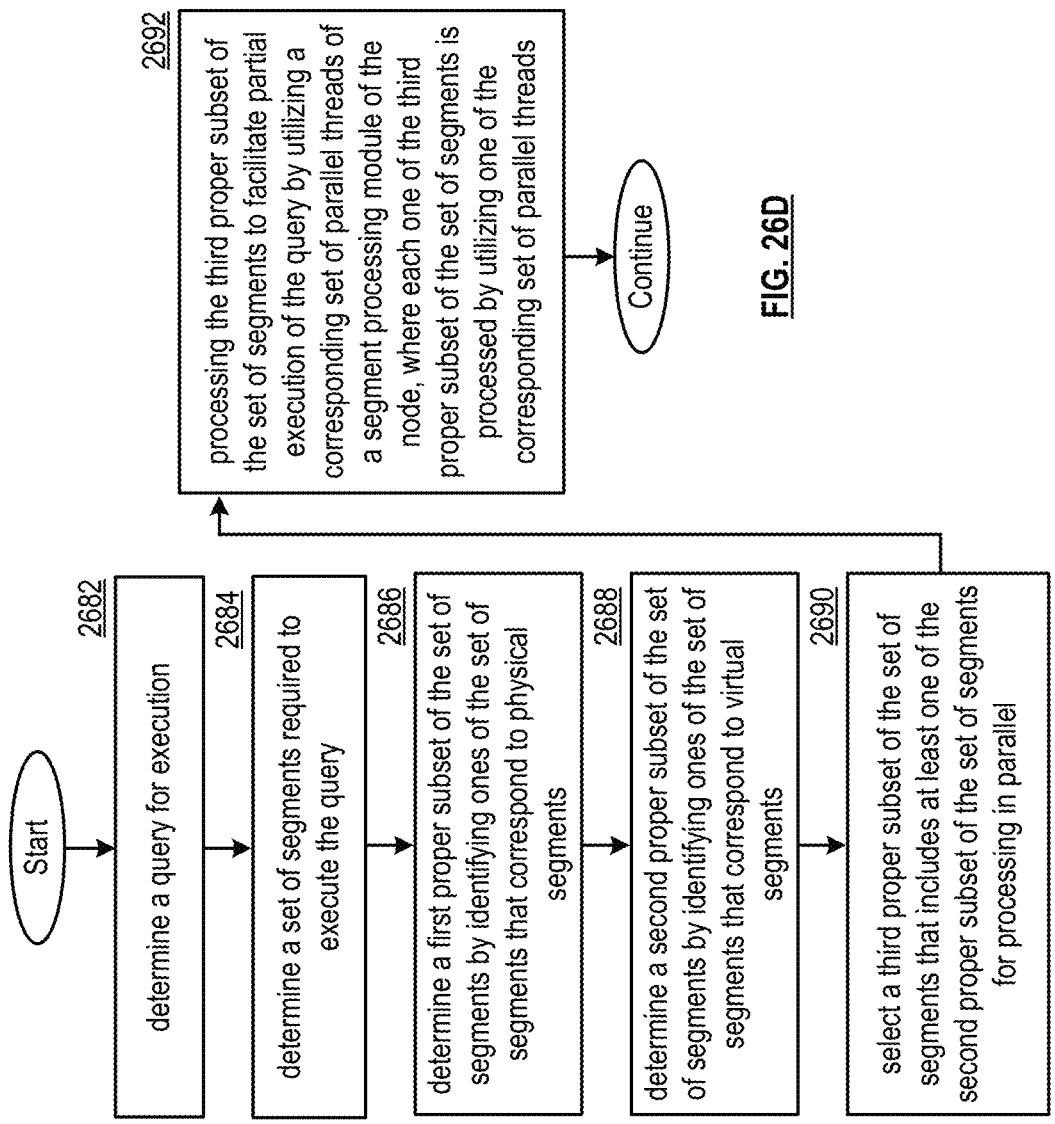
FIG. 26D is a logic diagram illustrating a method of allocating parallel threads to process queries in accordance with the present invention.

FIG. 26D illustrates a method for execution by a node 37. For example, the node can utilize at least one processing module of the node 37 to execute operational instructions stored in memory accessible by the node, where the execution of the operational instructions causes the node 37 to execute the steps of FIG. 26C. The method of 26C can be performed by a node 37 in accordance with embodiments of node 37 discussed in conjunction with FIGS. 26A-26C, and/or in conjunction with other embodiments of node 37 discussed herein.

In the method illustrated in FIG. 26C, step 2682 includes determining a query for execution. Step 2684 includes determining a set of segments required to execute the query. Step 2686 includes determining a first proper subset of the set of segments by identifying ones of the set of segments that correspond to physical segments. Step 2688 includes determining a second proper subset of the set of segments by identifying ones of the set of segments that correspond to virtual segments. In various embodiments, the first proper subset and the second proper subset are mutually exclusive and collectively exhaustive with respect to the set of segments. Step 2690 includes selecting a third proper subset of the set of segments that includes at least one of the second proper subset of the set of segments for processing in parallel. Step 2692 includes processing the third proper subset of the set of segments to facilitate partial execution of the query by utilizing a corresponding set of parallel threads of a segment processing module of the node, where each one of the third proper subset of the set of segments is processed by utilizing one of the corresponding set of parallel threads.

In various embodiments, the set of segments are processed across a plurality of sequential time slices. For each of the plurality of sequential time slices, the method includes: selecting a subset of the set of segments to be read in the each of the plurality of sequential time slices, where the third proper subset of the set of segments are read in a corresponding one of the plurality of sequential time slices via the corresponding set of parallel threads; and reading the selected subset of the set of segments to facilitate one of a set of partial executions of the query utilizing the subset of the set of segments. Different numbers of parallel threads are selected for at least two different ones of the plurality of sequential time slices based on the selected subset of the set of segments in the at least two different ones of the plurality of sequential time slices having different numbers of virtual segments from the second proper subset of the set of segments.

In various embodiments, the physical segments are each stored on a corresponding one of a set of memory drives, and processing each segment of the first proper subset of the set of segments includes retrieving the each segment from the corresponding one of the set of memory drives. In various embodiments, the virtual segments are not stored on any single one of a set of memory drives, and processing each segment of the second proper subset of the set of segments includes locally rebuilding the each segment via a recover scheme. In various embodiments, a set of previous physical segments were stored on a corresponding one of a set of memory drives, and the virtual segments of the second proper subset replaced the set of previous physical segments based on at least one of: a drive failure or a data migration.

In various embodiments, processing each segment of the second proper subset of the set of segments includes retrieving, for each segment of the second proper subset, a corresponding plurality of physical segments stored on a set of memory drives of a corresponding one of a set of other nodes based on sending a set of external retrieval requests to the corresponding plurality of other nodes. Processing each segment of the second proper subset of the set of segments further includes recovering each segment of the second proper subset by utilizing a recovery scheme based on the corresponding plurality of physical segments.

In various embodiments, the third proper subset is selected for a first one of a plurality of sequential time slices and is processed by the corresponding set of parallel threads and is processed in a first time window. The method includes selecting, for a second one of a set of sequential time slices, a fourth proper subset of the set of segments for processing in series, where the fourth proper subset and the second proper subset have a null intersection. The method includes processing the fourth proper subset of the set of segments by utilizing the segment processing module in a second time window, where the first time window and the second time window have a null overlap. In various embodiments, the fourth proper subset of the set of segments is selected for processing in series based on the fourth proper subset including none of the virtual segments of the second proper subset of the set of segments.

In various embodiments, the method includes selecting a fourth proper subset of the set of segments that includes another at least one of the second proper subset of the set of segments for processing in parallel, where the third proper subset and the fourth proper subset are mutually exclusive with respect to the set of segments. The fourth proper subset of the set of segments is processed in a second time window to facilitate another partial execution of the query by utilizing another corresponding set of parallel threads of the segment processing module. Each one of the fourth proper subset of the set of segments is processed by utilizing one of the same or a different corresponding set of parallel threads. The first time window and the second time window have a null overlap. In various embodiments, the third proper subset includes a first number of segments, and the fourth proper subset includes a second number of segments, where the first number of segments is greater than the second number of segments. In various embodiments, the first number of segments is selected to be greater than the second number of segments based on the third proper subset having a greater number of virtual segments than the fourth proper subset. In various embodiments, the first number of segments and the second number of segments are both greater than one based on the third proper subset and the fourth proper subset both including at least one virtual segment.

In various embodiments, a fourth proper subset of the set of segments is selected for processing in a second one of the plurality of sequential time slices, where the fourth proper subset includes only segments of the first proper subset, and where the fourth proper subset are processed utilizing a second number of parallel threads that is less than the number of parallel threads utilized to process the third proper subset based on including only segments of the first proper subset. where the second plurality of parallel threads is greater than the first plurality of parallel threads based on the second subset including the at least one segment of the second proper subset. In various embodiments, the fourth proper subset of the set of segments includes a smaller number of segments than the third proper subset of the set of segments based on the fourth proper subset including includes only segments of the first proper subset. In various embodiments, a smaller number of parallel threads are allocated to process the fourth proper subset than the third proper subset based on the fourth proper subset of the set of segments including the smaller number of segments than the third proper subset of the set of segments.

In various embodiments, the method includes determining utilization data, such as drive utilization data 2425 or processor utilization data, for each of the plurality of sequential time slices. Each subset of the set of segments for retrieval is selected in each of a plurality of sequential time slices based on the utilization data determined for the each of the plurality of sequential time slices. Second utilization data determined for the second one of the plurality of sequential time slices is less favorable than first utilization data determined for the first one of the plurality of sequential time slices. The third proper subset of the set of segments is selected to include the at least one segment of the second proper subset based on the first utilization data being more favorable than the second utilization data. In various embodiments, the utilization data is generated based on resource utilization of the set of memory drives and/or resource utilization of the at least one processor of the processing system.

In various embodiments, the method includes determining a plurality of queries for execution that includes the query, and further includes determining a plurality of sets of segments by determining, for each of the plurality of queries, a corresponding set of segments required to execute the query. The plurality of sets of segments is stored in the set of memory drives. A subset of the plurality of sets of segments is processed for each of the plurality of sequential time slices. One subset selected for one of the plurality of sequential time slices includes segments from different sets of segments of the plurality of sets of segments.

In various embodiments, a non-transitory computer readable storage medium includes at least one memory section that stores operational instructions that, when executed by a processing module that includes a processor and a memory, cause the processing module to determine a query for execution and to determine a set of segments required to execute the query. A first proper subset of the set of segments is determined by the processing module by identifying ones of the set of segments that correspond to physical segments. A second proper subset of the set of segments is determined by the processing module by identifying ones of the set of segments that correspond to virtual segments. A third proper subset of the set of segments that includes at least one of the second proper subset of the set of segments is selected by the processing module for processing in parallel. The processing module processes the third proper subset of the set of segments to facilitate partial execution of the query by utilizing a corresponding set of parallel threads, where each one of the third proper subset of the set of segments is processed by utilizing one of the corresponding set of parallel threads.

FIGS. 27A-27F illustrate embodiments where the segment scheduling module 2410 of a node 37 utilizes data ownership information to determine the segment sets 2418 for the set of queries 2405 in the query set 2415. The embodiments illustrated in 27A-27F can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The embodiments of node 37 discussed in conjunction with FIGS. 27A-27F can be utilized to implement any other nodes 37 of database system 10 discussed herein.

As discussed previously, multiple nodes 37, such as a particular group of nodes in a same storage cluster 35, can generate query resultants for the same query, where the query resultants generated by a storage cluster of nodes 37 in series and/or parallel to ultimately generate the full resultant of the query. For a given query, a full set of segments stored across and/or accessible by the storage cluster of nodes 37 executing the query is required. To ensure that the final query result generated via the combined efforts of this storage cluster 35 is correct, each one of the set of segments must be processed. Furthermore, each one of the set of segments must be processed exactly once to ensure that corresponding rows are not duplicated, which could affect the final resultant of the query. Therefore, for a given query, each segment must be retrieved and/or processed by exactly one node in the storage cluster 35, such as exactly one node at an IO level of a query execution plan as discussed in conjunction with FIGS. 28A-28N.

Figure 27A:
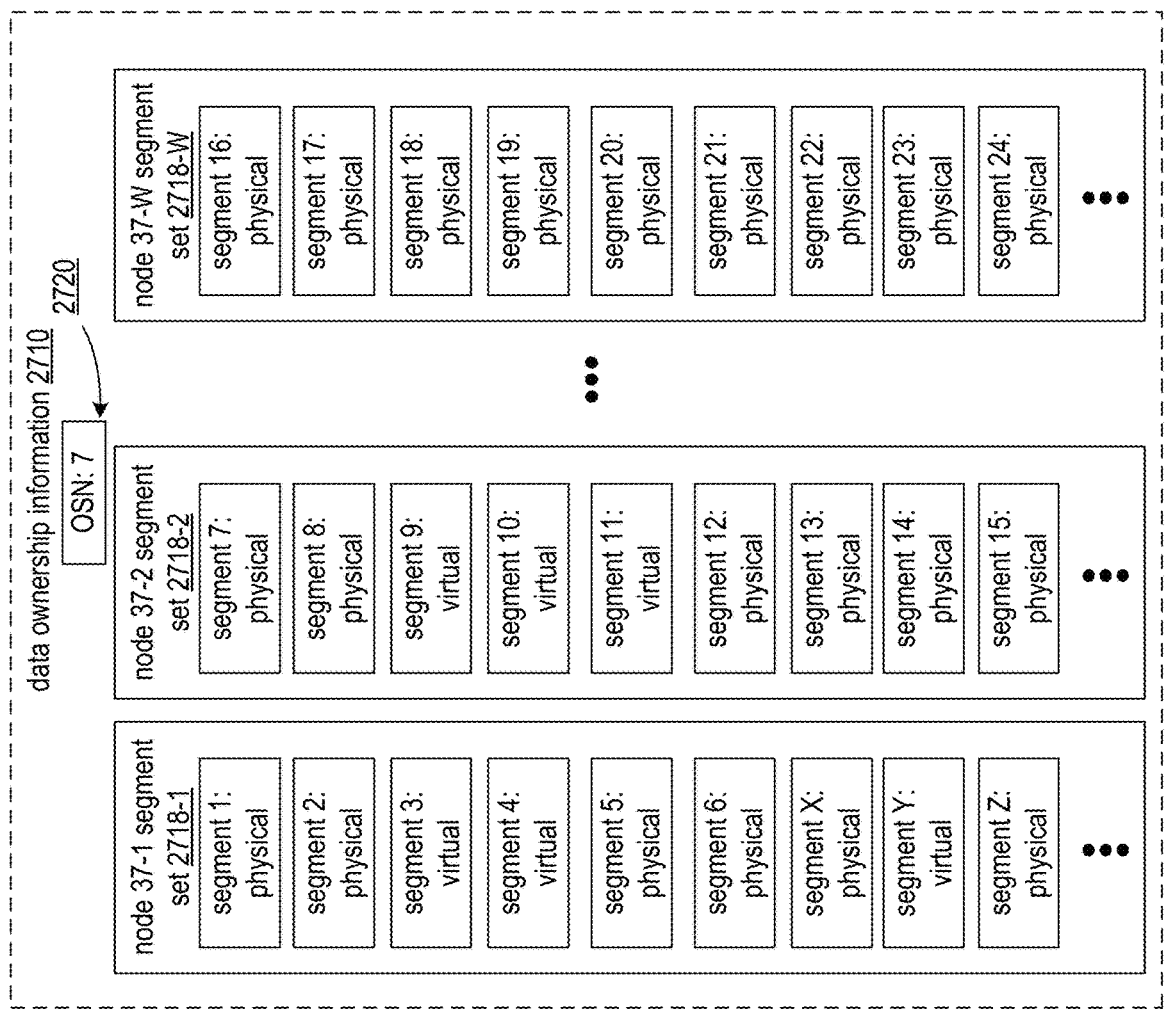
FIG. 27A illustrates an embodiment of data ownership information in accordance with the present invention.

To ensure that each segment of a query is processed exactly once, all nodes 37 of a storage cluster 35 can store and/or access data ownership information 2710. An example embodiment of the information included in data ownership information 2710 is depicted in FIG. 27A. These nodes responsible for storing data ownership information 2710 can include all nodes 37 in a group of nodes that are included in an IO level of a query execution plan, and/or that are otherwise responsible for performing read steps to read rows in facilitation of query execution. For example, if the storage cluster 35 includes 5 computing devices as illustrated in the example of FIG. 6, and if each computing device includes 4 nodes all illustrated in the example of FIG. 7, the storage cluster can include a set of 20 nodes. The data ownership information can include a plurality of node segment sets 2718 for the corresponding plurality of nodes in the storage cluster. As illustrated in FIG. 27A, a plurality of nodes 37-1-37-W of the storage cluster can each have a corresponding node segment set 2718 of a corresponding plurality of node segment sets 2718-1-2718-W. Each node segment set can indicate the full set of segments that are owned by the segment. As used herein, a node's "ownership" of a segment corresponds to a node being assigned to read and/or process this segment in accordance with processing queries and/or that the node is otherwise responsible for retrieval, recovery, and/or processing of the corresponding segments in its execution of queries in its query set 2405.

Each node segment set 2718 can further indicate whether the corresponding node is responsible for processing these segments as virtual or physical segments. Some or all the segments in a node segment set 2718 for a particular node can be physical segments that are directly accessible by the node via its segment storage 2442. Some or all of the segments in a node segment set 2718 for a particular node can be virtual segments that are accessible via a recovery scheme. Thus, a node's "ownership" of some segments can correspond to virtual segments that are not stored by the node in its own segment storage 2442.

In the example presented in FIG. 27A, node 37-1 owns a plurality of segments that include segments 1, 2, 3, 4, 5, 6, X,Y, and Z; node 37-2 owns a plurality of segments that include segments 7-15; and node 37-W owns a plurality of segments that include segments 16-24. These segment numbers are included to label the segments, and do not necessarily indicate any ordering of these segments. In this example, the node segment set of node 37-1 indicates segments 3, 4, and Y are owned by node 37-1 virtual segments, and the node segment set of node 37-2 indicates segments 9, 10, and 11 are owned by node 37-2 as virtual segments.

The nodes 1-W can process their queries by generating corresponding segment sets 2418 of incoming queries. In particular for a given query 2405 to be processed by a node 37, it can determine the corresponding segment set 2418 to include all required segments for the given query that are owned by the node as indicated by the data ownership information 2710, and only the required segments for the given query that are owned by the node the data ownership information 2710. The node can further determine whether each particular segment in the segment set is to be processed as a physical or virtual segment based upon its corresponding indication in the data ownership information 2710.

The data ownership information 2710 can indicate, in exactly one node segment set 2718, each one of the full set of segments owned by the corresponding storage cluster 35, such as the full set of segments that are stored by the storage cluster and/or the full set of segments the corresponding storage cluster is responsible for. Thus, the plurality of node segment sets of a storage cluster's data ownership information 2710 can be mutually exclusive and collectively exhaustive with regards to the full set of segments owned by the corresponding storage cluster 35. In some cases, not all of the storage cluster's full set of segments are currently stored by the storage cluster 35, for example, where they are only recoverable as virtual segments due to the corresponding physical segments being unavailable.

The data ownership information 2710 can correspond to a particular storage cluster 35 and can include node segment sets for every one of its node 37-1-37-W, such as a distinct set of 20 nodes. Each storage cluster of a plurality of different storage clusters in the database system 10, such as the plurality of storage clusters 35-1-35-z, can each have its own corresponding data ownership information for its own corresponding set of nodes. Queries can be processed by nodes of a single storage cluster 35 and/or via nodes of multiple storage clusters 35, for example, if they include segments in data ownership information 2710 of different storage clusters. Thus, to maintain query correctness across multiple storage clusters, the plurality of full sets of segments of the corresponding plurality of storage clusters can be mutually exclusive and collectively exhaustive with regards to all segments that are stored and/or recoverable by the database system 10 as a whole.

The portion of data ownership information 2710 accessible by a particular node can indicate only the proper subset of the full set of segments stored nodes in the storage cluster that are owned by the particular node. For example, each node 37-1-37-W may store, access, and/or be able to determine its own node segment set 2718. In such cases, the particular node may not have knowledge of which other nodes 37 in the storage cluster 35 store particular other segments that aren't owned by the particular node. Alternatively, as the particular node 37 may need to access segments stored by particular other nodes as part of a recovery scheme utilized in processing virtual segments of their node segment set 2718 as discussed in conjunction with FIGS. 25A-25L, each node 37 in the storage cluster can store, access, and/or otherwise determine the some or all of the full data ownership information 2710.

In this example presented in FIG. 27A, node 37-1 can be implemented by the node 37 illustrated in FIG. 25B. The data ownership information 2710 is utilized by the segment scheduling module 2410 of node 37-1 to determine that segments 1, 2, 3, 4, 5, 6, X,Y, and Z are to be processed in queries accordingly, if required by particular queries 2405 in the node's query set 2415. For example, this node 37-1 determines its segment set 2418 for query 2 includes segment 3, segment 5, and segment Y in response to first determining a full set of segments required for execution of query 2, and by next determining its own segment set 2418 as a proper subset of this full set of segments required for execution of query 2, where other segments in this full set of segments required for execution of query 2 are processed by other nodes in the storage cluster 35. In particular, segments 3, 5 and Y are identified in this proper subset because they are included in the full set of segments required for execution of query 2, and are further included in node 37-1's node segment set 2718. Even if node 37-1 determines that other segments, such as segment 7, is required for execution of query 2, segment 7 will not be included in node 37-1's segment set 2418 for query 1 because it is not owned by the node, and will instead be processed by node 37-2 in accordance with query 2.

Continuing with this example, node 37-1's segment set indicates segments 1, 2, 5, 6, X, and Z are to be processed as physical segments, and that segments 3, 4, and Y are to be processed as virtual segments. This can be due to the data ownership information 2710 being determined in response to and/or during the outage of memory drive 2440-2 that stores segments 3, 4, and Y. For example, a previous version of data ownership information determined before the outage of memory drive 2440-2 may have indicated that segments 3, 4, and Y were owned by node 37-1 as physical segments due to their availability in segment storage.

Thus, the data ownership information 2710 can change over time, where updated versions of the data ownership information 2710 can be generated and utilized, for example, over one or more ones of the plurality of sequential time slices. In particular, data migration within the storage cluster or between different storage clusters, drive outages, or other changes in availability of particular segments can cause segments in full set of segments in a storage cluster to change ownership in different versions of the data ownership information over time; to change from being owned by the same or different node as a virtual or physical segment in different versions of the data ownership information over time; to include new segments added to the storage cluster, for example, as new data to the database system 10 and/or as migrated data from a different storage cluster, in different versions of the data ownership information over time; to drop the inclusion of segments removed from the storage cluster, for example, based on being migrated data to a different storage cluster and/or being deleted from the database system entirely, in different versions of the data ownership information over time; and/or to otherwise change over time.

Alternatively, the same storage cluster 35 will always maintain ownership of its full set of segments over time to guarantee consistency across multiple storage clusters while not requiring any coordination across multiple storage clusters, where changes in a storage cluster's data ownership information only includes changes in distribution of ownership across nodes within the storage cluster of its fixed full set of segments. In particular, as each single storage cluster stores all segments within each segment group for segments stored by the storage cluster, ownership of unavailable segments of the storage cluster can be maintained as virtual segments assigned to nodes in the storage cluster for recover via retrieval of other segments 1-K from other nodes 1-K in the same storage cluster.

Each version of the data ownership information 2710 can be tagged or otherwise be associated with a corresponding ownership sequence number (OSN) 2720. As illustrated in FIG. 27A, the data ownership information 2710 is tagged with OSN 7, for example, to indicate that it is the seventh version of the data ownership information 2710, where the OSN increments with each corresponding updated version of the data ownership information 2710 over time. Alternatively, the OSN can be any unique identifier that distinguishes the corresponding version of data ownership information 2710 from other versions.

Rather than necessitating global coordination and/or single entity responsible for assignment and sharing of data ownership information as new versions are generated over time, each new version of the data ownership information of a particular storage cluster 35 can be generated via a consensus protocol, which can be executed by some or all nodes 37 in a storage cluster participating in the consensus protocol, where the shared state mediated via the consensus protocol indicates the most updated ownership information. This mechanism improves database systems by guaranteeing consistency of data ownership information across nodes for usage in queries while not requiring global coordination.

Figure 27B:
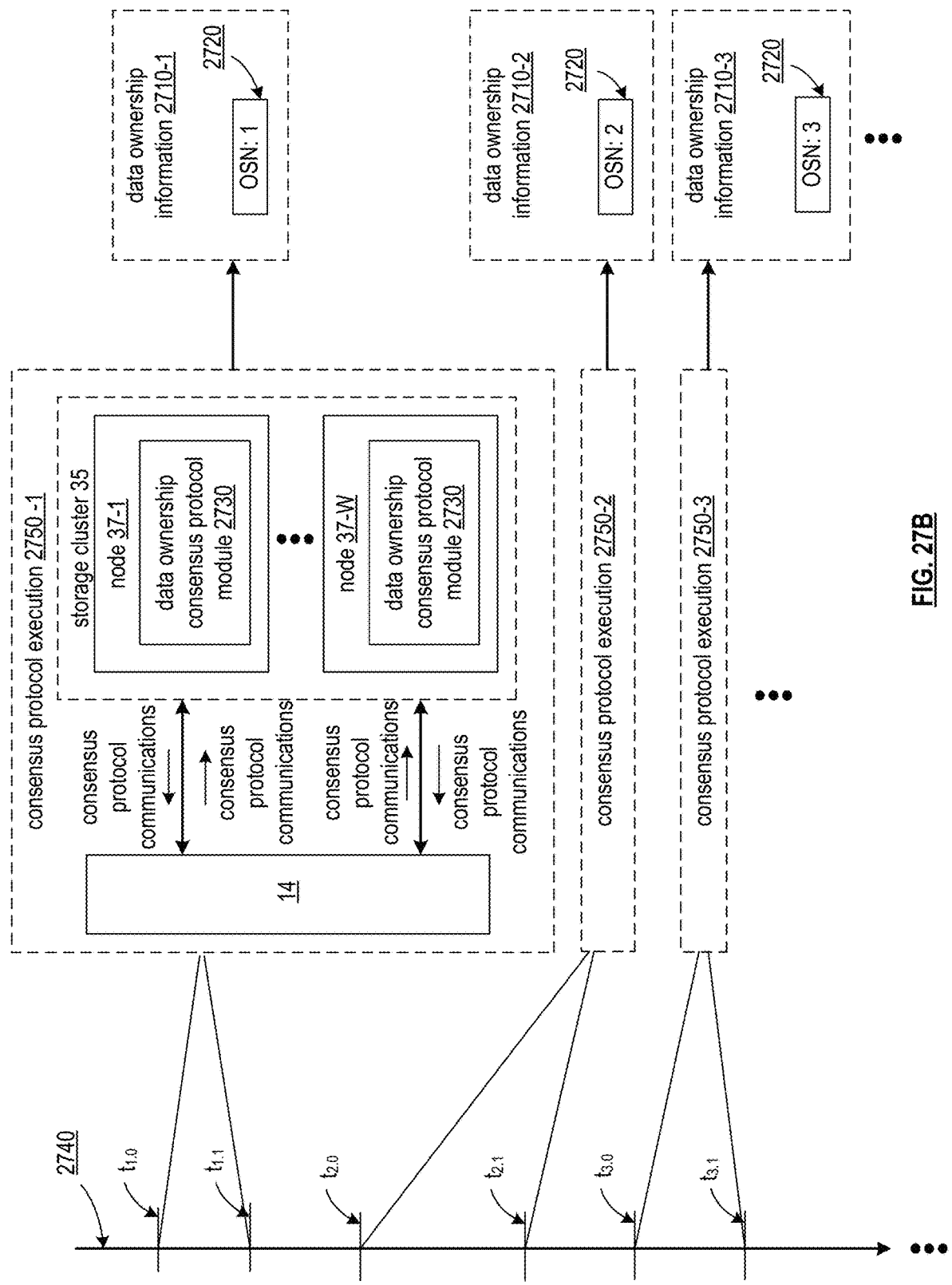
FIG. 27B illustrates a timeline of a plurality of consensus protocol executions in accordance with the present invention.

For example, as illustrated in FIG. 27B, a plurality of consensus protocol executions 2750 can be performed via the nodes 37-1-37-W in a storage cluster 35 over time to generate a corresponding plurality of versions of data ownership information 2710. For example, as illustrated by timeline 2740, a first consensus protocol execution 2750-1 can be mediated across nodes in the storage cluster during timespan $t_{1.0}$-$t_{1.1}$ to generate a corresponding first version of data ownership information 2710-1. For example, the first consensus protocol execution 2750-1 can be initiated at time $t_{1.0}$ by one or more nodes in the storage cluster 35, and the first consensus protocol execution 2750-1 can be completed, for example, where some or all nodes in the storage cluster have determined and/or can access the resulting data ownership information 2710-1, at $t_{1.1}$. At some time after $t_{1.1}$, or perhaps instead at some time before the first the first consensus protocol execution 2750-1 is complete but after the first consensus protocol execution 2750-1 is initiated, a second consensus protocol execution 2750-2 can be mediated across the nodes in the storage cluster 35 to generate to generate a corresponding second version of data ownership information 2710-2 during timespan $t_{2.0}$-$t_{2.1}$. Similarly, a third consensus protocol execution 2750-3 can be mediated across the nodes in the storage cluster 35 to generate to generate a corresponding third version of data ownership information 2710-3 during timespan $t_{3.0}$-$t_{3.1}$, and this process can continue over time where consensus protocol executions 2750 are performed to generate corresponding data ownership information 2710 over time. Data ownership information 2710-1, 2710-2, and 2710-3 are tagged with their respective OSNs 2720 with values of 1, 2, and 3, respectively, or otherwise indicating the ordering of the revision with respect to the other revisions.

As discussed herein, consider the times $t_{1.1}$, $t_{2.1}$, $t_{3.1}$, ..., $t_{i.1}$ of timeline 2740 as the times where the resulting corresponding versions of data ownership information 2710-1, 2710-2, 2710-3, ... 2710-$i$, respectively, are available for utilization by the nodes 37 in the storage cluster for query execution as a result of consensus protocol executions 2750-1, 2750-2, 2750-3, ..., 2750-$i$ being completed across the set of nodes in the storage cluster 35, where i is any ith iteration of executing the consensus protocol to generate a corresponding ith version of the data ownership information 2710. The OSN for any ith version of the data ownership information can be tagged with a respective OSNs 2720 indicating that the version is the ith version in the ordering, for example, where the value of the OSN 2720 is equal to or otherwise indicates the value of i.

As illustrated in FIG. 27B, the consensus protocol can be executed via consensus protocol communications generated by nodes 37 and/or received and processed by nodes 37. For example, each node can implement a data ownership consensus module 2730, for example, by utilizing at least one processing module of the node. The data ownership consensus module 2730 can be utilized by each corresponding node 37 to generate consensus protocol communications in accordance with the storage cluster's execution of the current consensus protocol for transmission to one or more other nodes in the storage cluster in accordance with the storage cluster's execution of the current consensus protocol, for example, via system communication resources 14. The data ownership consensus module 2730 can be utilized by each corresponding node 37 to receive and/or process consensus protocol communications, generated by other nodes in the storage cluster 35 in accordance with the storage cluster's execution of the current consensus protocol. The consensus protocol can be a leader-mediated consensus protocol. Execution of the consensus protocol can include election or other determination of a leader by one or more nodes, voting by one or more nodes, and/or ultimately arriving at a consensus based on the voting by the one or more nodes to generate and/or communicate the resulting data ownership information.

One or more nodes can initiate a revision of the data ownership information 2710 by initiating a new execution of the consensus protocol, for example, in response to determining a changed data storage condition such as a drive outage, a full rebuild of data being completed, a migration being initiated or completed, current or scheduled upcoming data unavailability, or another change. Alternatively or in addition, new executions of the consensus protocol to generate revised data ownership information 2710 can occur at scheduled and/or predetermined times.

Because data ownership information is local only to a particular storage cluster 35, each storage cluster of a small number of nodes can execute the consensus protocol amongst themselves, rather than requiring consensus or other coordination across all nodes in the database system. Each of the storage clusters in the plurality of storage clusters 35-1-35-$z$ can independently generate their own iterative revisions of their own data ownership information over time in their own timeline 2740, where at any given point in time, different storage clusters may have independently generated a different number of revisions of their data ownership information. This improves database systems by ensuring that the execution of the consensus protocol remains scalable, where only local coordination is required to determine data ownership information, while ensuring that all segments across different storage clusters 35 has consistent ownership information.

As revised data ownership information is determined by particular nodes over time, most recent versions of the data ownership information 2710 can be implemented to execute incoming queries. However, if the node were to immediately adopt the most recent data ownership information for segment processing in executing queries in query set 2415, queries could be processed improperly. In particular, as an individual node executes a query over a span of time, if the node changes its segment set determined for the query based on a more recent versions of the data ownership information 2710 mid-execution, some segments needed for execution of the query across all nodes can be missed and/or duplicated. Furthermore, multiple nodes can be executing the same query within slightly different time spans based on their own segment scheduler module's initiation of execution of a particular query. Alternatively or in addition, the most recent data ownership information can be received and/or determined by the different nodes at slightly different times. As global coordination is not utilized and as nodes independently execute queries via the segments they determine to own, a mechanism to ensure all nodes execute each given query with the same data ownership information is required.

FIGS. 27C-27F illustrate an example of an embodiment of the present invention where nodes in a storage cluster utilize OSNs 2720 tagged to and/or determined for each query 2405 in the query set 2415 to determine which corresponding one of a plurality of data ownership information versions 2710 generated via the storage cluster's execution of the consensus protocol over time will be utilized to determine the corresponding segment set 2418 for each query 2405.

Figure 27C:
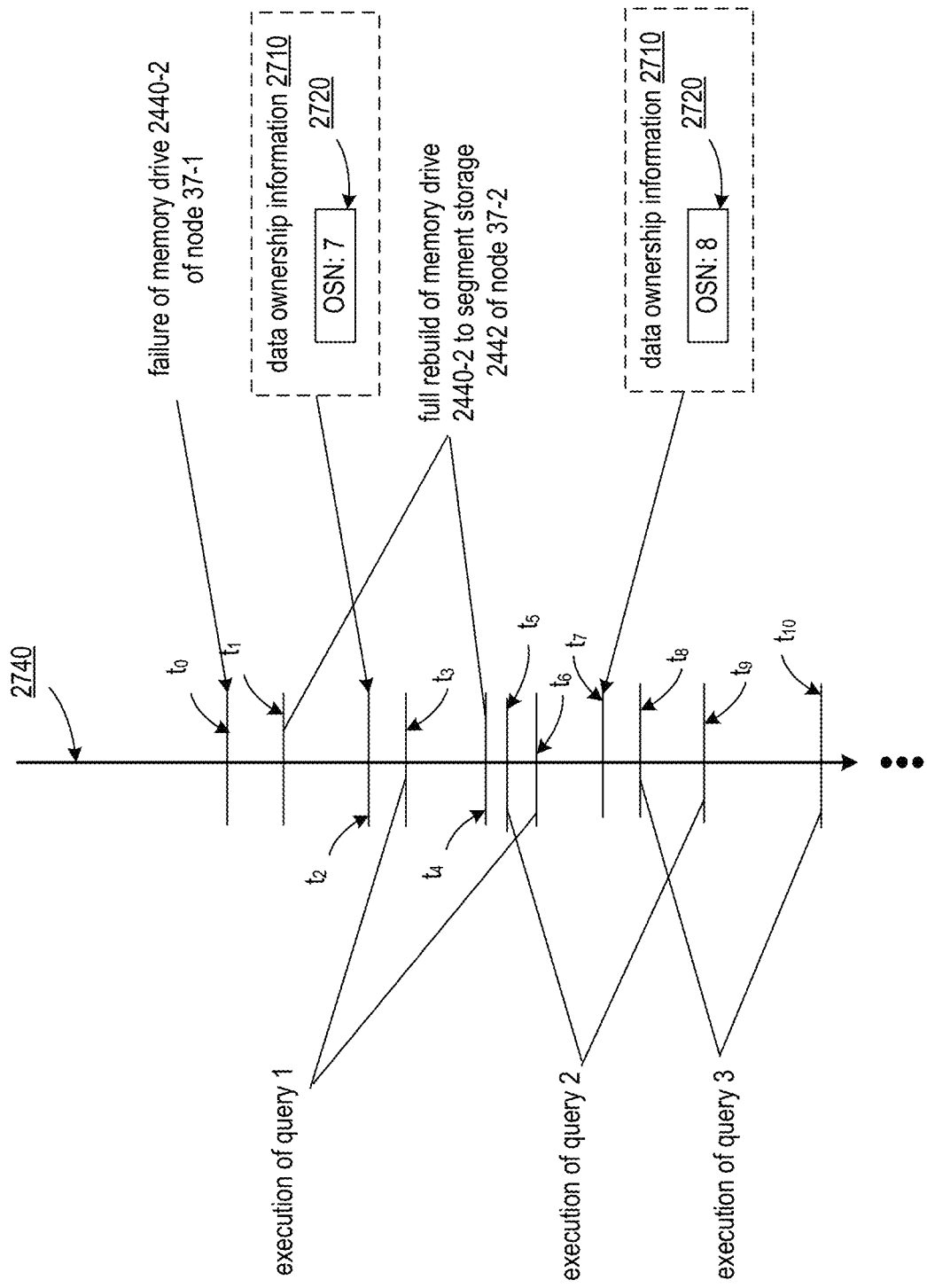
FIG. 27C illustrates an example timeline of execution of a plurality of queries in accordance with the present invention.

FIG. 27C illustrates a particular example of timeline 2740 to illustrate the temporal relation between a series of events occurring at particular points in time and/or time spans $t_0$-$t_{10}$. At a point in time $t_2$, data ownership information 2710 with OSN 7 is generated. For example, the execution of the consensus protocol can be completed at time $t_2$ to render the resulting data ownership information. This particular version of the data ownership information may have been generated in response to a failure of memory drive 2440-2 of node 37-1 at time $t_0$. In this example, node 37-1 may have initiated the consensus protocol shortly after time $t_0$ in response to detecting the failure and/or before time $t_0$ in response to this outage being scheduled. Alternatively or in addition, another node 37 in the storage cluster may have detected the failure of the memory drive, for example, based on failing to retrieve data stored in this memory drive as part of a recovery scheme for recovering one of their owned virtual segments. Alternatively, the storage cluster may have otherwise determined to generate data ownership information 2710 with OSN 7 in response to this failure.

Figure 27D:
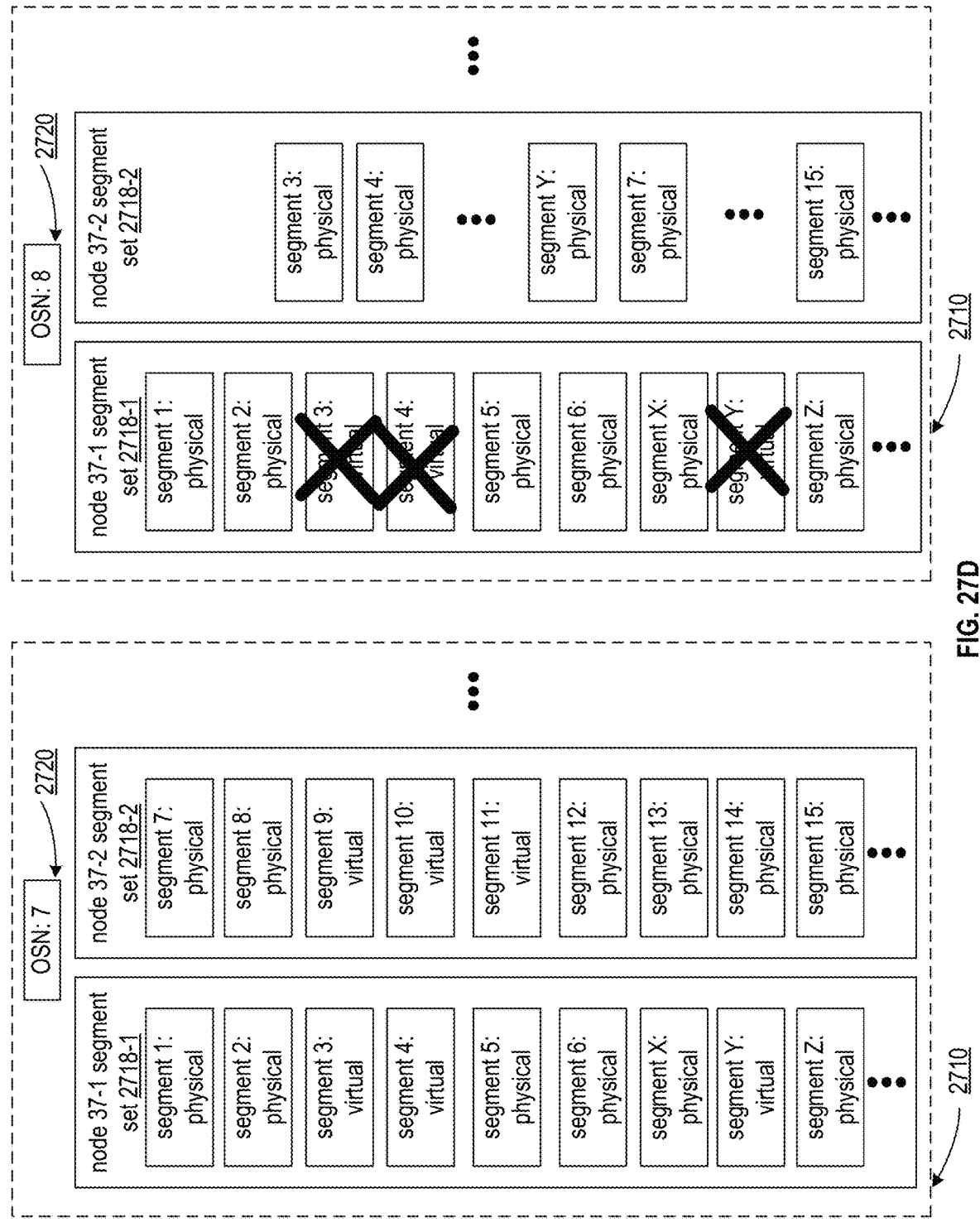
FIG. 27D illustrates an example embodiment of multiple versions of data ownership information in accordance with the present invention.

This failure of memory drive 2440-2 can correspond to the particular example discussed in conjunction with FIG. 25B, where data ownership information 2710 with OSN 7 indicates that node 37-1 maintains ownership of some or all of the segments of memory drive 2440-2, but the designation has changed to virtual segments as these segments are unavailable as physical segments. The data ownership information 2710 with OSN 7 of this example is illustrated in FIG. 27D. In particular, segments 3, 4, and Y, which were stored on 2440-2 of 37-1, are indicated as virtual segments, for example, changing from designation as physical segments owned by 37-1 in prior data ownership information 2710 with OSN 6.

Timeline 2740 of FIG. 27C indicates a span of time in which a full a rebuild of the memory drive 2440-2 of node 37-1 takes place to recover and store some or all segments of memory drive 2440-2 as physical segments in one or more memory drives of the segment storage of another node 37-2. For example, this is initiated at time $t_1$, for example, based on determining of the memory drive 2440-2 failed at time to. The execution of the consensus protocol for the data ownership information of OSN 7 may have been initiated before or after this full rebuild began. However, as the full rebuild is lengthy and/or because the full rebuild was not completed when the initiation of data ownership the consensus protocol for generating the data ownership information of OSN 7 occurred, the data ownership information of OSN 7 reflects that these segments are not available physically and assigns ownership as virtual segments.

Timeline 2740 also illustrates that after the full rebuild of memory drive 2440-2 is completed, a next version of data ownership information 2710 is generated, tagged to OSN 8. For example, the execution of the consensus protocol for this next version can be completed at time $t_7$ to render the resulting data ownership information. In this example, node 37-2 or another node of the storage cluster may have initiated this consensus protocol shortly after time $t_4$ in response to determining the full rebuild is completed and/or that the corresponding segments are again available as physical segments.

Data ownership information 2710 of OSN 8 reflects the availability of these segments as physical segments of segment storage 2442 of node 37-2 by indicating assignment of some or all of these newly rebuilt segments to node 37-2 as physical segments. For example, as illustrated in FIG. 27D, the data ownership information 2710 with OSN 8 indicates that segments 3, 4, and Y have been added to node 37-2's node segment set 2718-2 as physical segments. Furthermore, as segments cannot be owned by multiple nodes, these segments are removed from node 37-1's node segment set 2718-1. The "X"s indicated in FIG. 27D serve to illustrate the prior inclusion of these segments in node segment set 2718-1 of data ownership information 2710 with OSN 7 have been removed in the next revision, where segments 3, 4, and Y are not included in the node segment set 2718-1 of the data ownership information 2710 with OSN 8.

This example serves to illustrate how the tagging of OSNs to particular queries can ensure that, despite this timeline of changing data availability circumstances that could lead to confusion regarding which segments are owned by a node at particular times and more specifically, for different queries being executed by the node at the same time. This improves database systems by ensuring that, despite different concurrently running queries at a given time by a given node, and despite the concurrent, independent execution of each concurrently running query across multiple nodes in the storage cluster, query accuracy of every query is guaranteed because all nodes will utilize the same data ownership information for any given query, even if different ownership information is utilized at a particular time for different, corresponding concurrently running queries. Thus, different queries with different OSNs can be safely running in parallel by each of a set of multiple nodes.

A first query, query 1, can be executed by the storage cluster 35 from time $t_3$-$t_6$. Time $t_3$ can correspond to a time at which query 1 was received and/or at which at least one node initiated a partial execution of query 1. Time $t_6$ can correspond to a time at which execution of query 1 by all nodes in the storage cluster assigned to execute query 1 has completed. While execution spans of different nodes in the storage cluster may be different based on their own implementation of their segment scheduling module 2410, for the purposes of this example, assume that the time frame that both particular nodes 37-1 and 37-2 executed query 1 started between $t_2$ and $t_4$ and ended between $t_5$ and $t_7$.

A second and third query can similarly be executed by the storage cluster from times $t_5$-$t_9$ and times $t_8$-$t_{10}$, respectively. Again, for purposes of this example, assume that the time frame that both particular nodes 37-1 and 37-2 executed queries 2 and 3 started and ended substantially close to these times relative to other points illustrated in the timeline 2740 of this example. Also note that as illustrated, the execution of queries 1, 2, and 3 is overlapping, to reflect the concurrent execution of multiple queries implemented by the storage cluster and to further reflect the concurrent execution of multiple queries implemented by each node 37 in the storage cluster.

Figure 27E:
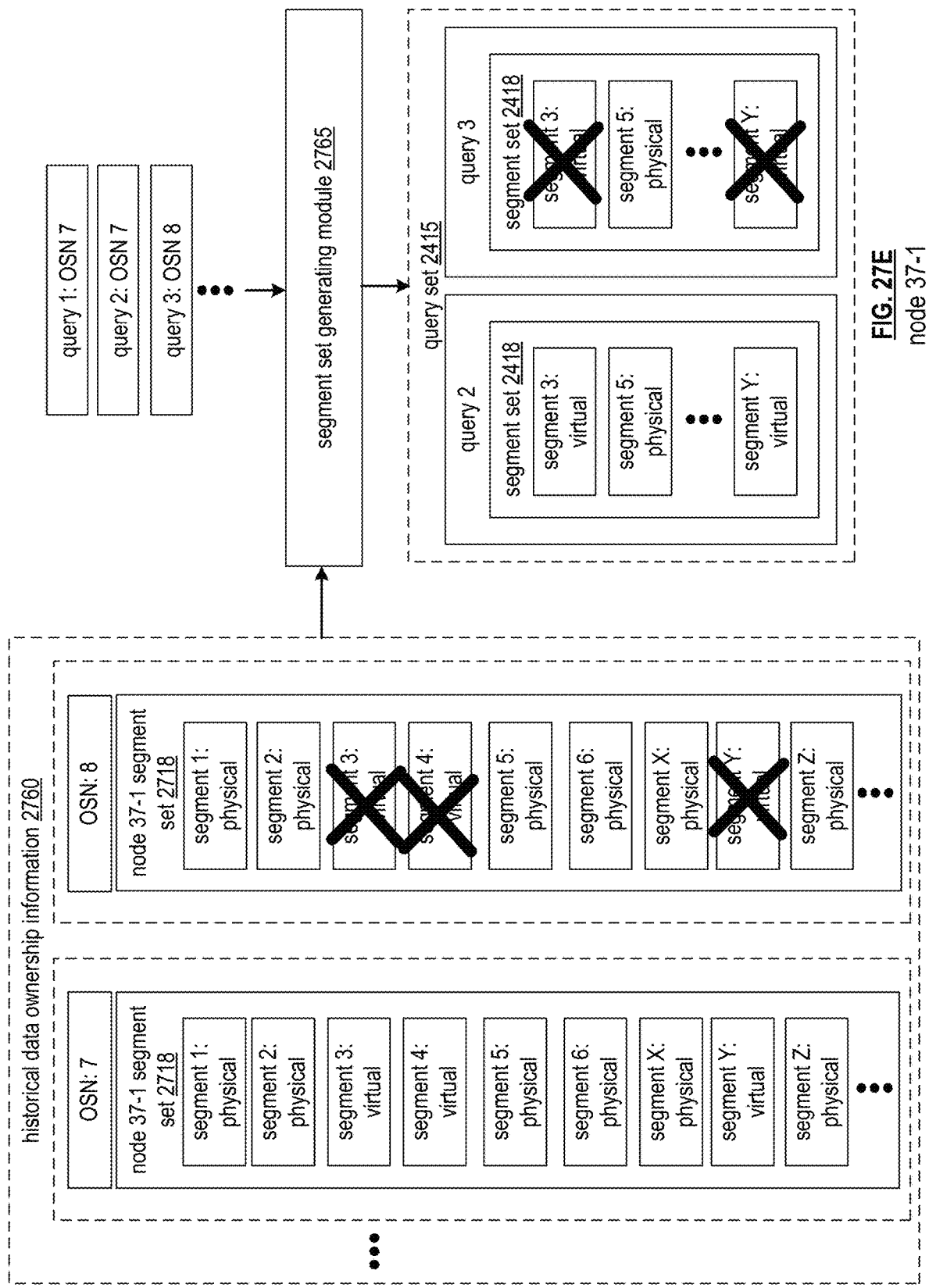
FIGS. 27E and 27F are schematic block diagrams of an embodiment of two example node that implement a segment set generating module in accordance with the present invention.
Figure 27F:
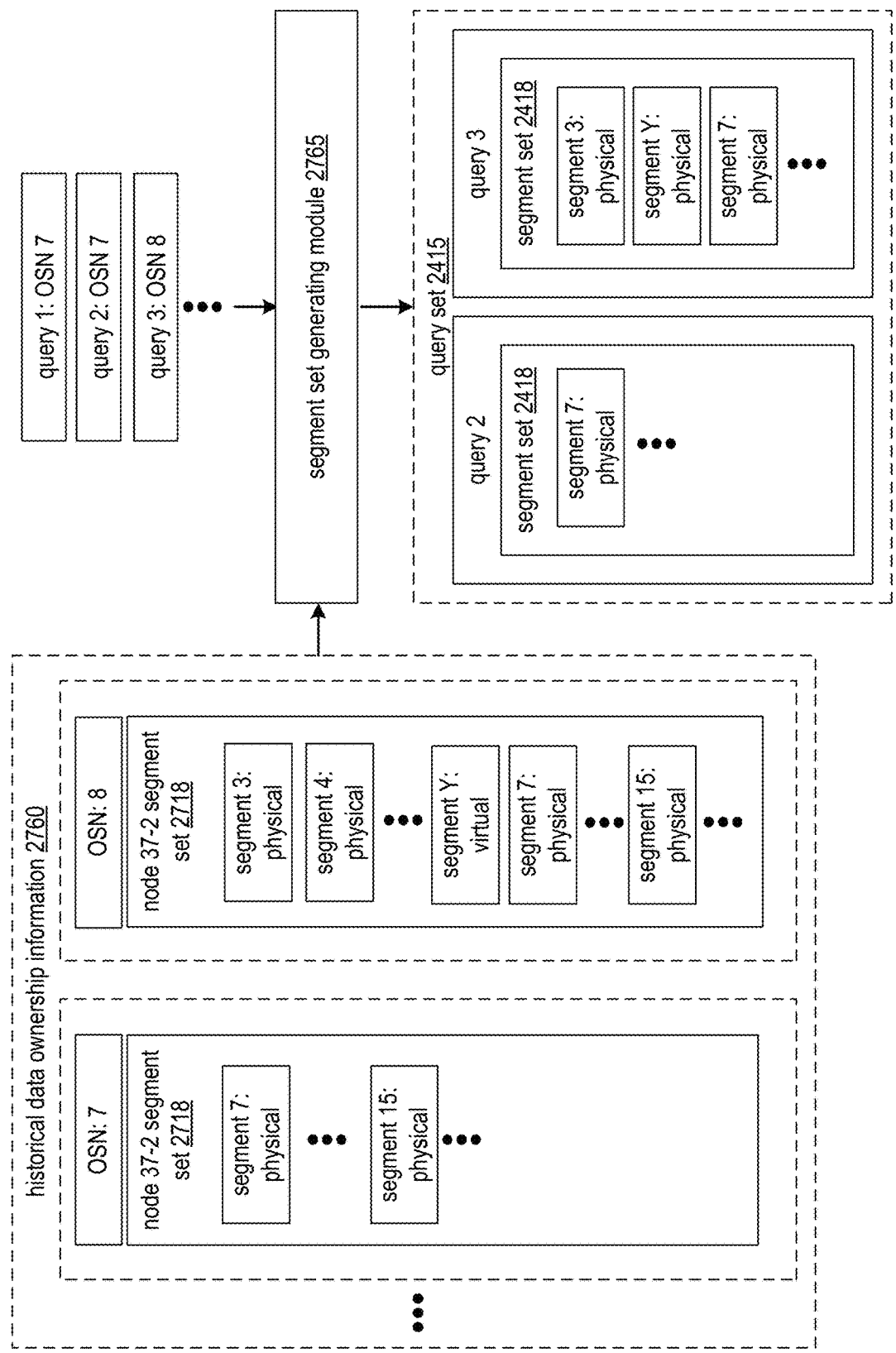

The execution of these queries by node 37-1 in accordance with determined OSNs for these queries is reflected in FIG. 27E, and the execution of these queries by node 37-1 in accordance with determined OSNs for these queries is reflected in FIG. 27F. FIGS. 27E and 27F illustrate nodes 37-1 and 37-2, respectively, that each implement a segment set generating module 2765. The segment set generating module 2765 can be implemented by any node 37 in the database system 10, for example, implemented by the segment scheduling module 2410 of the node and/or otherwise implemented utilizing at least one processing module of the node. The segment set generating module 2765 can be operable to generate some or all segment sets 2418 for corresponding queries 2405 of query set 2415 of the node that is utilized by the segment scheduling module 2410 to generate the segment processing selection data 2428 dictating the ordering in which segments of different queries will be processed by the node, as discussed in conjunction with FIG. 24A. The segment set generating module 2765 can be operable to update this query set 2415 as new queries are received for execution over time, where segment sets 2418 for each incoming query 2405 are generated by the segment set generating module 2765 for inclusion in query set 2415.

In particular the segment set generating module 2765 can determine the segment set for each incoming query based on the OSN assigned to and/or determined for each incoming query. For a given query with a corresponding tagged OSN, segment set generating module 2765 can access its node segment set 2718 in the data ownership information 2710 with the corresponding OSN. In particular, each node can access locally stored, retrievable, or otherwise determinable historical data ownership information 2760 that indicates a plurality of versions, such as a subset of all versions over time corresponding to the most recent versions still determined to be relevant and/or all versions historically. Alternatively, if incoming queries are assigned an OSN tag for the most recent data ownership information 2710, only the most recent data ownership information 2710 need be stored and/or retrievable, as the necessary information for prior data ownership information 2710 with prior OSNs can be already reflected in previously generated segment sets 2418 for other queries still being executed in accordance with older data ownership information 2710.

While not illustrated, the historical data ownership information can be represented as a plurality of (segment, OSN) pairs for the node. The segments of the node's node segment set 2718 in the data ownership information for a given OSN can be each be indicated in a corresponding set of (segment, OSN) pairs with the given OSN. In executing a query tagged with a given OSN, only segments included (segment, OSN) pairs that reflect the corresponding OSN are utilized. Thus, the node segment set for a given OSN is derived from and/or represented as all of the segments included in the node's (segment, OSN) pairs with the given OSN.

The particular node segment set 2718 in the data ownership information 2710 with the OSN tagged to an incoming query can be utilized to generate the segment set 2418 for this incoming query. In particular, the segment set 2418 of this incoming query must be a subset of the node segment set 2718 of the data ownership information 2710 with an OSN that matches that of the incoming query or otherwise compares favorably to the incoming query. In some cases, the segment set 2418 of this incoming query is only a proper subset of the corresponding node segment set 2718, for example, based on one or more nodes being determined not to be necessary to process the query and/or not being included in the query domain of the query. Filtering the node segment set 2718 to generate the corresponding segment set 2418 can include extracting information from the query itself to determine which particular proper subset of segments are required.

The OSN 2720 assigned to each query can be received by the node 37 in conjunction with receiving a request to execute the query and/or can be received in conjunction with the query itself, for example, where the OSN is generated by another entity of the database system 10 and/or of the corresponding storage cluster 35 and is sent to and/or accessible by all nodes executing the query in conjunction with information regarding the query for execution itself. The OSN of a given query can be alternatively determined by each node based on the query, for example, by comparing a timestamp of the query to timestamps associated with each of the plurality of versions, and selecting the most recent one of the plurality of OSN versions that has a corresponding timestamp indicating it was generated prior to the query and/or indicating it can be utilized on incoming queries after a particular point in time, such as $t_{i-1}$. The node can alternatively perform another deterministic function on a given query to determine the OSN assigned to the given query.

The mechanism utilized by a node to determine a query's OSN can be the same for all nodes in the storage cluster 35 to ensure that a given query executed by multiple nodes in the storage cluster 35 will assign a node the same OSN, thus ensuring a correct query result as each required segments will be read by a corresponding node, and as each required segment will be read by only one node.

Furthermore, if multiple storage clusters are required for execution of a query, nodes in different clusters will thus assign a given query different OSNs for corresponding different data ownership information of their storage cluster. However, despite different storage clusters being on different revisions of their data ownership data and mediating their data ownership data separately, query correctness can still be guaranteed where each required segment is read once and exactly once so long as nodes in the same storage cluster each utilize the same one of their revised data ownership information 2710 for the query, and so long as each storage cluster maintains ownership of their own fixed, full set of nodes in their set of revisions over time.

The generation of segment sets 2418 based on an OSN determined for the query to adhere to a corresponding version of the data ownership information ensures that a particular version of the data ownership information is used by every node in the storage cluster for execution of the query, and persists for the life of the query regardless of new versions of the data ownership information that are determined while the query is executing and/or regardless of changes in storage circumstances while the query is executing.

In particular, in this example, all nodes in the storage cluster, including nodes 37-1 and 37-2, determine to execute query 1 by utilizing the data ownership information with OSN 7, to execute query 2 by utilizing the data ownership information with OSN 7, and to execute query 3 utilizing the data ownership information with OSN 8. These determination of OSNs tagged to each query can be based on determining that the most recent OSN when each query was received and/or began executing. Queries 1 and 2 were received and/or began executing with data ownership information with OSN 7 being the most recent, as illustrated in timeline 2740 of FIG. 27C, and are tagged with OSN accordingly. The data ownership information was updated to the data ownership information with OSN 8 prior to receiving and/or initiating execution of query 3, so query 3 can be tagged to OSN 8.

Despite the full rebuild of segments of memory drive 2440-2 during query 1's execution, all nodes will maintain utilization of OSN 7 for the entirety of query 1's execution, and thus virtual segments of this memory drive will still be utilized by node 37-1 for the entirety of query 1's execution, and node 37-2 will not utilize these segments, despite being rebuilt and available to node 37-2, for its own execution of query 1.

Assume in this example that queries 2 and 3 require utilization of identical segments, and thus, if executed by the same node with the same OSN, would have identical segment sets 2418 for that node. However, in this example, each of these queries are tagged to different OSNs, and thus have different segment sets. As illustrated in FIG. 27E, for query 2, node 37-1 utilizes a segment set 2418 with segments 3, 4, and Y included as virtual segments, but these segments are not included in node 37-1's segment set 2418 for query 3, based on these nodes being included in node 37-1's node segment set 2718 for OSN 7, but not OSN 8, and based on query 2 being executed under OSN 7 and query 3 being executed under OSN 8.

Meanwhile, as illustrated in FIG. 27F, for query 2, node 37—utilizes a segment set 2418 that does not include segments 3, 4, and Y, but these segments are not included in node 37-2's segment set 2418 for query 3, based on these nodes being included in node 37-2's node segment set 2718 for OSN 8, but not OSN 7, and based on query 2 being executed under OSN 7 and query 3 being executed under OSN 8. In particular, despite segments 3, 4, and Y being available as physical segments to node 37-2 prior to query 2 being executed, these segments are not utilized for execution of query 2 because it is tagged to OSN 7 as the new data ownership information is not yet generated. Furthermore, despite the new ownership information with OSN 8 being generated during query 2's execution, both node's 37-1 and 37-2, as well as all other nodes in the storage cluster, will maintain utilization of OSN 7 for query 2 for the remainder of query 2's execution. Finally, note that in a period temporal period that includes the time span from $t_8$-$t_9$, nodes 37-1 and 37-2 are each concurrently executing multiple queries by utilizing different OSNs for these multiple queries during this temporal, where query 2 is being executed during the time span from $t_8$-$t_9$ utilizing prior data ownership information with OSN 7, and where query 3 is concurrently being executed during the time span from $t_8$-$t_9$ utilizing updated data ownership information with OSN 8.

Figure 27G:
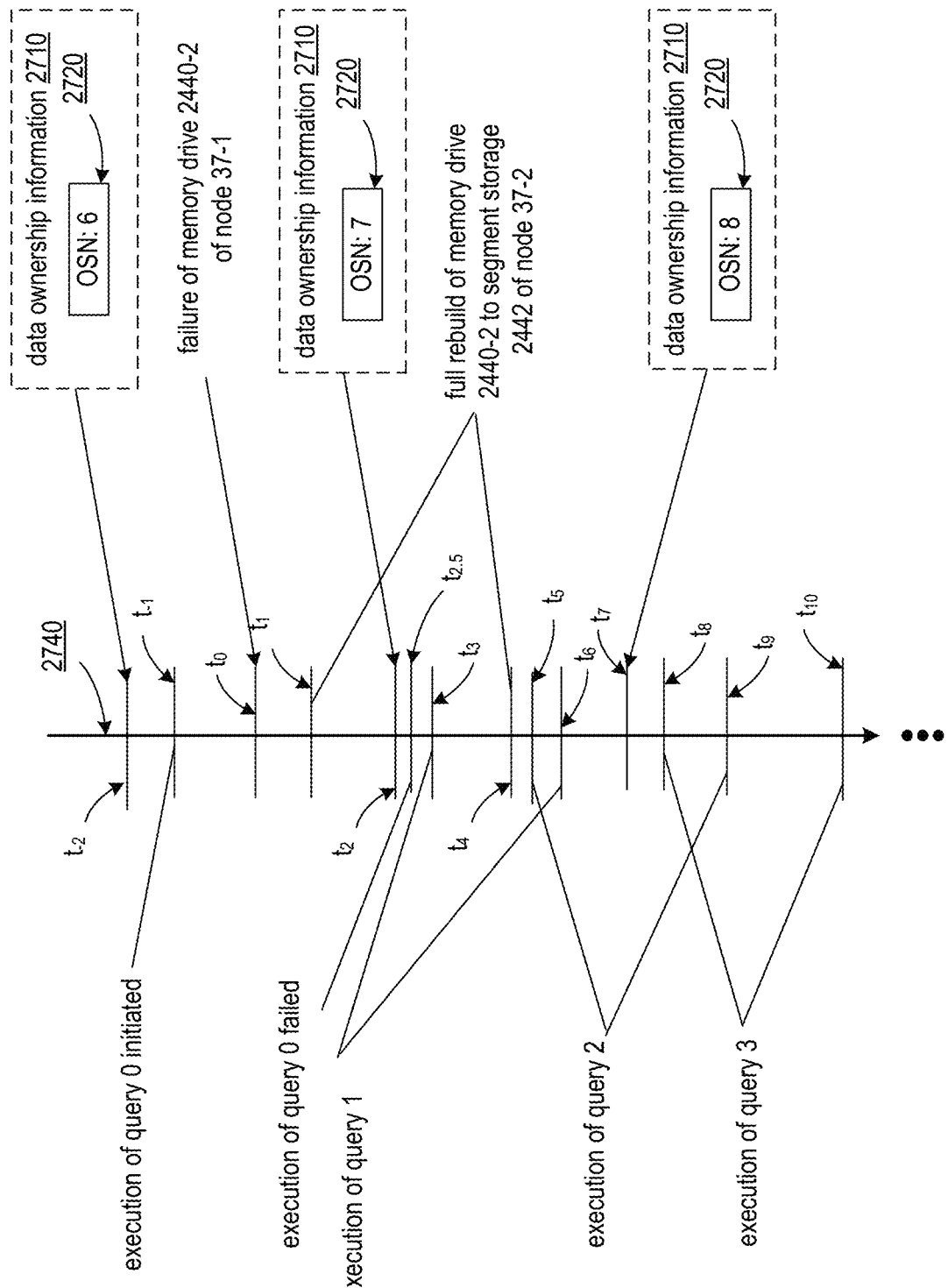
FIG. 27G illustrates an example timeline of execution of a plurality of queries in accordance with the present invention.
Figure 27H:
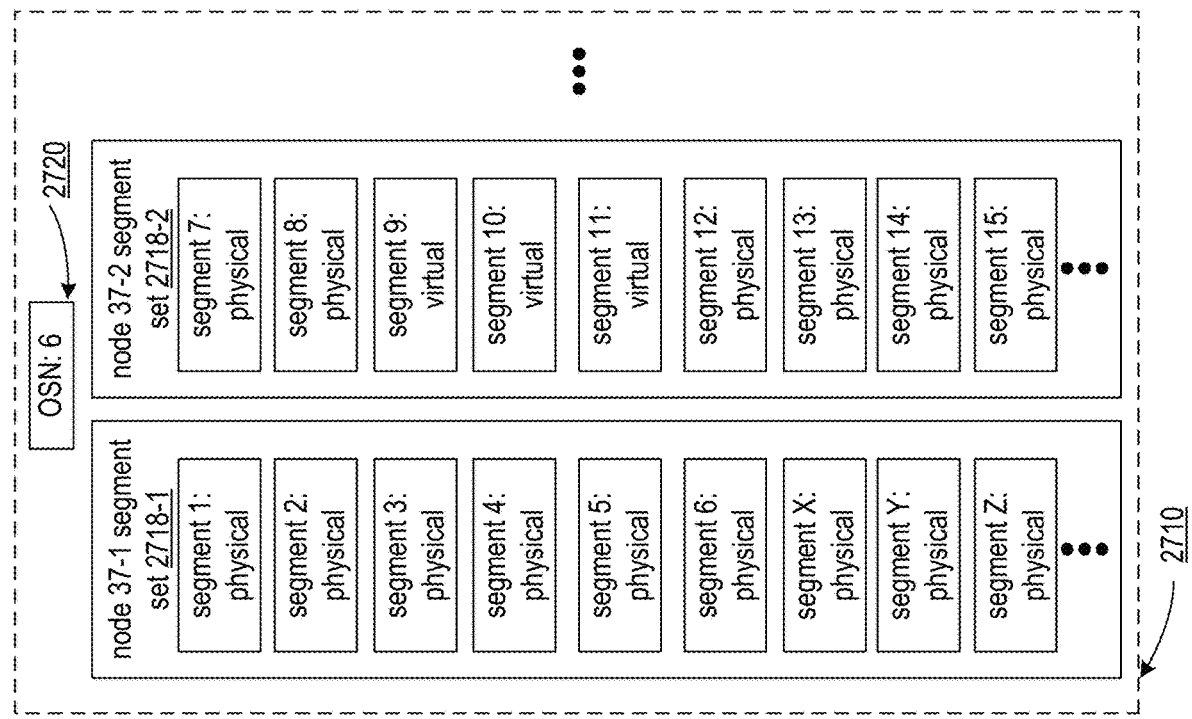
FIG. 27H illustrates an example embodiment of a version of data ownership information in accordance with the present invention.
Figure 27I:
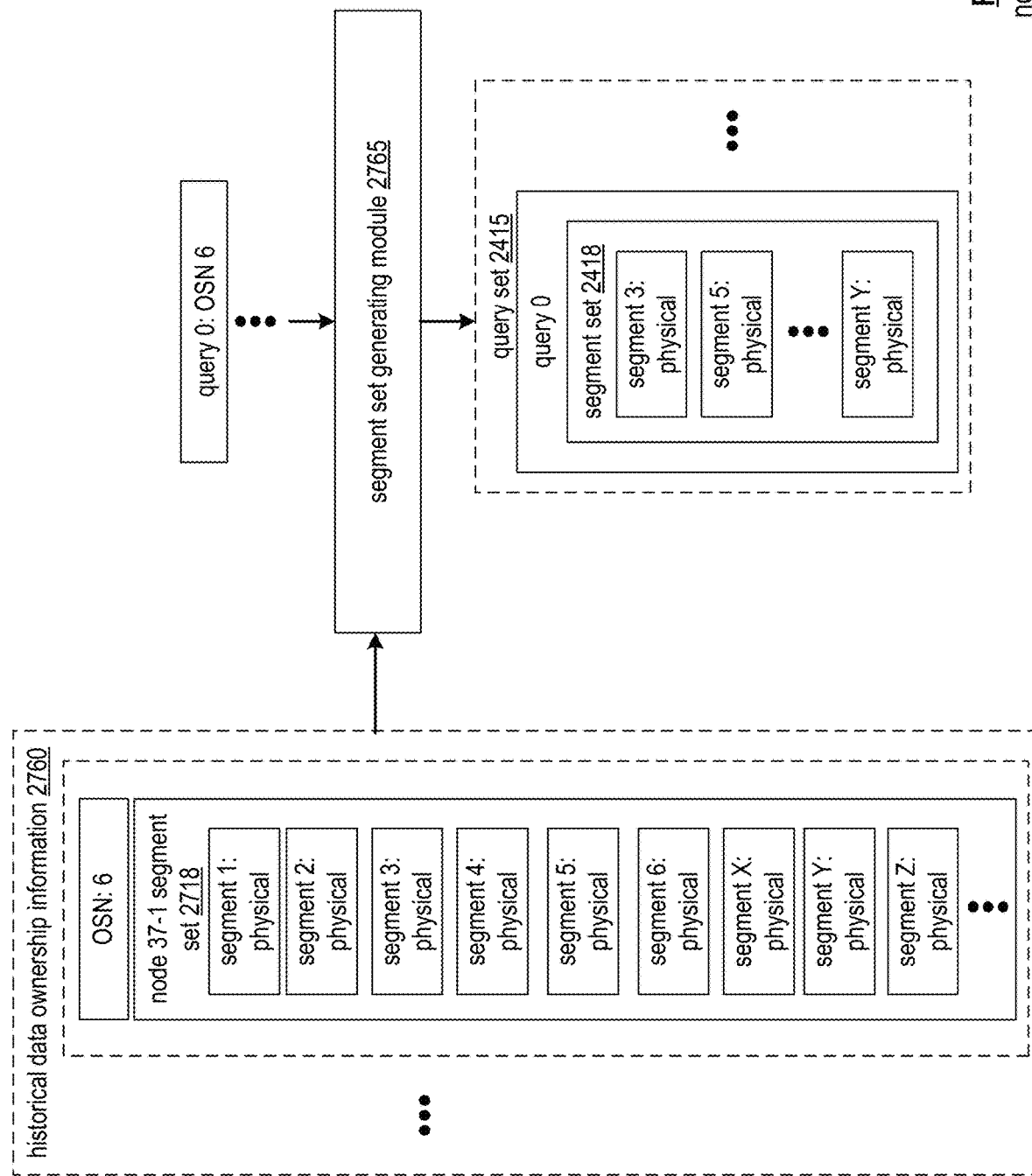
FIGS. 27I and 27J are schematic block diagrams of an example embodiment a node that implement a segment set generating module in accordance with the present invention.

FIGS. 27G-27J illustrate an extension of the example of FIGS. 27C-27F. As illustrated in FIG. 27G prior to $t_0$, data ownership information 2710 with OSN 6 is determined at $t_{-2}$, and where a query 0 is initiated at $t_{-1}$ utilizing OSN 6. Data ownership information 2710 with OSN 6 is illustrated in FIG. 27G. In particular, node 37-1 owns segments of memory v, including segments 3, 4, and Y, as physical segments, for example, based on the storage cluster determining, during execution of the corresponding consensus protocol, that these nodes are available as physical segments stored in memory drive 2440-2 of node 37-1's segment storage 2442, based on the failure at to not having yet occurred. As illustrated in FIG. 27I, node 37-1 generates the segment set for query 0 in accordance with OSN 6, where segments 3 and Y are included as physical segments.

However, due to the failure of memory drive 2440-2, for example, prior to retrieval of segment 3 or segment Y by node 37-1 to execute query 0, the node 37-1 indicates failure in continuing to execute query 0. This can be communicated across the storage cluster and/or the database system to halt other executions by other nodes of query 0 or to otherwise not return a resultant of the query due to the execution of query 0 by node 37-1 failing. The time of failure is indicated in timeline 2740 as $t_{2.5}$, but can alternatively be any time after $t_0$. In general, nodes 37 can abort and/or indicate failure of any queries they execute that cannot be executed in accordance with the data ownership information assigned to them. In particular, in this example, node 37-1 has already determined new data ownership information OSN 7 prior to this error occurring. However, rather than attempting to continue execution the query via utilization of the virtual segments indicated in OSN 7, execution of the query is aborted, as utilization of OSN 7 mid-query can cause other conflicting ownership problems that could render the query incorrect, and/or the correctness of the query resultant is not guaranteed if the node were to change data ownership information version being utilized for the query after its begun executing under a prior version.

In this example, query 1 can correspond to a re-execution of query 0, and thus query 0 can be re-executed as query 1 by the nodes in the storage cluster based on receiving the updated data ownership information 2710 and based on execution of query 0 previously being aborted. Query 0 is re-executed as query 1 in accordance with OSN 7. This is acceptable, as all nodes in the storage cluster will re-execute query 0 as query 1 under the same data ownership information, and execution of query 1 under OSN 7 is maintained by all nodes including node 37-1 for the duration of query 1's execution.

Figure 27J:
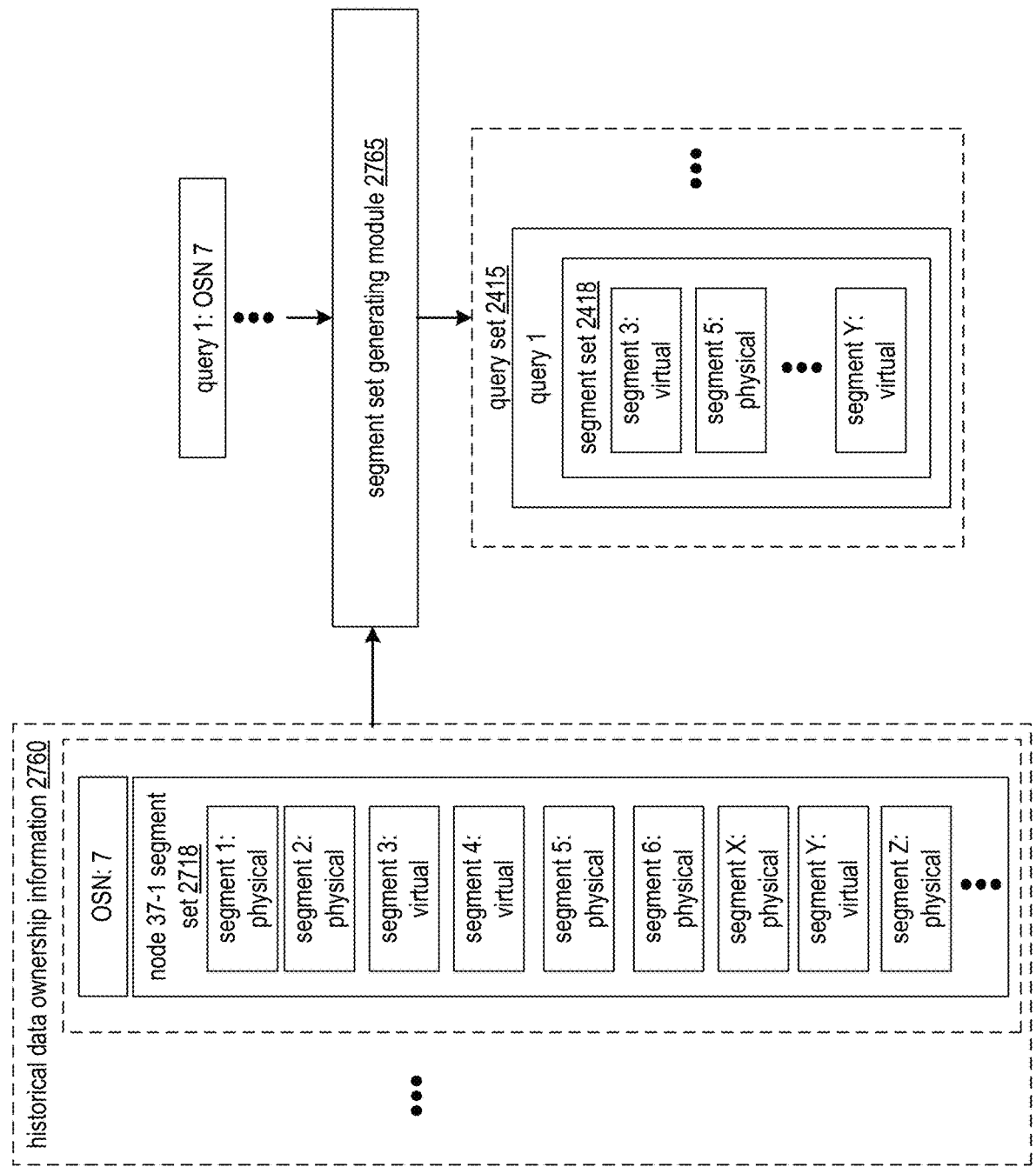

As illustrated in FIG. 27J, query 1 is determined to be executed by node 37-1 and is tagged to OSN 7. Query 1 is included in the query set with segments 3 and Y indicated as virtual segments based on the data ownership information of OSN 7. As segments 3 and Y can be recovered via the recovery scheme in response to being indicated for processing as virtual segments, in this example, execution of query 1 does not fail and its execution is completed at time $t_6$. Thus, query 0 is ultimately executed by the storage cluster when it is re-executed as query 1 with the data ownership information of OSN 7.

In various embodiments, a node of a computing device has at least one processor and memory that stores executable instructions that, when executed by the at least one processor, cause at least one processing module of the node to determine first data ownership information via participation in a first execution of a consensus protocol mediated with a plurality of other nodes in a storage cluster that includes the node. The first data ownership information indicates a first ownership sequence number. The first data ownership information further indicates the node's ownership of a first subset of a set of segments, where the set of segments is in a segment group stored by the plurality of nodes in the storage cluster. The executable instructions, when executed by the at least one processor, further cause the least one processing module of the node to determine second data ownership information via participation in a second execution of the consensus protocol mediated with the plurality of other nodes in the storage cluster. The second data ownership information indicates a second ownership sequence number that is different from the first ownership sequence number. The second data ownership information further indicates the node's ownership of a second subset of the set of segments, and where a set difference between the first subset and the second subset is non-null. The at least one processing module of the node receives a first query for execution and determines an ownership sequence number tag for the first query that indicates the value of the first ownership sequence number. The at least one processing module of the node facilitates execution of the first query by utilizing the first subset of the set of segments based on determining the ownership sequence number tag of the first query indicates the value of the first ownership sequence number.

Figure 27K:
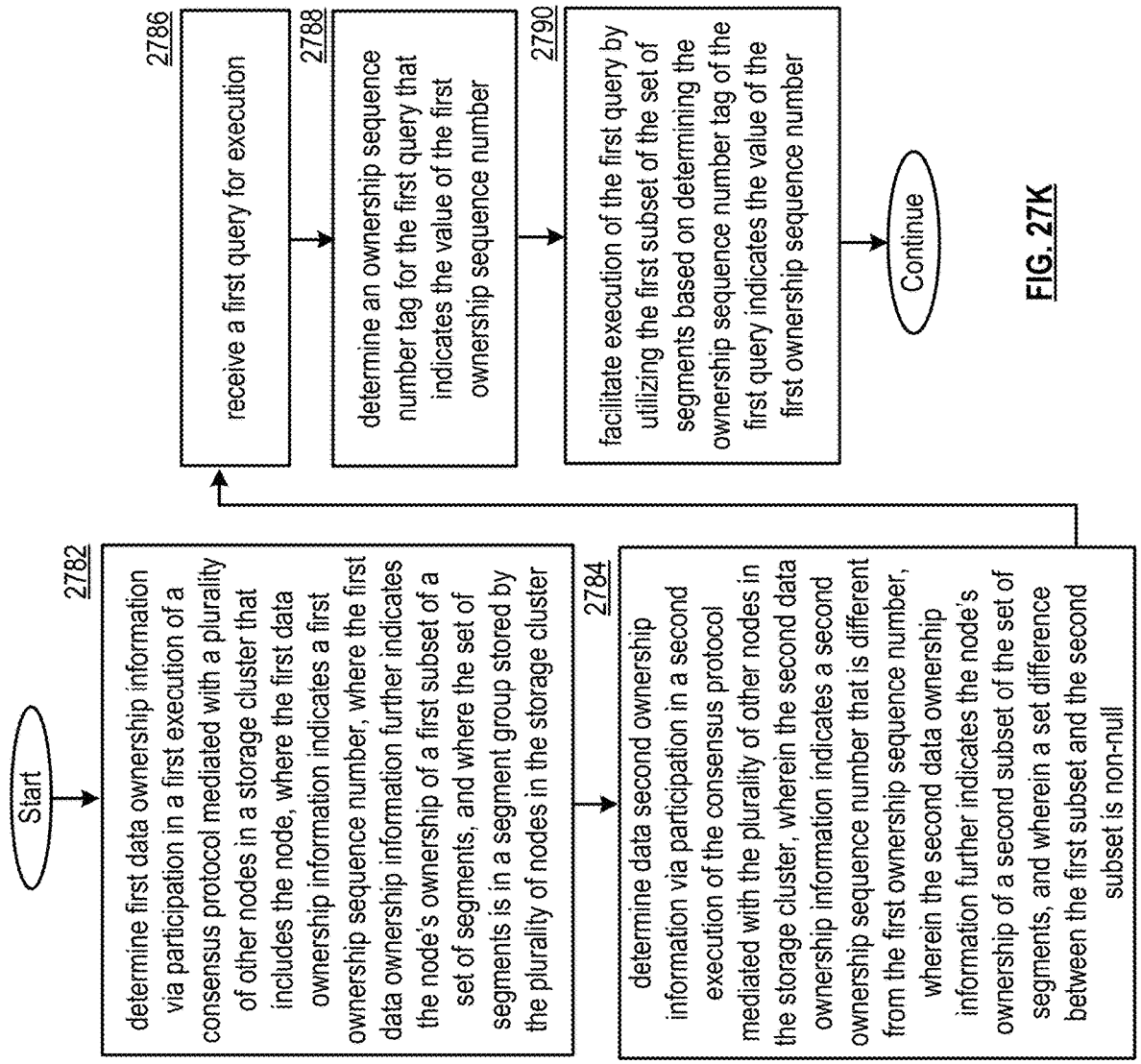
FIG. 27K is a logic diagram illustrating a method of executing a query based on a corresponding ownership sequence number in accordance with the present invention.

FIG. 27K illustrates a method for execution by a node 37. For example, the node can utilize at least one processing module of the node 37 to execute operational instructions stored in memory accessible by the node, where the execution of the operational instructions causes the node 37 to execute the steps of FIG. 27K. The method of 27K can be performed by a node 37 in accordance with embodiments of node 37 discussed in conjunction with FIGS. 27A-27J, and/or in conjunction with other embodiments of node 37 discussed herein.

Step 2782 includes determining first data ownership information via participation in a first execution of a consensus protocol mediated with a plurality of other nodes in a storage cluster that includes the node. The first data ownership information indicates a first ownership sequence number. The first data ownership information further indicates the node's ownership of a first subset of a set of segments, where the set of segments is in a segment group stored by the plurality of nodes in the storage cluster.

Step 2784 includes determining second data ownership information via participation in a second execution of the consensus protocol mediated with the plurality of other nodes in the storage cluster. The second data ownership information indicates a second ownership sequence number that is different from the first ownership sequence number. The second data ownership information further indicates the node's ownership of a second subset of the set of segments, where a set difference between the first subset and the second subset is non-null;

Step 2786 includes receiving or otherwise determining a first query for execution. Step 2788 includes determining an ownership sequence number tag for the first query that indicates the value of the first ownership sequence number. Step 2790 includes facilitating execution of the first query by utilizing the first subset of the set of segments based on determining the ownership sequence number tag of the first query indicates the value of the first ownership sequence number.

In various embodiments, the set difference between the first subset and the second subset is based on a migration of at least one segment in the segment group and/or a failure of a memory drive that stores at least one segment in the segment group. In various embodiments, the second data ownership information is determined more recently than the first data ownership information, and the values of the first ownership sequence number and the second ownership sequence number indicate the second data ownership information is more recent than the first data ownership information. In various embodiments, the first data ownership information indicates that at least one of the first set of the set of segments be accessed by the node as a physical segment, and the ownership information indicates that at least one of the first set of the set of segments be accessed by the node as a virtual segment.

In various embodiments execution of the first query is facilitated by the node during a temporal period. The temporal period begins prior to determining the second data ownership information, and the temporal period ends after determining the second data ownership information. In various embodiments, determining the ownership sequence number tag of the first query includes assigning the value of the first ownership sequence number to the ownership sequence number tag of the first query in response to receiving the first query based on determining the first data ownership information is the most recently determined data ownership information of a plurality of previously determined data ownership information.

In various embodiments, the first query is received and/or determined for execution by some or all of the plurality of other nodes in the storage cluster. Each of this the plurality of other nodes that received the first query can determine the ownership sequence number tag for the first query that indicates the value of the first ownership sequence number. Each of this plurality of other nodes utilize the first data ownership information to execute the query based on determining the ownership sequence number tag for the first query that indicates the value of the first ownership sequence number.

In various embodiments, the first query is received in a query request, and determining the ownership sequence number tag for the first query is based on extracting the ownership sequence number tag for the first query from the query request. In various embodiments, another processing module of the database system assigns the first ownership sequence number to the ownership sequence number tag of the first query, for example, in response to receiving the first query, based on determining the first data ownership information is the most recently determined data ownership information of a plurality of previously determined data ownership information. This another processing module can assign and/or send the first query, for example, by generating the query request indicating the first query and the ownership sequence number tag indicating the first ownership sequence number. The query request can be sent by the another processing module to some or all of the plurality of nodes of in storage cluster that includes the node. The node, as and/or the other nodes receiving the query request, can determine the ownership sequence number tag of the first query based on receiving the ownership sequence number tag assigned to the first query in the query request received from the another processing module.

In various embodiments, each of the plurality of other nodes determine the first data ownership information via their participation in the first execution of the consensus protocol. In various embodiments, the first data ownership information indicates a plurality of subsets of the set of segments, where each subset in the plurality of subsets is mutually exclusive and collectively exhaustive with respect to the set of segments. The first data ownership information can indicate each node in the plurality of other node is mapped to ownership of exactly one of the plurality of subsets. Each subset in the plurality of subsets can be mapped to exactly one of: one of the plurality of other nodes or the node itself.

In various embodiments, the method includes receiving a second query request indicating a second query for execution, where the second query request includes an ownership sequence number tag that indicates the value of the second ownership sequence number. The method further includes facilitating execution of the second query by utilizing the second subset of the set of segments based on determining the ownership sequence number tag of the second query indicates the value of the second ownership sequence number. In various embodiments, execution of the first query is facilitated by the node within a first temporal period, and execution of the second query is facilitated by the node within a second temporal period. In various embodiments, an overlap and/or intersection between the first temporal period and the second temporal period is non-null.

In various embodiments, facilitating execution of the first query by utilizing the first subset of the set of segments includes utilizing only segments in the first subset of the set of segments to facilitate execution of the first query. In various embodiments, segments of the set of segments that are included in the set difference and that are further included in the second subset are not utilized by the node in facilitating execution of the first query. In various embodiments, facilitating execution of the first query by utilizing the first subset of the set of segments further includes utilizing every segment in the first subset of the set of segments to facilitate execution of the first query. In various embodiments facilitating execution of the first query by utilizing the first subset of the set of segments further includes selecting a proper subset of the first subset of the set of segments based on identifying only segments of the first subset of the set of segments that are required for execution of the first query and by further identifying every segment of the first subset of the set of segments that are required for execution of the first query every. Facilitating execution of the first query by utilizing the first subset of the set of segments includes only utilizing this selected proper subset of the first subset of the set of segments to execute the first query.

In various embodiments, the method further includes determining at least one segment in the first subset of the set of segments is unavailable to the node. The method further includes terminating and/or aborting execution of the first query based on determining the at least one segment in the first subset of the set of segments is unavailable to the node. The method further includes sending a query error message indicating the termination of execution of the first query, for example, for receipt by other nodes in the storage cluster. In various embodiments, one other one of the plurality of other nodes facilitates execution of the first query utilizing a second subset of the set of segments that is distinct from the first subset of the set of segments, and a final query result of the query is not generated based on the query error message.

In various embodiments, the method includes receiving an error message generated by another node in the storage cluster, for example, where the another node generates the error message based on the another node being unable to access at least one segment in the one of the plurality of subsets mapped to the another node in the first data ownership information. The method further includes determining to abort execution of the first query and/or to forego transmission of a query resultant generated for the first query based on receiving the error message.

In various embodiments the method includes facilitating re-execution of the first query by determining an updated ownership sequence number tag for the first query that indicates the value of the second ownership sequence number, and by utilizing the second subset of the set of segments based on determining the updated ownership sequence number tag for the first query that indicates the value of the second ownership sequence number. For example, the method can include determining to facilitate the re-execution of the first query based on previous failure, aborting, and/or termination of the first query. The method includes determining re-execution of the first query is successful based on determining all of the segments in the second subset of the set of segments are available to the node. In various embodiments, the least one segment in the first subset of the set of segments is unavailable to the node during the re-execution of the first query, and the re-execution of the first query is successful based on the second subset not including the at least one segment.

In various embodiments, the least one segment in the first subset of the set of segments is indicated as at least one corresponding physical segment, for example, based on being determined to be available to the node as a physical segment in the first execution of the consensus protocol. The at least one segment in the second subset of the set of segments is indicated as at least one corresponding virtual segment based on the at least one segment in the first subset of the set of segments being determined unavailable to the node as the at least one corresponding physical segment, for example, in the second execution of the consensus protocol.

Re-execution of the first query can include performing a rebuilding function to utilize the at least one corresponding virtual segment.

In various embodiments, a non-transitory computer readable storage medium includes at least one memory section that stores operational instructions that, when executed by a processing module that includes a processor and a memory, cause the processing module to determine first data ownership information via participation in a first execution of a consensus protocol, where the first data ownership information indicates a first ownership sequence number and further indicates ownership of a first subset of a set of segments. The set of segments is in a segment group stored by a storage cluster. The operational instructions, when executed by the processing module, further causes the processing module to determine second data ownership information via participation in a second execution of the consensus protocol, where the second data ownership information indicates a second ownership sequence number that is different from the first ownership sequence number. The second data ownership information further indicates the node's ownership of a second subset of the set of segments, where a set difference between the first subset and the second subset is non-null. The processing module receives a first query for execution and determines an ownership sequence number tag for the first query that indicates the value of the first ownership sequence number. The processing module facilitates execution of the first query by utilizing the first subset of the set of segments based on determining the ownership sequence number tag of the first query indicates the value of the first ownership sequence number.

Figure 28A:
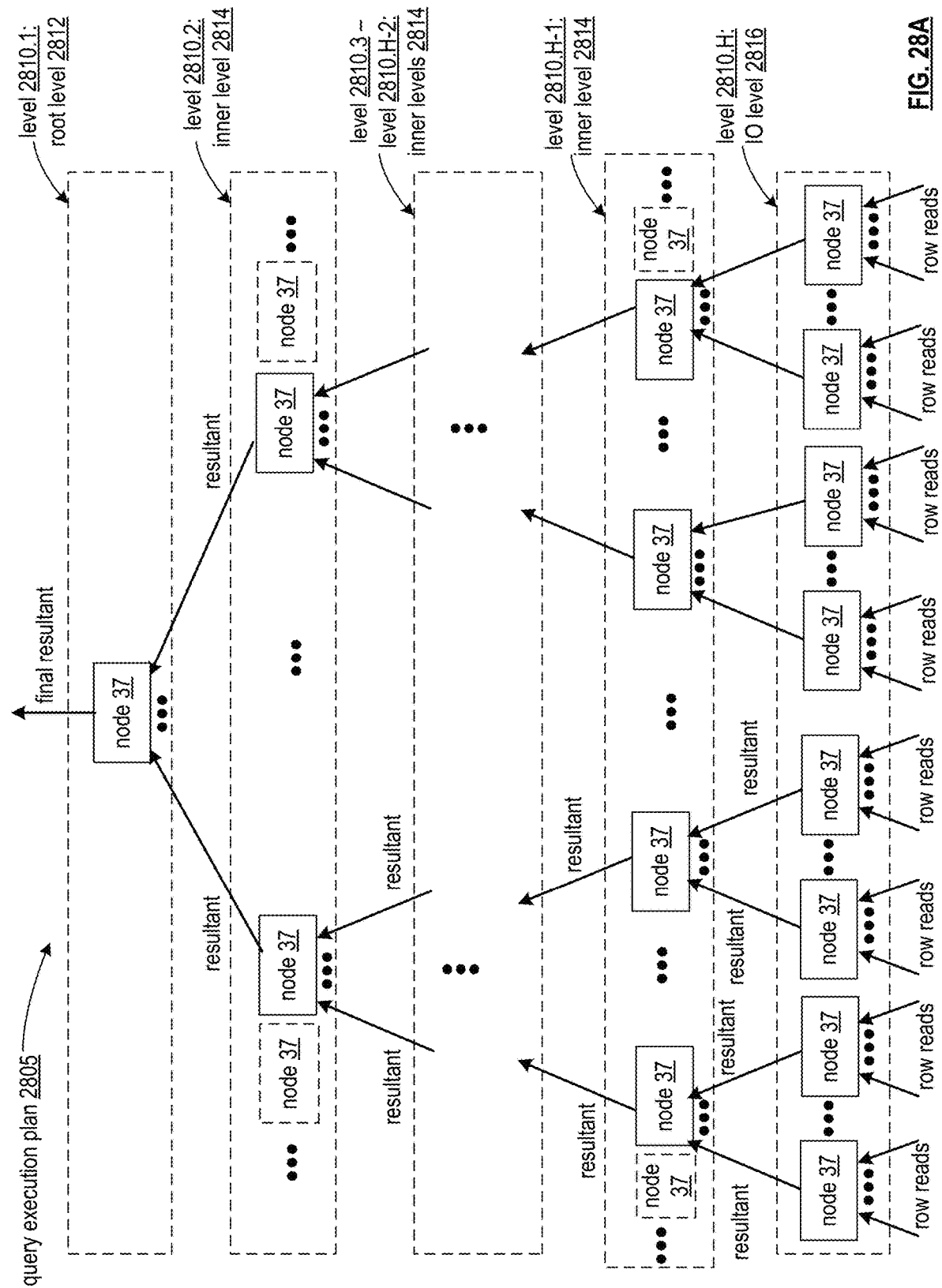
FIG. 28A is a schematic block diagram of an embodiment of a query execution plan in accordance with the present invention.

FIGS. 28A-28M illustrate example embodiments where a node 37 is operable to determine one or more levels of a query execution plan 2805 to which it is assigned to execute incoming queries, and to further determine, for different incoming queries which levels of its assigned set of levels in which it will participate to execute the incoming queries. The mechanisms utilized by nodes 37 in the database system 10 determining this level assignment information as discussed in conjunction with FIGS. 28A-28M can be the same as or similar to the mechanisms for determining data ownership information 2710 as discussed in conjunction with FIGS. 27A-27L. Furthermore, level assignment information can change over time in a same or similar fashion as discussed in conjunction with changes in the data ownership information 2710, for example, via multiple nodes execution of a corresponding consensus protocol. The embodiments illustrated in 28A-28M can be utilized to implement some or all of the plurality of nodes 37 of some or all computing devices 18-1-18-$n$, for example, of the of the parallelized data store, retrieve, and/or process sub-system 12, and/or of the parallelized query and results sub-system 13. The embodiments of node 37 discussed in conjunction with FIGS. 28A-28M can be utilized to implement any other nodes 37 of database system 10 discussed herein. T FIG. 28A illustrates an example of a query execution plan 2805 implemented by the database system 10. The query execution plan can include a plurality of levels 2810. In this example, a plurality of H levels in a corresponding tree structure of the query execution plan 2805 are included. The plurality of levels can include a top, root level 2812; a bottom, IO level 2816, and one or more inner levels 2814. In some embodiments, there is exactly one inner level 2814, resulting in a tree of exactly three levels 2810.1, 2810.2, and 2810.3, where level 2810.H corresponds to level 2810.3. In such embodiments, level 2810.2 is the same as level 2810.H-1, and there are no other inner levels 2810.3-2810.H-2. Alternatively, any number of multiple inner levels 2814 can be implemented to result in a tree with more than three levels.

This illustration of query execution plan 2805 illustrates the flow of execution of a given query by utilizing only a proper subset of nodes across some or all of the levels 2810. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included, as discussed in further detail herein.

Each of the nodes of IO level 2816 can be operable to, for a given query, perform the necessary row reads for gathering corresponding rows of the query. These row reads can correspond to the segment retrieval discussed herein as physical segments or virtual segments to read some or all of the rows of retrieved segments determined to be required for the given query. Thus, the nodes 37 in level 2816 can include any nodes 37 with functionality discussed in conjunction with FIGS. 24A-27L to retrieve segments for query execution; to determine whether to retrieve segments as physical or virtual segments; and/or to determine which exact set of segments is assigned to the node for retrieval to ensure queries are executed correctly.

IO level 2816 can include all nodes in a given storage cluster 35 and/or can include some or all nodes in multiple storage clusters 35, such as all nodes in a subset of the storage clusters 35-1-35-$z$ and/or all nodes in all storage clusters 35-1-35-$z$. For example, all nodes 37 and/or all currently available nodes 37 of the database system 10 can be included in level 2816. As another example, IO level 2816 can include a proper subset of nodes in the database system, such as some or all nodes that have access to segment storage 2442 and/or that are included in a segment set 35. In some cases, nodes 37 that are not included in segment sets, that do not have access to segment storage 2442, and/or that are not operable to perform row reads are not included at the IO level, but can be included at one or more inner levels 2814 and/or root level 2812.

The query executions discussed herein by nodes in accordance with executing queries at level 2816 can include retrieval of segments; extracting some or all necessary rows from the segments with some or all necessary columns; and sending these retrieved rows to a node at the next level 2810.H-1 as the query resultant generated by the node 37. For each node 37 at IO level 2816, the set of raw rows retrieved by the node 37 can be distinct from rows retrieved from all other nodes, for example, based on the segment assignment discussed in conjunction with FIGS. 27A-27L, to ensure correct query execution.

Each inner level 2814 can include a subset of nodes 37 in the database system 10. Each level 2814 can include a distinct set of nodes 37 and/or some or more levels 2814 can include overlapping sets of nodes 37. The nodes 37 at inner levels are implemented, for each given query, to execute queries in conjunction with operators for the given query. For example, a query plan can be generated for a given incoming query, where an ordering of execution of its operators is determined, and this ordering is utilized to assign one or more operators to each node in a given inner level 2814 for execution, for example, as operator data 2416 of its queries in query set 2415 of the node. For example, each node at a same inner level can be operable to execute a same set of operators for a given query, in response to being selected to execute the given query, upon incoming resultants generated by nodes at a directly lower level to generate its own resultants sent to a next higher level. In cases where there is exactly one inner level, each node selected to execute a query at a given inner level performs some or all of the given query's operators upon the raw rows received as resultants from the nodes at the IO level. In some cases, some operators beyond row reads are also performed by the nodes at the IO level. Each node at a given inner level 2814 can further perform a gather function to collect, union, and/or aggregate resultants sent from a previous level, for example, in accordance with one or more corresponding operators of the given query.

The root level 2812 can include exactly one node for a given query that gathers resultants from every node at the top-most inner level 2814. The node 37 at root level 2812 can perform additional query operators of the query and/or can otherwise collect, aggregate, and/or union the resultants from the top-most inner level 2814 to generate the final resultant of the query, which includes the resulting set of rows and/or one or more aggregated value, in accordance with the query, based on being performed on all rows requested by the query. The root level node can be selected from a plurality of possible root level nodes, where different root nodes are selected for different queries. Alternatively, the same root node can be selected for all queries.

As will be discussed in further detail herein, each level can include a possible set of nodes assigned to process queries at the given level. For a given query, a subset of nodes at some or all levels will be selected to process the given query, where different sets nodes are selected to process different queries. In particular, a proper subset of nodes at each inner level will be selected to process a given query, and different proper subsets are selected for different queries. The nodes at the corresponding lower level can independently which selected node for the next level will process their resultant for the given query, where nodes at the corresponding lower level select their parent node from a plurality of possible parent nodes in the corresponding inner level to which their resultant is sent for processing. Each selected parent node thus receives resultants from a plurality of corresponding child nodes that selected the parent node for processing at the next level.

As depicted in FIG. 28A, resultants are sent by nodes upstream with respect to the tree structure of the query execution plan as they are generated, where the root node generates a final resultant of the query. While not depicted in FIG. 28A, nodes at a same level can share data and/or send resultants to each other, for example, in accordance with operators of the query at this same level dictating that data is sent between nodes.

In some cases, the IO level 2816 always includes the same set of nodes 37, such as a full set of nodes and/or all nodes that are in a storage cluster 35 that stores data required to process incoming queries. In some cases, the lowest inner level corresponding to level 2810.H-1 includes at least one node from the IO level 2816 in the possible set of nodes. In such cases, while each selected node in level 2810.H-1 is depicted to process resultants sent from other nodes 37 in FIG. 28A, each selected node in level 2810.H-1 that also operates as a node at the IO level further performs its own row reads in accordance with its query execution at the IO level, and gathers the row reads received as resultants from other nodes at the IO level with its own row reads for processing via operators of the query. One or more inner levels 2814 can also include nodes that are not included in IO level 2816, such as nodes 37 that do not have access to segment storage 2442 and/or that are otherwise not operable and/or selected to perform row reads for some or all queries.

The node 37 at root level 2812 can be fixed for all queries, where the set of possible nodes at root level 2812 includes only one node that executes all queries at the root level of the query execution plan. Alternatively, the root level 2812 can similarly include a set of possible nodes, where one node selected from this set of possible nodes for each query and where different nodes are selected from the set of possible nodes for different queries. In such cases, the nodes at inner level 2810.2 determine which of the set of possible root nodes to send their resultant to. In some cases, the single node or set of possible nodes at root level 2812 is a proper subset of the set of nodes at inner level 2810.2, and/or is a proper subset of the set of nodes at the IO level 2816. In cases where the root node is included at inner level 2810.2, the root node generates its own resultant in accordance with inner level 2810.2, for example, based on multiple resultants received from nodes at level 2810.3, and gathers its resultant that was generated in accordance with inner level 2810.2 with other resultants received from nodes at inner level 2810.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2805 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 28B:
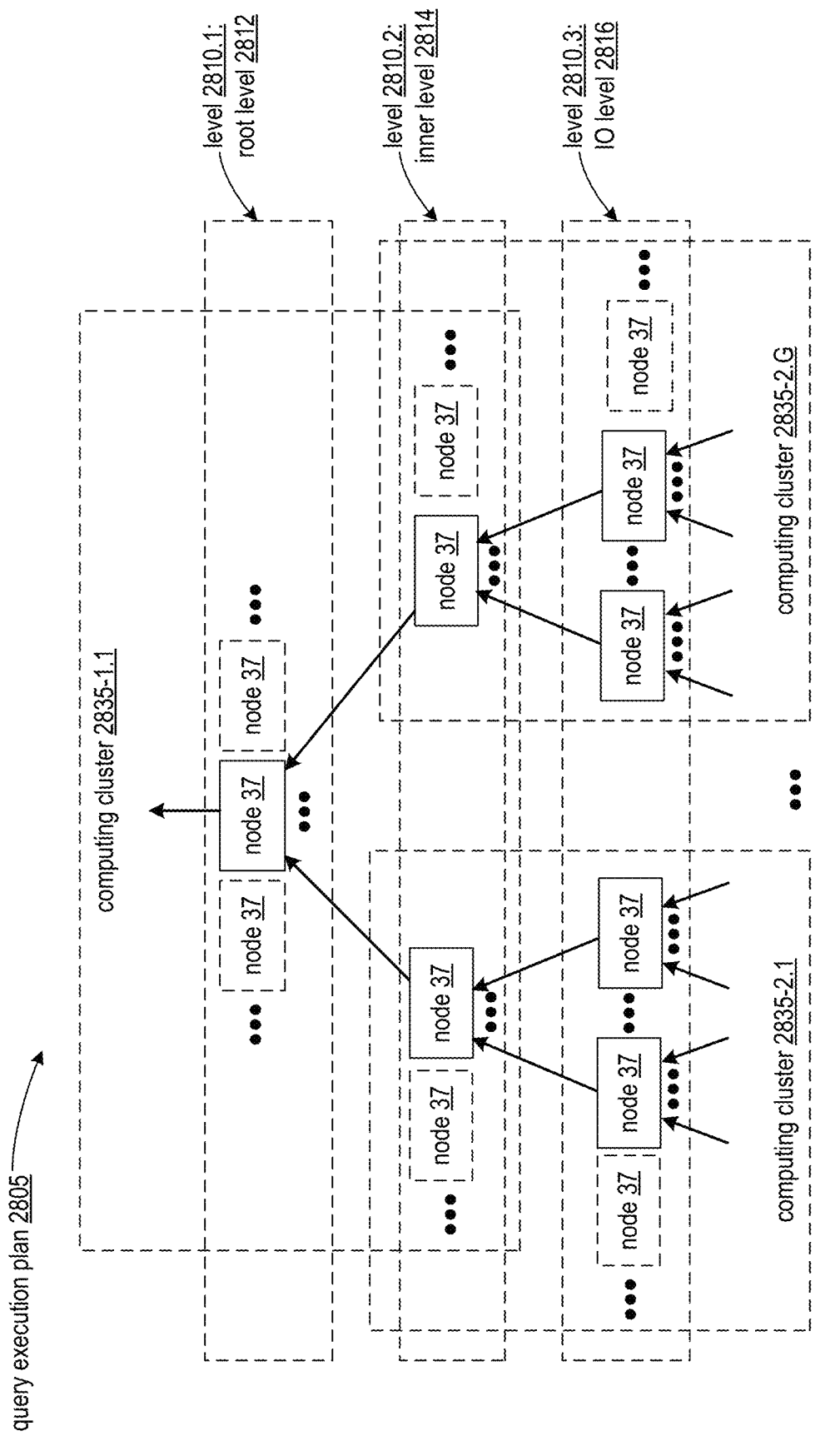
FIG. 28B is a schematic block diagram of an embodiment of multiple computing clusters utilized to implement a query execution plan in accordance with the present invention.

FIG. 28B illustrates an embodiment where the query execution plan is segregated into a plurality of computing clusters 2835, illustrating a subset of possible sets of nodes from each computing cluster that are selected to process a given query. In this illustration, nodes 37 with a solid outline are again nodes involved in executing the given query. Nodes 37 with a dashed outline are again other nodes that are not involved in executing the given query, but could be involved in executing other queries in accordance with their level of the query execution plan in which they are included.

A computing cluster 2835 can be similar to storage clusters 35 and can include a set of possible nodes that can operate in accordance with at least two levels of the query execution plan. A computing cluster 2835 can include some or all nodes of exactly one storage cluster 35. A computing cluster 2835 can include some or all nodes of multiple storage clusters 35. For example, a computing cluster 2835 can correspond to a "sub-tree" of query execution plan, corresponding to the possible set of child nodes and corresponding possible set of parent nodes each child node will select a single node from to process their resultants. In this example, each computing cluster includes exactly two levels: a lower level corresponding to possible child nodes of the computing cluster and an upper level corresponding to possible parent nodes of the computing cluster. The computing cluster can be implemented as a virtual machine computing cluster, for example which each node in the cluster implemented as a virtual machine processing different queries in accordance with their selected level.

The set of computing clusters illustrated in FIG. 28B can be utilized to implement an entire, three level query execution plan 2805 with level 2810.1 implemented as root level 2812, with level 2810.2 implemented as the single inner level 2814, and with level 2810.3 implemented as the IO level 2810.3. Alternatively, if the query execution plan 2805 includes more than three levels, these computing clusters can correspond to a subset of the query execution plan's full set of computing clusters. In particular, an additional set of computing clusters can include corresponding subsets of nodes of level 2810.3 their corresponding upper level of possible parent nodes for corresponding possible child nodes of a subsequently lower level than level 2810.3. Alternatively or in addition, an additional computing cluster can include all possible parent nodes of computing cluster 2835 as possible child nodes, as well as possible parent nodes of one or more additional computing clusters 2835-1.2-2835-1.N with upper levels at level 2810.1 and lower levels at level 2810.2 as additional possible child nodes. This additional computing cluster could include its own set of possible parent nodes in the next higher level than level 2810.1. Any number of levels of the query execution plan can thus be implemented by corresponding computing clusters of the sub-trees.

For each given computing cluster 2835, for a given query, some or all possible child nodes, corresponding to nodes in the lower level of the computing cluster, will be assigned to process the query. The nodes with the solid outline at the lower level of each computing cluster 2835 correspond to the selected subset of possible child nodes executing the given query for the corresponding computing cluster 2835. For example, if the lower level of the computing cluster is the IO level 2816 of the query execution plan, the child nodes generate resultants by performing row reads. This example is illustrated by illustrated computing clusters 2835-2.1-2835-2.G that includes a set of nodes from level 2810.2 as possible parent nodes and includes a set of nodes from level 2810.3 as possible child nodes, where level 2810.3 in this example is the IO level.

As another example, if the lower level of the computing cluster is an inner level 2814 of the query execution plan, the child nodes receive resultants as input from child nodes of another, subsequently lower, computing cluster by being selected as the parent node for the subsequently lower computing cluster for the given query, gather these resultants, and generate their own resultant. This example is illustrated by illustrated computing cluster 2835-1.1 that includes a set of nodes from level 2810.1 as possible parent nodes and includes a set of nodes from level 2810.2 as possible child nodes. In this example, level 2810.1 can be the root level, as illustrated, or can be an inner level that is higher than inner level 2810.2.

As illustrated, for each computer cluster 2835, exactly one node at the upper level receives resultants from nodes at the lower level. Thus, for an execution of a given query by a given computing cluster 2835, every participating node at the lower level is operable to select, for example without global coordination, the same, single node at the upper level that will process their resultant as a selected parent node from the plurality of possible parent nodes included in the upper level. Each participating node at the lower level thus sends their resultants to this same selected parent node. The selected parent node for each illustrated computing cluster in FIG. 28B for executing the given query corresponds to the one node in the computing cluster's upper level that has a solid outline, selected over the other nodes in the computing cluster's upper level with dashed outlines. In some embodiments, if the upper level of computer cluster 2835 is the root level, the same single node is selected for every query, where the set of possible parent nodes includes exactly one node.

Alternatively or in addition, for execution of a given query by a given computing cluster 2835, each possible node at the lower level is operable to determine whether or not it is participating in the given query. In some embodiments, all nodes at the lower level that receive resultants from its own child nodes, for example, in accordance with a different computing cluster, is automatically determined to be participating at the lower level to ensure these resultants continue to be processed. In such embodiments, all nodes at the lower level that do not receive resultants from its own child nodes, for example, in accordance with a different computing cluster selecting a different parent node, is automatically determined to not participate at the lower level, as it has no resultants as input. In cases where the nodes at the lower level are nodes at the IO level, every node included in or otherwise assigned to the lower can determine to participate at the lower level for any given query. For example, every computing cluster with its lower level as the IO level, such as computing clusters 2835-2.1-2835-2.G in FIG. 28B, can determine that every node at the lower level is responsible for performing row reads, for example, in accordance with data ownership information 2710.

As discussed previously, it is desirable for nodes 37 to operate independently without global coordination. Utilizing inter-coordination between only nodes within the same computing cluster can aid in reducing global coordination. As illustrated in FIG. 28B, each computing cluster with the same upper and lower level, such as computing clusters 2835-1.1-2835-1.G, can include mutually exclusive sets of nodes as possible nodes in their respective upper and lower levels. Thus, each of these computing clusters 2835-1.1-2835-1.G can independently coordinate the mechanism for selecting a single parent node to which participating child nodes will send their resultants. To further reduce global coordination, in some embodiments, no computing clusters have overlapping sets of nodes. As a particular example, in embodiments with exactly the three levels as illustrated in FIG. 28B, only computing clusters 2835-2.1-2835-2.G are required, and computing cluster 2835-1.1. is not implemented. In such embodiments, the root level includes exactly one node that all nodes are predetermined to send resultants to for every query. In such embodiments, every computing cluster in the database system 10 can be mutually exclusive. In some cases, the database system 10 can implement multiple query execution plans 2805 for different queries, for example, operating on different, distinct sets of data stored by the corresponding distinct set of nodes at each query execution plan 2805's IO level. Alternatively, the database system implements the single query execution plan 2805 for all queries.

Each computing cluster can include the same or different number of total possible nodes across each of its levels. A computing cluster can include the same or different number of possible nodes for some or all of its levels as other computing clusters that include these same levels. Each computing cluster can include the same or different number of levels. For a given query, each selected parent node across different computing clusters at the same level can receive resultants from the same or different number of child nodes. A same or different number of child nodes can be participating for a given query in different computing clusters. Computing clusters that include the lower level as the IO level can include the same or different number of nodes at the IO level. In some cases, all nodes at the IO level and/or all available nodes at the IO level in every one of these computing clusters that include the lower level as the IO level can be included to implement every query. In some cases, at least one node at the IO level of at least one computing cluster will not be selected to perform row reads for some queries.

Figure 28C:
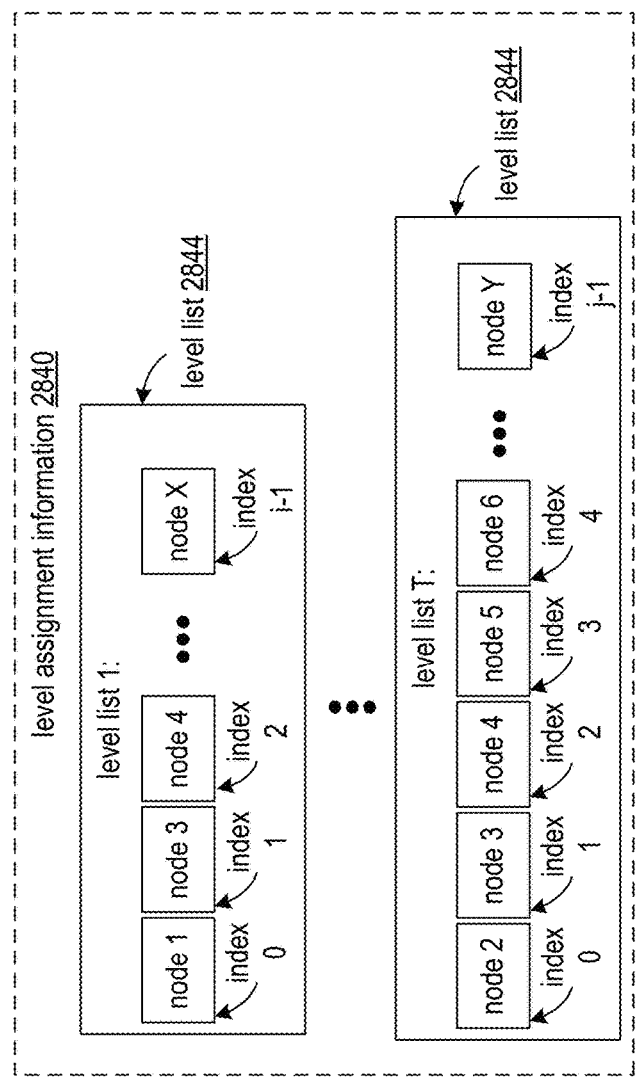
FIGS. 28C and 28D illustrate embodiments of level assignment information in accordance with the present invention.
Figure 28D:
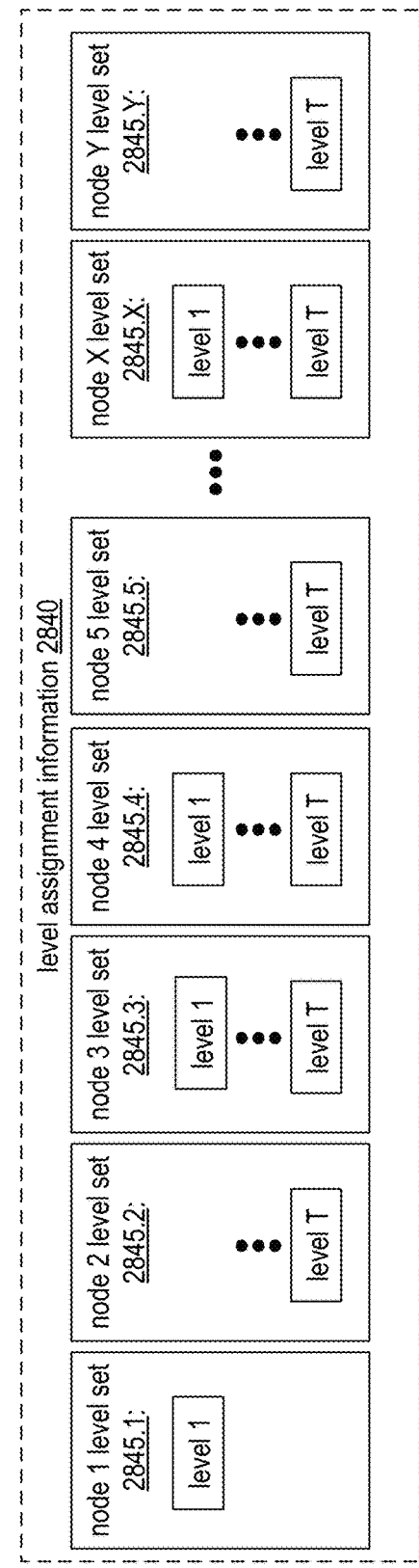

As illustrated in FIGS. 28C and 28D, each computing cluster 2835 can have corresponding level assignment information 2840. The level assignment information 2840 can be utilized by corresponding nodes in the computing cluster 2835 to determine which levels of the computing cluster 2835 it is assigned to for participation in some or all queries. In particular, the level assignment information 2840 can indicate a cluster-level mapping that indicates assignment of each of a plurality of subsets of the plurality of levels of the computing cluster 2835 to a corresponding one of the set of nodes. A node assigned to a particular level in the level in the level assignment information is included as in the set of possible nodes for that level, where its participation in a given query can be determined based on the query itself and/or based on whether the level is a root level, inner level, or IO level, As illustrated in FIG. 28C, the level assignment information 2840 can include, can be represented as, and/or can otherwise indicate a plurality of T level lists 2844-1-2844-T, corresponding to a plurality of levels of the computing cluster 2835. For example, if a computing cluster only includes an upper level and a lower level, level list 1 can correspond to the level list for the upper level, and level list T can correspond to the level list for the lower level, where T is equal to two. In other embodiments, T can include more than two levels for a corresponding computing cluster than includes nodes in more than two levels of the query execution plan. Each level lists includes a subset of nodes in the computing cluster that are assigned to the corresponding level as a possible node in the set of possible nodes for the level.

In this example, level list 1 includes a list of i nodes that includes node 1, node 3, node 4, and node X. Level list 1 has corresponding indices 0-(i−1), where node 1 is at index 0 of the list, node 3 is at index 1 of the list, node 4 is at index 2 of the list, and node X is at index i-1 of the list. Level list T includes a list of j nodes that includes node 2, node 3, node 4, node 5, and node Y. In this example, level list T does not include node 1. For example, if level list T corresponds to the IO level of the query execution plan 2805, level list T can include every node in the computing cluster 2835 and/or every available node in the computing cluster 2835 that has access to segment storage 2442 and/or that is included in a corresponding storage cluster 35 belonging to the computer cluster 2835. For example, node 1 is not included in level list T because it does not include or have access to segment storage 2442 and/or is not included in any storage clusters 35. In some embodiments, each of a computing cluster's level lists 2844 can include any number of nodes. For example, i can be greater than j, less than j, or equal to j.

The level lists 2844 of level assignment information can indicate, can be utilized to derive, and/or can be derived from a plurality of node level sets 2845.1-2845.Y. This is illustrated in FIG. 28D, which depicts identical level assignment information as the example of FIG. 28C in a different fashion. As illustrated in FIG. 28D, the level assignment information 2840 can include, can be represented as, and/or can otherwise indicate this set of node level sets 2845.1-2845.Y. Each node in the computing cluster 2835 has a node level set 2845 that can include one or more levels to which the node is assigned for the computing cluster 2835 as a possible node, or can indicate the node is assigned to no levels of the computing cluster 2835.

As illustrated in FIGS. 28E-28G, for a given query, each node selected in a lower level, such as level T, to execute a given query at the lower level, must determine which node at the next, higher level, such as level 1, to send their resultant by determining which node will be selected from the set of possible nodes for execution of the query at this next level. While each node in a computing cluster can determine the levels to which it is assigned as a possible node based on the level assignment information 2840, the node needs to further determine whether it is selected for performing the given query at each of its assigned levels. Furthermore, if a node selected for participation at a lower level, it needs to determine which node of the set of possible nodes is selected to perform the query at the next, higher level within the computing cluster and/or in another computing cluster. As illustrated in FIG. 28E, different queries dictate usage of different parent nodes at level 1. Therefore, the nodes at level T do not necessarily have knowledge of which parent node will be utilized until they have determined the corresponding query being executed.

Consider the example where the computing cluster includes exactly two levels: level T and level 1. For a given query, level T of a computing cluster 2835 includes a selected child node set 2854 of the computing cluster that includes one or more selected child nodes from the set of possible child nodes that execute the given query at level T, such as every node in the possible set of nodes for level T when level T is the IO level. Each of these nodes must determine which of the nodes of the possible parent node set 24852 of level 1 to send their resultant for a given query, as the selected node can be the same or different for different queries. For example, possible parent node set 2852 for level 1 includes the set of i nodes indicated in level list 1. In some cases, for a given query, every child node must select the same parent node from this set of possible parent nodes, where exactly one node in the set of possible parent nodes is selected to process resultants generated by every node executing the given query in the selected child node set 2854. In this example, assume the same level lists 2844-1 and 2844-T illustrated in the example level assignment information 2840 of FIGS. 28C and 28D.

Consider a particular example where two different queries, query 1 and query 2, are executed by a plurality of computing clusters including the particular computing cluster depicted in FIG. 28E with the level assignment information of FIGS. 28C and 28D. As illustrated in FIG. 28F, the nodes 37 in the computing cluster 2835 determine that node 4 is selected as the selected parent node 2853 for execution of query 1. In particular, nodes 2-Y participating in query 1 as nodes in the selected child node set 2854, based on having received resultants and/or being included in level list T where level T is the IO level, each determine, for example, independently without communicating amongst themselves after query 1 is received for execution, that node 4 is to be selected as the selected parent node. In response to this determination, each selected child node, once they have generated their resultants, send their resultants to node 4.

Node 4 itself can determine that is responsible for executing query 1 at level 1. If node 4 was included in the selected child node set 2854, node 4 can gather its own resultant that was generated in accordance with execution of query 1 at level T with the resultants received from the other nodes in the selected child node set 2854. In some cases, the node 4 determines the selected child node set, for example, based on the level assignment information 2840 and/or based on additional determinations if the selected child node set is selected as a proper subset of the level list T. This can enable node 4 to determine that it has received resultants from every node at level T of the computing cluster involved in the query. For example, node 4 determines it requires resultants from node 2-Y. This ensures that node 4's resultant generated upon input based on gathering resultants of the child nodes is correct by ensuring the gathered input includes every necessary resultant generated by each selected child node in the selected child node set.

As illustrated in FIG. 28G, the nodes 37 in the computing cluster 2835 determine that a different node, node 3, is selected as the selected parent node 2853 for execution of a different query 2. Nodes 2-Y participating in query 2 as nodes in the selected child node set 2854 each similarly determine that node 3 is to be selected as the selected parent node 2853 for execution of query 2. In response to this determination, each selected child node, once they have generated their resultants, send their resultants to node 3. Node 3 similarly can determine that is responsible for executing query 2 at level 1, and can similarly ensure that it has received all necessary resultants as input to generate its resultant in accordance with level 1.

In these examples, if level 1 is not the root level, the node to which node 4 sends its resultant for query 1 generated at level 1, and the node to which node 3 sends its resultant for query 2 generated at level 2, can be the same or different. For example, node 3 and 4 can be included in the lowest level list of another computing cluster 2835, and can similarly determine which parent node in a set of possible parent nodes in a next-lowest level list of the other computing cluster 2835, such as the upper list of two level lists in the other computing cluster 2835, to send their respective level 1 resultants. In some cases, if level 1 corresponds to the highest inner level and the next level in the query execution plan is the root level that includes exactly one designated root node, node 3 and 4 send their resultants to this designated root node, for example, where this is a predetermined designated root node that all nodes at level 1 of the presented computing cluster 2835 will always send their resultants to.

In some embodiments, the determination of which node will be selected as a parent receiving resultants can be dictated by the downstream configuration information, for example, where the parent node of the resulting tree structure is known to a node prior to generating its resultants. In such cases, determination of a parent can be based on a parent previously determining its child nodes in accordance with forwarding configuration information downstream, where each child node determines the parent as the node from whom this configuration information was received. As discussed herein, each node can determine its participation in one or more queries as a selected node in one or more levels, in accordance with a downstream flow in accordance with the sending configuration information, and/or in accordance with an upstream flow, for example as resultants are generated and propagated upwards. The level participation determination module 2860 can be implemented at either or both of these stages for nodes to determine their participation. The level assignment data can dictate consistency of the set of node's participating in a query in both the downstream and upstream processes.

Figure 28H:
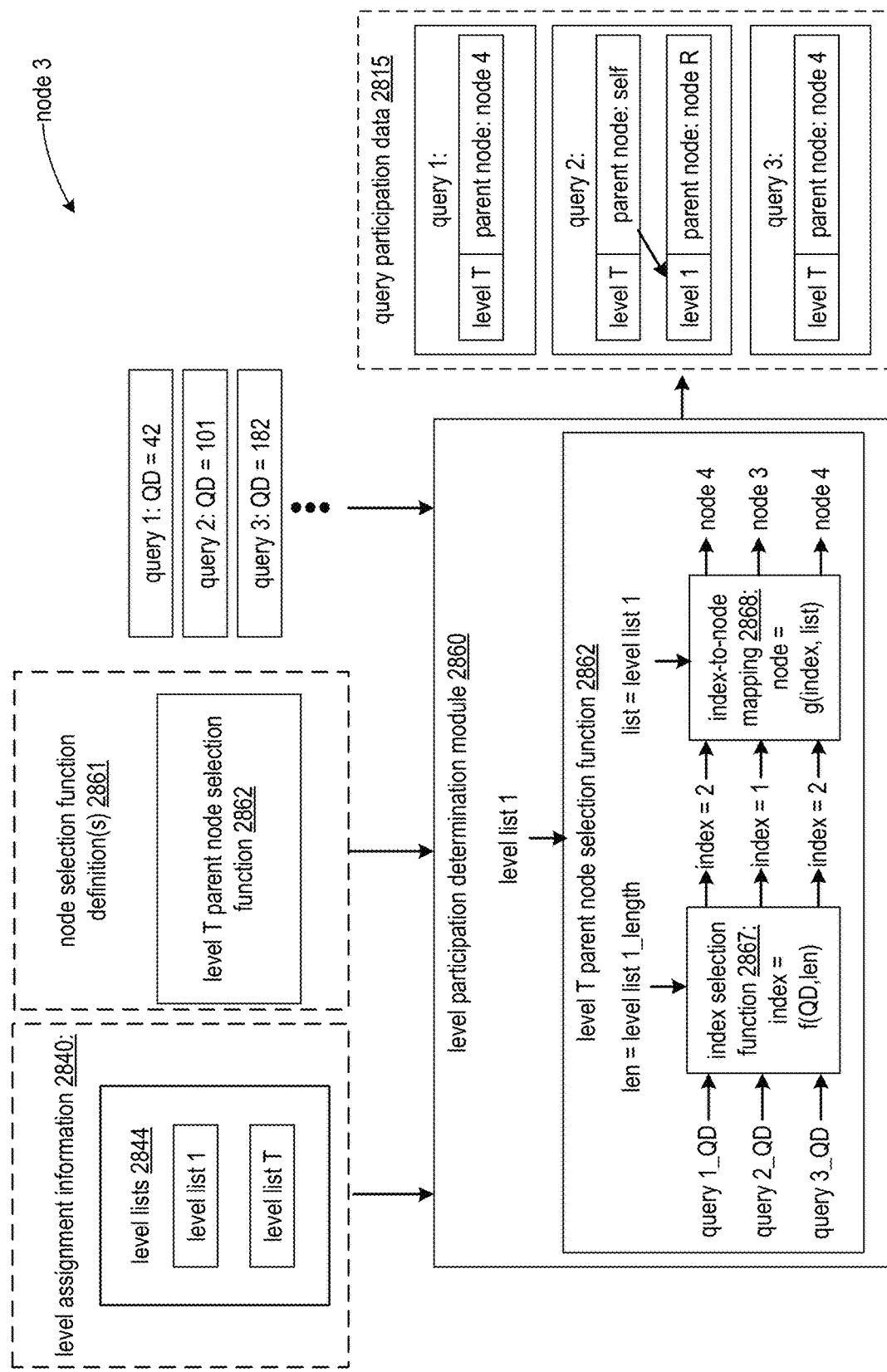
FIG. 28H is a schematic block diagram of an embodiment of a node that implements a level participation determination module in accordance with the present invention.

FIG. 28H illustrates embodiments where nodes 37, such as all nodes in a computing cluster and/or all possible nodes in the query execution plan, implement a level participation determination module 2860 to determine whether or not it participates at particular levels of its computing cluster for incoming queries and/or to determine which node in a next level, if participating at a given level, to which the resultant generated at the given level is to be sent by the node 37. The level participation determination module 2860 can be implemented by a given node by utilizing at least one processing module of the given node 27 and/or of the computing device 18 of the given node.

Figure 28I:
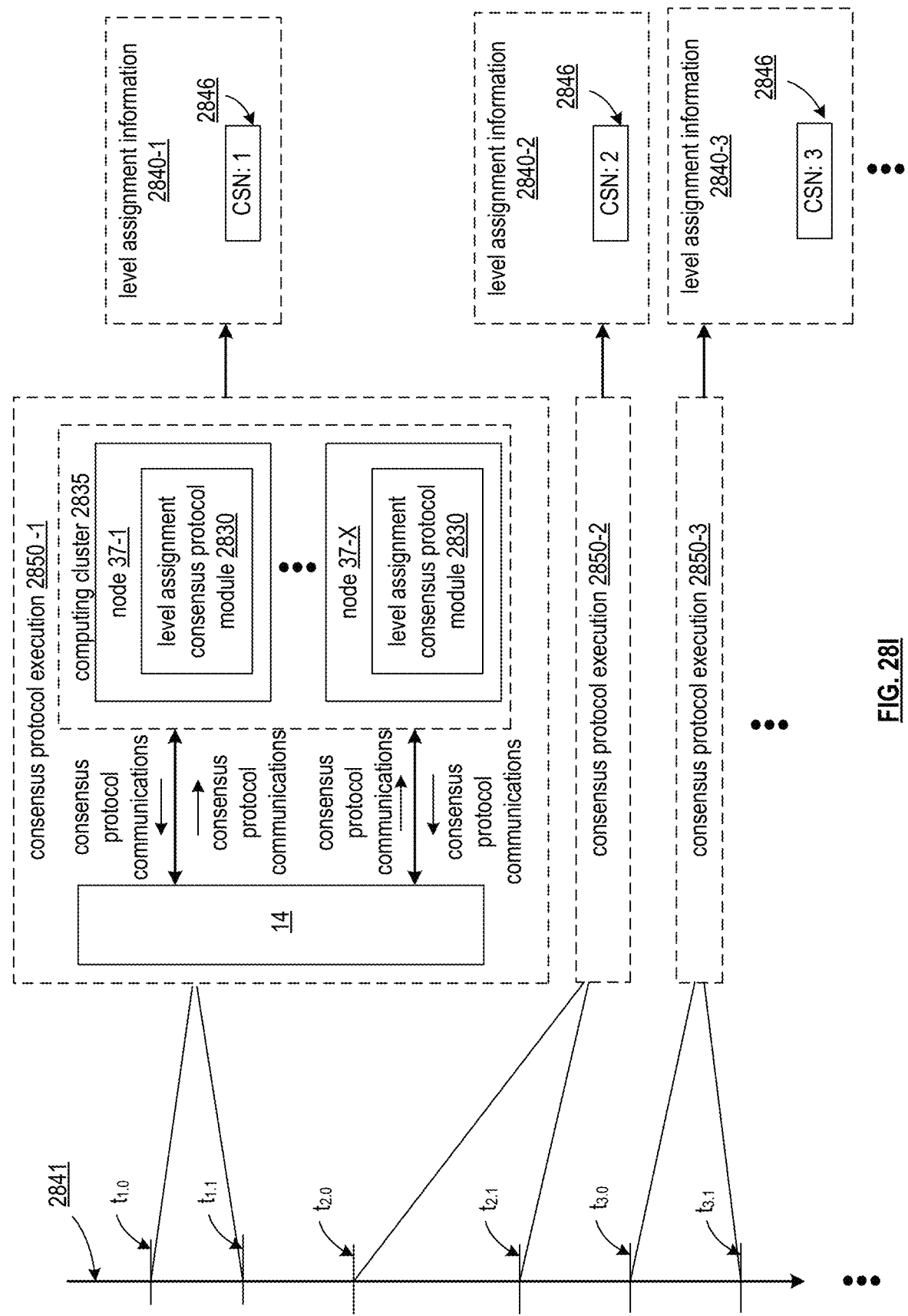
FIG. 28I illustrates a timeline of a plurality of consensus protocol executions in accordance with the present invention.

The level participation determination module 2860 of a given node 37 can be operable to generate query participation data 2815 indicating whether the given node 37 is participating in each query at one or more levels of the query execution plan, and/or indicating which nodes in one or more computing clusters 2835 the given node belongs to are selected for participation in executing each query at one or more levels of each one or more computing clusters 2835. The level participation determination module 2860 can utilize a received and/or determined set of queries to generate the query participation data 2815, for example, where level participation determination module 2860 is generated for each individual query as it is received and/or determined. The level participation determination module 2860 can utilize level assignment information 2840 for each of one or more computing clusters to which the given node 37 belongs to generate the query participation data 2815 for each query. The level assignment information 2840 can be stored by, accessible by, or otherwise determined by the node 37, for example, based on participation in the execution of a corresponding consensus protocol mediated across nodes in the computing cluster 2835 that includes the node as illustrated in FIG. 28I.

The level participation determination module 2860 can utilize one or more node selection function definitions 2861 dictating one or more node selection functions that are performed by the level participation determination module 2860 to generate the query participation data 2815 for each query. In this example, the node selection function definitions 2861 includes a function definition for a level T parent node selection function utilized for nodes participating in level T to select their parent node that is selected for level 1. The node selection function definitions 2861 can further include other selection functions, such as a function dictating how the child nodes participating in each query are selected. The node selection function definitions 2861 can be stored by, accessible by, or otherwise determined by the node 37, for example, based on participation in the execution of a corresponding consensus protocol mediated across nodes in the computing cluster 2835 that includes the node as illustrated in FIG. 28I, where the node selection function definitions 2861 are indicated in the level assignment information 2840. Alternatively, the node selection function definitions 2861 can fixed and/or constant across multiple versions of level assignment information 2840, as discussed in further detail in conjunction with FIGS. 28I-28M.

As illustrated, FIG. 28H continues the example of FIGS. 28C-28G by illustrating the utilization of the level participation determination module 2860 of node 3 to determine its participation in a set of incoming queries query 1, query 2, and query 3. The level participation determination module 2860 can utilize, for each incoming query, a query discriminator number (QD), for example, where the query discriminator number is a unique identifier of the query or other number tagged to the query and/or deterministic based on the query, where every node in the computing cluster 2835 can assign or determine the same QD for each given query.

In particular, the level participation determination module 2860 generates query participation data 2815 for a given query as a function of the query's corresponding QD. This can be accomplished by performing at least one parent node selection function 2862 to determine, for a given level that the node is determined to participate in, which node the resultant is to be sent to. If the node itself is selected as the parent, it can further determine which full set of child nodes are selected for a lower level of the query, indicating the full set of nodes from which resultants should be received as input. In this example, every node in the level list T in computing cluster 2835 automatically determines to participate in level T because level T is the IO level. In this example, all nodes 2-Y automatically participate in level T because level T is the IO level, and because they are included in level list T. Therefore, due to automatic participation of node 3 in every query at level T, a level T parent node selection function 2862 is performed by node 3.

Alternatively, if a node determined not to participate in level T for a given query, it may not perform the level T parent node selection function 2862 because it would not generate resultants for the query that need to be sent to a parent node. However, nodes can still perform this function if included as possible parent nodes to determine whether they are responsible for performing the query at level 1. In this example, node 1 determines it will not participate at level T for any query based on not being included at level list T. However, node 1 can still perform the level T parent node selection function 2862 on incoming queries to determine whether in will perform a query at level 1. For queries where node 1 determines it will participate in level 1, it can receive resultants from all other nodes 2-Y. The node 1 can further determine resultants from all nodes 2-Y are required based on all nodes 2-Y being determined to be selected for processing the given query, for example, because they will be selected to process every query.

A level parent node selection function 2862 can be a function of the QD to select a particular node from the level list from which the parent node is being selected. In this case, the parent node of level T is level 1, and thus the full level list 1 of possible parent nodes of level T is utilized to select which of the nodes in level list 1 is the parent node, as a function of the QD. In particular, the parent node selection function 2862 can include an index selection function 2867 that generates an index value as output, as a function of the QD of the given query. For each QD of each incoming query, an index value is generated by index selection function 2867. In particular, an index value of 2 is generated for query 1 based on query 1 having a QD of 42, an index value of 1 is selected for query 2 based on query 2 having a QD of 101, and an index value of 2 is generated for query 3 based on query 3 having a QD of 182.

These indices can be input to an index-to-node mapping 2868 of the parent node selection function 2862. The index-to-node mapping 2868 can simply utilize the level list from which the parent is being selected, and can select the parent node by selecting the node indexed by the index value in the list. In this example, node 4 is selected for queries 1 and 3 because node 4 is at index 2 of level list 1, as illustrated in FIG. 28C. Node 3 is selected for query 2 because node 3 is at index 1 of level list 1, as illustrated in FIG. 28C. Alternatively, another deterministic mapping of index to each node indicated by the level assignment information can be utilized to select the node as a deterministic function of index.

The index selection function 2867 can implemented to generate a uniform and/or substantially uniform distribution of indices with respect to the level list with respect to a plurality of QDs assigned to a corresponding plurality of queries. This can help ensure that over time, nodes selected for participation as the selected parent node 2853 is uniformly distributed and/or substantially uniformly distributed to ensure that processing load is distributed relatively evenly across different ones of the possible parent node set 2852. The assignment of QDs with respect to the index selection function 2867 can further be implemented to help ensure that selection of nodes for sequentially received queries and/or across the plurality of sequential time slices is evenly dispersed over time, for example, to ensure that a node is not overloaded with processing too many queries relative to other possible nodes in its level list at a given point in time.

In some cases, the index selection function 2867 is further a function of the length and/or size of the level list from which the parent node is being selected, in this case level list 1. For example, possible output of the index selection function 2867 is one of the discrete index values 0-(i−1) of level list 1, based on level list 1 having a length of i, to ensure the index-to-node mapping only has valid indices as input. As a particular example, the index selection function 2867 produces the resulting index by performing a modulo function on the QD of the given query with a modulus value equal to the list length to generate the index utilized to select the node in the corresponding level list for the given query. In this case, the modulo function utilizes a modulus of i because the length of level list 1 is equal to i, where the output of index selection function 2867 is therefore always one of the integers 0-(i−1). Thus, the index selection function 2867 in this case can generate the output index as index=QD % i, where % denotes the modulo operation, and where the outputted value of index is thus equal to the remainder of the Euclidian division of the value of QD by the value of i.

Furthermore, if incoming queries are assigned a random integer value and/or sequential integer values with respect to the sequence in which they are received and/or determined for execution by the database system, the indices can be selected from the integers 0-(i−1) relatively uniformly, and furthermore can be substantially evenly spaced out over time when the incoming queries are assigned to the sequential integer values and when the queries are executed in a similar order to the order in which they are received and/or determined for execution.

In this example, suppose the number of nodes in level list 1 of the level assignment information is equal to 20 and thus i is equal to 20. The index value of 2 is generated for query 2 because 42% 20=2; the index value of 1 is generated for query 3 because 101% 20=1; and the index value of 2 is generated for query 3 because 182% 20=2.

Utilizing the modulo function, or another function of list length and QD, to generate the index enables the same parent node selection function 2862 to be used for any computing cluster with different level lists, as this embodiment of parent node selection function 2862 is a function of the QD upon the level list itself from which the parent node is to be selected. Thus, this same parent node selection function can be utilized by the level participation determination module of any node to select a parent node at one or more levels, as required. This mechanism of selecting the parent node also ensures that all nodes participating will select the same parent node, rather than if they were to implement the parent node selection function 2862 buy merely selecting a random node from the level list or by asynchronously increment an index counter to select nodes sequentially from the list over time. In particular, this mechanism relies only on each node in the computing cluster accessing the same level assignment information 2840, as will be further discussed herein.

The selected parent nodes for each query are indicated in the query participation data 2815 generated by the level participation determination module 2860. This query participation data 2815 indicates node 3's participation in level T for each query 1, 2, and 3. For example, the indication that node 3 participates in level T, if level T is the IO level, is utilized by node 3 to determine to generate segment sets 2418 for each query 1, 2, and 3 for inclusion in the query set 2415 utilized to schedule segment retrieval by the segment scheduler module 2410.

The query participation indicates which parent node the resultant generated for level T should be set by node 3. For query 2, the parent node indicates the node itself is the parent node, and that the resultant for level T should be retained by the node itself rather than being transmitted to another node. Furthermore, as a result of the parent node of query 2 being the node itself, level 1 is further indicated to indicate the node's participation in level 1 for query 2. A parent node R is determined as the parent node of level 1, for example by performing the same or different parent node selection function 2862 as the level 1 parent node selection function 2862 to select node R from a plurality of possible parent nodes at the next highest level in the query execution plan. Alternatively, node R is known to be the parent node for all queries, for example, due to being a single root node, and is not selected from a plurality of options via a parent node selection function 2862.

If the node is selected as a parent node of level T, while not illustrated, it can further perform a level parent node selection function 2862 for the next level to determine which node its resultant is to be transmitted to. In some cases, if this next level is outside of a node's given computing cluster's set of levels, because the node is selected as the parent at the upper-most level of the computing cluster, it can deterministically select a same single node for every query, such as the designated root node discussed previously, where every node in the computing cluster, when selected as the parent node at the upper-most level selects this same single node.

In other embodiments, the selected parent node of the upper-most level of the given computing cluster is a selected one of the selected child node set 2854 of a different computing cluster's lowest level. A set of G nodes in a selected child node set 2854 of a particular computing cluster's lowest level, if not the IO level, can include each of the exactly one selected parent nodes of G different computing clusters' upper level. The possible parent nodes of each the G lower computing clusters can thus all be included as possible child nodes in the lower level of the particular computing cluster's lower level. In such cases, rather than independently selecting its own child nodes from the possible child nodes, the particular computing cluster's determination of their selected set of G child nodes is already predetermined or otherwise accomplished by each of the G computing cluster's in their own determinations of which node of their possible parent node is selected. Thus, selection of child nodes trickles "up" the query execution plan: as lower computing clusters select their parent nodes, this dictates the selection of higher computing clusters' child nodes. The selection of a computing cluster's selected set of child nodes of its lower level can there be automatically determined to include all child nodes if its lower level is the IO level, and can automatically include the selected parent nodes from the lower set of G computing clusters if its lower level is not the IO level. In other embodiments, the selection can trickle "down" the query execution plan, where higher computing clusters select their child nodes, which dictates the selection of lower computing clusters' selected parent nodes.

For example, if the computing cluster 2835 of the example illustrated in FIGS. 28C-28G is computing cluster 2835-2.1 of FIG. 28B, the selected parent node of the upper-most level of computing cluster 2835-2 is automatically included in the selected child node set 2854 of computing cluster 2835-1.1's lowest level. In these embodiments, the possible parent nodes are included in both computing clusters, and can determine two separate level assignment information 2840 for each computing cluster and can further determine the same or different parent node selection function 2862 to select a parent node from this lowest level of computing cluster 2835-1.1 to which the query resultant of node at level 1 of computing cluster 2835-2.1 is to be sent.

As a particular example, node 3 is included in two computing clusters: a first computing cluster, corresponding to the particular computing cluster illustrated in the examples of FIGS. 28C-28H, and a second, other computing cluster. In response to being the selected parent node of level T for query 2 in the first computing cluster and thus the being selected as the node participating in level 1 for query 2 in the first computing cluster, node 3 can determine second level assignment information for the second computing cluster in which node 3 is assigned as a possible node in the lowest level of the other computing cluster. For example, this second level assignment information is accessible by node 3 due to being included in the second computing cluster. Node R also a node of the second computing cluster and is included in a list of multiple possible nodes in a next level, such as the upper level of two levels, of the other computing cluster's level assignment information In response to participating in the lowest level of the another computing cluster for query 2, node 3 performs the same or different parent node selection function 2862 to select node R as the parent node, and sends the resultant of query 2 generated at the upper level of the first computing cluster to node R. For example, a particular index of the lowest level list of the second level assignment information 2840 is selected from the set of possible indices based on the length of this lowest level list as indicated the second level assignment information 2840. For example, the modulo function is performed on the QD by utilizing modulus equal to the length of this lowest level list as indicated the second level assignment information, where node R is indicated in the lowest level list as indicated the second level assignment information at the resulting index outputted by performing this modulo function. Node R receives other resultants from other nodes participating in the lower level of the second computing cluster, utilized as input to generate its own resultant.

FIG. 28I illustrates an embodiment where the level assignment information 2840 for a computing cluster 2835 is generated via execution of a consensus protocol 2850 by the nodes in computing cluster 2835. Rather than necessitating global coordination and/or single entity responsible for assignment and sharing of level assignment information as new versions are generated over time, each new version of the level assignment information of a particular computing cluster 2835 can be generated via a consensus protocol, which can be executed by some or all nodes 37 in a computing cluster participating in the consensus protocol, where the shared state mediated via the consensus protocol indicates the most updated level assignment information.

This consensus protocol mediated by the nodes 37 in a computing cluster 2835 to generate level assignment information 2840 can be the same as or similar to the consensus protocol mediated by the nodes 37 in a storage cluster 35 to generate data ownership information 2710 as discussed in conjunction with FIGS. 27A-27K. In some cases, for example, if the computing cluster includes the same set of nodes as the set of nodes of a storage cluster, the execution of the consensus protocol can be utilized to generate both a new version of the data ownership information as well as a new version of the level assignment information.

For example, as illustrated in FIG. 28I, a plurality of consensus protocol executions 2850 can be performed via the nodes 37-1-37-X in a computing cluster 2835 over time to generate a corresponding plurality of versions of level assignment information 2840. For example, as illustrated by timeline 2841, a first consensus protocol execution 2850-1 can be mediated across nodes in the storage cluster during timespan $t_{1.0}$-$t_{1.1}$ to generate a corresponding first version of level assignment information 2840-1. For example, the first consensus protocol execution 2850-1 can be initiated at time $t_{1.0}$ by one or more nodes in the computing cluster 2835, and the first consensus protocol execution 2850-1 can be completed, for example, where some or all nodes in the computing cluster have determined and/or can access the resulting level assignment information 2840-1 at $t_{1.1}$. At some time after $t_{1.1}$, or perhaps instead at some time before the first the first consensus protocol execution 2850-1 is complete but after the first consensus protocol execution 2850-1 is initiated, a second consensus protocol execution 2850-2 can be mediated across the nodes in the computing cluster 2835 to generate to generate a corresponding second version of level assignment information 2810-2 during timespan $t_{2.0}$-$t_{2.1}$. Similarly, a third consensus protocol execution 2850-3 can be mediated across the nodes in the computing cluster 2835 to generate to generate a corresponding third version of level assignment information 2810-3 during timespan $t_{3.0}$-$t_{3.1}$, and this process can continue over time where consensus protocol executions 2850 are performed to generate corresponding level assignment information 2840 over time. Level assignment information 2810-1, 2810-2, and 2810-3 are each tagged with a respective compute sequence number (CSN) 2846 with values of 1, 2, and 3, respectively, or otherwise indicating the ordering of the revision with respect to the other revisions.

As discussed herein, consider the times $t_{1.1}$, $t_{2.1}$, $t_{3.1}$, of timeline 2841 as the times where the resulting corresponding versions of level assignment information 2840-1, 2840-2, 2840-3, . . . 2840-$i$, respectively, are available for utilization by the nodes 37 in the corresponding computing cluster 2835 for query execution as a result of consensus protocol executions 2850-1, 2850-2, 2850-3, . . . , 2850-$i$ being completed across the set of nodes in the computing cluster 2835, where i is any ith iteration of executing the consensus protocol to generate a corresponding ith version of the level assignment information 2840. The CSN for any ith version of the level assignment information can be tagged with a respective CSN 2846 indicating that the version is the ith version in the ordering, for example, where the value of the CSN 2846 is equal to or otherwise indicates the value of i.

As illustrated in FIG. 28I, the consensus protocol can be executed via consensus protocol communications generated by nodes 37 and/or received and processed by nodes 37. For example, each node can implement a level assignment consensus module 2830, for example, by utilizing at least one processing module of the node. The level assignment consensus module 2830 can be utilized by each corresponding node 37 to generate consensus protocol communications in accordance with the computing cluster's execution of the current consensus protocol for transmission to one or more other nodes in the computing cluster in accordance with the computing cluster's execution of the current consensus protocol, for example, via system communication resources 14. The level assignment consensus module 2830 can be utilized by each corresponding node 37 to receive and/or process consensus protocol communications, generated by other nodes in the computing cluster 2835 in accordance with the computing cluster's execution of the current consensus protocol. The consensus protocol can be a leader-mediated consensus protocol. Execution of the consensus protocol can include election or other determination of a leader by one or more nodes, voting by one or more nodes, and/or ultimately arriving at a consensus based on the voting by the one or more nodes to generate and/or communicate the resulting data ownership information.

One or more nodes can initiate a revision of the level assignment information 2840 by initiating a new execution of the consensus protocol, for example, in response to determining changes to availability, storage conditions, processing resources, or another change. Alternatively or in addition, new executions of the consensus protocol to generate revised level assignment information 2840 can occur at scheduled and/or predetermined times.

Because level assignment information is local only to a particular computing cluster 2835, each computing cluster of a small number of nodes can execute the consensus protocol amongst themselves, rather than requiring consensus or other coordination across all nodes in the database system. Each of the computing clusters in a plurality of computing clusters can independently generate their own iterative revisions of their own level assignment information over time in their own timeline 2841, where at any given point in time, different computing clusters may have independently generated a different number of revisions of their level assignment information. This ensures that the execution of the consensus protocol remains scalable, while ensuring that all nodes across different computing clusters 35 has consistent level assignment information.

As revised level assignment information is determined by particular nodes over time, most recent versions of the level assignment information 2810 can be implemented to execute incoming queries. However, if the node were to immediately adopt the most recent level assignment information for segment processing in executing queries in query set 2415, queries could be processed improperly. In particular, as an individual node executes a query over a span of time, if the node changes its level assignment determined for the query based on a more recent versions of the level assignment information 2840 mid-execution, some resultants needed for execution of the query across all nodes can be never generated and/or can be sent to parent nodes that are not processing the query. Furthermore, multiple nodes can be executing the same query within slightly different time spans based on their own segment scheduler module's initiation of execution of a particular query. Alternatively or in addition, the most recent level assignment information can be received and/or determined by the different nodes at slightly different times. As global coordination is not utilized and as nodes independently execute queries via the segments they determine to own, a mechanism to ensure all nodes execute each given query with the same level assignment information is required.

In embodiments where the computing cluster includes at least one node in a storage cluster, a new version of the level assignment information generated by the computing cluster can reflect most recent changes in the data ownership information generated by the storage cluster, for example, where nodes assigned to the IO level are based on the most recent data ownership information. Similarly, a new version of the data ownership information generated by the storage cluster can reflect most recent changes in the level assignment information generated by the computing cluster, for example, where segment ownership in the data ownership information is determined is based on the set of nodes assigned to the IO level in the level assignment information.

Figure 28J:
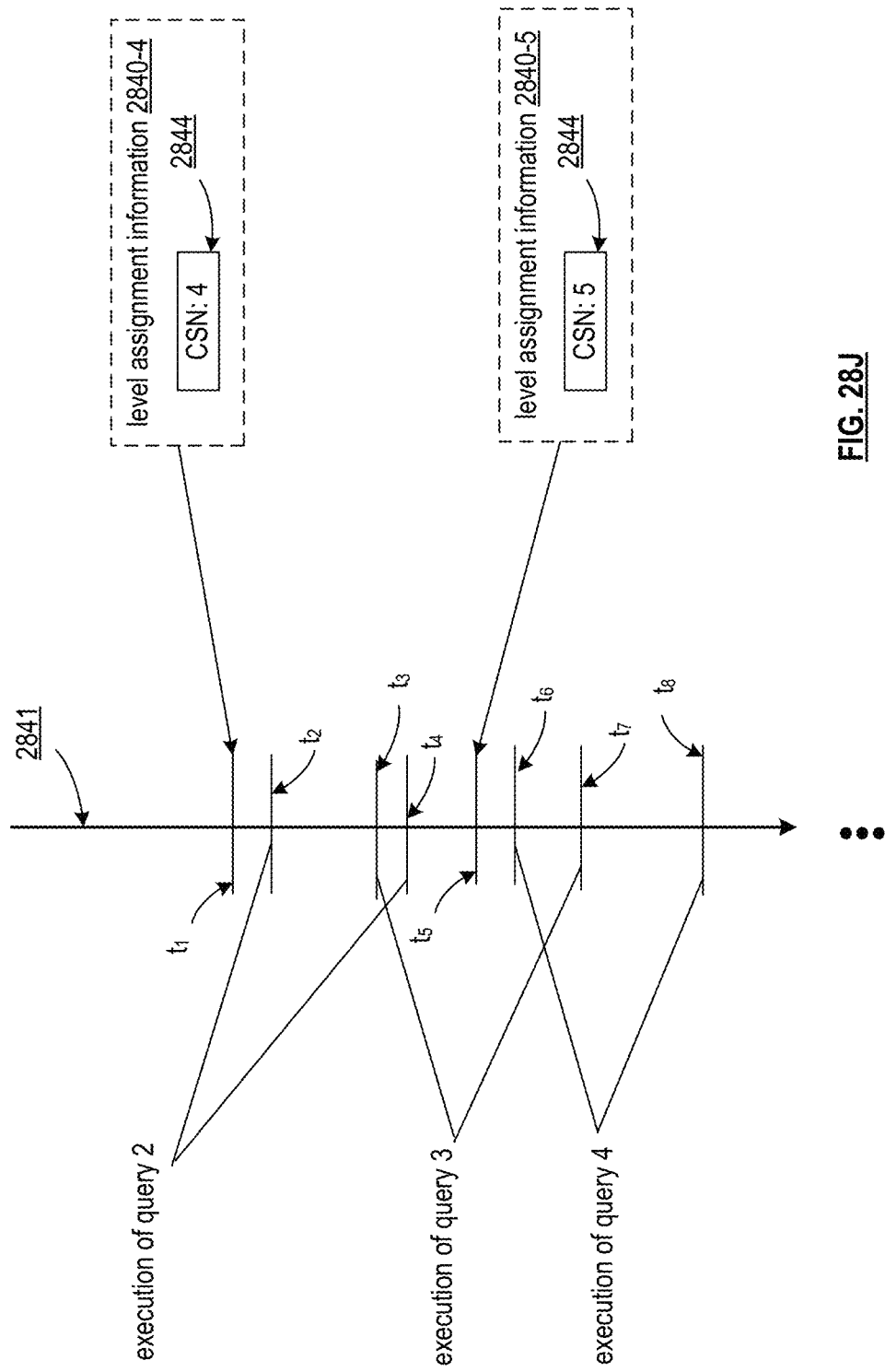
FIG. 28J illustrates an example timeline of execution of a plurality of queries in accordance with the present invention.
Figure 28K:
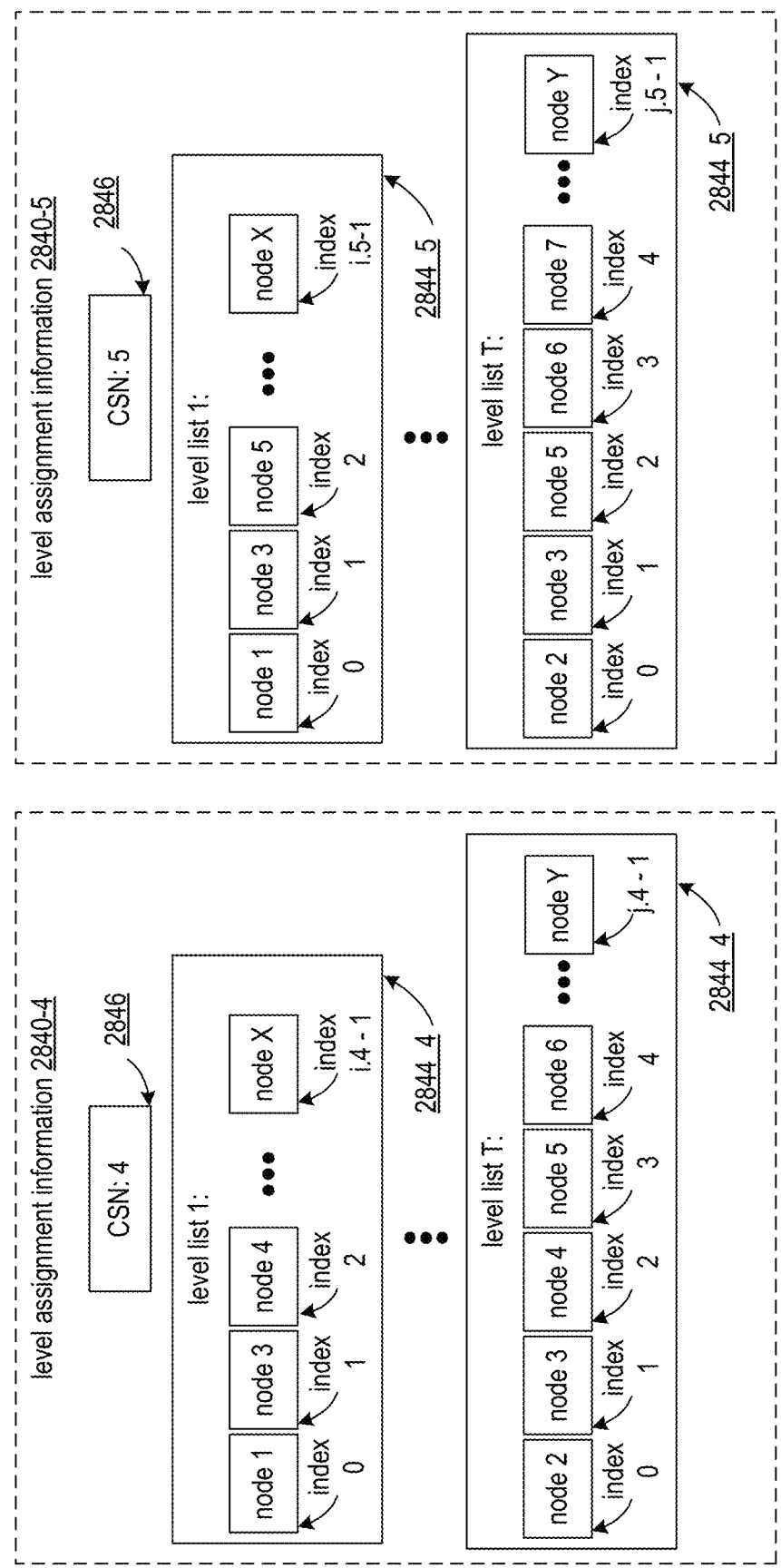
FIG. 28K illustrates an example embodiment of multiple versions of level assignment information in accordance with the present invention.
Figure 28L:
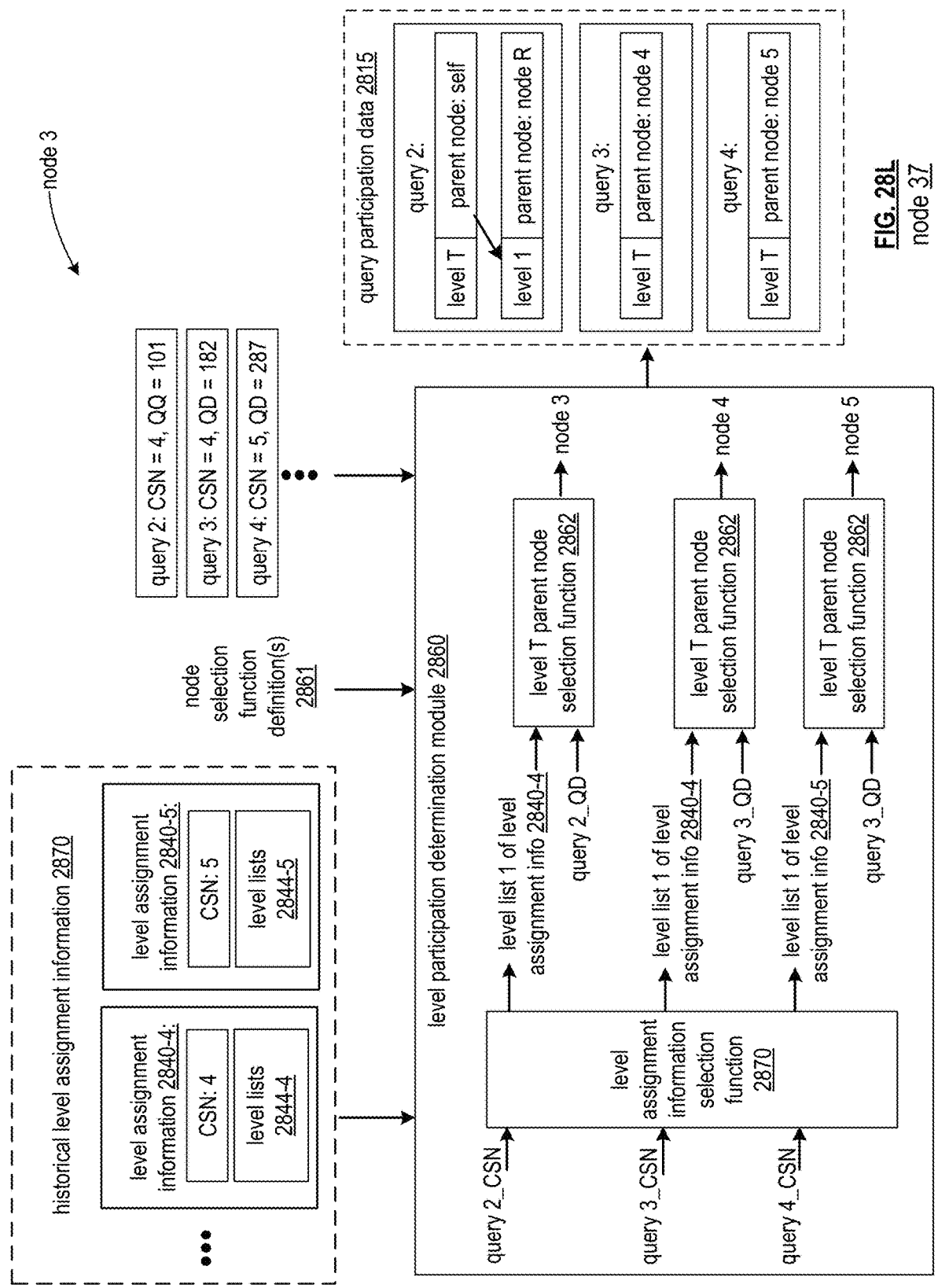
FIG. 28L is a schematic block diagram of an example embodiment of a node that implements a level participation determination module in accordance with the present invention.

FIGS. 28J-28L illustrate an example of an embodiment of the present invention where nodes in a computing cluster utilize CSNs 2846 tagged to and/or determined for each query to determine which corresponding one of a plurality of level assignment information versions 2840 generated via the computing cluster's execution of the consensus protocol over time will be utilized to determine the corresponding query participation data 2815 for each query, for example in the node's query set 2415. This can be the same as or similar to the tagging of OSNs 2720 to each query to determine the which corresponding one of a plurality of data ownership information versions 2710 will be utilized for each query, as discussed in conjunction with FIGS. 27A-27K. In particular, the CSN of a query is fixed for the life of the query, where all nodes in the computing cluster execute the query in accordance with level assignment information with a matching CSN, regardless of whether other level assignment information is generating before or during the query's execution.

This improves database systems by ensuring that, despite multiple concurrently running queries by multiple nodes, a computing cluster's configuration for each query has fixed and consistent level assignment for each query. This enables detection of mismatches in cluster configuration and ensures that the same set of nodes is considered for downstream and upstream, and/or ensures that the same set of nodes is considered for lateral flow.

FIG. 28J illustrates a particular example of timeline 2841 to illustrate the temporal relation between a series of events occurring at particular points in time and/or time spans $t_1$-$t_8$. At a point in time $t_1$, level assignment information 2840-4 with CSN 4 is generated. For example, the execution of the consensus protocol can be completed at time $t_1$ to render the resulting level assignment information. At a later point in time $t_5$, level assignment information 2840-5 with CSN 5 is generated.

A first query, query 2, can be executed by the computing cluster 2835 from time $t_2$-$t_4$. Time $t_2$ can correspond to a time at which query 2 was received and/or at which at least one node initiated a partial execution of query 2. Time $t_4$ can correspond to a time at which execution of query 2 by all nodes in the computing cluster assigned to execute query 2 has completed. While execution spans of different nodes in the computing cluster may be different based on their own implementation of their segment scheduling module 2410, for the purposes of this example, assume that the time frame that both particular nodes in the computing cluster executed query 2 started between $t_1$ and $t_3$ and ended between $t_3$ and $t_5$.

A second and third query can similarly be executed by the storage cluster from times $t_3$-$t_7$ and times $t_6$-$t_8$, respectively. Again, for purposes of this example, assume that the time frame that particular nodes in the computer cluster executed queries 3 and 4 started and ended substantially close to these times relative to other points illustrated in the timeline 2841 of this example. Also note that as illustrated, the execution of queries 2, 3, and 4 is overlapping, to reflect the concurrent execution of multiple queries implemented by the storage cluster and to further reflect the concurrent execution of multiple queries implemented by each node 37 in the storage cluster.

FIG. 28K illustrates the example level assignment information 2840-4 and 2840-5 generated as discussed in conjunction with example of FIG. 28J with CSNs 2846 of 4 and 5, respectively. In particular, continuing the example discussed in conjunction with FIGS. 28C-28H, the level assignment information 2840-4 of this example can be the same level assignment information 2840 of with FIGS. 28C-28H, as illustrated in FIG. 28K. The level assignment information 2840-5 is different from level assignment information 2840-4. In particular, node 4 is no longer included in level list 1 or level list T, for example, based on node 4 being removed from the cluster or based on node 4 failing at a time prior to the time when level assignment information 2840-5 was generated and/or at a time prior to the time when the corresponding consensus protocol was initiated. For example, the failure of node 4 was detected by another node in the computing cluster, and this other node initiated the consensus protocol to update the level assignment information to level assignment information 2840-5 based on failure of node 4 to exclude node 4 from this new version of the level assignment information. For example, node 4 was detected by a selected parent node for level 1 for a query based on never receiving node 4's resultant generated in accordance with level T for the query.

Thus in this example, level list T can include fewer nodes, such as j minus 1 nodes, due to the removal of node 4. The lengths of level list T of level assignment information 2840-4 and 2840-5 denote a corresponding number of indices j4 and j5, respectively, to denote that the list lengths can be different for these different level lists 1 2844-4 and 2844-5, respectively. Alternatively, level list T may have been changed to add additional nodes to maintain the same number of nodes. Level list 1 may include fewer nodes, such as i minus 1 nodes, due to the removal of node 4. The lengths of level list 1 of level assignment information 2840-4 and 2840-5 denote a corresponding number of indices i4 and i5, respectively, to denote that the list lengths can be different for these different level lists 1 2844-4 and 2844-5, respectively. Alternatively, level list 1 may have been changed to add additional nodes to maintain the same number of nodes. In this example, assume that level list 1 of level assignment information.

Continuing with this example, the execution of these queries by node 3 in accordance with determined CSNs for these queries is reflected in FIG. 28L. In particular, queries 2 and 3 can be the same queries illustrated in conjunction with FIG. 28H, and level assignment information 2840-4 can be these same as level assignment information 2840 of FIGS. 28C-28H. Thus, queries 2 and 3 have the same query participation data 2815 as discussed in conjunction with FIG. 28H. In particular, queries 2 and 3 are tagged with CSN 4, and the level assignment information 2840-4 is therefore utilized by the level participation determination module 2860 based on level assignment information 2840-4 having a corresponding CSN 2846 of 4.

In particular, the level participation determination module 2860 can implement a level assignment information selection module 2870 to select the particular level assignment information 2840 that will be utilized for the query, for example, from a plurality of level assignment information 2840 of historical level assignment information accessible by, stored by, and/or determined by the node 37. Thus, level assignment information 2840-4 is selected for queries 2 and 3 based on queries 2 and 3 having the CSN of 4 and level assignment information 2840-4 having the matching CSN of 4. Level assignment information 2840-5 is selected for query 4 based on query 4 having the CSN of 5 and level assignment information 2840-5 having the matching CSN of 5.

The CSN tagged for incoming queries can be determined in a same or similar fashion as the OSN tagged for incoming queries as discussed in conjunction with FIGS. 27A-27K. For example, queries 2 and 3 are tagged with CSN 4 because they are received and/or initiated at a time when the level assignment information 2840 with CSN 4 is the most recent level assignment information 2840 generated by the computing cluster, as illustrated by timeline 2841. Query 4 is tagged with CSN 5 because it is received and/or initiated at a time when the level assignment information 2840 with CSN 5 is the most recent level assignment information 2840 generated by the computing cluster, as illustrated by timeline 2841.

As illustrated in FIG. 28L, the level T parent node selection function 2862 is performed on each query's QD to select a parent node from level list 1 from the corresponding level assignment information 2840 selected by level assignment information selection module 2870. In particular, the parent node for queries 2 and 3 is selected from level list 1 of level assignment information 2840-4. In particular, the index is generated based on the length i.4 of the level list 1, for example where the index is selected from integers 0-19 based on i.4 being equal to 20 in the particular example discussed in conjunction with FIG. 28H, and where nodes 3 and 4 are selected based on generation of indices of 2 and 1, where these indices are applied to the level list 1 of level assignment information 2840-4 based on level assignment information 2840-4 being selected for these queries.

However, the parent node for query 4 is selected from level list 1 of level assignment information 2840-5. In particular, the index is generated based on the length i.5 of the level list 1, for example where the index is selected from integers 0-18 based on i.5 being equal to 19 in response to the removal of node 4 decrementing the length of level list 1 in this version of the level assignment information. Nodes 5 is ultimately selected, for example, based on the resulting index being index 2, and based on node 5 being included in level list 1 of level assignment information 2840-5 at index 2 as illustrated in FIG. 28K. Note that, while a same index of 2 is generated for both queries 2 and 4, different nodes are selected based on accessing the different level lists 1 of the different level assignment information, in response to these queries having different tagged CSNs.

For example, the same index selection function 2867 can be utilized to generate each selected index of 2, 1, and 2, despite utilizing different level assignment information, based on being performed as a function of the different lengths i.4 and i.5. In particular, the node selection function definitions 2861 can indicate functions, such as the parent node selection function 2862, to be utilized for any version of the level assignment information. Consider the previously discussed particular example discussed previously where index values of 1 and 2 for queries 2 and 3 are generated by performing the modulo function utilizing a modulus equal to i.4, thus 20, upon the QDs of 101 and 182 for queries 2 and 3 (101% 20=1; 182% 20=2). The index value of 2 is generated for query 4 by performing the modulo function utilizing a modulus equal to i.5, thus 19, upon the QD of 287 for query 4 (287% 19=2).

The query participation data 2815 can indicate whether or not the node is selected to participate in each level, based on utilizing the level assignment information of the corresponding CSN. The query participation data can further indicate which parent node a resultant, generated by the node at a level for which it is determined to participate, is to be sent, based on utilizing the level assignment information of the corresponding CSN.

While not illustrated, all other nodes in the computing cluster tag queries 2, 3, and 4 with the same CSNs of 4, 4, and 5. All nodes determine which levels in which they participate for each query independently, in parallel and in isolation, utilizing the level assignment information of the corresponding CSN and utilizing the corresponding, parent node selection function(s), whether fixed or indicated in the corresponding level assignment information with the corresponding CSN.

In particular, all nodes of level list 1 of level assignment information 2840-4, including node 4, participate at level T for queries 2 and 3 based on determining they are selected to participate based on the level assignment information 2840-4. All nodes of level list T of level assignment information 2840-4 send their resultants generated for query 2 to node 3 based on all determining that node 3 is the single node selected from level list 1 to participate at level 1 for query 2, for example, by performing the same level T parent node selection function 2862 utilizing the QD for query 2 and level list 1 of level assignment information 2840-4. All nodes of level list T of level assignment information 2840-4 send their resultants generated for query 3 to node 4 based on all determining that node 4 is the single node selected from level list 1 to participate at level 1 for query 3, for example, by performing the same level T parent node selection function 2862 utilizing the QD for query 3 and level list 1 of level assignment information 2840-4.

Furthermore, all nodes of level list 1 of level assignment information 2840-5 participate at level T for query based on based on determining they are selected to participate based on the level assignment information 2840-5. Even if failing node 4 again becomes available before or during query 4, it will not participate at level T or level 1 based on not being included in level list 1 or level list T of level assignment information 2840-5. All nodes of level list T of level assignment information 2840-5 send their resultants generated for query 4 to node 5 based on all determining that node 5 is the single node selected from level list 1 to participate at level 1 for query 4, for example, by performing the same level T parent node selection function 2862 utilizing the QD for query 4 and level list 1 of level assignment information 2840-5.

Figure 28M:
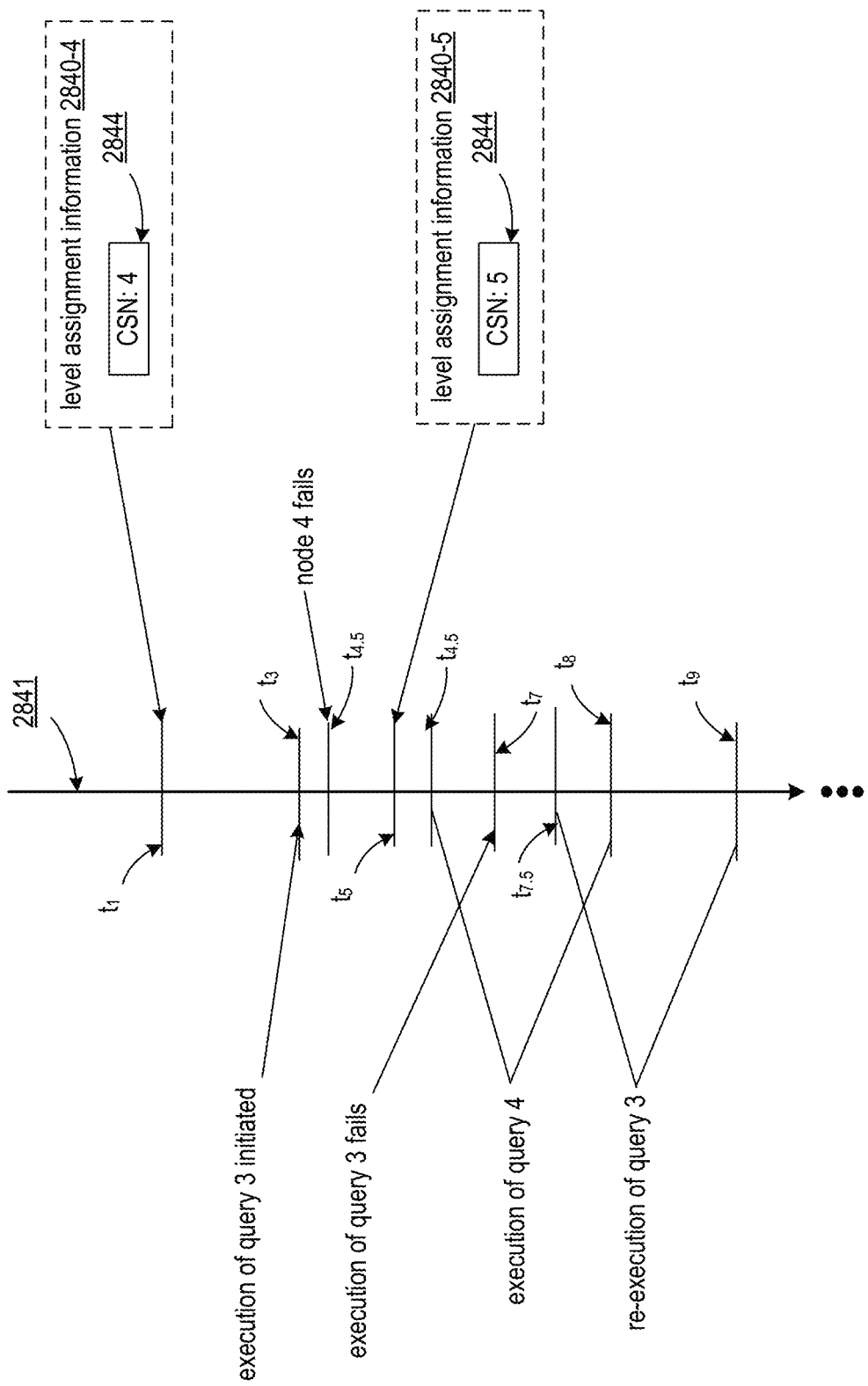
FIG. 28M illustrates an example timeline of execution of a plurality of queries in accordance with the present invention.

FIG. 28M illustrates another example timeline 2841 where query 3 was determined to fail based on node 4 failing during query 3's execution at time $t_{4.5}$. For example, the failure of node 4 is rectified by removal of node 4 from the level lists of revised level assignment information 2840-5 as discussed in the example of FIGS. 28J-28L. In particular, query 3 fails due to node 4 being selected to participate in level T for query 3, but failing to generate and/or send its level T resultant for query 3. In a similar manner as discussed in conjunction with FIGS. 27G-27J, queries can be aborted and/or later re-executed in response to failing by utilizing updated level assignment information. For example, query 3 is re-executed from $t_{7.5}$-$t_9$, this time tagged with CSN 5 based on being received and/or initiated after level assignment information 2840-5 was generated, with level assignment information 2840-5 being the most recent level assignment information. This time, query 3 is successful, for example, because all nodes determined to be assigned to participate in accordance with level assignment information 2840-5 were available and/or generated their resultants at their assigned levels in accordance with level assignment information 2840-5.

In various embodiments, a node of a computing device has at least one processor and memory that stores executable instructions that, when executed by the at least one processor, cause at least one processing module of the node to determine level assignment information indicating the node's assignment to a subset of levels of a plurality of levels of a query execution plan. The plurality of levels can include a lowest level such as the IO level, at least one inner level, and a highest level such as the root level. The executable instructions, when executed by the at least one processing module of the node, further cause the processing module to determine a query for execution and determine a query discriminator number corresponding to the query. The at least one processing module of the node determines to process the query at one of the plurality of levels based on determining the one of the plurality of levels is included in the subset of levels, and generates query resultant data by facilitating execution of at least one query operator of the query in accordance with the one of the plurality of levels. The at least one processing module of the node selects one of a plurality of possible parent nodes in a sequentially higher one of the plurality of levels based on the query discriminator number and sends the query resultant data to the one of the plurality of possible parent nodes for processing.

In various embodiments, a node of a computing device has at least one processor and memory that stores executable instructions that, when executed by the at least one processor, cause at least one processing module of the node to determine first level assignment information indicating assignment to a first subset of levels of a plurality of levels of a query execution plan based on a first cluster-level mapping generated by participation in a first execution of a consensus protocol mediated via a set of nodes in a computing cluster that includes the node. The first level assignment information indicates a first compute sequence number. The executable instructions, when executed by the at least one processor, further cause at least one processing module of the node to determine second level assignment information indicating assignment to a second subset of levels of the plurality of levels of the query execution plan based on a second cluster-level mapping generated by participation in a second execution of the consensus protocol mediated via the set of nodes in the computing cluster. The second level assignment information indicates a second compute sequence number that is different from the first compute sequence number.

The at least one processing module of the node determines a query for execution and determines a compute sequence number tag for the query that indicates the value of the first compute sequence number. The at least one processing module of the node determines to utilize the first level assignment information based on determining the compute sequence number tag for the query that indicates the value of the first compute sequence number. The at least one processing module of the node determines to process the query at one of the plurality of levels based on determining the one of the plurality of levels is included in the first subset of levels and based on determining to utilize the first level assignment information. The at least one processing module of the node generates query resultant data by facilitating execution of at least one query operator of the query in accordance with the one of the plurality of levels based on determining to process the query at the one of the plurality of levels.

Figure 28N:
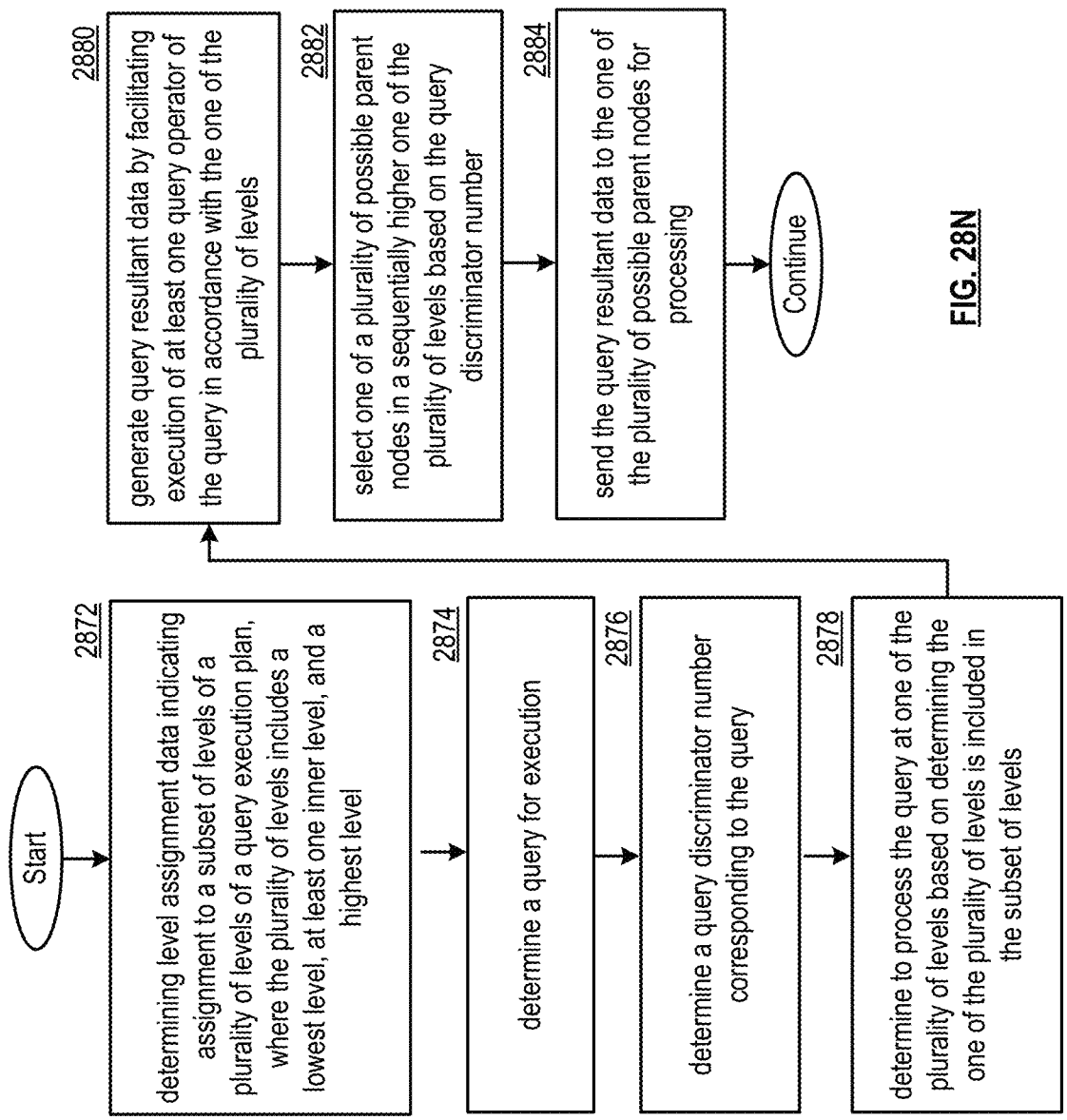
FIG. 28N is a logic diagram illustrating a method of executing a query based on selecting a parent node for processing a query resultant in accordance with the present invention.
Figure 28O:
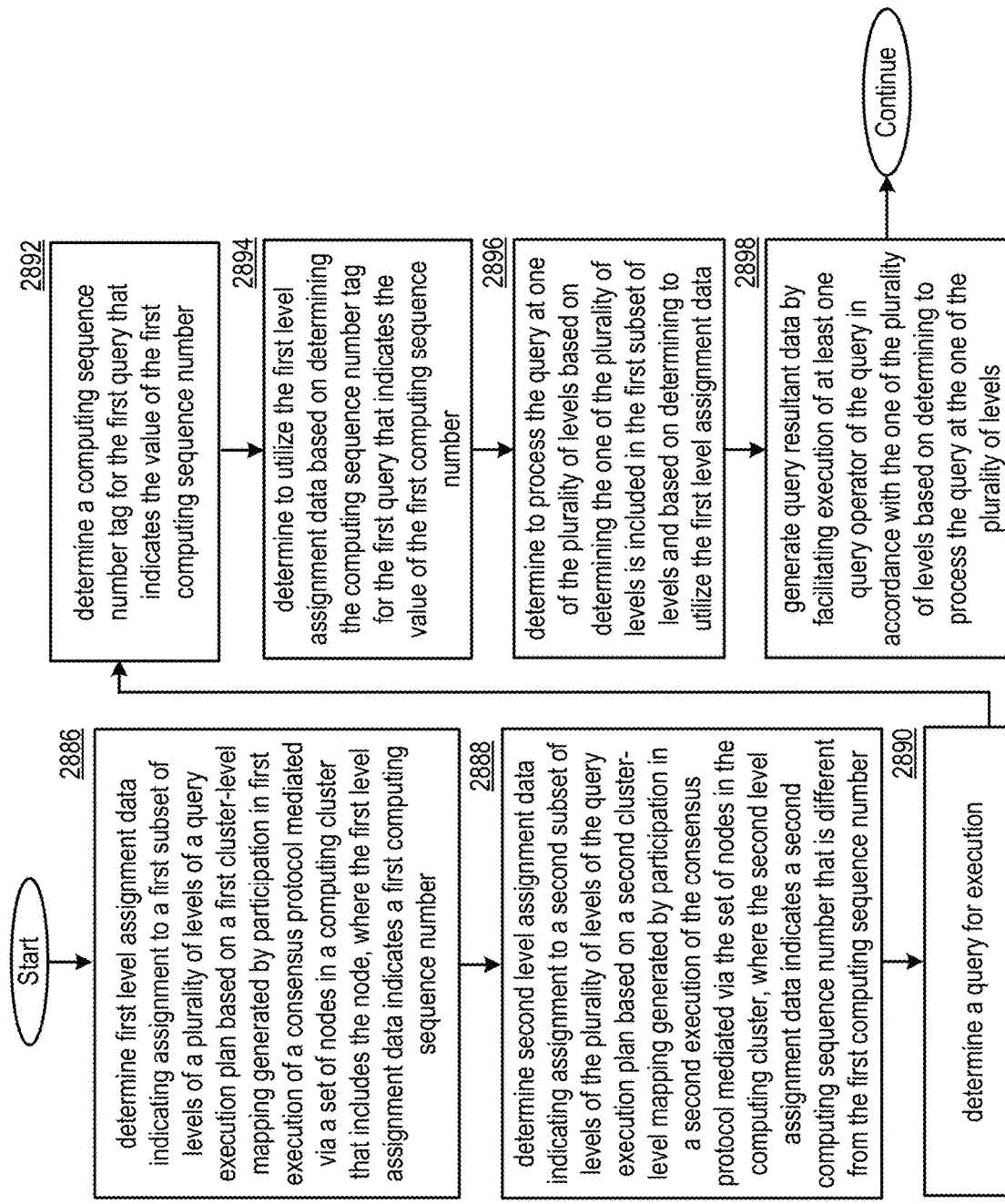
FIG. 28O is a logic diagram illustrating a method of executing a query based on a corresponding compute sequence number in accordance with the present invention.

FIG. 28N and FIG. 28O illustrate methods for execution by a node 37. For example, the node can utilize at least one processing module of the node 37 to execute operational instructions stored in memory accessible by the node, where the execution of the operational instructions causes the node 37 to execute the steps of FIG. 28N and/or FIG. 28O. The methods of FIG. 28N and/or FIG. 28O can be performed by a node 37 in accordance with embodiments of node 37 discussed in conjunction with FIGS. 28A-28M, and/or in conjunction with other embodiments of node 37 discussed herein.

As illustrated in the method of FIG. 28N, step 2872 includes determining level assignment information indicating the node's assignment to a subset of levels of a plurality of levels of a query execution plan. The subset of levels can be a proper subset of the plurality of levels or can include all of the plurality of levels. The plurality of levels includes a lowest level, at least one inner level, and a highest level. In various embodiments, the plurality of levels includes exactly three levels. Step 2874 includes receiving and/or otherwise determining a query for execution. Step 2876 includes determining a query discriminator number corresponding to the query. Step 2878 includes determining to process the query at one of the plurality of levels based on determining the one of the plurality of levels is included in the subset of levels. Step 2880 includes generating query resultant data by facilitating execution of at least one query operator of the query in accordance with the one of the plurality of levels based on determining to process the query at one of the plurality of levels. Step 2882 includes selecting one of a plurality of possible parent nodes in a sequentially higher one of the plurality of levels based on the query discriminator number. Step 2884 includes sending the query resultant data to the one of the plurality of possible parent nodes for processing.

In various embodiments, the level assignment information is determined based on a cluster-level mapping generated by execution of a consensus protocol mediated via a set of nodes in a computing cluster that includes the node. The cluster-level mapping indicates assignment of each of a plurality of subsets of the plurality of levels to a corresponding one of the set of nodes. In various embodiments, determining the level assignment information includes selecting the cluster-level mapping from a plurality of sequential cluster-level mappings that has a corresponding compute sequence number that compares favorably to a computer sequence number determined for the query. In various embodiments, the query execution plan includes assignment of a plurality of nodes in a plurality of computing clusters that includes the computing cluster. Each of the plurality of computing clusters includes a subset of the plurality of nodes, and each of the plurality of computing clusters independently generates corresponding level assignment information based on executing its own consensus protocol mediated via the corresponding subset of the plurality nodes. In various embodiments, the cluster-level mapping indicates assignment of the set of nodes to only nodes in a set of two or more consecutive levels of the query execution plan, where the set of two or more consecutive levels is a proper subset of the plurality of levels.

In various embodiments, the method includes determining the plurality of possible parent nodes based on the level assignment information. In various embodiments, each of the plurality of possible parent nodes are listed for assignment to the sequentially higher one of the plurality of levels in the level assignment information with one of a set of corresponding indices. In various embodiments, selecting one of the plurality of possible parent nodes includes performing a deterministic function on the query discriminator number to generate a computed index, and further includes selecting the one of the plurality of possible parent nodes by identifying the one of the plurality of possible parent nodes with a corresponding index in the set of the corresponding indices that matches the computed index. In various embodiments, performing the deterministic function includes performing a modulo operation on the query discriminator number, where a modulus of the modulo operation is equal to a number of nodes in the plurality of possible parent nodes.

In various embodiments, the method includes receiving a plurality of queries, and further includes determining a query discriminator number for each of the plurality of queries. For each of the plurality of queries, the method includes determining whether to process the each query at the one or more of the plurality of levels. When it is determined to process the each query at the inner level of the subset of levels, query resultant data is generated by facilitating partial execution of the query in accordance with the inner level of the query execution plan, and one of the plurality of possible parent nodes in the sequentially higher one of the plurality of levels is selected based on the query discriminator number of the each query. The query resultant data of the each query is to the one of the plurality of possible parent nodes for processing. In various embodiments, a distribution of selection of the plurality of possible parent nodes in the sequentially higher one of the plurality of levels across all of the plurality of queries is in accordance with a uniform distribution based on a distribution of the query discriminator numbers of the plurality of queries and/or based on the deterministic function utilized to select the one of the plurality of parent nodes.

In various embodiments, determining the query discriminator number corresponding to the query includes receiving a query request that includes the query, and further includes extracting the query discriminator number from the query request. In various embodiments, determining the query discriminator number includes performing a deterministic function upon the query, for example, where the deterministic function is indicated in the level assignment information.

In various embodiments, the plurality of possible parent nodes includes the node based on the level assignment information indicating assignment to the sequentially higher one of the plurality of levels. The query resultant data is processed by the node in accordance with the sequentially higher one of the plurality of levels of the query execution plan to generate subsequent query resultant data when the node itself is selected from the plurality of possible parent nodes to process the query resultant data.

The method can further include receiving a set of query resultant data from a corresponding set of nodes, where each of the set of query resultant data is generated by a corresponding one of the corresponding set of nodes in accordance with the inner level of the query execution plan, and where each of the corresponding set of nodes determines to send their query resultant data to the node based on selecting the node from the plurality of possible parent nodes based on the query discriminator number. Generating the subsequent query resultant data includes gathering, performing a union upon, aggregating, and/or or otherwise processing the query resultant data generated by the node itself with the set of query resultant data received from the corresponding set of nodes in accordance with the sequentially higher one of the plurality of levels of the query execution plan. This can include performing an additional at least one operator of the query upon the resultant data generated by the node itself and the set of query resultant data received from the corresponding set of nodes. In various embodiments, each of the set of nodes determines to send their query resultant data to the node independently, in isolation and/or without coordination. In various embodiments, each of the set of nodes determines to send their query resultant data to the node without receiving a request from the node to send their query resultant data.

In various embodiments, the query includes a plurality of operators. The plurality of operators includes a first subset of operators that includes the at least one operator and a second subset of operators that includes the additional at least one operator. Full execution of the query in accordance with the query execution plan can include performance of the first subset of operators by nodes executing at the one of the plurality of levels and can further include performance of the second subset of operators by nodes executing at the sequentially higher one of the plurality of levels. In various embodiments, the plurality of operators is segmented into the plurality of subsets of operators that includes the first subset and the second subset. Each subset of the plurality of subsets is performed by nodes at a corresponding one of the plurality of levels.

In various embodiments, determining to process the query at the one of the levels is based on a hierarchical position of the one of the levels. In various embodiments, the query is determined to be processed at the one of the plurality of levels based on determining the one of the plurality of levels is the lowest level of the plurality of levels. In various embodiments, the lowest level of the plurality of levels corresponds to an IO level, and the corresponding subset of the plurality of subsets of operators of the query includes select operators and/or read operators. In various embodiments, generating the query resultant data by facilitating execution of the least one query operator of the query in accordance lowest level includes facilitating reading of rows required to execute the query, for example, based on retrieval of corresponding physical segments from storage and/or based on recovery of corresponding virtual segments via a recovery scheme.

In various embodiments, level assignment information is determined based on the cluster-level mapping generated by execution of the consensus protocol mediated via the set of nodes in the computing cluster that includes the node. The cluster-level mapping indicates assignment of a subset of the set of nodes to the lowest level, where each node in the subset of the set of nodes in the computing cluster processes the query in accordance with the lowest level, and where exactly one node of the set of nodes in the computing cluster processes the query in accordance with the sequentially higher one of the plurality of levels.

In various embodiments, determining the query is to be processed at the one of the plurality of levels includes determining the one of the plurality of levels is an inner level of the plurality of levels and further includes determining, based on the query discriminator number, whether or not to process the query at the one of the plurality of levels in response to determining the one of the plurality of levels is an inner level. In various embodiments, determining whether or not to process the query at the one of the plurality of levels in response to determining the one of the plurality of levels is an inner level is based on generating function output by performing a function on the query discriminator number, where the function output indicates one of a plurality of possible nodes. The node determines to process the query at the one of the plurality of levels when the one of the plurality of possible nodes matches or compares favorably to the node itself. The node determines not to process the query at the one of the plurality of levels when the one of the plurality of possible nodes does not match, corresponds to a different node, and/or compares unfavorably to the node itself.

In various embodiments, the node determines to process the query at the one of the plurality of levels based on the one of the plurality of possible nodes indicated by the function output compares favorably to the node itself. In various embodiments, the method includes determining a second query for execution and determining a second query discriminator number corresponding to the second query. The method further includes determining whether or not to process the second query at the one of the plurality of levels in response to determining the one of the plurality of levels is an inner level. The method further includes generating second function output by performing the function on the second query discriminator number. The method further includes determining not to process the second query at the one of the plurality of levels based on the second one of the plurality of possible nodes indicated by the second function output comparing unfavorably to the node itself and/or corresponds to a different node. In various embodiments, the different node determines to perform the second query at the one of the plurality of levels by performing the function on the second query discriminator number and by determining the corresponding function output corresponds to the different node itself.

In various embodiments, a non-transitory computer readable storage medium includes at least one memory section that stores operational instructions that, when executed by a processing module that includes a processor and a memory, cause the processing module to determine level assignment information indicating assignment to a subset of levels of a plurality of levels of a query execution plan, where the plurality of levels includes a lowest level, at least one inner level, and a highest level. The operational instructions, when executed by the processing module, further causes the processing module to determine a query for execution and determine a query discriminator number corresponding to the query. The processing module determines to process the query at one of the plurality of levels based on determining the one of the plurality of levels is included in the subset of levels, and generates query resultant data by facilitating execution of at least one query operator of the query in accordance with the one of the plurality of levels. The processing module selects one of a plurality of possible parent nodes in a sequentially higher one of the plurality of levels based on the query discriminator number and sends the query resultant data to the one of the plurality of possible parent nodes for processing.

In the method illustrated in FIG. 28O, step 2886 includes determining first level assignment information indicating assignment to a first subset of levels of a plurality of levels of a query execution plan based on a first cluster-level mapping generated by participation in a first execution of a consensus protocol mediated via a set of nodes in a computing cluster that includes the node, where the first level assignment information indicates a first compute sequence number. Step 2888 includes determining second level assignment information indicating assignment to a second subset of levels of the plurality of levels of the query execution plan based on a second cluster-level mapping generated by participation in a second execution of the consensus protocol mediated via the set of nodes in the computing cluster, where the second level assignment information indicates a second compute sequence number that is different from the first compute sequence number. Step 2890 includes receiving and/or otherwise determining a query for execution. Step 2892 includes determining a compute sequence number tag for the first query that indicates the value of the first compute sequence number. Step 2894 includes determining to utilize the first level assignment information based on determining the compute sequence number tag for the first query that indicates the value of the first compute sequence number.

Step 2896 includes determining to process the query at one of the plurality of levels based on determining the one of the plurality of levels is included in the first subset of levels and based on determining to utilize the first level assignment information. In various embodiments, the one of the plurality of levels is not included in the second subset of levels of the plurality of levels indicated by the second level assignment information. Step 2898 includes generating query resultant data by facilitating execution of at least one query operator of the query in accordance with the one of the plurality of levels based on determining to process the query at the one of the plurality of levels.

In various embodiments, once the first level assignment information is determined to be utilized in step 2894, some of all remaining steps 2896 and/or 2898 can be implemented based on the method illustrated in FIG. 28N, for example, or where the level assignment information of FIG. 28N is implemented as the first level assignment information determined to be utilized in step 2894. Thus, step 2878 can be utilized to implement step 2896 and/or step 2880 can be utilized to implement step 2898. Furthermore, remaining steps of FIG. 28N can be applied to the method of FIG. 28O, for example, where steps 2882 and/or 2884 are performed after the method of FIG. 28O performs step 2898.

In particular, in various embodiments, the method can further include generating query resultant data by facilitating partial execution of the query in accordance with the one of the plurality of levels, The method can include determining a plurality of possible parent nodes in a sequentially higher one of the plurality of levels indicated in the first cluster-level mapping based on determining the compute sequence number tag for the query that indicates the value of the first compute sequence number. The method can further include selecting one of the plurality of possible parent nodes in a sequentially higher one of the plurality of levels based on the query, for example, by utilizing a query discriminator of the query. The method can further include sending the query resultant data to the one of the plurality of possible parent nodes for processing.

In various embodiments, a set difference between the first subset of levels and the second subset of levels is non-null. In various embodiments, the one of the plurality of levels is not included in the second subset of levels. In various embodiments, the set difference between the first subset of levels and the second subset of levels is non-null based on a migration of at least one segment stored by the node, a failure of a memory drive of the node, and/or a failure of another node in the computing cluster.

In various embodiments, execution of the query is facilitated by the node during a temporal period. The temporal period begins prior to determining the second level assignment information, and the temporal period ends after determining the second level assignment information. In various embodiments, the second level assignment information is determined more recently than the first level assignment information, and the values of the first compute sequence number and the second compute sequence number indicate the second level assignment information is more recent than the first level assignment information. In various embodiments, determining the compute sequence number tag of the query includes assigning the value of the first compute sequence number to the compute sequence number tag of the query in response to receiving the query and/or based on determining the first level assignment information is the most recently determined level assignment information of a plurality of previously determined level assignment information.

In various embodiments, the method includes receiving a second query request indicating a second query for execution, where the second query request includes a compute sequence number tag that indicates the value of the second compute sequence number. The method includes determining to utilize the second level assignment information for the second query based on determining the compute sequence number tag for the second query indicates the value of the second compute sequence number. In various embodiments, the method includes determining not to process the second query at the one of the plurality of levels based on determining the one of the plurality of levels is not included in the second subset of levels and based on determining to utilize the second level assignment information.

In various embodiments, the method includes determining not to process the query at a second one of the plurality of levels based on determining the second one of the plurality of levels is not included in the first subset of levels and based on determining to utilize the first level assignment information for the query. The method further includes determining to process the second query at the second one of the plurality of levels based on determining the second one of the plurality of levels is included in the second subset of levels and based on determining to utilize the second level assignment information for the second query. The method further includes generating second query resultant data by facilitating execution of at least one query operator of the second query in accordance with the second one of the plurality of levels based on determining to process the second query at the second one of the plurality of levels. In various embodiments, execution of the query is facilitated by the node within a first temporal period. Execution of the second query is facilitated by the node within a second temporal period, where an overlap between the first temporal period and the second temporal period is non-null.

In various embodiments, the query is received in a query request, and determining the compute sequence number tag for the query is based on extracting the compute sequence number tag for the query from the query request. In various embodiments, the query is received for execution by each of the plurality of other nodes in the computing cluster. Each of the plurality of other nodes determine the compute sequence number tag for the query indicating the value of the first compute sequence number. Each of the plurality of other nodes utilize the first level assignment information to execute the query based on determining the compute sequence number tag for the query indicates the value of the first compute sequence number. In various embodiments, some or all of the plurality of other nodes determine the first level assignment information via their participation in the first execution of the consensus protocol. In various embodiments, first level assignment information indicates a plurality of subsets of the plurality of levels. The first level assignment information indicates each node in the plurality of other nodes is mapped to assignment to levels of one of the plurality of subsets, where each subset in the plurality of subsets is mapped to one of the plurality of other nodes or the node itself.

In various embodiments, the method includes determining at least one other node in the computing cluster failed to execute the query in accordance with one of the plurality of levels assigned to the other node in the first level assignment data. The method further includes aborting and/or terminating execution of the query based on determining the at least one other node in the computing cluster failed to execute the query.

In various embodiments the one of the plurality of levels corresponds to an IO level. The method includes determining a set of segments required for the node to execute the query at the IO level based on data ownership information that indicates the set of segments. In various embodiments, the data ownership information is determined from a plurality of data ownership information based on an ownership sequence number tagged to the query that is different from the compute sequence number. The method can include performing row reads via the set of segments to execute the query at the IO level, for example, where the at least one operator indicates the row reads and where the query resultants indicates a plurality of rows of the set of segments. In various embodiments, a first subset of the set of segments are retrieved from segment storage by the node based on being indicated in the data ownership information as physical segments, and a second subset of the set of segments are recovered by the node via a recovery scheme based on being indicated in the data ownership information as virtual segments.

In various embodiments, the method includes determining at least one of the set of segments is unavailable for retrieval as a physical segment and/or for recovery as a virtual segment. The method includes sending an error message to other nodes in the computing cluster indicating the at least one of the set of segments is unavailable. In various embodiments, the other nodes abort and/or terminate execution of the query in response to the error message and/or in response to detecting the node's failure to generate its query resultant data for the query. In various embodiments, a final query resultant is not generated via full execution of the query execution plan based on the error message.

In various embodiments, the method includes facilitating re-execution of the query by determining an updated compute sequence number tag for the first query that indicates the value of the second compute sequence number, and by performing in only one or more levels of the second subset of the plurality of levels based on determining the updated compute sequence number tag for the re-execution of the query that indicates the value of the second ownership sequence number. In various embodiments, at least one of the set of segments is unavailable to the node during the re-execution of the first query. In various embodiments, re-execution of the first query is successful based on the IO level not being included in second subset of levels in the second level assignment data.

In various embodiments, the re-execution of the first query is successful further based on an updated data ownership information being utilized in re-execution of the first query, where the updated ownership information assigns the at least one of the set of segments to a different node in the computing cluster, where the different node in the computing cluster is assigned to the IO level in the level assignment data, and where the different node re-executes the query in accordance with the IO level by utilizing the at least one of the set of segments based on the updated ownership information. In various embodiments, the updated ownership information is generated by the computing cluster in conjunction with the second level assignment data via the execution of the second execution of the consensus protocol.

In various embodiments, a non-transitory computer readable storage medium includes at least one memory section that stores operational instructions that, when executed by a processing module that includes a processor and a memory, cause the processing module to determine first level assignment information indicating assignment to a first subset of levels of a plurality of levels of a query execution plan based on a first cluster-level mapping generated by participation in a first execution of a consensus protocol. The first level assignment information indicates a first compute sequence number. The operational instructions, when executed by the at least one processor, further cause processing module to determine second level assignment information indicating assignment to a second subset of levels of the plurality of levels of the query execution plan based on a second cluster-level mapping generated by participation in a second execution of the consensus protocol mediated. The second level assignment information indicates a second compute sequence number that is different from the first compute sequence number.

The processing module determines a query for execution and determines a compute sequence number tag for the query that indicates the value of the first compute sequence number. The processing module determines to utilize the first level assignment information based on determining the compute sequence number tag for the query that indicates the value of the first compute sequence number. The processing module determines to process the query at one of the plurality of levels based on determining the one of the plurality of levels is included in the first subset of levels and based on determining to utilize the first level assignment information. The processing module generates query resultant data by facilitating execution of at least one query operator of the query in accordance with the one of the plurality of levels based on determining to process the query at the one of the plurality of levels.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, a set of memory locations within a memory device or a memory section. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a processing system of a node, comprising:
response to receiving a query from a computing device via a network:
determining, via at least one processor, the query for execution over a plurality of sequential time slices, wherein one sequential time slice of the plurality of sequential time slices includes a first utilization level of a plurality of utilization levels that is determined for a first memory drive of a set of memory drives and a second utilization level of the plurality of utilization levels that is determined for a second memory drive of the set of memory drives, wherein the first utilization level is more unfavorable than the second utilization level based on the first memory drive of the set of memory drives having first current resource utilization metrics indicating lower resource utilization than second current resource utilization metrics of the second memory drive of the set of memory drives;
identifying, via the at least one processor, a set of segments required to execute the query, wherein the set of segments is stored in the set of memory drives, wherein the set of memory drives includes the first memory drive and the second memory drive;
for each sequential time slice of the plurality of the sequential time slices:

identifying, via the at least one processor, maximum utilization data for the set of memory drives, wherein the identifying the maximum utilization data includes determining, based on a raw measurement or estimate of throughput of the set of memory drives, the plurality of utilization levels, wherein each utilization level of the plurality of utilization levels corresponds to a corresponding memory drive of the set of memory drives;

selecting, via the at least one processor, a selected one memory drive of the set of memory drives based on the identified maximum utilization data, wherein the selected one memory drive of the set of memory drives is selected based on the selected one memory drive of the set of memory drives having a most unfavorable utilization level of the plurality of utilization levels based on having a highest available utilization of the set of memory drives;

retrieving, via the at least one processor, a retrieved one segment of the set of segments stored in the selected one memory drive of the set of memory drives to facilitate one partial execution of a set of partial executions of the query by utilizing the retrieved one segment of the set of segments; and executing, via the at least one processor, the one partial execution of the set of partial executions for the retrieved one segment of the set of segments to generate results of the query;

wherein each segment of the set of segments is retrieved in a corresponding sequential time slice of the plurality of sequential time slices, wherein each partial execution of the set of partial executions is facilitated utilizing a corresponding one of the set of segments, wherein the facilitation of the set of partial executions yields execution of the query.

2. The method of claim 1, wherein the plurality of utilization levels are determined based on determining current resource utilization metrics for each memory drive of the set of memory drives by sampling each memory drive of the set of memory drives.

3. The method of claim 1, wherein the plurality of utilization levels are further determined based on determining at least one prior subset of the set of segments retrieved in at least one corresponding prior time slice of the plurality of sequential time slices.

4. The method of claim 3, wherein, for one of the plurality of sequential time slices:

retrieval of a first prior subset of the set of segments from a first one of the set of memory drives was initiated within a subset of prior time slices of the plurality of sequential time slices, wherein retrieval of a second prior subset of the set of segments from a second one of the set of memory drives was initiated within the subset of prior time slices of the plurality of sequential time slices, wherein a first utilization level of the plurality of utilization levels is determined for the first one of the set of memory drives based on a first number of segments in the first prior subset of the set of segments, wherein a second utilization level of the plurality of utilization levels is determined for the second one of the set of memory drives based on a second number of segments in the second prior subset of the set of segments, and wherein the first utilization level is more unfavorable than the second utilization level based on the first number of segments in the first prior subset of the set of segments being lower than the second number of segments in the second prior subset of the set of segments.

5. The method of claim 4, further comprising:

determining, for the one of the plurality of sequential time slices, the first prior subset of the set of segments and the second prior subset of the set of segments based on determining ones of the set of segments whose retrieval is currently in progress during the one of the plurality of sequential time slices.

6. The method of claim 1, wherein one of the set of memory drives is determined to have a most unfavorable utilization level of the plurality of utilization levels based on having a utilization level indicating a lowest level of current resource utilization of the plurality of utilization levels.

7. The method of claim 1, further comprising:

determining a maximum throughput for each memory drive of the set of memory drives; and determining available utilization for the each memory drive of the set of memory drives based on a difference between the maximum throughput of the each memory drive of the set of memory drives and the utilization level of the each memory drive of the set of memory drives;

wherein one of the set of memory drives is determined to have a most unfavorable utilization level of the plurality of utilization levels based on having a highest available utilization of the set of memory drives.

8. The method of claim 1, further comprising:

determining a plurality of queries for execution that includes the query; and determining a plurality of sets of segments by determining, for each query of the plurality of queries, a corresponding set of segments required to execute the query, wherein the plurality of sets of segments is stored in the set of memory drives;

wherein one of the plurality of sets of segments is retrieved for each sequential time slice of the plurality of sequential time slices based on the selection of the one of the set of memory drives based on the maximum utilization data, wherein each partial execution of a plurality of sets of partial executions is facilitated by utilizing a corresponding one of the plurality of sets of segments, and wherein facilitation of each set of partial executions in the plurality of sets of partial executions yields execution of a corresponding one of the plurality of queries.

9. The method of claim 8, wherein a first time slice of the plurality of sequential time slices includes a retrieval of a first one of the plurality of sets of segments, wherein a second time slice of the plurality of sequential time slices includes a retrieval of a second one of the plurality of sets of segments, wherein a third time slice of the plurality of sequential time slices includes a retrieval of a third one of the plurality of sets of segments, wherein the first time slice is before the second time slice in the plurality of sequential time slices, and wherein the second time slice is before the third time slice in the plurality of sequential time slices;

wherein the first one of the plurality of sets of segments is utilized to facilitate a partial execution of a first one of the plurality of queries, wherein the second one of the plurality of sets of segments is utilized to facilitate a partial execution of a second one of the plurality of queries, and wherein the third one of the plurality of sets of segments is utilized to facilitate a partial execution of the first one of the plurality of queries.

10. A node of a computing device comprising:
at least one processor; and
memory that stores executable instructions that, when executed by the at least one processor, cause at least one processing module of the node to:
response to receiving a query from a computing device via a network:
determine the query for execution over a plurality of sequential time slices, wherein one sequential time slice of the plurality of sequential time slices includes a first utilization level of a plurality of utilization levels that is determined for a first memory drive of a set of memory drives and a second utilization level of the plurality of utilization levels that is determined for a second memory drive of the set of memory drives, wherein the first utilization level is more unfavorable than the second utilization level based on the first memory drive of the set of memory drives having first current resource utilization metrics indicating lower resource utilization than second current resource utilization metrics of the second memory drive of the set of memory drives;
identify a set of segments required to execute the query, wherein the set of segments is stored in the set of memory drives, wherein the set of memory drives includes the first memory drive and the second memory drive; for each sequential time slice of the plurality of the sequential time slices:
identify maximum utilization data for the set of memory drives, wherein the identifying the maximum utilization data includes determining, based on a raw measurement or estimate of throughput of the set of memory drives, the plurality of utilization levels, wherein each utilization level of the plurality of utilization levels corresponds to a corresponding memory drive of the set of memory drives;
select a selected one memory drive of the set of memory drives based on the identified maximum utilization data, wherein the selected one memory drive of the set of memory drives is selected based on the selected one memory drive of the set of memory drives having a most unfavorable utilization level of the plurality of utilization levels based on having a highest available utilization of the set of memory drives;
retrieve a retrieved one segment of the set of segments stored in the selected one memory drive of the set of memory drives to facilitate one partial execution of a set of partial executions of the query by utilizing the retrieved one segment of the set of segments; and
execute the one partial execution of the set of partial executions for the retrieved one segment of the set of segments within one or more time slices to generate results of the query;
wherein each segment of the set of segments is retrieved in a corresponding sequential time slice of the plurality of sequential time slices, wherein each partial execution of the set of partial executions is facilitated utilizing a corresponding one of the set of segments, wherein the facilitation of the set of partial executions yields execution of the query.

11. The node of claim 10, wherein the plurality of utilization levels are determined based on determining current resource utilization metrics for each memory drive of the set of memory drives by sampling each memory drive of the set of memory drives.

12. The node of claim 10, wherein the plurality of utilization levels are determined based on determining at least one prior subset of the set of segments retrieved in at least one corresponding prior time slice of the plurality of sequential time slices.

13. The node of claim 12, wherein, for one of the plurality of sequential time slices:
retrieval of a first prior subset of the set of segments from a first one of the set of memory drives was initiated within a subset of prior time slices of the plurality of sequential time slices, wherein retrieval of a second prior subset of the set of segments from a second one of the set of memory drives was initiated within the subset of prior time slices of the plurality of sequential time slices, wherein a first utilization level of the plurality of utilization levels is determined for the first one of the set of memory drives based on a first number of segments in the first prior subset of the set of segments, wherein a second utilization level of the plurality of utilization levels is determined for the second one of the set of memory drives based on a second number of segments in the second prior subset of the set of segments, and wherein the first utilization level is more unfavorable than the second utilization level based on the first number of segments in the first prior subset of the set of segments being lower than the second number of segments in the second prior subset of the set of segments.

14. The node of claim 13, wherein the executable instructions that, when executed by the at least one processor, further cause at least one processing module of the node to:
determine, for the one of the plurality of sequential time slices, the first prior subset of the set of segments and the second prior subset of the set of segments based on determining ones of the set of segments whose retrieval is currently in progress during the one of the plurality of sequential time slices.

15. The node of claim 10, wherein one of the set of memory drives is determined to have a most unfavorable utilization level of the plurality of utilization levels based on having a utilization level indicating a lowest level of current resource utilization of the plurality of utilization levels.

16. A non-transitory computer readable storage medium comprises:
at least one memory section that stores operational instructions that, when executed by a processing module that includes a processor and a memory, causes the processing module to:
response to receiving a query from a computing device via a network:
determine the query for execution over a plurality of sequential time slices, wherein one sequential time slice of the plurality of sequential time slices includes a first utilization level of a plurality of utilization levels that is determined for a first memory drive of a set of memory drives, and a second utilization level of the plurality of utilization levels is determined for a second memory drive of the set of memory drives, wherein the first utilization level is more unfavorable than the second utilization level based on the first memory drive of the set of memory drives having first current resource utilization metrics indicating lower resource utilization than second current resource utilization metrics of the second memory drive of the set of memory drives;

identify a set of segments required to execute the query, wherein the set of segments is stored in the set of memory drives, wherein the set of memory drives includes the first memory drive and the second memory drive;

for each sequential time slice of the plurality of the sequential time slices:

identify maximum utilization data for the set of memory drives, wherein the identifying the maximum utilization data includes determining, based on a raw measurement or estimate of throughput of the set of memory drives, the plurality of utilization levels, wherein each utilization level of the plurality of utilization levels corresponds to a corresponding memory drive of the set of memory drives;

select a selected one memory drive of the set of memory drives based on the identified maximum utilization data, wherein the selected one memory drive of the set of memory drives is selected based on the selected one memory drive of the set of memory drives having a most unfavorable utilization level of the plurality of utilization levels based on having a highest available utilization of the set of memory drives;

retrieve a retrieved one segment of the set of segments stored in the selected one memory drive of the set of memory drives to facilitate one partial execution of a set of partial executions of the query by utilizing the retrieved one segment of the set of segments; and execute the one partial execution of the set of partial executions for the retrieved one segment of the set of segments to generate results of the query;

wherein each segment of the set of segments is retrieved in a corresponding sequential time slice of the plurality of sequential time slices, wherein each partial execution of the set of partial executions is facilitated utilizing a corresponding one of the set of segments, wherein the facilitation of the set of partial executions yields execution of the query.

* * * * *